US012692439B2

(12) United States Patent
Hoshino et al.

(10) Patent No.: US 12,692,439 B2
(45) Date of Patent: Jul. 28, 2026

(54) COMPOSITION, POLARIZER LAYER, LAMINATE, AND IMAGE DISPLAYING DEVICE

(71) Applicant: FUJIFILM Corporation, Tokyo (JP)

(72) Inventors: Wataru Hoshino, Kanagawa (JP); Yuki Hirai, Kanagawa (JP); Hiroshi Matsuyama, Kanagawa (JP); Naoya Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/685,002

(22) Filed: Mar. 2, 2022

(65) Prior Publication Data

US 2023/0062801 A1 Mar. 2, 2023

Related U.S. Application Data

(63) Continuation of application No. PCT/JP2020/033595, filed on Sep. 4, 2020.

(30) Foreign Application Priority Data

Sep. 5, 2019 (JP) ................................ 2019-162262
Mar. 27, 2020 (JP) ................................ 2020-058300

(51) Int. Cl.
*G02F 1/1333* (2006.01)
*C09K 19/30* (2006.01)
*C09K 19/34* (2006.01)

(52) U.S. Cl.
CPC ...... *C09K 19/3003* (2013.01); *C09K 19/3491* (2013.01); *C09K 19/3497* (2013.01); *C09K 2019/3004* (2013.01); *C09K 2323/031* (2020.08)

(58) Field of Classification Search
CPC ........... C09K 19/3003; C09K 19/3491; C09K 19/3497; C09K 19/601; C09K 19/3804; C09K 19/3852; C09K 2019/3004; C09K 2019/0444; C09K 2019/0448; C09K 2019/528
See application file for complete search history.

(56) References Cited

U.S. PATENT DOCUMENTS

| | | | | |
|---|---|---|---|---|
| 7,311,949 | B2 * | 12/2007 | Yoshizawa | C09K 19/542 428/1.31 |
| 7,427,364 | B2 * | 9/2008 | Takaku | C09K 19/60 252/299.1 |
| 7,780,870 | B2 * | 8/2010 | Kato | C09K 19/60 252/299.6 |
| 2003/0039768 | A1 | 2/2003 | Buchecker et al. | |
| 2003/0218709 | A1 | 11/2003 | Ito et al. | |
| 2015/0357599 | A1 | 12/2015 | Kawakami et al. | |
| 2019/0322937 | A1 | 10/2019 | Matsuyama et al. | |
| 2020/0018879 | A1 | 1/2020 | Katou et al. | |
| 2020/0033663 | A1 | 1/2020 | Hoshino et al. | |
| 2020/0318010 | A1 | 10/2020 | Hoshino et al. | |
| 2020/0326590 | A1 | 10/2020 | Shibata et al. | |
| 2023/0062801 | A1 * | 3/2023 | Hoshino | C09K 19/3852 |

FOREIGN PATENT DOCUMENTS

| | | | |
|---|---|---|---|
| JP | 2001-004834 | A | 1/2001 |
| JP | 2003-520878 | A | 7/2003 |
| JP | 2014-159124 | A | 9/2014 |
| KR | 10-2003-0013414 | A | 2/2003 |
| WO | 2018/124198 | A1 | 7/2018 |
| WO | 2018/186503 | A1 | 10/2018 |
| WO | 2018/199096 | A1 | 11/2018 |
| WO | 2019/131943 | A1 | 7/2019 |
| WO | 2019/131949 | A1 | 7/2019 |
| WO | 2019/132018 | A1 | 7/2019 |

OTHER PUBLICATIONS

Office Action, issued by the State Intellectual Property Office of China on Sep. 19, 2022, in connection with Chinese Patent Application No. 202080062168.9.
Office Action, issued by the Japanese Patent Office on Nov. 29, 2022, in connection with Japanese Patent Application No. 2021-544051.
Office Action, issued by the State Intellectual Property Office of China on Feb. 24, 2023, in connection with Chinese Patent Application No. 202080062168.9.
International Search Report issued in PCT/JP2020/033595 on Nov. 24, 2020.
Written Opinion issued in PCT/JP2020/033595 on Nov. 24, 2020.
International Preliminary Report on Patentability completed by WIPO on Mar. 8, 2022 in connection with International Patent Application No. PCT/JP2020/033595.

(Continued)

*Primary Examiner* — Geraldina Visconti
(74) *Attorney, Agent, or Firm* — Edwards Neils LLC; Jean C. Edwards, Esq.

(57) ABSTRACT

Provided is a composition that is capable of forming a polarizer layer having an excellent degree of alignment and excellent adhesiveness to another layer in a case of being applied to a laminate, a polarizer layer, a laminate, and an image display device. The composition of the present invention is a composition including at least a polymer liquid crystal compound, a dichroic material, and a low-molecular-weight liquid crystal compound, in which the polymer liquid crystal compound is a copolymer having a repeating unit (1) represented by Formula (1), the low-molecular-weight liquid crystal compound is a compound represented by Formula (LC), and relationships represented by Expressions $|\log P(SP1)-\log P(SPL1)|\leq 2.0$ (11), $|\log P(MG1)-\log P(SP1)|\geq 4.5$ (12), and $|\log P(ML)-\log P(SPL1)|\geq 4.0$ (13) are satisfied.

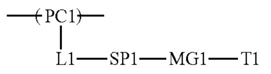

(1)

Q1—SPL1—ML—SPL2—Q2 (LC)

17 Claims, 1 Drawing Sheet

(56) References Cited

OTHER PUBLICATIONS

Office Action issued by the Korean Intellectual Property Office on Mar. 13, 2024, in connection with Korean Patent Application No. 10-2022-7006829.
Office Action issued by the Korean Intellectual Property Office on Sep. 20, 2024, in connection with Korean Patent Application No. 10-2022-7006829.

* cited by examiner

COMPOSITION, POLARIZER LAYER, LAMINATE, AND IMAGE DISPLAYING DEVICE

CROSS-REFERENCE TO RELATED APPLICATIONS

This application is a Continuation of PCT International Application No. PCT/JP2020/033595 filed on Sep. 4, 2020, which was published under PCT Article 21(2) in Japanese, and which claims priority under 35 U.S.C. § 119(a) to Japanese Patent Application No. 2019-162262 filed on Sep. 5, 2019 and Japanese Patent Application No. 2020-058300 filed on Mar. 27, 2020. The above applications are hereby expressly incorporated by reference, in their entirety, into the present application.

BACKGROUND OF THE INVENTION

1. Field of the Invention

The present invention relates to a composition, a polarizer layer, a laminate, and an image display device.

2. Description of the Related Art

In the related art, in a case where an attenuation function, a polarization function, a scattering function, a light-shielding function of irradiation light including laser light or natural light is required, a device that is operated according to principles different for each function is used. Therefore, products corresponding to the above-described functions are also produced by production processes different for each function.

For example, a linear polarizer or a circular polarizer is used in an image display device (for example, a liquid crystal display device) to control optical rotation or birefringence in display. Further, a circular polarizer is used in an organic light emitting diode (OLED) to prevent reflection of external light.

In the related art, iodine has been widely used as a dichroic material in these polarizers, but a polarizer that uses an organic dye in place of iodine as a dichroic material has also been examined.

For example, WO2018/199096A describes a liquid crystal composition containing a polymer liquid crystal compound, a low-molecular-weight liquid crystal compound, and a dichroic material (claim 1).

SUMMARY OF THE INVENTION

As a result of examination on a light absorption anisotropic layer (polarizer layer) obtained using the liquid crystal composition described in WO2018/199096A, the present inventors found that both a high degree of alignment and high adhesiveness between a polarizer layer and another layer in a case of being applied to a laminate are difficult to achieve depending on the kinds of the polymer liquid crystal compound and the low-molecular-weight liquid crystal compound contained in the liquid crystal composition.

Therefore, an object of the present invention is to provide a composition that is capable of forming a polarizer layer having an excellent degree of alignment and excellent adhesiveness to another layer in a case of being applied to a laminate, a polarizer layer, a laminate, and an image display device.

As a result of intensive examination conducted by the present inventors, it was found that a polarizer layer having an excellent degree of alignment and excellent adhesiveness to another layer in a case of being applied to a laminate can be formed by using a composition obtained by combining a polymer liquid crystal compound and a low-molecular-weight liquid crystal compound which satisfy a specific relationship, thereby completing the present invention.

That is, the present inventors found that the above-described object can be achieved by employing the following configurations.

[1] A composition comprising: at least a polymer liquid crystal compound; a dichroic material; and a low-molecular-weight liquid crystal compound, in which the polymer liquid crystal compound is a copolymer having a repeating unit (1) represented by Formula (1), the low-molecular-weight liquid crystal compound is a compound represented by Formula (LC), and relationships represented by Expressions (11) to (13) are satisfied.

In Formula (1), PC1 represents a main chain of the repeating unit, L1 represents a single bond or a divalent linking group, SP1 represents a spacer group, MG1 represents a mesogen group, and T1 represents a terminal group.

In Formula (LC), SPL1 and SPL2 each independently represent a spacer group, ML represents a mesogen group, Q1 and Q2 each independently represent a crosslinkable group or a terminal group, and at least one of Q1 or Q2 represents a crosslinkable group.

$$|\log P(SP1)-\log P(SPL1)|\leq 2.0 \quad (11)$$

$$|\log P(MG1)-\log P(SP1)|\geq 4.5 \quad (12)$$

$$|\log P(ML)-\log P(SPL1)|\geq 4.0 \quad (13)$$

In Formulae (11) to (13), log P(SP1) represents a log P value of SP1 in Formula (1), log P(MG1) represents a log P value of MG1 in Formula (1), log P(SPL1) represents a log P value of SPL1 in Formula (LC), and log P(ML) represents a log P value of ML in Formula (LC).

[2] The composition according to [1], in which relationships represented by Expressions (20) and (21) are satisfied.

$$D(SPL1)\geq D(SPL2) \quad (20)$$

$$|D(SP1)-D(SPL1)|\leq 4.0 \text{ Å} \quad (21)$$

In Expressions (20) and (21), D(SPL1) represents a molecular length of SPL1 in Formula (LC), D(SPL2) represents a molecular length of SPL2 in Formula (LC), and D(SP1) represents a molecular length of SP1 in Formula (1).

[3] The composition according to [1], in which Expressions (20) and (41') are satisfied.

$$D(SPL1)\geq D(SPL2) \quad (20)$$

$$D(SPL2)\leq 4.0 \text{ Å} \quad (41')$$

In Expressions (20) and (41'), D(SPL1) represents a molecular length of SPL1 in Formula (LC), and D(SPL2) represents a molecular length of SPL2 in Formula (LC).

[4] The composition according to any one of [1] to [3], in which a relationship represented by Expression (31) is satisfied.

$$\log P(SPL2)\leq 1.5 \quad (31)$$

Here, in Formula (31), log P(SPL2) represents a log P value of SPL2 in Formula (LC).

[5] The composition according to any one of [1] to [4], in which the polymer liquid crystal compound further has a repeating unit (4) represented by Formula (4), and a content of the repeating unit (4) is 10% by mass or greater with respect to all repeating units of the polymer liquid crystal compound.

Here, in Formula (4), PC4 represents a main chain of the repeating unit, L4 represents a single bond or a divalent linking group, SP4 represents a spacer group, and T4 represents a crosslinkable group.

[6] The composition according to [5], in which the number of atoms in a main chain of SP4 in Formula (4) is 15 or greater.

[7] The composition according to any one of [1] to [6], wherein SP1 in Formula (1) has an oxyethylene structure.

[8] The composition according to any one of [1] to [7], further comprising: a polymer interface improver.

[9] A polarizer layer which is formed of the composition according to any one of [1] to [8].

[10] A laminate comprising: a base material; and the polarizer layer according to [9] provided on the base material.

[11] The laminate according to [10], further comprising: an alignment layer which contains a polymer having a repeating unit that contains a crosslinkable group, on the base material, in which a content of the repeating unit that contains the crosslinkable group is 20% by mass or greater with respect to all repeating units of the polymer.

[12] The laminate according to [11], in which the polymer further has a repeating unit having a partial structure represented by Formula (PA).

In Formula (PA), two symbols "*" represent a bonding position, and $R^{P1}$ to $R^{P4}$ each independently represent a hydrogen atom or a substituent.

[13] The laminate according to any one of [10] to [12], further comprising: a refractive index adjusting layer on the polarizer layer.

[14] The laminate according to any one of [10] to [13], in which the laminate has a haze of 0.2% to 1.5%.

[15] A laminate comprising: the polarizer layer according to [9]; and a layer containing an ultraviolet absorbing agent.

[16] The laminate according to any one of [10] to [15], further comprising: a λ/4 plate.

[17] The laminate according to [16], further comprising: a glass substrate on a side of the polarizer layer opposite to a surface where the λ/4 plate is provided, in which in a case where the laminate includes the base material, the base material is the glass substrate.

[18] The laminate according to [16], further comprising: a barrier layer on a side of the polarizer layer opposite to the surface where the λ/4 plate is provided.

[19] An image display device comprising: the polarizer layer according to [9] or the laminate according to any one of [10] to [18].

According to the present invention, it is possible to provide a composition that is capable of forming a polarizer layer having an excellent degree of alignment and excellent adhesiveness to another layer in a case of being applied to a laminate, a polarizer layer, a laminate, and an image display device.

DESCRIPTION OF THE PREFERRED EMBODIMENTS

Figure 1:
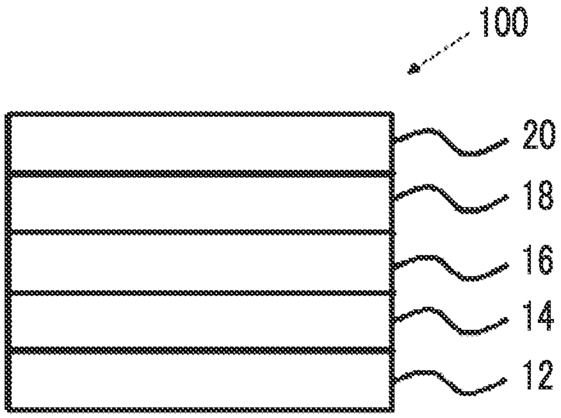
FIG. 1 is a schematic cross-sectional view showing an example of a laminate of the present invention.

Hereinafter, the present invention will be described in detail.

The description of constituent elements described below may be made based on typical embodiments of the present invention, but the present invention is not limited to such embodiments.

In the present specification, a numerical range shown using "to" indicates a range including numerical values described before and after "to" as a lower limit and an upper limit.

In the present specification, (meth)acrylic acid is a generic term for both "acrylic acid" and "methacrylic acid", (meth) acryloyl is a generic term for both "acryloyl" and "methacryloyl", and (meth)acryl is a generic term for both "acryl" and "methacryl".

In the present specification, the term parallel or orthogonal does not indicate parallel or orthogonal in a strict sense, but indicates a range of ±5° from parallel or orthogonal.

In the present specification, the concepts of the liquid crystal composition and the liquid crystal compound also include those that no longer exhibit liquid crystallinity due to curing or the like.

In the present specification, each component may be used alone or in combination of two or more kinds thereof. Here, in a case where each component is used in combination of two or more kinds thereof, the content of the components indicates the total content unless otherwise specified.

In the present specification, it may be expressed that the effects of the present invention are more excellent in a case where at least one of the degree of alignment or the adhesiveness is more excellent.

[Substituent W]

A substituent W used in the present specification represents any of the following groups.

Examples of the substituent W include a halogen atom, an alkyl group having 1 to 20 carbon atoms, a halogenated alkyl group having 1 to 20 carbon atoms, a cycloalkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an aniline group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group ($-B(OH)_2$), a phosphate group ($-OPO(OH)_2$), or a sulfate group ($-OSO_3H$), and other known substituents.

The details of the substituent are described in paragraph [0023] of JP2007-234651A. Further, the substituent W may be a group represented by Formula (W1).

$$*\text{-}LW\text{-}SPW\text{-}Q \qquad \text{(W1)}$$

In Formula (W1), "*" represents a bonding position, LW represents a single bond or a divalent linking group, SPW represents a divalent spacer group, and Q represents a hydrogen atom, a halogen atom, a linear, branched, or cyclic alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group ($-B(OH)_2$), a phosphate group ($-OPO(OH)_2$), or a sulfate group ($-OSO_3H$), or any of crosslinkable groups represented by Formula (P-1) to (P-30).

Examples of the divalent linking group represented by LW include —O—, $-(CH_2)_g-$, $-(CF_2)_g-$, $-Si(CH_3)_2-$, $-(Si(CH_3)_2O)_g-$, $-(OSi(CH_3)_2)_g-$ (g represents an integer of 1 to 10), —N(Z)—, —C(Z)=C(Z')—, —C(Z)=N—, —N=C(Z)—, $-C(Z)_2-C(Z')_2-$, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (Z, Z', and Z" each independently represent a hydrogen atom, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. LW may represent a group in which two or more of these groups are combined (hereinafter, also referred to as "L-C").

(P-1)

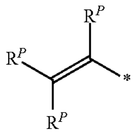

(P-2)

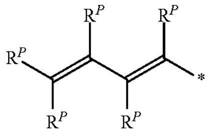

(P-3)

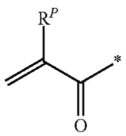

(P-4)

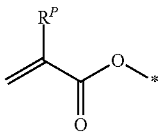

-continued (P-5)

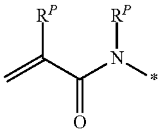

(P-6)

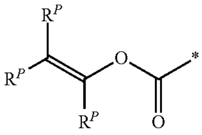

(P-7)

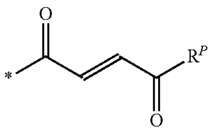

(P-8)

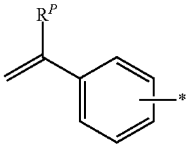

(P-9)

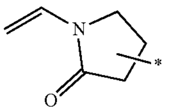

(P-10)

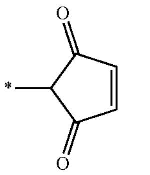

(P-11)

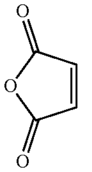

(P-12)

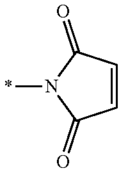

(P-13)

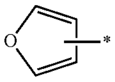

(P-14)

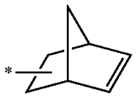

(P-15)

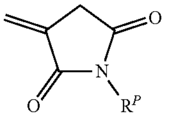

-continued (P-16)

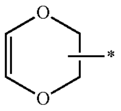

(P-17)

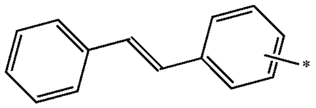

(P-18)

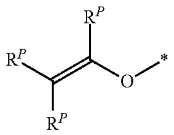

(P-19)

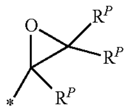

(P-20)

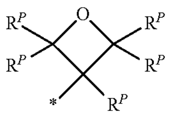

(P-21)

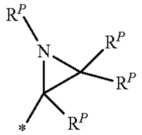

(P-22)

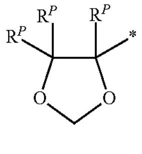

(P-23)

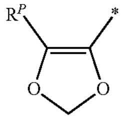

(P-24)

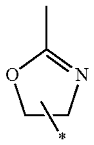

(P-25)

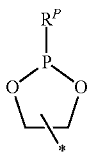

(P-26)

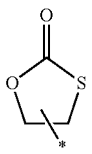

-continued (P-27)

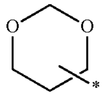

(P-28)

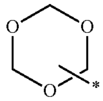

(P-29)

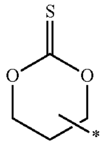

(P-30)

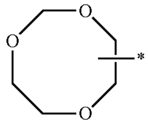

In Formulae (P-1) to (P-30), $R^P$ represents a hydrogen atom, a halogen atom, a linear, branched, or cyclic alkylene group having 1 to 10 carbon atoms, a halogenated alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group ($—B(OH)_2$), a phosphate group ($—OPO(OH)_2$), or a sulfate group ($—OSO_3H$), and a plurality of $R^P$'s may be the same as or different from each other.

Preferred examples of the crosslinkable group include a radically polymerizable group and a cationically polymerizable group, and a vinyl group represented by Formula (P-1), a butadiene group represented b Formula (P-2), a (meth)acryloyloxy group represented by Formula (P-4), a (meth)acrylamide group represented by Formula (P-5), a vinyl acetate group represented by Formula (P-6), a fumaric acid ester group represented by Formula (P-7), a styryl group represented by Formula (P-8), a vinylpyrrolidone group represented by Formula (P-9), a maleic acid anhydride represented by Formula (P-11), or a maleimide group represented by Formula (P-12) is preferable as the radically polymerizable group, and a vinyl ether group represented by Formula (P-18), an epoxy group represented by Formula (P-19), or an oxetanyl group represented by Formula (P-20) is preferable as the cationically polymerizable group.

Examples of the spacer group represented by SPW include a linear, branched, or cyclic alkylene group having 1 to 50 carbon atoms, and a heterocyclic group having 1 to 20 carbon atoms.

Here, the carbon atoms of the alkylene group and the heterocyclic group may be substituted with —O—, $—Si(CH_3)_2—$, $—(Si(CH_3)_2O)_g—$, $—(OSi(CH_3)_2)_g—$ (g represents an integer of 1 to 10), —N(Z)—, —C(Z)=C(Z')—, —C(Z)=N—, —N=C(Z)—, $—C(Z)_2—C(Z')_2—$, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (Z, Z', and Z" each independently represent a hydrogen atom, an alkyl group having 1 to 4 carbon atoms, a cycloalkyl group, an aryl group, a cyano group, or a halogen atom), —N=N—, —S—, —C(S)—, —S(O)—, $—SO_2—$, —(O)S(O)O—, —O(O)S(O)O—, —SC(O)—, —C(O)S—, or a group obtained by combining two or more of these groups (hereinafter, also referred to as "SP-C").

Further, the hydrogen atoms of the alkylene group and the heterocyclic group may be substituted with a halogen atom, a cyano group, $—Z^H$, —OH—, $—OZ^H$, —COOH, $—C(O)Z^H—C(O)OZ^H$, $—OC(O)Z^H$, $—OC(O)OZ^H$, $—NZ^HZ^{H'}$, $—NZ^HC(O)Z^{H'}$, $—NZ^HC(O)OZ^{H'}$, $—C(O)NZ^HZ^{H'}$, $—OC(O)NZ^HZ^{H'}$, $—NZ^HC(O)NZ^{H'}OZ^{H''}$, —SH, $—SZ^H$, $—C(S)Z^H$, $—C(O)SZ^H$, or $—SC(O)Z^H$ (hereinafter, also referred to as "SP-H"). Here, $Z^H$ and $Z^{H'}$ represent an alkyl group having 1 to 10 carbon atoms, a halogenate alkyl group, or -L-CL (L represents a single bond or a linking group, specific examples of the linking group are the same as those for LW and SPW described above, and CL represents a crosslinkable group (and preferably a group represented by any of Formulae (P-1) to (P-30))).

<Composition>

The composition according to the embodiment of the present invention (hereinafter, also referred to as a "composition for forming a polarizer layer") is a composition containing a polymer liquid crystal compound, a dichroic material, and a low-molecular-weight liquid crystal compound.

Further, the polymer liquid crystal compound is a copolymer having a repeating unit (1) represented by Formula (1), and the low-molecular-weight liquid crystal compound is a compound represented by Formula (LC).

Further, the relationships represented by Expressions (11) to (13) are satisfied.

$$|\log P(SP1) - \log P(SPL1)| \leq 2.0 \quad (11)$$

$$|\log P(MG1) - \log P(SP1)| \geq 4.5 \quad (12)$$

$$|\log P(ML) - \log P(SPL1)| \geq 4.0 \quad (13)$$

In Expressions (11) to (13), log P(SP1) represents the log P value of SP1 in Formula (1) shown below.

log P(MG1) represents the log P value of MG1 in Formula (1) shown below.

log P(SPL1) represents the log P value of SPL1 in Formula (LC) shown below.

log P(ML) represents the log P value of ML in Formula (LC) shown below.

Further, in a case where the polymer liquid crystal compound has two or more kinds of repeating units (1), at least one repeating unit (1) and the low-molecular-weight liquid crystal compound may satisfy the above-described relational expressions.

With the composition according to the embodiment of the present invention, a polarizer layer having a high degree of alignment (that is, an excellent degree of alignment) and excellent adhesiveness to another layer in a case of being applied to a laminate can be formed. The details of the reason for this are not clear, but it is assumed as follows.

An increase in the degree of cure of the polarizer layer is considered to improve the adhesiveness of the polarizer layer, and for example, a method of using a compound containing a plurality of crosslinkable groups in combination may be used for this purpose. However, in a case where a polymer liquid crystal compound and a compound containing a plurality of crosslinkable groups are used in combination, the compatibility of these compounds deteriorates, and the degree of alignment of the polarizer layer to be obtained decreases.

It is assumed that a polarizer layer with an excellent degree of alignment and excellent adhesiveness to another layer is obtained by using the low-molecular-weight liquid crystal compound satisfying Expressions (11) to (13) as the compound containing a crosslinkable group having a high compatibility with a polymer liquid crystal compound in order to solve the above-described problem.

Further, in a case where the composition according to the embodiment of the present invention is used in vertical alignment, a polarizer layer having an excellent degree of alignment can be formed.

[Polymer Liquid Crystal Compound]

The polymer liquid crystal compound contained in the composition according to the embodiment of the present invention is a copolymer having a repeating unit (1) represented by Formula (1).

Specific examples of the repeating unit that can be copolymerized with the repeating unit (1) include repeating units (2) to (5) described below.

The polymer liquid crystal compound may be any polymer such as a block polymer, an alternating polymer, a random polymer, or a graft polymer.

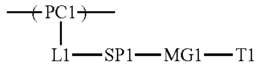

(1)

In Formula (1), PC1 represents the main chain of the repeating unit, L1 represents a single bond or a divalent linking group, SP1 represents a spacer group, MG1 represents a mesogen group, and T1 represents a terminal group.

The log P(SP1) representing the log P value of SP1 and the log P(SPL1) representing the log P value of SPL1 of the low-molecular-weight liquid crystal compound represented by Formula (LC) satisfy the relationship of Expression (11) and preferably the relationship of Expression (11') from the viewpoint that the effects of the present invention are more excellent.

$$|\log P(SP1) - \log P(SPL1)| \leq 2.0 \quad (11)$$

$$|\log P(SP1) - \log P(SPL1)| \leq 1.5 \quad (11')$$

Further, the log P(SP1) representing the log P value of SP1 and the log P(MG1) representing the log P value of MG1 satisfy the relationship of Expression (12) and preferably the relationship of Expression (12') from the viewpoint that the effects of the present invention are more excellent.

$$|\log P(MG1)-\log P(SP1)|\geq 4.5 \quad (12)$$

$$|\log P(MG1)-\log P(SP1)|\geq 5.0 \quad (12')$$

Here, the log P value is an index for expressing the properties of the hydrophilicity and hydrophobicity of a chemical structure and is also referred to as a hydrophilic-hydrophobic parameter. The log P value can be calculated using software such as ChemBioDrawUltra or HSPiP (Ver. 4.1.07). Further, the log P value can be acquired experimentally by the method of the OECD Guidelines for the Testing of Chemicals, Sections 1, Test No. 117 or the like. In the present invention, a value calculated by inputting the structural formula of a compound to HSPiP (Ver. 4.1.07) is employed as the log P value unless otherwise specified.

For example, the log P value of SP1 which is a partial structure of the repeating unit represented by Formula (1) is calculated by inputting the structural formula of SP1 into software. Further, the log P value of SPL1 which is a partial structure of the low-molecular-weight liquid crystal compound represented by Formula (LC) is calculated by inputting the structural formula of SPL1 into software.

Further, from the viewpoint that the effects of the present invention are more excellent, D(SP1) representing the molecular length of SP1 in Formula (1) and D(SPL1) representing the molecular length of SPL1 of the low-molecular-weight liquid crystal compound represented by Formula (LC) satisfy preferably the relationship of Expression (21) and more preferably the relationship of Expression (21'). However, D(SPL1) representing the molecular length of SPL1 in Formula (LC) and D(SPL2) representing the molecular length of SPL2 in Formula (LC) satisfy the relationship of Expression (20).

Further, from the viewpoint that the effects of the present invention are more excellent, D(MG1) representing the molecular length of MG1 and D(ML) representing the molecular length of ML of the low-molecular-weight liquid crystal compound represented by Formula (LC) satisfy preferably the relationship of Expression (22) and more preferably the relationship of Expression (22').

$$D(SPL1)\geq D(SPL2) \quad (20)$$

$$|D(SP1)-D(SPL1)|\leq 4.0\ \text{Å} \quad (21)$$

$$|D(SP1)-D(SPL1)|\leq 3.0\ \text{Å} \quad (21')$$

$$|D(MG1)-D(ML)|\leq 4.0\ \text{Å} \quad (22)$$

$$|D(MG1)-D(ML)|\leq 2.0\ \text{Å} \quad (22')$$

Here, the molecular lengths of a spacer group, a mesogen group, and the like can be calculated using calculation software capable of molecular dynamics calculation such as Winmostar, which has been commercially available. In the present invention, the molecular length values calculated by the following method are employed as the molecular lengths of a spacer group, a mesogen group, and the like unless otherwise specified. The molecular structure prepared by ChemDraw is converted into a MDL Mol file format and opened by Winmostar. The structure is optimized by Winmostar's simple molecular force field method. The interatomic distances between both ends of the spacer group and the mesogen group after structural optimization are calculated as the molecular lengths.

Specific examples of the main chain of the repeating unit represented by PC1 include groups represented by Formulae (P1-A) to (P1-D). Among these, from the viewpoints of diversity and handleability of a monomer serving as a raw material, a group represented by Formula (P1-A) is preferable.

(P1-A)

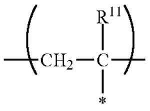

(P1-B)

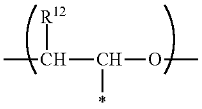

(P1-C)

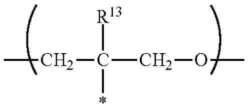

(P1-D)

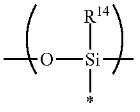

In Formulae (P1-A) to (P1-D), "*" represents a bonding position with respect to L1 in Formula (1). In Formulae (P1-A) to (P1-D), $R^{11}$, $R^{12}$, $R^{13}$, and $R^{14}$ each independently represent a hydrogen atom, a halogen atom, a cyano group, an alkyl group having 1 to 10 carbon atoms, or an alkoxy group having 1 to 10 carbon atoms. The alkyl group may be a linear or branched alkyl group or an alkyl group having a cyclic structure (cycloalkyl group). Further, the number of carbon atoms of the alkyl group is preferably in a range of 1 to 5.

It is preferable that the group represented by Formula (P1-A) is a unit of a partial structure of poly(meth)acrylic acid ester obtained by polymerization of (meth)acrylic acid ester.

It is preferable that the group represented by Formula (P1-B) is an ethylene glycol unit formed by ring-opening polymerization of an epoxy group of a compound containing the epoxy group.

It is preferable that the group represented by Formula (P1-C) is a propylene glycol unit formed by ring-opening polymerization of an oxetane group of a compound containing the oxetane group.

It is preferable that the group represented by Formula (P1-D) is a siloxane unit of a polysiloxane obtained by polycondensation of a compound containing at least one of an alkoxysilyl group or a silanol group. Here, examples of the compound containing at least one of an alkoxysilyl group or a silanol group include a compound containing a group represented by Formula $SiR^{14}(OR^{15})_2$—. In the formula, $R^{14}$ has the same definition as that for $R^{14}$ in Formula (P1-D), and a plurality of $R^{15}$'s each independently represent a hydrogen atom or an alkyl group having 1 to 10 carbon atoms.

L1 represents a single bond or the same linking group as that for LW in Formula (W1), and preferred examples thereof include a single bond, —C(O)O—, —OC(O)—, —O—, —S—, —C(O)$NR^{16}$—, —$NR^{16}$C(O)—, —$S(O)_2$—, and —$NR^{16}R^{17}$—. In the formulae, $R^{16}$ and $R^{17}$ eachindependently represent a hydrogen atom or an alkyl group having 1 to 6 carbon atoms which may have a substituent (for example, the substituent W). In the specific examples of the divalent linking group described above, the bonding site on the left side is bonded to PC1 and the bonding site on the right side is bonded to SP1.

In a case where PC1 represents a group represented by Formula (P1-A), it is preferable that L1 represents a group represented by —C(O)O— or —C(O)NR$^{16}$—. In a case where PC1 represents a group represented by any of Formulae (P1-B) to (P1-D), it is preferable that L1 represents a single bond.

Examples of the spacer group represented by SP1 include a group represented by SPW in Formula (W1).

From the viewpoint of the degree of alignment, as the spacer group represented by SP1, a group having at least one structure selected from the group consisting of an oxyethylene structure, an oxypropylene structure, a polysiloxane structure, and an alkylene fluoride structure or a linear or branched alkylene group having 2 to 20 carbon atoms is preferable. Here, the alkylene group may have —O—, —S—, —O—CO—, —CO—O—, —O—CO—O—, —O—CNR— (R represents an alkyl having 1 to 10 carbon atoms), —S(O)$_2$— (that is, the carbon atoms in the alkylene group may be substituted with these groups). Further, the hydrogen atom of the alkylene group may be substituted with —OH.

From the viewpoints of easily exhibiting liquid crystallinity and the availability of raw materials, it is more preferable that the spacer group represented by SP1 is a group having at least one structure selected from the group consisting of an oxyethylene structure, an oxypropylene structure, a polysiloxane structure, and an alkylene fluoride structure and particularly preferable that the spacer group is a group having an oxyethylene structure.

Here, as the oxyethylene structure represented by SP1, a group represented by $*-(CH_2-CH_2O)_{n1}-*$ is preferable. In the formula, n1 represents an integer of 1 to 20, and * represents a bonding position with respect to L1 or MG1. From the viewpoint that the effects of the present invention are more excellent, n1 represents preferably an integer of 2 to 10, more preferably an integer of 2 to 6, and most preferably an integer of 2 to 4.

Here, a group represented by $*-(CH(CH_3)-CH_2O)_{n2}-*$ is preferable as the oxypropylene structure represented by SP1. In the formula, n2 represents an integer of 1 to 3, and * represents a bonding position with respect to L1 or MG1.

Further, a group represented by $*-(Si(CH_3)_2-O)_{n3}-*$ is preferable as the polysiloxane structure represented by SP1. In the formula, n3 represents an integer of 6 to 10, and * represents a bonding position with respect to L1 or MG1.

Further, a group represented by $*-(CF_2-CF_2)_{n4}-*$ is preferable as the alkylene fluoride structure represented by SP1. In the formula, n4 represents an integer of 6 to 10, and * represents a bonding position with respect to L1 or MG1.

In Formula (1), MG1 represents a mesogen group. The mesogen group represented by MG1 is a group showing a main skeleton of a liquid crystal molecule that contributes to liquid crystal formation. A liquid crystal molecule exhibits liquid crystallinity which is in an intermediate state (mesophase) between a crystal state and an isotropic liquid state. The mesogen group is not particularly limited and for example, particularly description on pages 7 to 16 of "FlussigeKristalle in Tabellen II" (VEB Deutsche Verlag fur Grundstoff Industrie, Leipzig, 1984) and particularly the description in Chapter 3 of "Liquid Crystal Handbook" (Maruzen, 2000) edited by Liquid Crystals Handbook Editing Committee can be referred to.

The mesogen group represented by MG1 has preferably 2 to 10 cyclic structures and more preferably 2 to 7 cyclic structures.

Specific examples of the cyclic structure include an aromatic hydrocarbon group, a heterocyclic group, and an alicyclic group.

From the viewpoints of exhibiting the liquid crystallinity, adjusting the liquid crystal phase transition temperature, and the availability of raw materials and synthetic suitability and from the viewpoint that the effects of the present invention are more excellent, as the mesogen group represented by MG1, a group represented by Formula (MG-A) or Formula (MG-B) is preferable, and a group represented by Formula (MG-B) is more preferable.

$$*-(A1)_{a1}-* \qquad \text{(MG-A)}$$

$$*-(A2-LA1)_{a2}-A3-* \qquad \text{(MG-B)}$$

In Formula (MG-A), A1 represents a divalent group selected from the group consisting of an aromatic hydrocarbon group, a heterocyclic group, and an alicyclic group. These groups may be substituted with a substituent such as the substituent W.

It is preferable that the divalent group represented by A1 is a 4- to 15-membered ring. Further, the divalent group represented by A1 may be a monocycle or a fused ring.

"*" represents a bonding position.

In Formula (MG-A), examples of the divalent aromatic hydrocarbon group represented by A1 include a phenylene group, a naphthylene group, a fluorene-diyl group, an anthracene-diyl group, and a tetracene-diyl group. From the viewpoints of design diversity of a mesogenic skeleton and the availability of raw materials, a phenylene group or a naphthylene group is preferable.

In Formula (MG-A), the divalent heterocyclic group represented by A1 may be any of aromatic or non-aromatic, but a divalent aromatic heterocyclic group is preferable as the divalent heterocyclic group from the viewpoint of further improving the degree of alignment.

The atoms other than carbon constituting the divalent aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, a thienooxazole-diyl group, and Formulae (II-1) to (II-4).

(II-1)

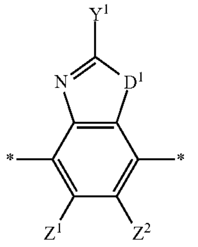

(II-2)

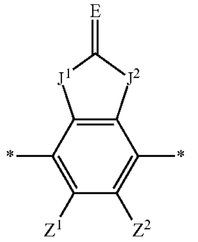

(II-3)

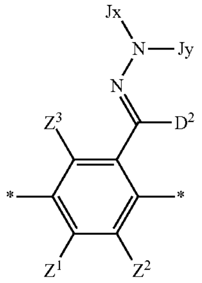

(II-4)

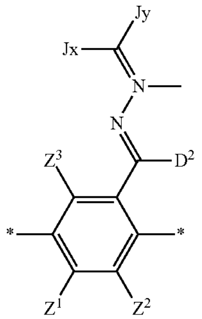

In Formulae (II-1) to (II-4), D1 represents —S—, —O—, or $NR^{11}$—, and $R^{11}$ represents a hydrogen atom or an alkyl group having 1 to 6 carbon atoms, $Y^1$ represents an aromatic hydrocarbon group having 6 to 12 carbon atoms or an aromatic heterocyclic group having 3 to 12 carbon atoms, $Z^1$, $Z^2$, and $Z^3$ each independently represent a hydrogen atom, an aliphatic hydrocarbon group having 1 to 20 carbon atoms, an alicyclic hydrocarbon group having 3 to 20 carbon atoms, a monovalent aromatic hydrocarbon group having 6 to 20 carbon atoms, a halogen atom, a cyano group, a nitro group, —$NR^{12}R^{13}$, or —$SR^{12}$, $Z^1$ and $Z^2$ may be bonded to each other to form an aromatic ring or an aromatic heterocyclic ring, $R^{12}$ and $R^{13}$ each independently represent a hydrogen atom or an alkyl group having 1 to 6 carbon atoms, $J^1$ and $J^2$ each independently represent a group selected from the group consisting of —O—, —$NR^{21}$— ($R^{21}$ represents a hydrogen atom or substituent), —S—, and —C(O)—, E represents a hydrogen atom or a non-metal atom of a Group 14 to a Group 16 to which a substituent may be bonded, Jx represents an organic group having 2 to 30 carbon atoms, which has at least one aromatic ring selected from the group consisting of an aromatic hydrocarbon ring and an aromatic heterocyclic ring, Jy represents a hydrogen atom, an alkyl group having 1 to 6 carbon atoms which may have a substituent, or an organic group having 2 to 30 carbon atoms which has at least one aromatic ring selected from the group consisting of an aromatic hydrocarbon ring and an aromatic heterocyclic ring, the aromatic ring of Jx and Jy may have a substituent, Jx and Jy may be bonded to each other to form a ring, and $D^2$ represents a hydrogen atom or an alkyl group having 1 to 6 carbon atoms which may have a substituent.

In Formula (II-2), in a case where $Y^1$ represents an aromatic hydrocarbon group having 6 to 12 carbon atoms, the aromatic hydrocarbon group may be monocyclic or polycyclic. In a case where $Y^1$ represents an aromatic heterocyclic group having 3 to 12 carbon atoms, the aromatic heterocyclic group may be monocyclic or polycyclic.

In Formula (II-2), in a case where $J^1$ and $J^2$ represent —$NR^{21}$—, the substituent as $R^{21}$ can refer to, for example, paragraphs 0035 to 0045 of JP2008-107767A, and the content thereof is incorporated in the present specification.

In Formula (II-2), in a case where E represents a non-metal atom of a Group 14 to a Group 16 to which a substituent may be bonded, =O, =S, =NR', or =C(R')R' is preferable. R' represents a substituent, and the substituent can refer to, for example, the description in paragraphs [0035] to [0045] of JP2008-107767A, and a nitrogen atom is preferable.

In Formula (MG-A), specific examples of the divalent alicyclic group represented by A1 include a cyclopentylene group and a cyclohexylene group, and the carbon atoms thereof may be substituted with —O—, —$Si(CH_3)_2$—, —N(Z)—, —C(O)— (Z independently represents a hydrogen atom, an alkyl group having 1 to 4 carbon atoms, a cycloalkyl group, an aryl group, a cyano group, or a halogen atom), —S—, —C(S)—, —S(O)—, —$SO_2$—, or a group obtained by combining two or more of these groups.

In Formula (MG-A), a1 represents an integer of 2 to 10. The plurality of A1's may be the same as or different from each other.

In Formula (MG-B), A2 and A3 each independently represent a divalent group selected from the group consisting of an aromatic hydrocarbon group, a heterocyclic group, and an alicyclic group. Specific examples and preferred embodiments of A2 and A3 are the same as those for A1 in Formula (MG-A), and thus description thereof will not be repeated.

In Formula (MG-B), a2 represents an integer of 1 to 10, a plurality of A2's may be the same as or different from each other, and a plurality of LA1's may be the same as or different from each other. From the viewpoint that the effects of the present invention are more excellent, it is preferable that a2 represents 2 or greater.

In Formula (MG-B), a plurality of LA1's each independently represent a single bond or a divalent linking group, and examples of the divalent linking group represented by LA1 include LW in Formula (W1).

Specific examples of MG1 include the following structures, the hydrogen atoms on the aromatic hydrocarbon group, the heterocyclic group, and the alicyclic group in the following structures may be substituted with the substituent W described above.

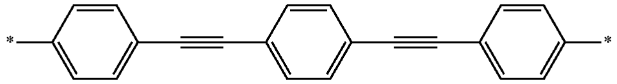
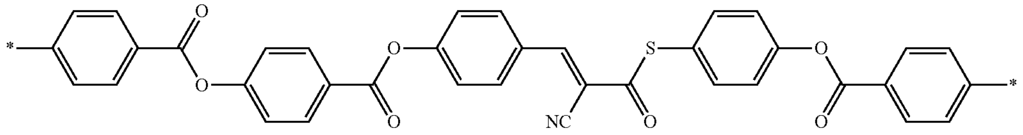
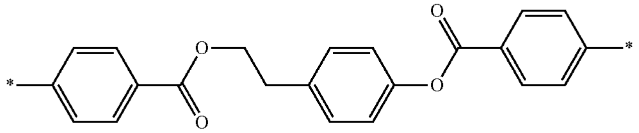
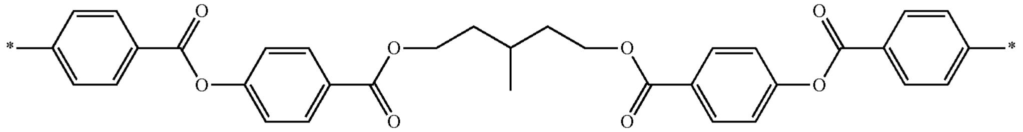
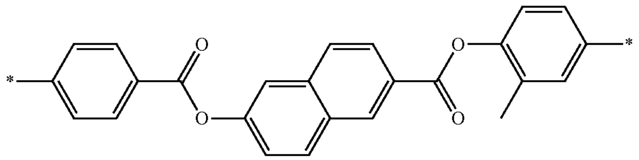
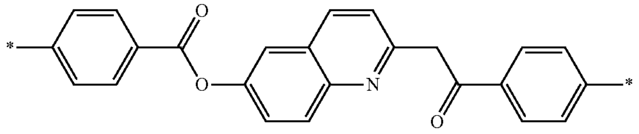
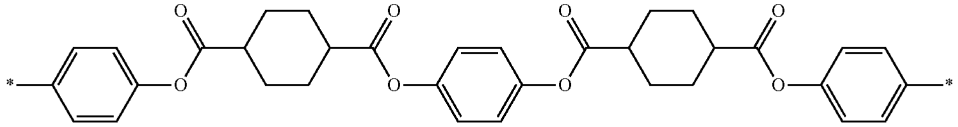
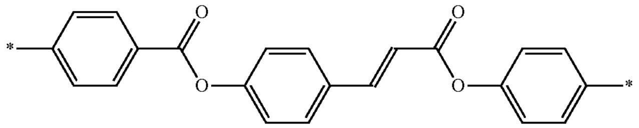
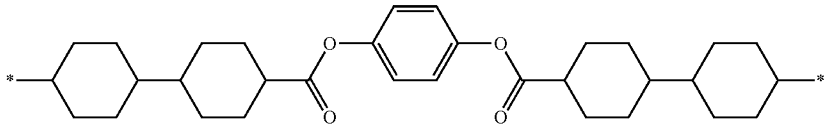
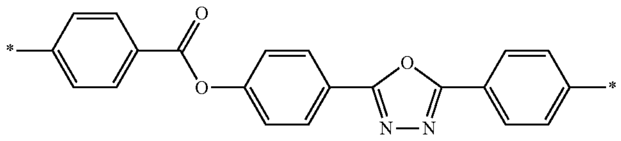
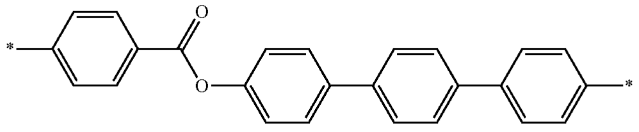
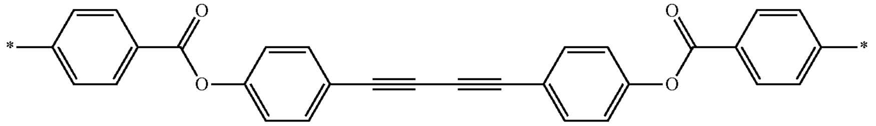

-continued
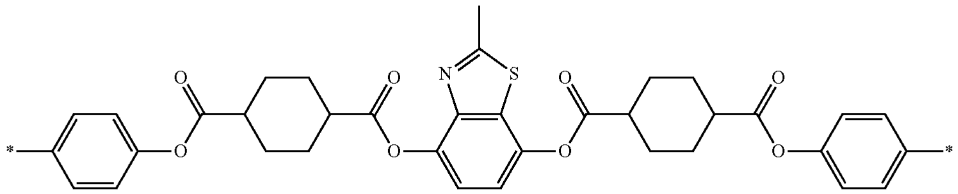
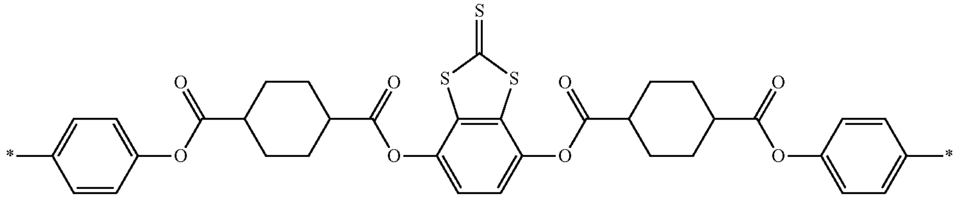
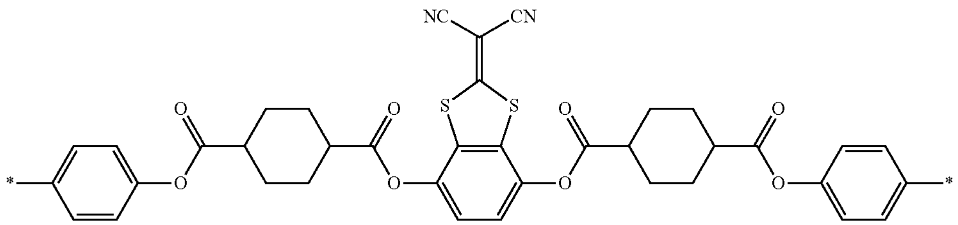
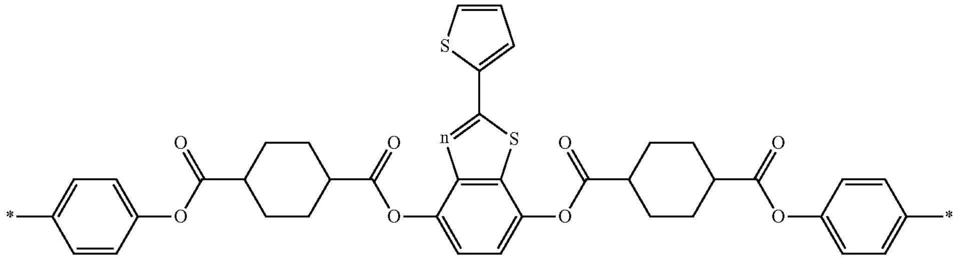
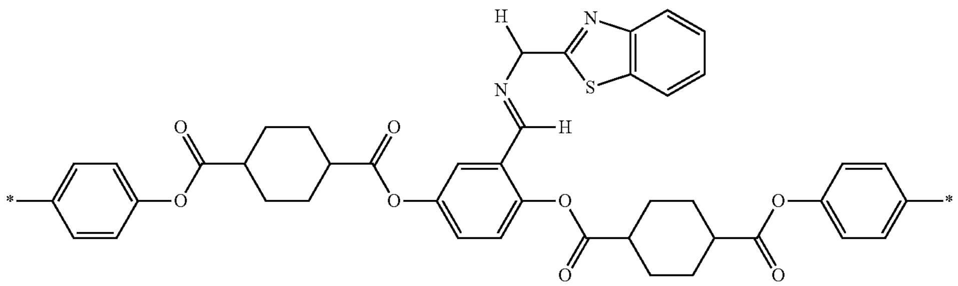
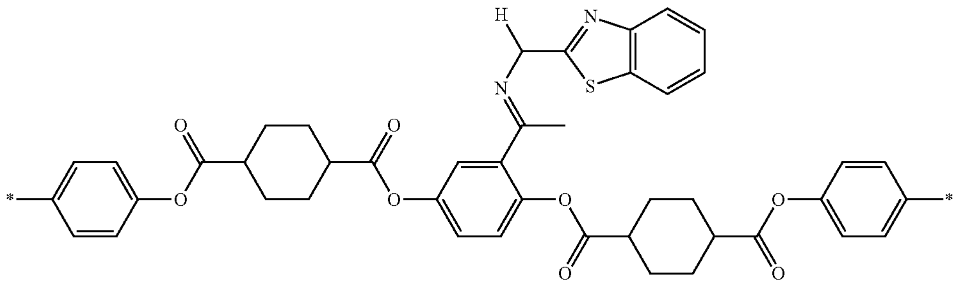

-continued
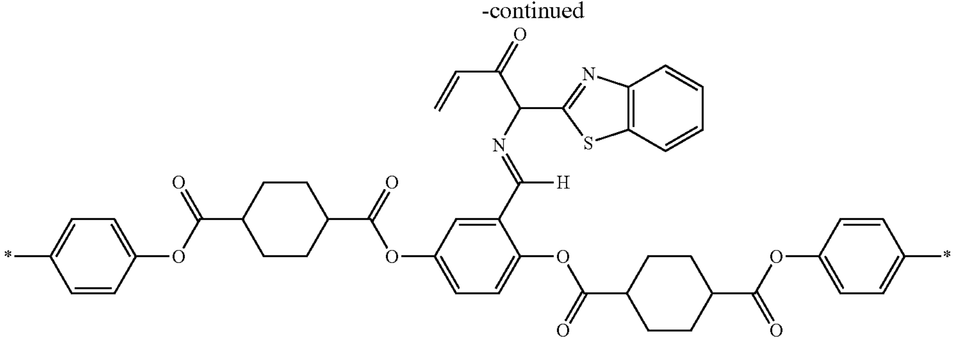
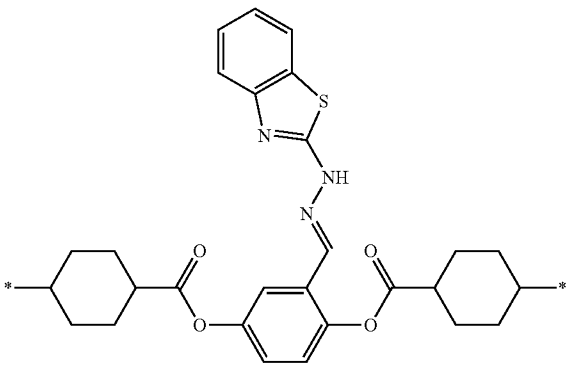
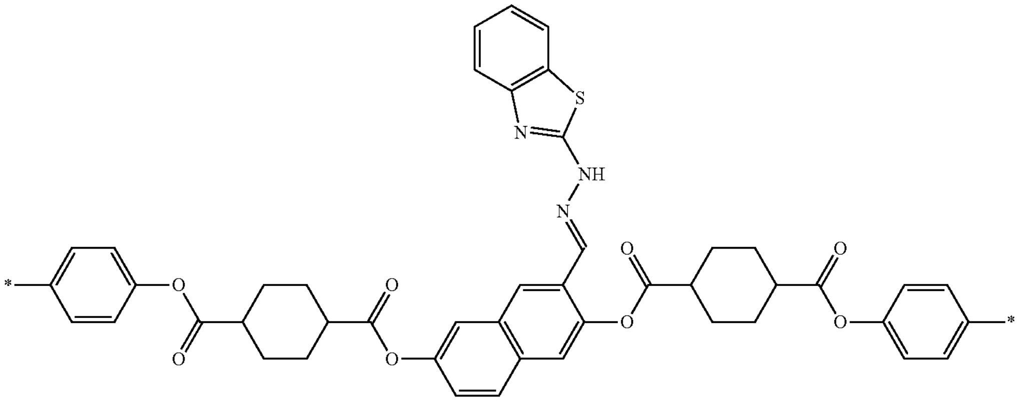
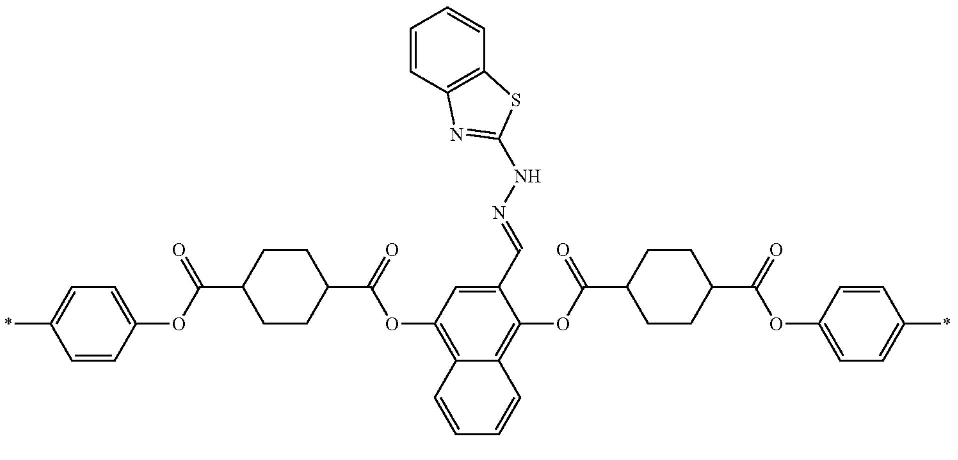

-continued
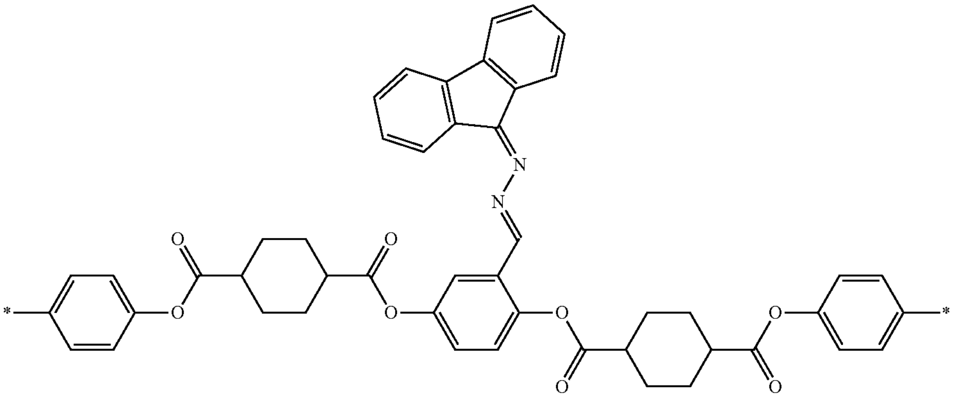
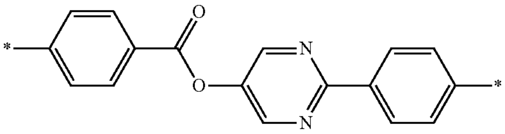
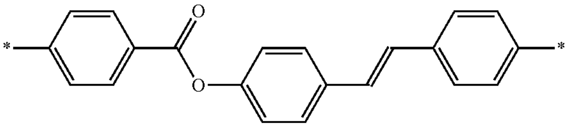
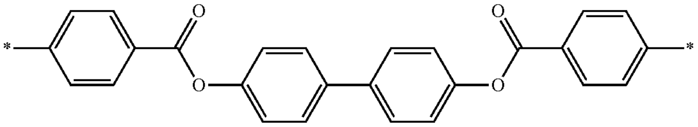
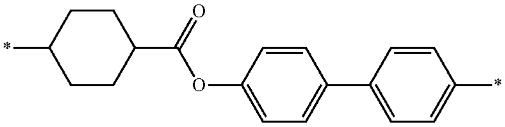
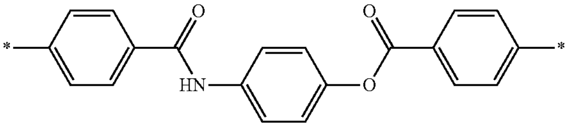
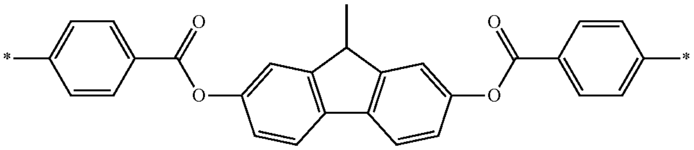
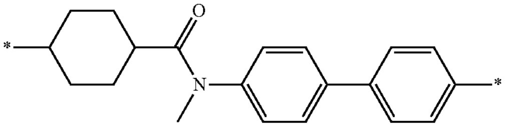
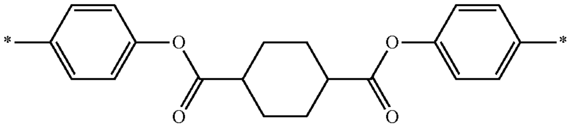
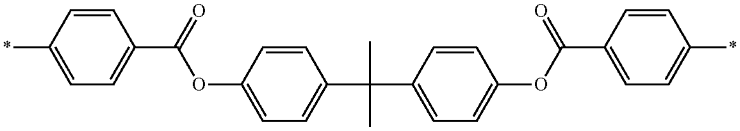
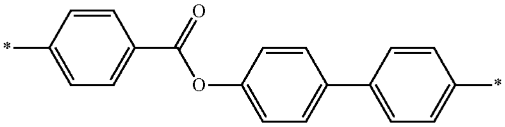
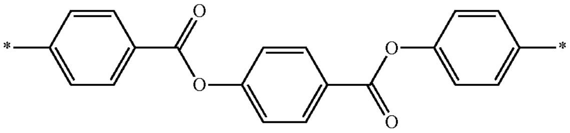
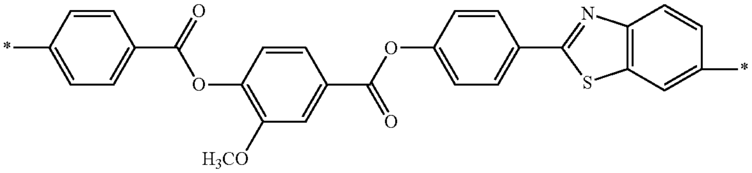
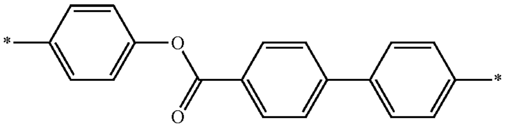
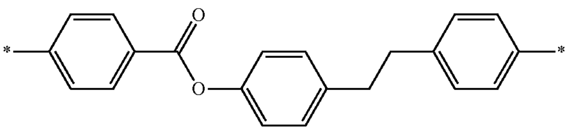

-continued
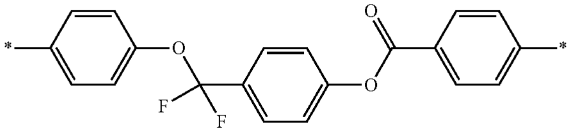
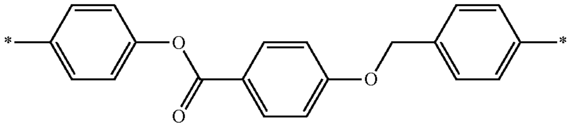
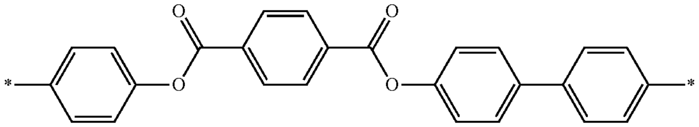
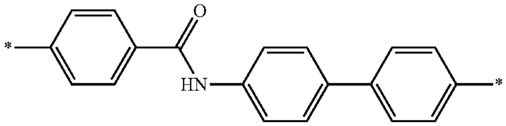
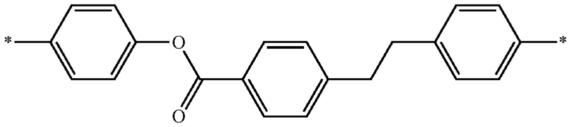
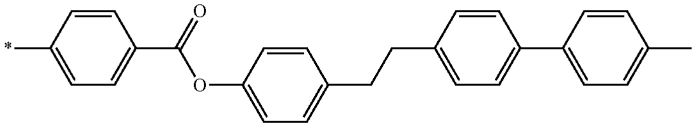
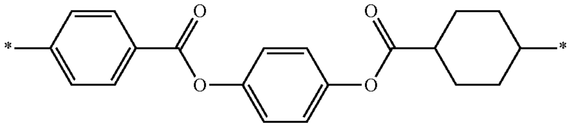
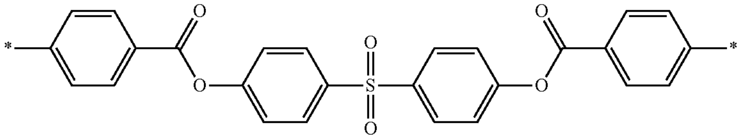
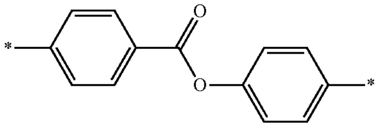
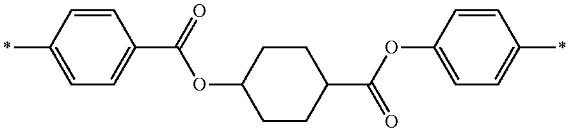
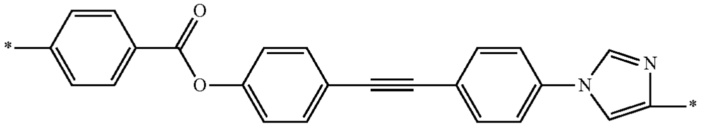
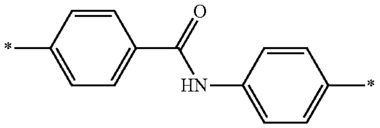
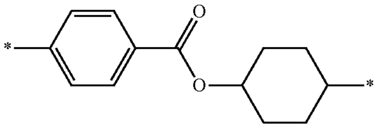
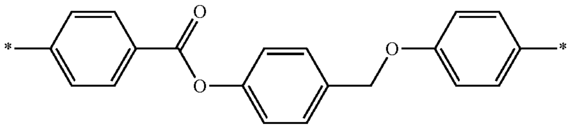
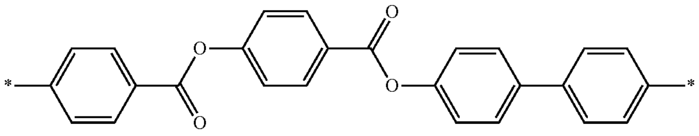
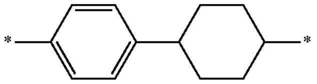

-continued
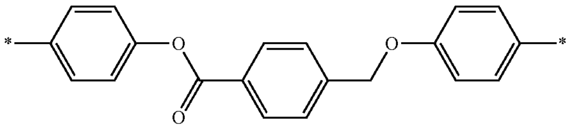
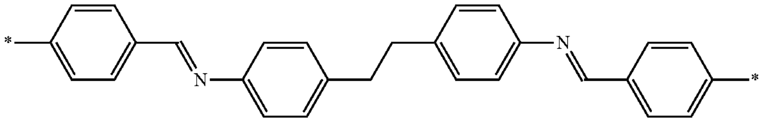
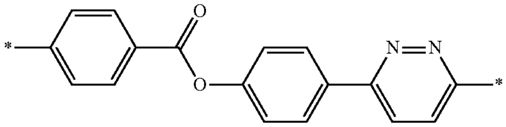
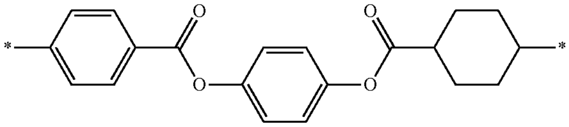
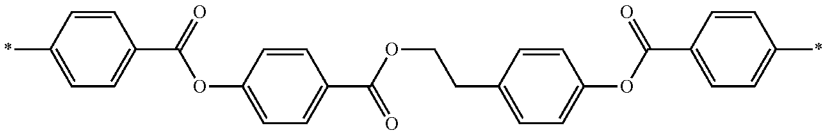
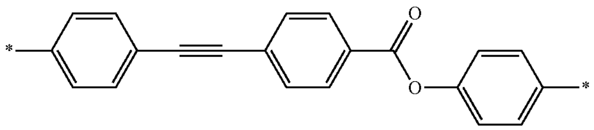
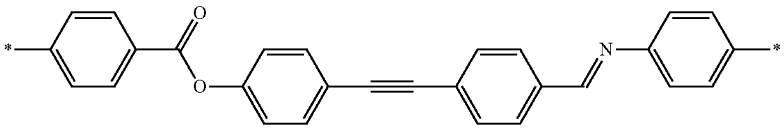
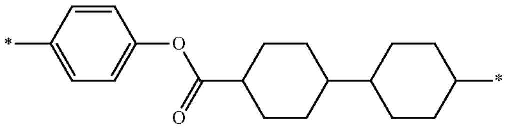
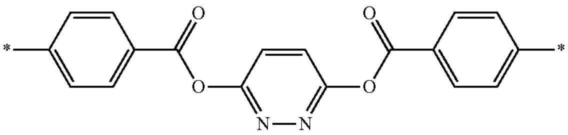
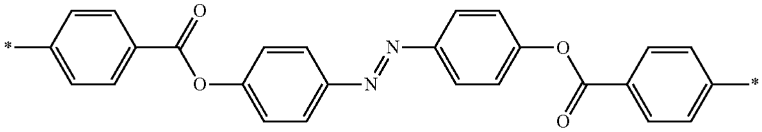
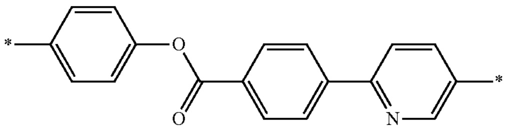
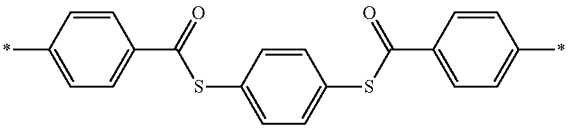
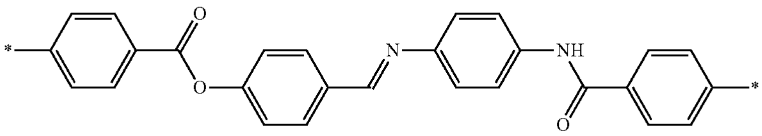
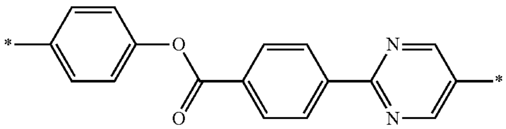
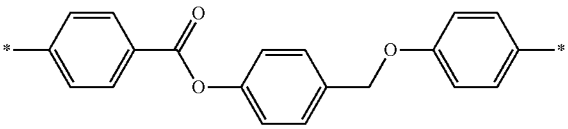
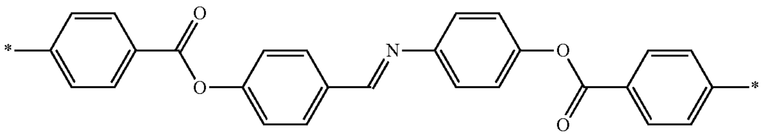
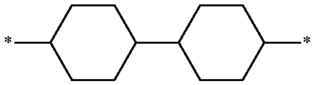
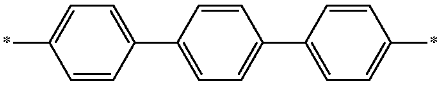

-continued

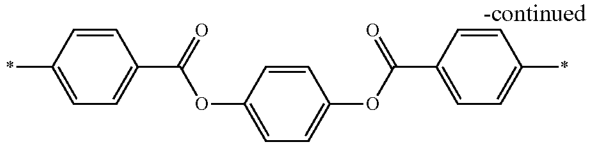

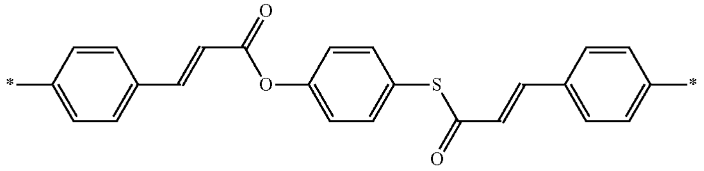

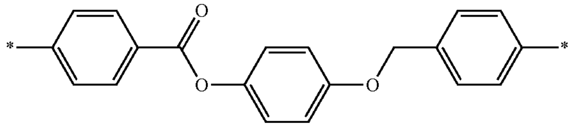

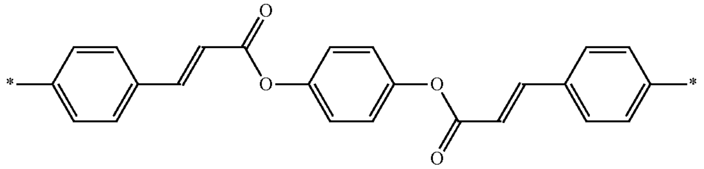

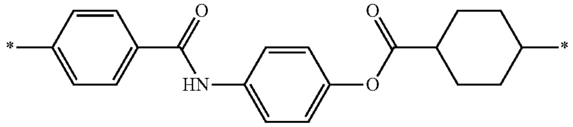

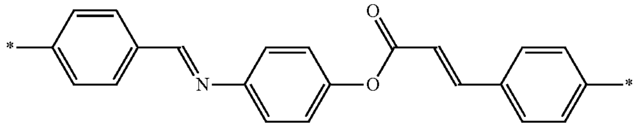

Examples of the terminal group represented by T1 include a hydrogen atom, a halogen atom, a cyano group, a nitro group, a hydroxy group, —SH, a carboxyl group, a boronic acid group, $—SO_3H—$, $—PO_3H_2—$, $—NR^{11}R^{12}$ ($R^{11}$ and $R^{12}$ each independently represent a hydrogen atom, a substituted or unsubstituted alkyl group having 1 to 10 carbon atoms, a cycloalkyl group, or an aryl group), an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an acyloxy group having 1 to 10 carbon atoms, an acylamino group having 1 to 10 carbon atoms, an alkoxycarbonyl group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a crosslinkable group-containing group (that is, a group containing a crosslinkable group).

As the crosslinkable group, for example, groups represented by Formulae (P-1) to (P-30) in Formula (W1) are preferable. Further, T1 may represent a group obtained by combining two or more of these groups.

From the viewpoint that the effects of the present invention are more excellent, T1 represents preferably an alkoxy group having 1 to 10 carbon atoms, more preferably an alkoxy group having 1 to 5 carbon atoms, and still more preferably a methoxy group. These terminal groups may be further substituted with these groups or the polymerizable groups described in JP2010-244038A.

From the viewpoint that the effects of the present invention are more excellent, the number of atoms in the main chain of T1 is preferably in a range of 1 to 20, more preferably in a range of 1 to 15, still more preferably in a range of 1 to 10, and particularly preferably in a range of 1 to 7. In a case where the number of atoms in the main chain of T1 is 20 or less, the degree of alignment of the light absorption anisotropic film is further improved. Here, the "main chain" in T1 indicates the longest molecular chain bonded to M1, and the number of hydrogen atoms is not included in the number of atoms in the main chain of T1. For example, the number of atoms in the main chain is 4 in a case where T1 represents an n-butyl group, the number of atoms in the main chain is 3 in a case where T1 represents a sec-butyl group.

From the viewpoint that the uniformity of alignment is excellent, the content of the repeating unit (1) is preferably 50% by mass or greater, more preferably 55% or greater, and particularly preferably 60% or greater with respect to all repeating units (100% by mass) of the polymer liquid crystal compound.

From the viewpoint of improving the degree of alignment, the upper limit of the content of the repeating unit (1) is preferably 99% by mass or less and more preferably 97% by mass or less.

The polymer liquid crystal compound may have only one or two or more kinds of repeating units (1). In a case where the polymer liquid crystal compound has two or more kinds of repeating units (1), there is an advantage in that the solubility of the polymer liquid crystal compound in a solvent is improved and the liquid crystal phase transition temperature is likely to be adjusted. In a case where the polymer liquid crystal compound has two or more kinds of repeating units (1), it is preferable that the total amount thereof is in the above-described range.

In the present invention, the content of each repeating unit contained in the polymer liquid crystal compound is calculated based on the charged amount (mass) of each monomer used for obtaining each repeating unit.

From the viewpoint of improving the degree of alignment, it is preferable that the polymer liquid crystal compound has a repeating unit having an electron-donating property and/or an electron-withdrawing property at the terminal. More specifically, it is more preferable that the side-chain type polymer liquid crystal compound has a repeating unit (21) containing a mesogen group and an electron-withdrawing group present at the terminal of the mesogen group and having a σp value of greater than 0 and a repeating unit (22) containing a mesogen group and a group present at the terminal of the mesogen group and having a σp value of 0 or less. As described above, in a case where the polymer liquid crystal compound has the repeating unit (21) and the repeating unit (22), the degree of alignment of the polarizer to be formed using the polymer liquid crystal compound is further improved as compared with a case where the polymer liquid crystal compound has only one of the repeating unit (21) or the repeating unit (22). The details of the reason for this are not clear, but it is assumed as follows.

That is, it is assumed that since the opposite dipole moments generated in the repeating unit (21) and the repeating unit (22) interact between molecules, the interaction between the mesogen groups in the minor axis direction is strengthened, and the orientation in which the liquid crystals are aligned is more uniform, and as a result, the degree of order of the liquid crystals is considered to be high. In this manner, it is assumed that the aligning properties of the dichroic material are enhanced, and thus the degree of alignment of the polarizer to be formed increases.

Further, the repeating units (21) and (22) may be the repeating units represented by Formula (1).

The repeating unit (21) contains a mesogen group and an electron-withdrawing group present at the terminal of the mesogen group and having a σp value of greater than 0.

The electron-withdrawing group is a group that is positioned at the terminal of the mesogen group and has a σp value of greater than 0. Examples of the electron-withdrawing group (a group having a σp value of greater than 0) include a group represented by EWG in Formula (LCP-21) described below, and specific examples thereof are also the same as those described below.

The σp value of the electron-withdrawing group described above is greater than 0. From the viewpoint of further increasing the degree of alignment of the polarizer, the σp value is preferably 0.3 or greater and more preferably 0.4 or greater. From the viewpoint that the uniformity of alignment is excellent, the upper limit of the σp value of the electron-withdrawing group is preferably 1.2 or less and more preferably 1.0 or less.

The σp value is a Hammett's substituent constant σp value (also simply abbreviated as a "σp value") and is a parameter showing the strength of electron-donating property and the electron-withdrawing property of a substituent, which numerically expresses the effect of the substituent on the acid dissociation equilibrium constant of substituted benzoic acid. The Hammett's substituent constant σp value in the present specification indicates the substituent constant σ in a case where the substituent is positioned at the para position of benzoic acid.

As the Hammett's substituent constant σp value of each group in the present specification, the values described in the document "Hansch et al., Chemical Reviews, 1991, Vol, 91, No. 2, pp. 165 to 195" are employed. Further, the Hammett's substituent constant σp values can be calculated for groups whose Hammett's substituent constant σp values are not described in the document described above using software "ACD/ChemSketch (ACD/Labs 8.00 Release Product Version: 8.08)" based on a difference between the pKa of benzoic acid and the pKa of a benzoic acid derivative having a substituent at the para position.

The repeating unit (21) is not particularly limited as long as the repeating unit (21) contains, at a side chain thereof, a mesogen group and an electron-withdrawing group present at the terminal of the mesogen group and having a σp value of greater than 0, and from the viewpoint of further increasing the degree of alignment of the polarizer, it is preferable that the repeating unit (21) is a repeating unit represented by Formula (LCP-21).

(LCP-21)

—(PC21)—
|
L21—SP21A—MG21—SP21B—EWG

In Formula (LCP-21), PC21 represents the main chain of the repeating unit and more specifically the same structure as that for PC1 in Formula (1), L21 represents a single bond or a divalent linking group and more specifically the same structure as that for L1 in Formula (1), SP21A and SP21B each independently represent a spacer group and more specifically the same structure as that for SP1 in Formula (1), MG21 represents a mesogen structure and more specifically a mesogen group MG in Formula (LC), and EWG represents an electron-withdrawing group having a σp value of greater than 0.

The spacer group represented by SP21A and SP21B is the same group as SP1 in Formula (1), and a group having at least one structure selected from the group consisting of an oxyethylene structure, an oxypropylene structure, a polysiloxane structure, and an alkylene fluoride structure or a linear or branched alkylene group having 2 to 20 carbon atoms is preferable. Here, the alkylene group may contain —O—, —O—CO—, —CO—O—, or —O—CO—O—.

From the viewpoints of easily exhibiting liquid crystallinity and the availability of raw materials, the spacer group represented by SP1 has preferably at least one structure selected from the group consisting of an oxyethylene structure, an oxypropylene structure, a polysiloxane structure, and an alkylene fluoride structure and more preferably an oxyethylene structure.

It is preferable that the spacer group represented by SP21B is a single bond or a linear or branched alkylene group having 2 to 20 carbon atoms. Here, the alkylene group may contain —O—, —O—CO—, —CO—O—, or —O—CO—O—.

Among these, from the viewpoint of further increasing the degree of alignment of the polarizer, a single bond is preferable as the spacer group represented by SP21B. In other words, it is preferable that the repeating unit (21) has a structure in which EWG that represents an electron-withdrawing group in Formula (LCP-21) is directly linked to MG21 that represents a mesogen group in Formula (LCP-21). In this manner, it is assumed that in a case where the electron-withdrawing group is directly linked to the mesogen group, the intermolecular interaction due to an appropriate dipole moment works more effectively in the polymer liquid crystal compound, and the orientation in which the liquid crystals are aligned is more uniform, and as a result, the degree of order of the liquid crystals and the degree of alignment are considered to be high.

EWG represents an electron-withdrawing group having a σp value of greater than 0. Examples of the electron-withdrawing group having a σp value of greater than 0 includes an ester group (specifically, a group represented by *—C(O)OR$^E$), a (meth)acryloyl group, a (meth)acryloyloxy group, a carboxy group, a cyano group, a nitro group, a sulfo group, —S(O)(O)—OR$^E$, —S(O)(O)—R$^E$, —O—S(O)(O)—R$^E$, an acyl group (specifically, a group represented by *—C(O)R$^E$), an acyloxy group (specifically, a group represented by *—OC(O)R$^E$), an isocyanate group (—N═C(O)), *—C(O)N(R$^F$)$_2$, a halogen atom, and an alkyl group substituted with any of these groups (preferably having 1 to 20 carbon atoms). In each of the above-described groups, * represents a bonding position with respect to SP21B. R$^E$ represents an alkyl group having 1 to 20 carbon atoms (preferably 1 to 4 carbon atoms and more preferably 1 or 2 carbon atoms). R$^F$'s each independently represents a hydrogen atom or an alkyl group having 1 to 20 carbon atoms (preferably 1 to 4 carbon atoms and more preferably 1 or 2 carbon atoms).

Among the above-described groups, from the viewpoint of further exhibiting the effects of the present invention, it is preferable that EWG represents a group represented by *—C(O)O—R$^E$, a (meth)acryloyloxy group, a cyano group, or a nitro group.

From the viewpoint that the polymer liquid crystal compound and the dichroic material can be uniformly aligned while a high degree of alignment of the polarizer is maintained, the content of the repeating unit (21) is preferably 60% by mass or less, more preferably 50% by mass or less, and particularly preferably 45% or less with respect to all the repeating units (100% by mass) of the polymer liquid crystal compound.

From the viewpoint that the effects of the present invention are more excellent, the lower limit of the content of the repeating unit (21) is preferably 1% by mass or greater and more preferably 3% by mass or greater.

The polymer liquid crystal compound may have only one or two or more kinds of repeating units (21). In a case where the polymer liquid crystal compound has two or more kinds of repeating units (21), there is an advantage in that the solubility of the polymer liquid crystal compound in a solvent is improved and the liquid crystal phase transition temperature is likely to be adjusted. In the case where the polymer liquid crystal compound has two or more kinds of repeating units (21), it is preferable that the total amount thereof is in the above-described range.

In the case where the polymer liquid crystal compound has two or more kinds of repeating units (21), a repeating unit (21) that does not contain a crosslinkable group in EWG and a repeating unit (21) that contains a crosslinkable group in EWG may be used in combination. In this manner, the curability of the polarizer is further improved. Further, preferred examples of the crosslinkable group include a vinyl group, a butadiene group, a (meth)acryloyloxy group, a (meth)acrylamide group, a vinyl acetate group, a fumaric acid ester group, a styryl group, a vinylpyrrolidone group, a maleic acid anhydride, a maleimide group, a vinyl ether group, an epoxy group, and an oxetanyl group.

In this case, from the viewpoint of the balance between the curability and the degree of alignment of the polarizer layer, the content of the repeating unit (21) containing a crosslinkable group in EWG is preferably in a range of 1% to 30% by mass with respect to all the repeating units (100% by mass) of the polymer liquid crystal compound.

Hereinafter, examples of the repeating unit (21) will be described, but the repeating unit (21) is not simply limited to the following repeating units.

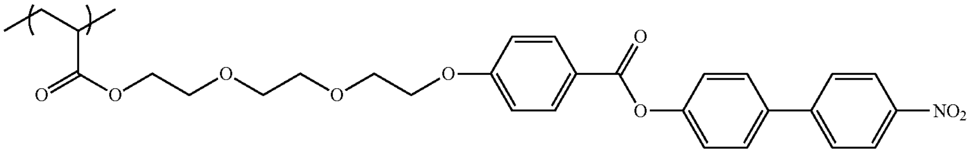

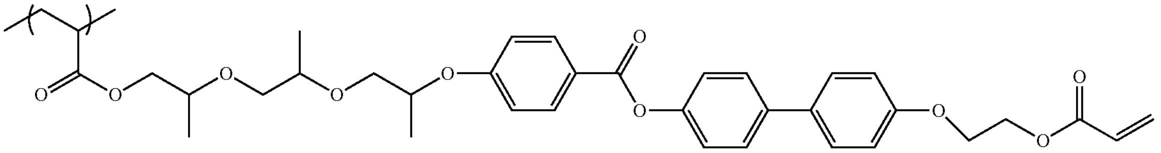

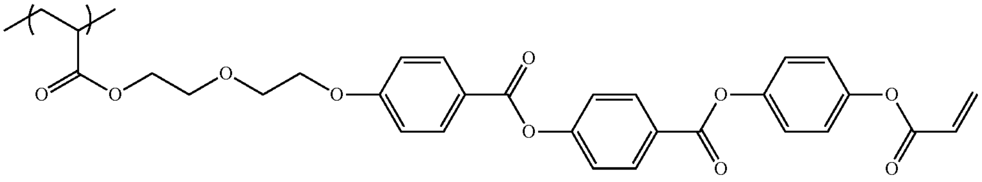

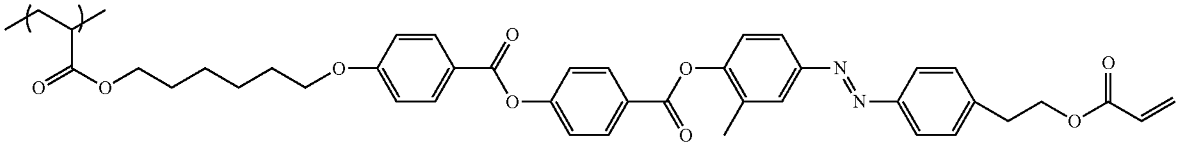

-continued
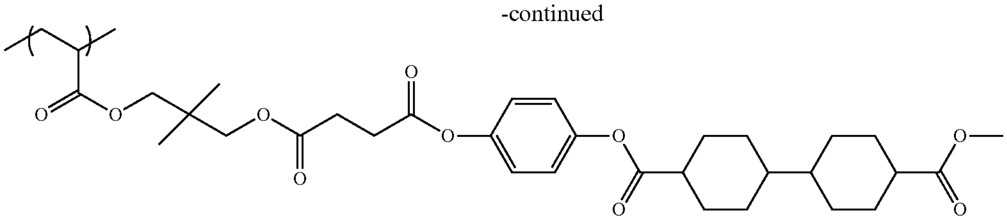
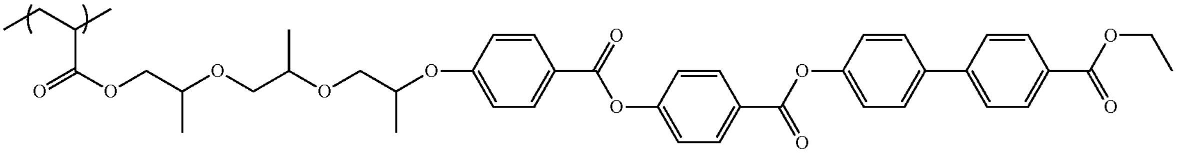
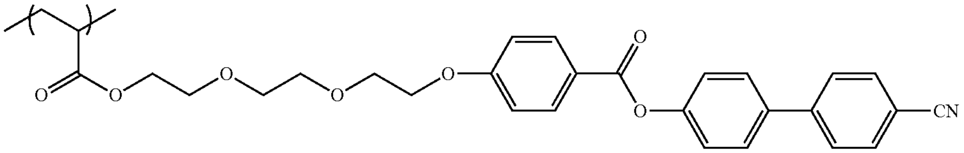
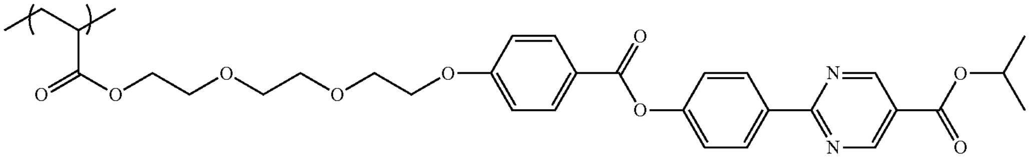
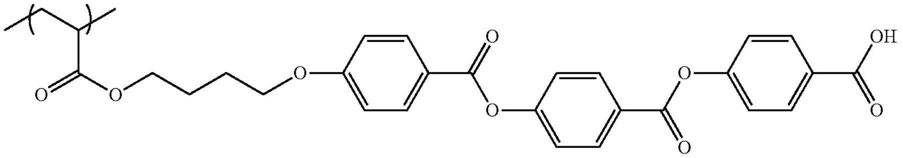
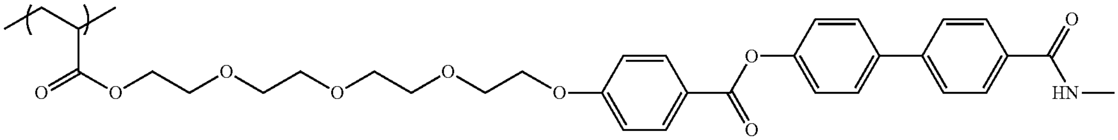
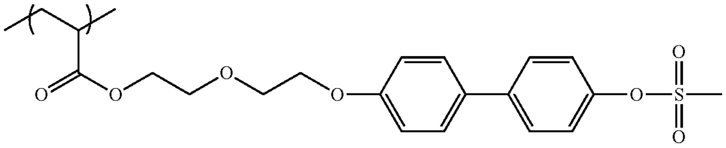
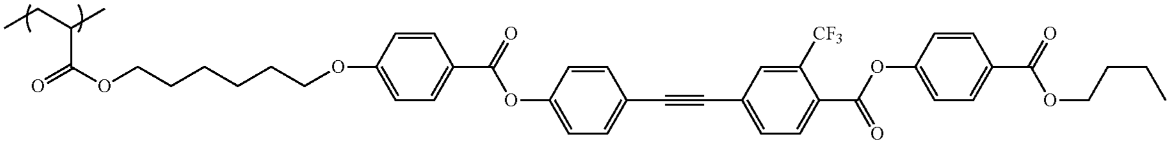
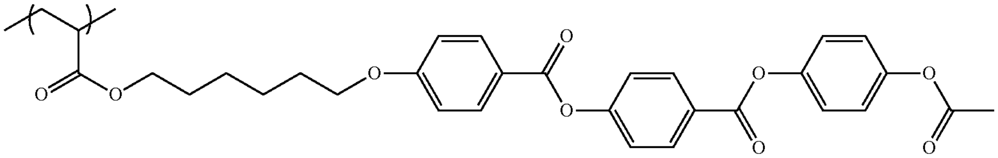
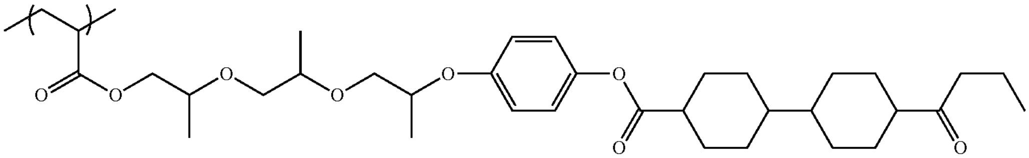
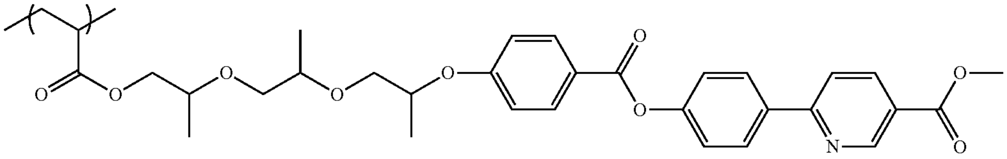

-continued

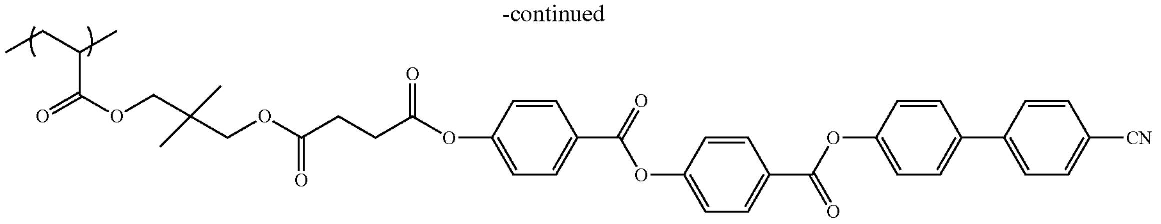

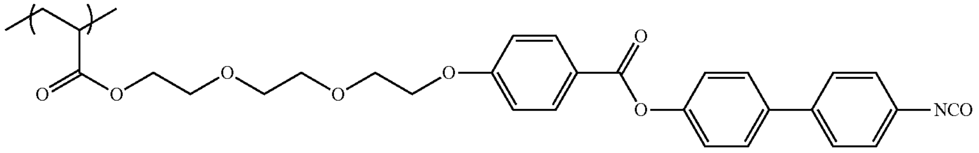

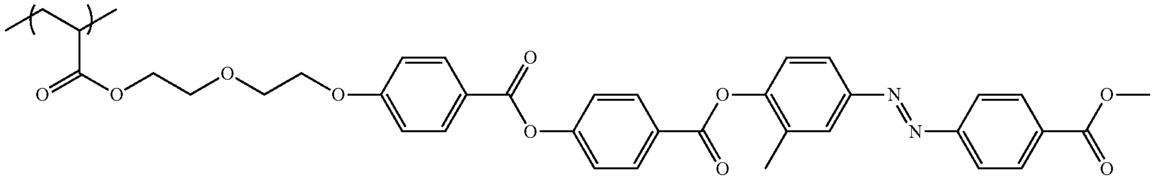

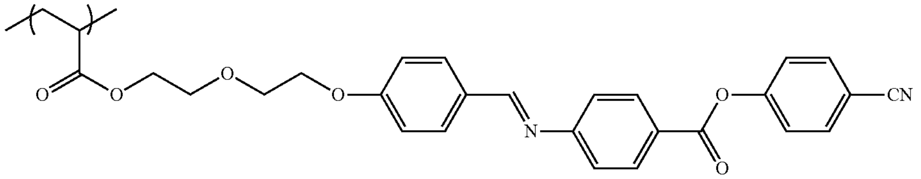

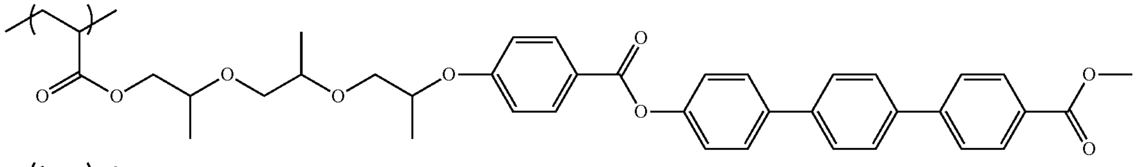

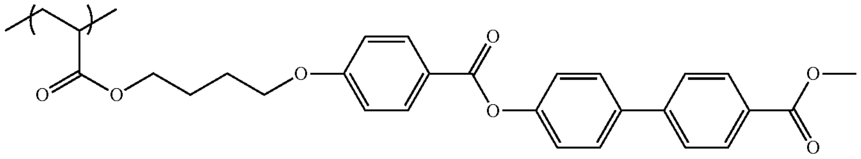

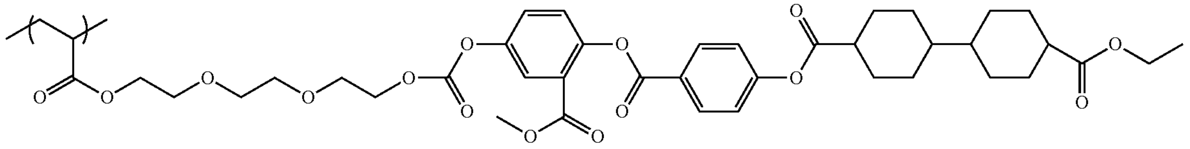

As a result of intensive examination on the composition (content ratio) and the electron-donating property and the electron-withdrawing property of the terminal groups of the repeating unit (21) and the repeating unit (22), the present inventors found that the degree of alignment of the polarizer is further increased by decreasing the content ratio of the repeating unit (21) in a case where the electron-withdrawing property of the electron-withdrawing group of the repeating unit (21) is high (that is, in a case where the σp value is large), and the degree of alignment of the polarizer is further increased by increasing the content ratio of the repeating unit (21) in a case where the electron-withdrawing property of the electron-withdrawing group of the repeating unit (21) is low (that is, in a case where the σp value is close to 0).

The details of the reason for this are not clear, but it is assumed as follows. That is, it is assumed that since the intermolecular interaction due to an appropriate dipole moment works in the polymer liquid crystal compound, the orientation in which the liquid crystals are aligned is more uniform, and as a result, the degree of order of the liquid crystals and the degree of alignment of the polarizer are considered to be high.

Specifically, the product of the σp value of the electron-withdrawing group (EWG in Formula (LCP-21)) in the repeating unit (21) and the content ratio (on a mass basis) of the repeating unit (21) in the polymer liquid crystal compound is preferably in a range of 0.020 to 0.150, more preferably in a range of 0.050 to 0.130, and particularly preferably in a range of 0.055 to 0.125. In a case where the product thereof is in the above-described range, the degree of alignment of the polarizer further increases.

The repeating unit (22) contains a mesogen group and a group present at the terminal of the mesogen group and having a σp value of 0 or less. In a case where the polymer liquid crystal compound has the repeating unit (22), the polymer liquid crystal compound and the dichroic material can be uniformly aligned.

The mesogen group is a group showing the main skeleton of a liquid crystal molecule that contributes to liquid crystal formation, and the details thereof are as described in the section of MG in Formula (LCP-22) described below, and specific examples thereof are also the same as described below.

The above-described group is positioned at the terminal of the mesogen group and has a σp value of 0 or less. Examples of the above-described group (a group having a σp value of 0 or less) includes a hydrogen atom having a σp value of 0 and a group (electron-donating group) having a σp value of less than 0 and represented by T22 in Formula (LCP-22) described below. Among the above-described groups, specific example of the group having a σp value of less than 0 (electron-donating group) are the same as those for T22 in Formula (LCP-22) described below.

The σp value of the above-described group is 0 or less, and from the viewpoint that the uniformity of alignment is more excellent, the σp value is preferably less than 0, more preferably −0.1 or less, and particularly preferably −0.2 or less. The lower limit of the σp value of the above-described group is preferably −0.9 or greater and more preferably −0.7 or greater.

The repeating unit (22) is not particularly limited as long as the repeating unit (22) contains, at a side chain thereof, a mesogen group and a group present at the terminal of the mesogen group and having a σp value of 0 or less, and from the viewpoint of further increasing the uniformity of alignment of liquid crystals, it is preferable that the repeating unit (22) is a repeating unit represented by Formula (PCP-22) which does not correspond to a repeating unit represented by Formula (LCP-21).

(LCP-22)

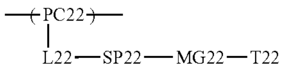

In Formula (LCP-22), PC22 represents the main chain of the repeating unit and more specifically the same structure as that for PC1 in Formula (1), L22 represents a single bond or a divalent linking group and more specifically the same structure as that for L1 in Formula (1), SP22 represents a spacer group and more specifically the same structure as that for SP1 in Formula (1), MG22 represents a mesogen structure and more specifically the same structure as the mesogen group MG1 in Formula (1), and T22 represents an electron-donating group having a Hammett's substituent constant σp value of less than 0.

T22 represents an electron-donating group having a σp value of less than 0. Examples of the electron-donating group having a σp value of less than 0 include a hydroxy group, an alkyl group having 1 to 10 carbon atoms, an alkoxy group having 1 to 10 carbon atoms, and an alkylamino group having 1 to 10 carbon atoms.

In a case where the number of atoms in the main chain of T22 is 20 or less, the degree of alignment of the polarizer is further improved. Here, the "main chain" in T22 indicates the longest molecular chain bonded to MG22, and the number of hydrogen atoms is not included in the number of atoms in the main chain of T22. For example, the number of atoms in the main chain is 4 in a case where T22 represents an n-butyl group, and the number of atoms in the main chain is 3 in a case where T22 represents a sec-butyl group.

Hereinafter, examples of the repeating unit (22) will be described, but the repeating unit (22) is not limited to the following repeating units.

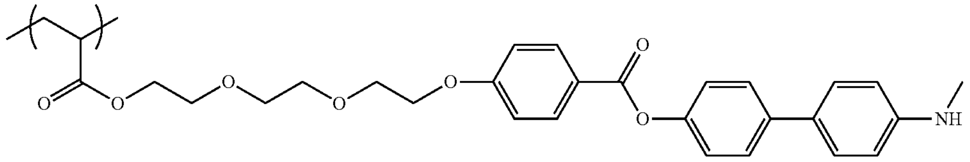

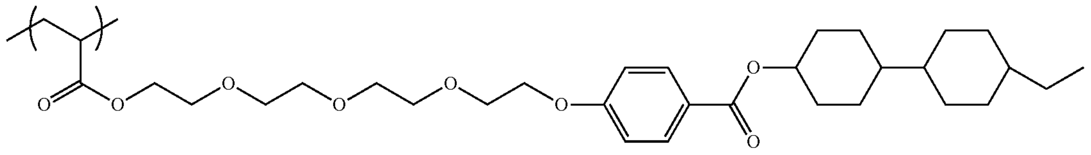

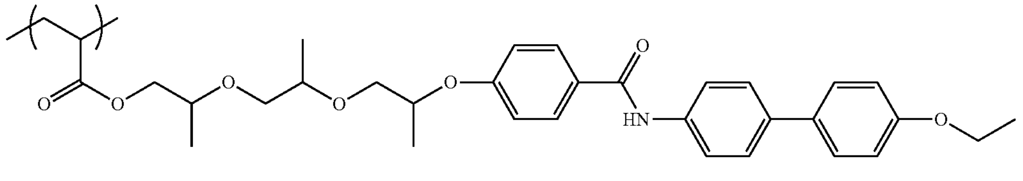

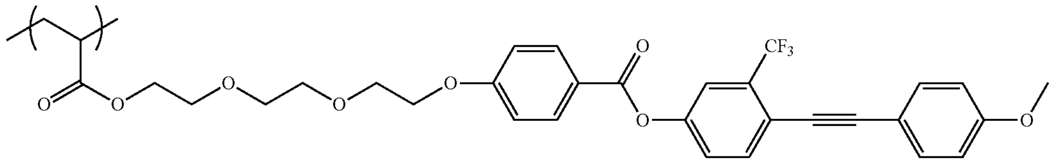

-continued
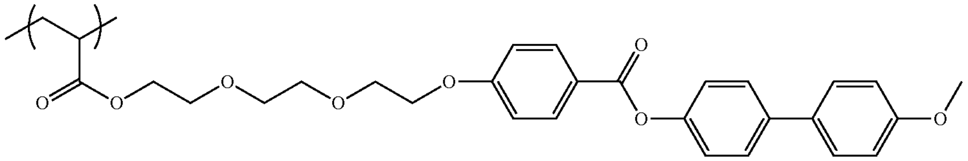
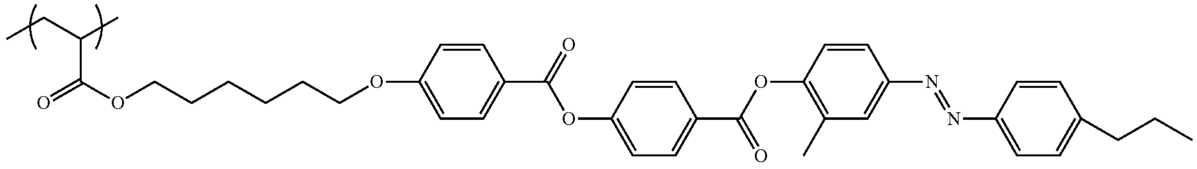
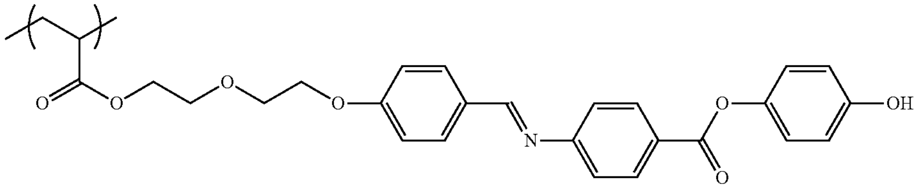
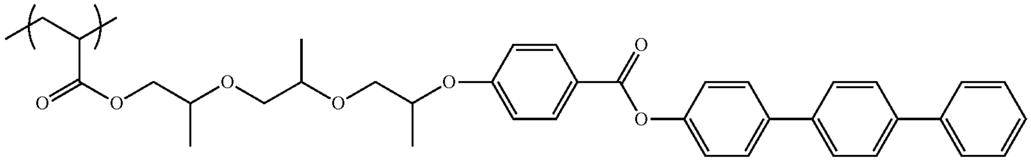
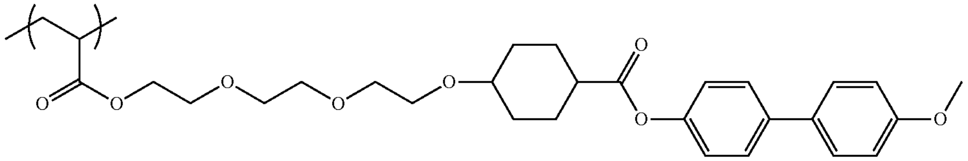
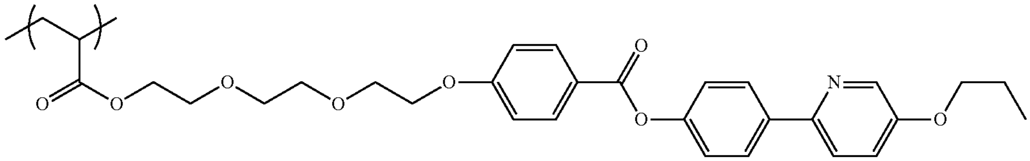
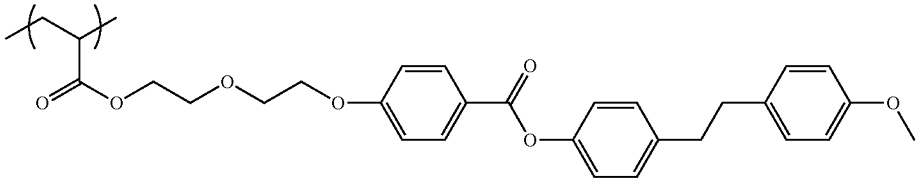
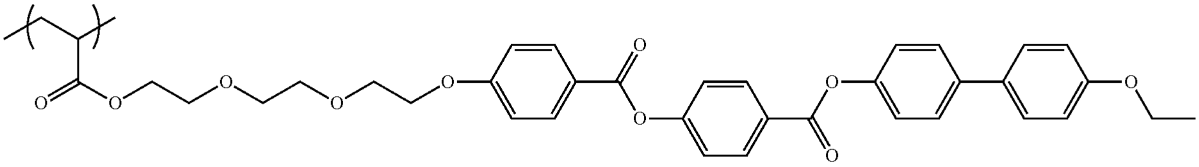
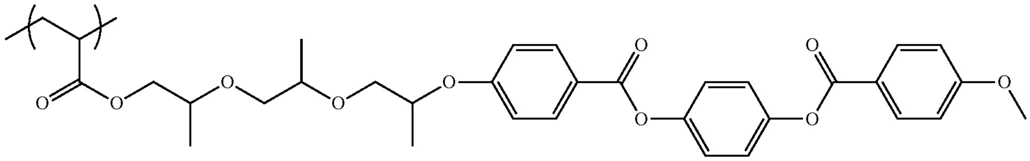
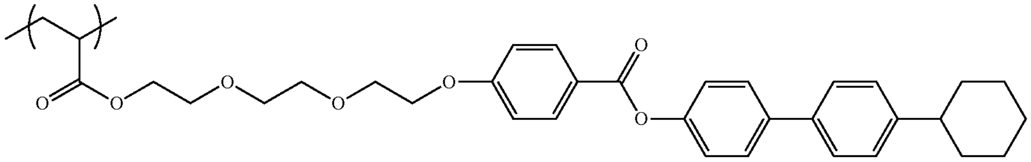

-continued

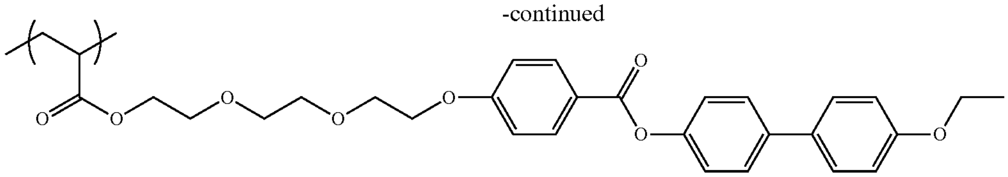

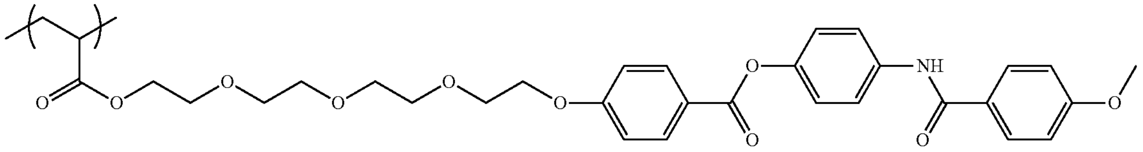

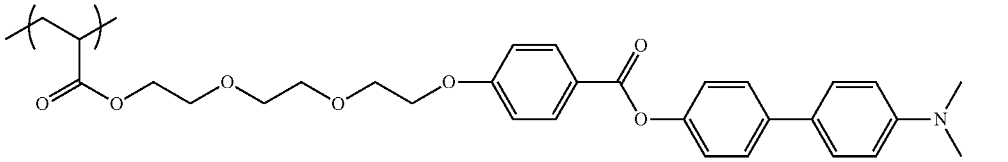

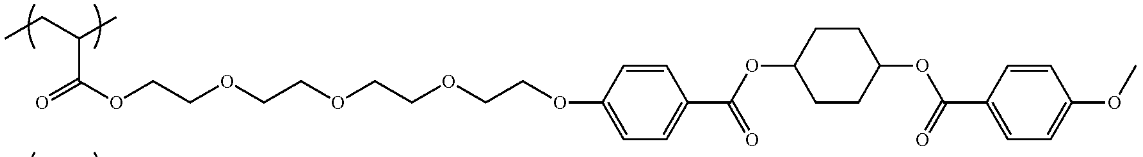

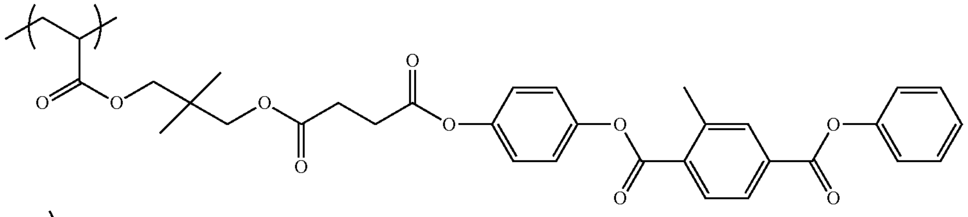

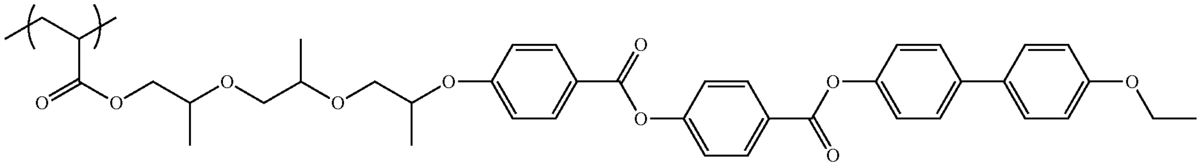

It is preferable that the structures of the repeating unit (21) and the repeating unit (22) have a part in common. It is assumed that the liquid crystals are uniformly aligned as the structures of repeating units are more similar to each other. In this manner, the degree of alignment of the polarizer is further increased.

Specifically, from the viewpoint of further increasing the degree of alignment of the polarizer, it is preferable to satisfy at least one of a condition that SP21 of Formula (LCP-21) has the same structure as that for SP22 of Formula (LCP-22), a condition that MG21 of Formula (LCP-21) has the same structure as that for MG22 of Formula (LCP-22), or a condition that L21 of Formula (LCP-21) has the same structure as that for L22 of Formula (LCP-22), more preferable to satisfy two or more of the conditions, and particularly preferable to satisfy all the conditions.

From the viewpoint that the uniformity of alignment is excellent, the content of the repeating unit (22) is preferably 50% by mass or greater, more preferably 55% or greater, and particularly preferably 60% or greater with respect to all the repeating units (100% by mass) of the polymer liquid crystal compound.

From the viewpoint of improving the degree of alignment, the upper limit of the content of the repeating unit (22) is preferably 99% by mass or less and more preferably 97% by mass or less.

The polymer liquid crystal compound may have only one or two or more kinds of repeating units (22). In a case where the polymer liquid crystal compound has two or more kinds of repeating units (22), there is an advantage in that the solubility of the polymer liquid crystal compound in a solvent is improved and the liquid crystal phase transition temperature is likely to be adjusted. In a case where the polymer liquid crystal compound has two or more kinds of repeating units (22), it is preferable that the total amount thereof is in the above-described range.

From the viewpoint of improving the solubility in a general-purpose solvent, the polymer liquid crystal compound used in the present invention may have a repeating unit (3) that does not contain a mesogen.

Specific examples of the repeating unit (3) include a repeating unit (hereinafter, also referred to as a "repeating unit (3-1)") that does not contain a crosslinkable group (for example, an ethylenically unsaturated group) and a repeating unit (hereinafter, also referred to as a "repeating unit (3-2)") that contains a crosslinkable group.

Specific examples of the monomer used for polymerization of the repeating unit (3-1) include acrylic acid, α-alkylacrylic acids (such as methacrylic acid and itaconic acid), esters and amides derived therefrom (such as N-i-propylacrylamide, N-n-butylacrylamide, N-t-butylacrylamide, N,N-dimethylacrylamide, N-methylmethacrylamide, acrylamide, methacrylamide, diacetoneacrylamide, acryloylmorpholine, N-methylol acrylamide, N-methylol methacrylamide, methyl acrylate, ethyl acrylate, hydroxyethyl acrylate, n-propyl acrylate, i-propyl acrylate, 2-hydroxypropyl acrylate, 2-methyl-2-nitropropyl acrylate, n-butyl acrylate, i-butyl acrylate, t-butyl acrylate, t-pentyl acrylate, 2-methoxyethyl acrylate, 2-ethoxyethyl acrylate, 2-ethoxyethoxyethyl acrylate, 2,2,2-trifluoroethyl acrylate, 2,2-dimethylbutyl acrylate, 3-methoxybutyl acrylate, ethyl carbitol acrylate, phenoxyethyl acrylate, n-pentyl acrylate, n-hexyl acrylate, cyclohexyl acrylate, cyclopentyl acrylate, benzyl acrylate, n-octyl acrylate, 2-ethylhexyl acrylate, 4-methyl-2-propylpentyl acrylate, methyl methacrylate, 2,2,2-trifluoroethyl methacrylate, hydroxyethyl methacrylate, 2-hydroxypropyl methacrylate, n-butyl methacrylate, i-butyl methacrylate, sec-butyl methacrylate, n-octyl methacrylate, 2-ethylhexyl methacrylate, 2-methoxyethyl methacrylate, 2-ethoxyethyl methacrylate, benzyl methacrylate, 2-norbornyl methyl methacrylate, 5-norbornen-2-ylmethyl methacrylate, and dimethylaminoethyl methacrylate), vinyl esters (such as vinyl acetate), esters derived from maleic acid or fumaric acid (such as dimethyl maleate and diethyl fumarate), maleimides (such as N-phenylmaleimide), maleic acid, fumaric acid, p-styrenesulfonic acid, acrylonitrile, methacrylonitrile, dienes (such as butadiene, cyclopentadiene, and isoprene), aromatic vinyl compounds (such as styrene, p-chlorostyrene, t-butylstyrene, and α-methylstyrene), N-vinylpyrrolidone, N-vinyloxazolidone, N-vinyl succinimide, N-vinylformamide, N-vinyl-N-methylformamide, N-vinylacetamide, N-vinyl-N-methylacetamide, 1-vinylimidazole, 4-vinylpyridine, vinylsulfonic acid, sodium vinyl sulfonate, sodium allyl sulfonate, sodium methallyl sulfonate, vinylidene chloride, vinyl alkyl ethers (such as methyl vinyl ether), ethylene, propylene, 1-butene, and isobutene.

The above-described monomers may be used alone or in combination of two or more kinds thereof.

Among the above-described monomers, acrylic acid, α-alkylacrylic acids, esters and amides derived therefrom, acrylonitrile, methacrylonitrile, and aromatic vinyl compounds are preferable.

As monomers other than the above-described monomers, the compounds described in Research Disclosure No. 1955 (July, 1980) can be used.

Hereinafter, specific examples of the repeating unit (3-1) will be described, but the present invention is not limited to these specific examples.

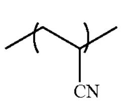
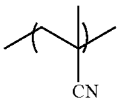
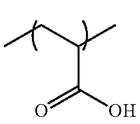
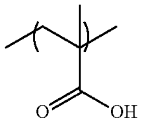
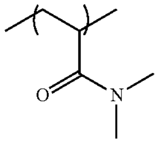
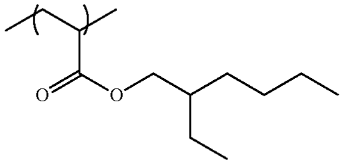

-continued

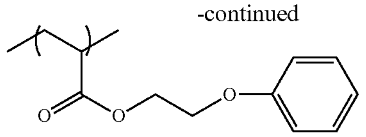

Specific examples of the crosslinkable group in the repeating unit (3-2) include groups represented by Formulae (P-1) to (P-30). Among these, a vinyl group, a butadiene group, a (meth)acryloyloxy group, a (meth)acrylamide group, a vinyl acetate group, a fumaric acid ester group, a styryl group, a vinylpyrrolidone group, a maleic acid anhydride, a maleimide group, a vinyl ether group, an epoxy group, and an oxetanyl group are more preferable.

From the viewpoint of easily performing polymerization, it is preferable that the repeating unit (3-2) is a repeating unit represented by Formula (3).

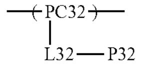
(3)

In Formula (3), PC32 represents the main chain of the repeating unit and more specifically the same structure as that for PC1 in Formula (1), L32 represents a single bond or a divalent linking group and more specifically the same structure as that for L1 in Formula (1), and P32 represents a group represented by any of Formulae (P-1) to (P-30).

Hereinafter, specific examples of the repeating unit (3-2) will be described, but the present invention is not limited to these specific examples.

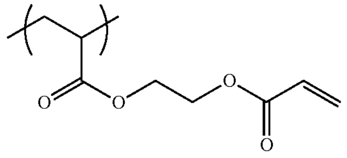
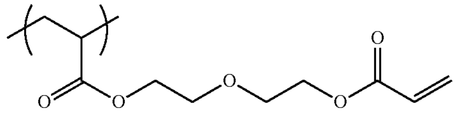
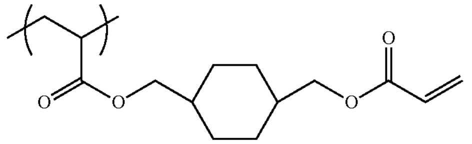
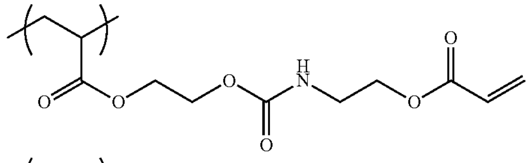
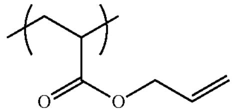
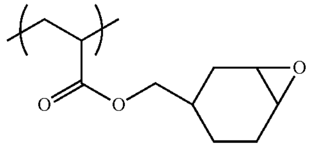

-continued

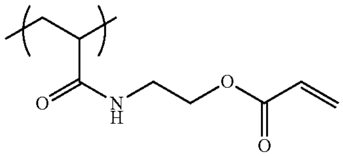
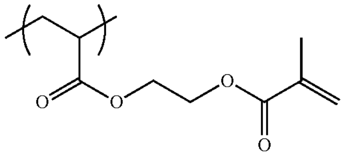
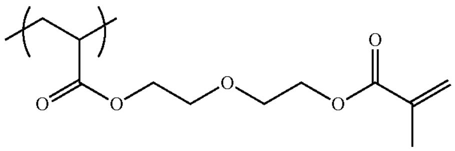
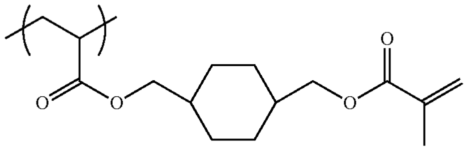
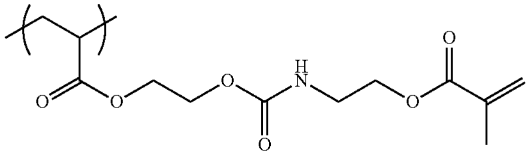
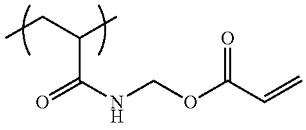
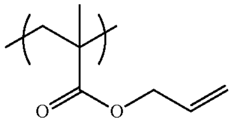
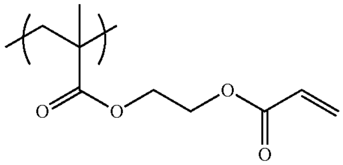
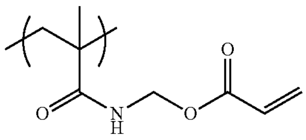
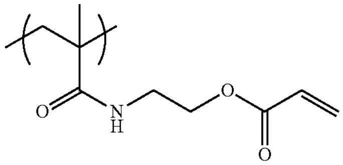
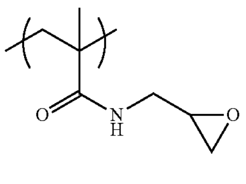

-continued

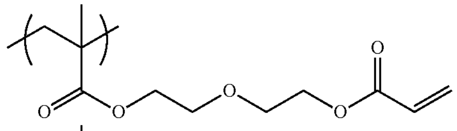
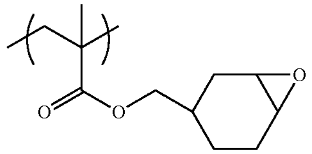
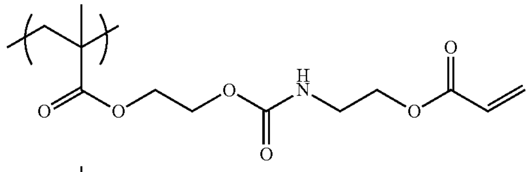
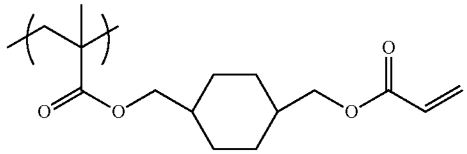

The content of the repeating unit (3) is less than 50% by mass, preferably 45% by mass or less, and more preferably 40% by mass or less with respect to all the repeating units (100% by mass) of the polymer liquid crystal compound. The lower limit of the content of the repeating unit (3) is preferably 1% by mass or greater and more preferably 3% by mass or greater. In a case where the content of the repeating unit (3) is less than 50% by mass, the degree of alignment of the polarizer layer is further improved. In a case where the content of the repeating unit (3) is 1% by mass or greater, the solubility of the polymer liquid crystal compound is further improved.

The polymer liquid crystal compound may have only one or two or more kinds of repeating units (3). In a case where the polymer liquid crystal compound has two or more kinds of repeating units (3), it is preferable that the total amount thereof is in the above-described range.

From the viewpoint of improving the adhesiveness and planar uniformity, the polymer liquid crystal compound used in the present invention may have a repeating unit (4) having a flexible structure with a long molecular chain (SP4 in Formula (4)). The reason for this is assumed as follows.

That is, in a case where the polymer liquid crystal compound has such a flexible structure having a long molecular chain, entanglement of the molecular chains constituting the polymer liquid crystal compound is likely to occur, and aggregation destruction of the polarizer layer (specifically, destruction of the polarizer itself) is suppressed. As a result, the adhesiveness between the polarizer layer and an underlayer (for example, a base material or an alignment layer) is assumed to be improved. Further, it is considered that a decrease in planar uniformity occurs due to the low compatibility between the dichroic material and the polymer liquid crystal compound. That is, it is considered that in a case where the compatibility between the dichroic material and the polymer liquid crystal compound is not sufficient, a planar defect (alignment defect) having the dichroic material to be precipitated as a nucleus occurs. Meanwhile, it is assumed that in the case where the polymer liquid crystal compound has such a flexible structure having a long molecular chain, a polarizer layer in which precipitation of the dichroic material is suppressed and the planar uniformity is excellent is obtained. Here, the "planar uniformity is excellent" indicates that the alignment defect occurring in a case where the liquid crystal composition containing the polymer liquid crystal compound is repelled on the underlayer (for example, the base material or the alignment layer) is less likely to occur.

The repeating unit (4) is a repeating unit represented by Formula (4).

(4)

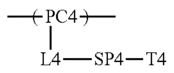

In Formula (4), PC4 represents the main chain of the repeating unit and more specifically the same structure as that for PC1 in Formula (1), L4 represents a single bond or a divalent linking group and more specifically the same structure as that for L1 in Formula (1), SP4 represents an alkylene group having 10 or more atoms in the main chain, and T4 represents a terminal group and more specifically the same group as that for T1 in Formula (1).

In Formula (4), specific examples and preferred embodiments of PC4 are the same as those for PC1 in Formula (1), and thus description thereof will not be repeated.

In Formula (4), specific examples and preferred embodiments of L4 are the same as those for L1 in Formula (1), and thus description thereof will not be repeated.

In Formula (4), SP4 represents an alkylene group having 10 or more atoms in the main chain. Here, one or more —$CH_2$— constituting the alkylene group represented by SP4 may be substituted with "SP-C" described above and particularly preferably at least one group selected from the group consisting of —O—, —S—, —N($R^{21}$)—, —C(═O)—, —C(═S), —C($R^{22}$)═C($R^{23}$)—, an alkynylene group, —Si($R^{24}$)($R^{25}$)—, —N═N—, —C($R^{26}$)═N—N═C($R^{27}$)—, —C($R^{28}$)═N—, and —S(═O)$_2$—. In addition, $R^{21}$ to $R^{28}$ each independently represent a hydrogen atom, a halogen atom, a cyano group, a nitro group, or a linear or branched alkyl group having 1 to 10 carbon atoms. Further, the hydrogen atoms contained in one or more —$CH_2$— constituting the alkylene group represented by SP4 may be substituted with "SP-H" described above.

SP4 represents an alkylene group having 10 or more atoms in the main chain, one or more —$CH_2$— constituting the alkylene group may be substituted with "SP-C" described above, and the hydrogen atoms contained in one or more —$CH_2$— constituting the alkylene group may be substituted with "SP-H" described above.

From the viewpoint of obtaining a light absorption anisotropic film in which at least one of the adhesiveness or the planar uniformity is more excellent, the number of atoms in the main chain of SP4 is preferably 10 or greater and more preferably 15 or greater. Further, from the viewpoint of obtaining a polarizer with a more excellent degree of alignment, the upper limit of the number of atoms in the main chain of SP4 is preferably 70 or less, more preferably 60 or less, and particularly preferably 50 or less.

Here, the "main chain" in SP4 indicates a partial structure required for directly linking L4 and T4 to each other, and the "number of atoms in the main chain" indicates the number of atoms constituting the partial structure. In other words, the "main chain" in SP4 is a partial structure in which the number of atoms linking L4 and T4 to each other is the smallest. For example, the number of atoms in the main chain in a case where SP4 represents a 3,7-dimethyldecanyl group is 10, and the number of atoms in the main chain in a case where SP4 represents a 4,6-dimethyldodecanyl group is 12. Further, in Formula (4-1), the inside of the frame shown by the dotted quadrangle corresponds to SP4, and the number of atoms in the main chain of SP4 (corresponding to the total number of atoms circled by the dotted line) is 10.

(4-1)

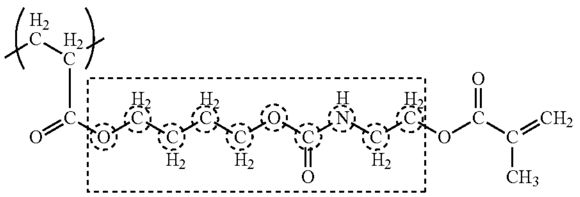

The alkylene group represented by SP4 may be linear or branched.

From the viewpoint of obtaining a light absorption anisotropic film with an excellent degree of alignment, the number of carbon atoms (the number of atoms in the main chain in a case where the carbon atoms of the alkylene group are substituted with "SP-C" of the main chain) of the alkylene group represented by SP4 is preferably in a range of 10 to 80 and more preferably in a range of 15 to 80.

From the viewpoint of obtaining a polarizer layer with more excellent adhesiveness and planar uniformity, it is preferable that one or more —$CH_2$— constituting the alkylene group represented by SP4 are substituted with "SP-C" described above.

Further, in a case where a plurality of —$CH_2$— constituting the alkylene group represented by SP4 are present, it is more preferable that only some of the plurality of —$CH_2$— are substituted with "SP-C" described above from the viewpoint of obtaining a polarizer layer with more excellent adhesiveness and planar uniformity.

Among the examples of "SP-C", —O—, —S—, —N($R^{21}$)—, —C(═O)—, —C(═S)—, —C($R^{22}$)═C($R^{23}$)—, an alkynylene group, —Si($R^{24}$)($R^{25}$)—, —C($R^{26}$)═N—N═C($R^{27}$)—, —C($R^{28}$)═N—, and —S(═O)$_2$— are preferable, and from the viewpoint of obtaining a polarizer layer with more excellent adhesiveness and planar uniformity, at least one group selected from the group consisting of —O—, —N($R^{21}$)—, —C(═O)—, and —S(═O)$_2$— is more preferable, and at least one group selected from the group consisting of —O—, —N($R^{21}$)—, and —C(═O)— is particularly preferable.

Particularly, it is preferable that SP4 represents a group having at least one selected from the group consisting of an oxyalkylene structure in which one or more —$CH_2$— constituting an alkylene group are substituted with —O—, an ester structure in which one or more —$CH_2$—$CH_2$-constituting an alkylene group are substituted with —O— and —C(═O)—, and a urethane bond in which one or more —$CH_2$—$CH_2$—$CH_2$— constituting an alkylene group are substituted with —O—, —C(═O)—, and —NH—.

The hydrogen atoms contained in one or more —$CH_2$— constituting the alkylene group represented by SP4 may be substituted with "SP-H" described above. In this case, one or more hydrogen atoms contained in —$CH_2$— may be substituted with "SP-H". That is, only one hydrogen atom contained in —$CH_2$— may be substituted with "SP-H" or all (two) hydrogen atoms contained in —$CH_2$— may be substituted with "SP-H".

Among the examples of "SP-H", at least one group selected from the group consisting of a halogen atom, a cyano group, a nitro group, a hydroxyl group, a linear alkyl group having 1 to 10 carbon atoms, a branched alkyl group having 1 to 10 carbon atoms, and a halogenated alkyl group having 1 to 10 carbon atoms is preferable, and at least one group selected from the group consisting of a hydroxyl group, a linear alkyl group having 1 to 10 carbon atoms, and a branched alkyl group having 1 to 10 carbon atoms is more preferable.

T4 represents preferably a crosslinkable group, more preferably a group represented by any of Formulae (P-1) to (P-30) in Formula (W1), still more preferably a vinyl group, a butadiene group, a (meth)acryloyloxy group, a (meth) acrylamide group, a vinyl acetate group, a fumaric acid ester group, a styryl group, a vinylpyrrolidone group, a maleic anhydride, a maleimide group, s vinyl ether group, an epoxy group, or an oxetanyl group, furthermore preferably a (meth) acryloyloxy group, an epoxy group, or an oxetanyl group, and particularly preferably a (meth)acryloyloxy group.

The epoxy group may be an epoxycycloalkyl group, and the number of carbon atoms of the cycloalkyl group moiety in the epoxycycloalkyl group is preferably in a range of 3 to 15, more preferably in a range of 5 to 12, and particularly preferably 6 (that is, in a case where the epoxycycloalkyl group is an epoxycyclohexyl group) from the viewpoint that the effects of the present invention are more excellent.

Examples of the substituent of the oxetanyl group include an alkyl group having 1 to 10 carbon atoms. Among the examples, an alkyl group having 1 to 5 carbon atoms is preferable from the viewpoint that the effects of the present invention are more excellent. The alkyl group as a substituent of the oxetanyl group may be linear or branched, but is preferably linear from the viewpoint that the effects of the present invention are more excellent.

Specific examples of the repeating unit (4) include the following structures, but the present invention is not limited thereto. Further, in the following specific examples, n1 represents an integer of 2 or greater, and n2 represents an integer of 1 or greater.

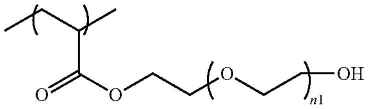

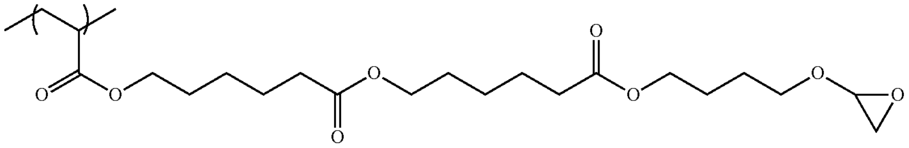

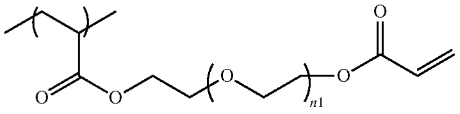

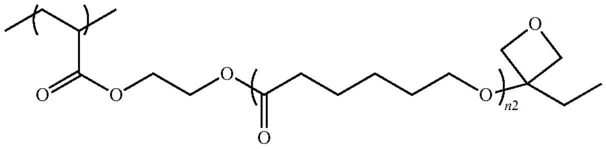

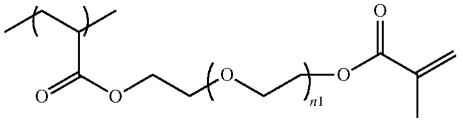

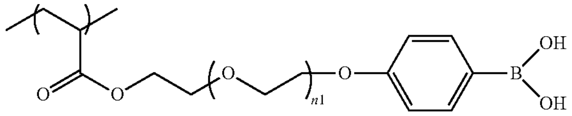

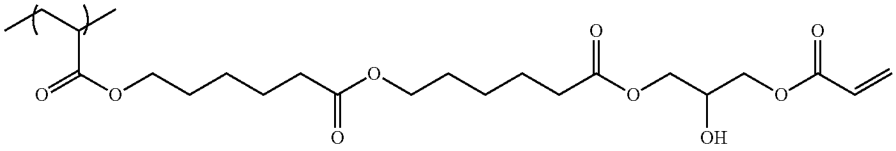

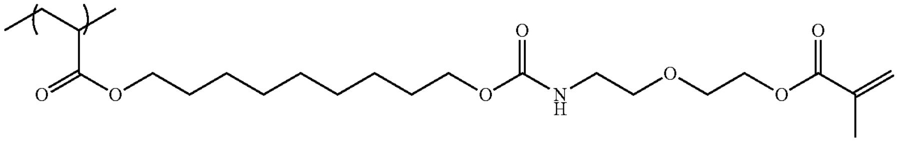

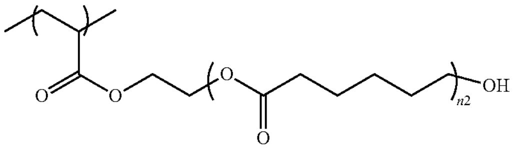

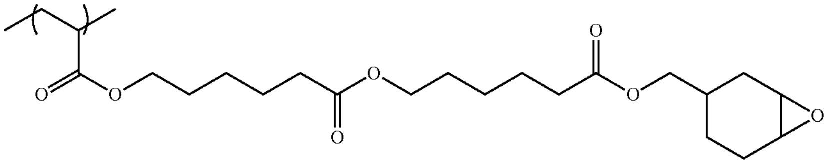

-continued

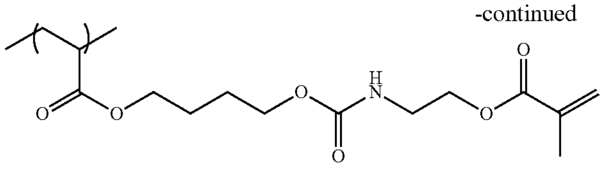

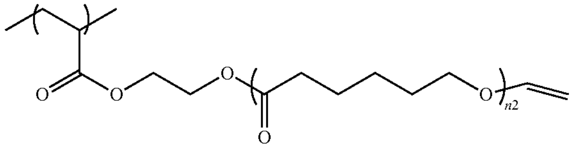

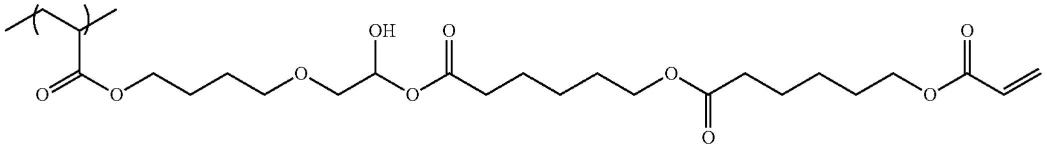

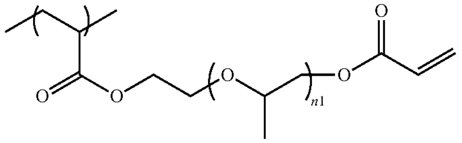

The content of the repeating unit (4) is preferably in a range of 1% to 40% by mass and more preferably in a range of 2% to 35% by mass with respect to all the repeating units (100% by mass) of the polymer liquid crystal compound. In a case where the content of the repeating unit (4) is 2% by mass or greater (more preferably 10% by mass or greater), a polarizer layer having more excellent adhesiveness can be obtained. Further, in a case where the content of the repeating unit (4) is 20% by mass or less, a polarizer layer having more excellent planar uniformity can be obtained.

The polymer liquid crystal compound may have only one or two or more kinds of repeating units (4). In a case where the polymer liquid crystal compound has two or more kinds of repeating units (4), the content of the repeating unit (4) indicates the total content of the repeating units (4).

From the viewpoint of the planar uniformity, the polymer liquid crystal compound may have a repeating unit (5) to be introduced by polymerizing a polyfunctional monomer. Particularly in order to improve the planar uniformity while suppressing a decrease in the degree of alignment, the content of the repeating unit (5) to be introduced by polymerizing a polyfunctional monomer in the polymer liquid crystal compound is preferably 10% by mass or less with respect to all the repeating units (100% by mass) of the polymer liquid crystal compound. As described above, the reason why the planar uniformity can be improved while a decrease in the degree of alignment is suppressed by allowing the polymer liquid crystal compound to have 10% by mass or less of the repeating unit (5) is assumed as follows.

The repeating unit (5) is a unit to be introduced to the polymer liquid crystal compound by polymerizing a polyfunctional monomer. Therefore, it is considered that the polymer liquid crystal compound contains a polymer body in which a three-dimensional crosslinked structure is formed by the repeating unit (5). Here, since the content of the repeating unit (5) is small, the content of the polymer body having the repeating unit (5) is considered to be small.

It is assumed that a polarizer layer in which cissing of the composition is suppressed and the planar uniformity is excellent is obtained due to the presence of a small amount of the polymer body with the three-dimensional crosslinked structure that has been formed as described above.

Further, it is assumed that the effect of suppressing a decrease in the degree of alignment can be maintained because the content of the polymer body is small.

It is preferable that the repeating unit (5) to be introduced by polymerizing a polyfunctional monomer is a repeating unit represented by Formula (5).

(5)

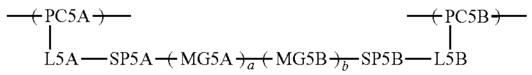

In Formula (5), PC5A and PC5B each independently represent the main chain of the repeating unit and more specifically the same structure as that for PC1 in Formula (1), L5A and L5B each independently represent a single bond or a divalent linking group and more specifically the same structure as that for L1 in Formula (1), SP5A and SP5B each independently represent a spacer group and more specifically the same structure as that for SP1 in Formula (1), MG5A and MG5B each independently represent a mesogen group and more specifically the same structure as that for MG1 in Formula (1), and a and b each independently represent an integer of 0 or 1.

PC5A and PC5B may represent the same group or different groups, but it is preferable that PC5A and PC5B represent the same group from the viewpoint of further improving the degree of alignment of the polarizer.

L5A and L5B may represent a single bond, the same group, or different groups, but L5A and L5B represent preferably a single bond or the same group and more preferably the same group from the viewpoint of further improving the degree of alignment of the polarizer.

SP5A and SP5B may represent a single bond, the same group, or different groups, but SP5A and SP5B represent preferably a single bond or the same group and more preferably the same group from the viewpoint of further improving the degree of alignment of the polarizer.

Here, the same group in Formula (5) indicates that the chemical structures are the same as each other regardless of the orientation in which each group is bonded. For example, even in a case where SP5A represents *—$CH_2$—$CH_2$—O—** (* represents a bonding position with respect to L5A, and ** represents a bonding position with respect to MG5A) and SP5B represents *—O—$CH_2$—$CH_2$—** (* represents a bonding position with respect to MG5B, and ** represents a bonding position with respect to L5B), SP5A and SP5B represent the same group.

a and b each independently represent an integer of 0 or 1 and preferably 1 from the viewpoint of further improving the degree of alignment of the polarizer layer.

a and b may be the same as or different from each other, but from the viewpoint of further improving the degree of alignment of the polarizer layer, it is preferable that both a and b represent 1.

From the viewpoint of further improving the degree of alignment of the polarizer layer, the sum of a and b is preferably 1 or 2 (that is, the repeating unit represented by Formula (5) contains a mesogen group) and more preferably 2.

From the viewpoint of further improving the degree of alignment of the polarizer layer, it is preferable that the partial structure represented by $-(MG5A)_a-(MG5B)_b—$ has a cyclic structure. In this case, from the viewpoint of further improving the degree of alignment of the polarizer layer, the number of cyclic structures in the partial structure represented by $-(MG5A2)_a-(MG5B)_b—$ is preferably 2 or greater, more preferably in a range of 2 to 8, still more preferably in a range of 2 to 6, particularly preferably in a range of 2 to 4, and most preferably 3 or 4.

From the viewpoint of further improving the degree of alignment of the polarizer layer, the mesogen groups represented by MG5A and MG5B each independently have preferably one or more cyclic structures, more preferably 2 to 4 cyclic structures, still more preferably 2 or 3 cyclic structures, and particularly preferably 2 cyclic structures.

Specific examples of the cyclic structure include an aromatic hydrocarbon group, a heterocyclic group, and an alicyclic group. Among these, an aromatic hydrocarbon group is preferable.

MG5A and MG5B may represent the same group or different groups, but from the viewpoint of further improving the degree of alignment of the polarizer layer, it is preferable that MG5A and MG5B represent the same group.

From the viewpoints of exhibiting the liquid crystallinity, adjusting the liquid crystal phase transition temperature, and the availability of raw materials and synthetic suitability and from the viewpoint that the effects of the present invention are more excellent, it is preferable that the mesogen group represented by MG5A and MG5B is the same structure as that for the mesogen group MG1 in Formula (1).

Particularly in the repeating unit (5), it is preferable that PC5A and PC5B represent the same group, L5A and L5B represent a single bond or the same group, SP5A and SP5B represent a single bond or the same group, and MG5A and MG5B represent the same group. In this manner, the degree of alignment of the polarizer layer is further improved.

The content of the repeating unit (5) is 10% by mass or less, and from the viewpoint that the effects of the present invention are more excellent, the content thereof is preferably in a range of 0.001% to 5% by mass and more preferably in a range of 0.05% to 3% by mass with respect to all the repeating units (100% by mass) of the polymer liquid crystal compound.

The polymer liquid crystal compound may have only one or two or more kinds of repeating units (5). In a case where the polymer liquid crystal compound has two or more kinds of repeating units (5), it is preferable that the total amount thereof is in the above-described range.

The polymer liquid crystal compound may be a star-shaped polymer. The star-shaped polymer in the present invention indicates a polymer having three or more polymer chains extending from the nucleus and is specifically represented by Formula (6).

The star-shaped polymer represented by Formula (6) as the polymer liquid crystal compound can form a polarizer layer having a high degree of alignment while having high solubility (excellent solubility in a solvent).

$$A\leftarrow(PI)_{n_A} \quad (6)$$

In Formula (6), $n_A$ represents an integer of 3 or greater and preferably an integer of 4 or greater. The upper limit of $n_A$ is not limited thereto, but is typically 12 or less and preferably 6 or less.

A plurality of PI's each independently represent a polymer chain having any of repeating units represented by Formulae (1), (21), (22), (3), (4), and (5). Here, at least one of the plurality of PI's represents a polymer chain having a repeating unit represented by Formula (1).

A represents an atomic group that is the nucleus of the star-shaped polymer. Specific examples of A include structures obtained by removing hydrogen atoms from thiol groups of the polyfunctional thiol compound, described in paragraphs [0052] to [0058] of JP2011-074280A, paragraphs [0017] to [0021] of JP2012-189847A, paragraphs [0012] to [0024] of JP2013-031986A, and paragraphs [0118] to [0142] of JP2014-104631A. In this case, A and PI are bonded to each other through a sulfide bond.

The number of thiol groups of the polyfunctional thiol compound from which A is derived is preferably 3 or greater and more preferably 4 or greater. The upper limit of the number of thiol groups of the polyfunctional thiol compound is typically 12 or less and preferably 6 or less.

Specific examples of the polyfunctional thiol compound are shown below.

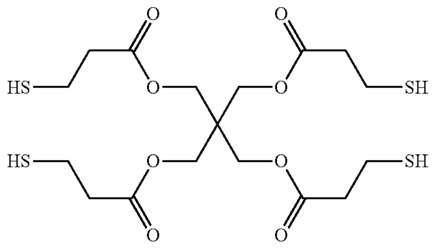

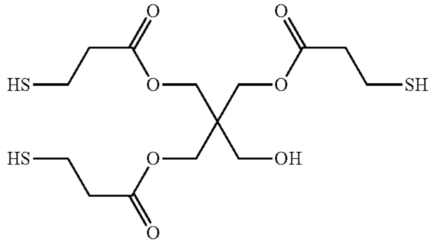

-continued
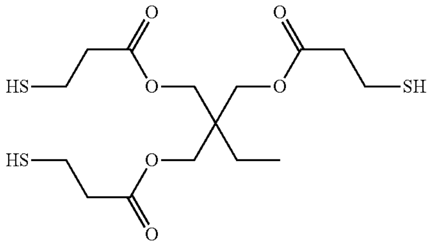
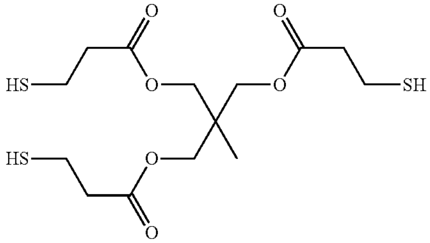
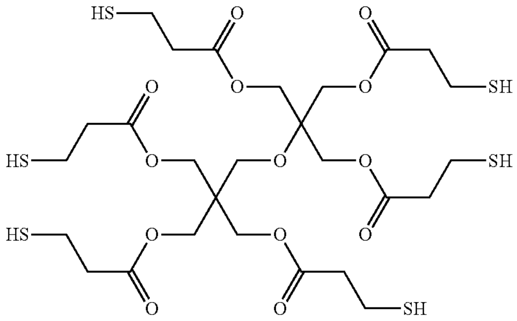
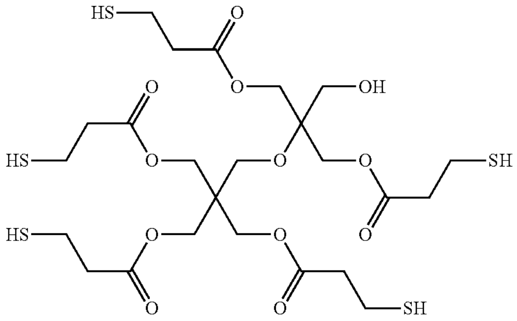
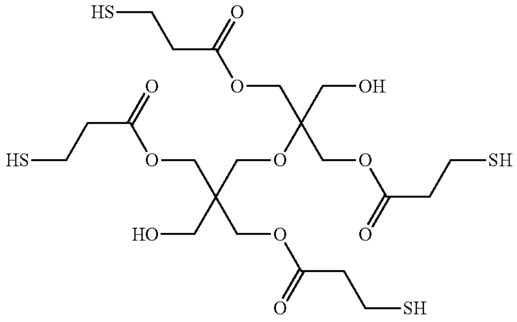
-continued
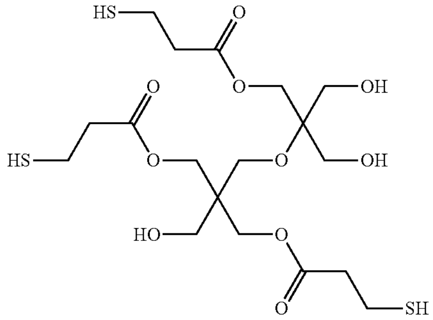
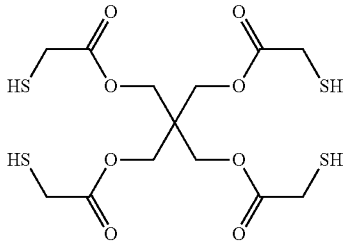
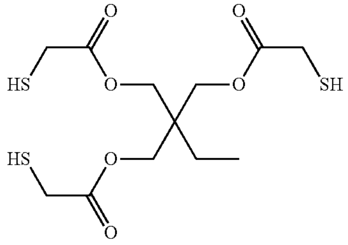
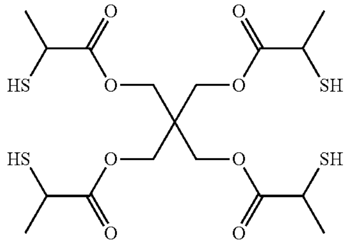
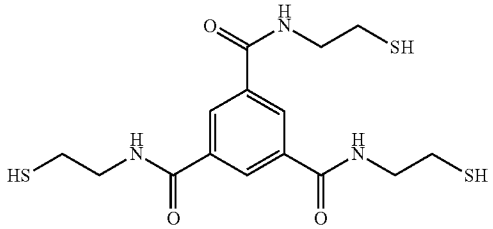
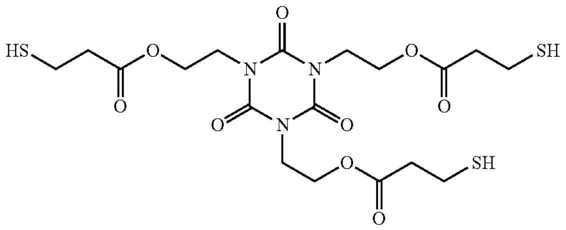

-continued

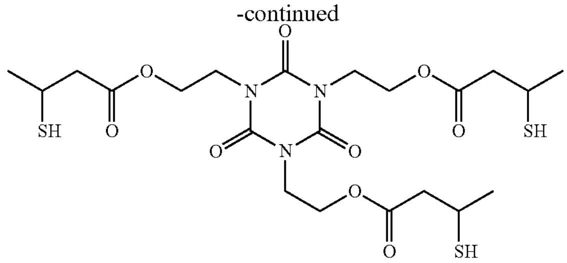

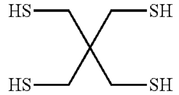

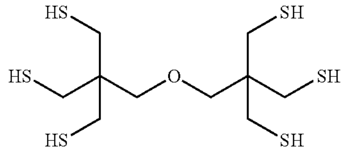

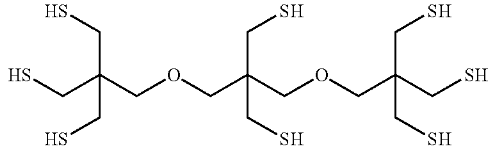

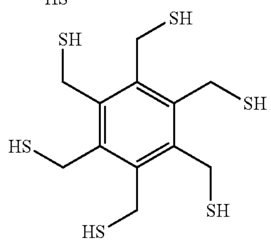

From the viewpoint of further improving the degree of alignment, the polymer liquid crystal compound may be a thermotropic liquid crystal and a crystalline polymer.

(Thermotropic Liquid Crystal)

The thermotropic liquid crystal is a liquid crystal that shows transition to the liquid crystal phase due to a change in temperature and may show any of a nematic phase or a smectic phase, but from the viewpoint that the degree of alignment of the polarizer layer is higher and haze is unlikely to be observed (the haze is improved), it is preferable that the thermotropic liquid crystal shows a nematic phase.

The temperature range showing the nematic phase is preferably in a range of room temperature (23° C.) to 450° C. from the viewpoint that the degree of alignment of the polarizer layer is higher and haze is unlikely to be observed and more preferably in a range of 30° C. to 400° C. from the viewpoints of the handleability and the manufacturing suitability.

(Crystalline Polymer)

A crystalline polymer is a polymer showing a transition to a crystal layer due to a change in temperature. The crystalline polymer may show a glass transition other than the transition to the crystal layer.

It is preferable that the polymer liquid crystal compound is a polymer liquid crystal compound that has a transition from a crystal phase to a liquid crystal phase in a case of being heated (glass transition may be present in the middle of the transition) from the viewpoint that the degree of alignment of the polarizer layer is higher and haze is unlikely to be observed or a polymer liquid crystal compound that has a transition to a crystal phase in a case where the temperature is lowered after entering a liquid crystal state by being heated (glass transition may be present in the middle of the transition).

Further, the presence or absence of crystallinity of the polymer liquid crystal compound is evaluated as follows.

Two polarizers of an optical microscope (ECLIPSE E600 POL, manufactured by Nikon Corporation) are disposed so as to be orthogonal to each other, and a sample table is set between the two polarizers. Further, a small amount of the polymer liquid crystal compound is placed on slide glass, and the slide glass is set on a hot stage placed on the sample table. While the state of the sample is observed, the temperature of the hot stage is increased to a temperature at which the polymer liquid crystal compound exhibits liquid crystallinity, and the polymer liquid crystal compound is allowed to enter a liquid crystal state. After the polymer liquid crystal compound enters the liquid crystal state, the behavior of the liquid crystal phase transition is observed while the temperature of the hot stage is gradually lowered, and the temperature of the liquid crystal phase transition is recorded. Further, in a case where the polymer liquid crystal compound exhibits a plurality of liquid crystal phases (for example, a nematic phase and a smectic phase), all the transition temperatures are also recorded.

Next, approximately 5 mg of a sample of the polymer liquid crystal compound is put into an aluminum pan, and the pan is covered and set on a differential scanning calorimeter (DSC) (an empty aluminum pan is used as a reference). The polymer liquid crystal compound measured in the above-described manner is heated to a temperature at which the compound exhibits a liquid crystal phase, and the temperature is maintained for 1 minute. Thereafter, the calorific value is measured while the temperature is lowered at a rate of 10° C./min. An exothermic peak is confirmed from the obtained calorific value spectrum.

As a result, in a case where an exothermic peak is observed at a temperature other than the liquid crystal phase transition temperature, it can be said that the exothermic peak is a peak due to crystallization and the polymer liquid crystal compound has crystallinity.

Meanwhile, in a case where the exothermic peak is not observed at a temperature other than the liquid crystal phase transition temperature, it can be said that the polymer liquid crystal compound does not have crystallinity.

The method of obtaining a crystalline polymer is not particularly limited, but as a specific example, a method of using a polymer liquid crystal compound having the repeating unit (1) described above is preferable, and a method of using a suitable form among polymer liquid crystal compounds having the repeating unit (1) described above is more preferable.

(Crystallization Temperature)

As described above, it is preferable that the polymer liquid crystal compound is a crystalline polymer. From the viewpoint that the degree of alignment of the polarizer layer is higher and haze is unlikely to be observed, the crystallization temperature is preferably −50° C. or higher and lower than 150° C., more preferably 120° C. or lower, still more preferably −20° C. or higher and lower than 120° C., and particularly preferably 95° C. or lower. From the viewpoint of reducing haze of the polarizer layer, the crystallization temperature of the polymer liquid crystal compound is preferably lower than 150° C.

Further, the crystallization temperature is a temperature of an exothermic peak due to crystallization in the above-described DSC.

(Molecular Weight)

From the viewpoint that the effects of the present invention are more excellent and/or the polymer liquid crystal compound is easily handled, the weight-average molecular weight (Mw) of the polymer liquid crystal compound is preferably in a range of 1000 to 500000 and more preferably in a range of 2000 to 300000.

In particular, from the viewpoint of suppressing cracking during the coating, the weight-average molecular weight (Mw) of the polymer liquid crystal compound is preferably 10000 or greater and more preferably in a range of 10000 to 300000.

In addition, from the viewpoint of the temperature latitude of the degree of alignment, the weight-average molecular weight (Mw) of the polymer liquid crystal compound is preferably less than 10000 and more preferably 2000 or greater and less than 10000.

Here, the weight-average molecular weight and the number average molecular weight in the present invention are values measured according to gel permeation chromatography (GPC).

Solvent (eluent): N-methylpyrrolidone

Equipment name: TOSOH HLC-8220GPC

Column: Connect and use three of TOSOH TSKgel Super AWM-H (6 mm×15 cm)

Column temperature: 25° C.

Sample concentration: 0.1% by mass

Flow rate: 0.35 mL/min

Calibration curve: TSK standard polystyrene (manufactured by TOSOH Corporation), calibration curves of 7 samples with Mw of 2800000 to 1050 (Mw/Mn=1.03 to 1.06) are used.

The polymer liquid crystal compound may exhibit nematic or smectic liquid crystallinity, but it is preferable that the polymer liquid crystal compound exhibits at least the nematic liquid crystallinity.

The temperature at which the nematic phase is exhibited is preferably in a range of 0° C. to 450° C. and from the viewpoints of the handleability and the manufacturing suitability, more preferably in a range of 30° C. to 400° C.

The content of the polymer liquid crystal compound is preferably in a range of 25% to 98% by mass, more preferably in a range of 30% to 97% by mass, and still more preferably in a range of 35% to 96% by mass with respect to 100% by mass of the solid content in the composition. In a case where the content of the polymer liquid crystal compound is in the above-described range, the degree of alignment of the polarizer layer is further improved.

[Low-Molecular-Weight Liquid Crystal Compound]

The low-molecular-weight liquid crystal compound contained in the composition according to a first embodiment is a compound represented by Formula (LC).

$$Q1\text{-}SPL1\text{-}ML\text{-}SPL2\text{-}Q2 \qquad \text{(LC)}$$

In Formula (LC), Q1 and Q2 each independently represent a crosslinkable group or a terminal group, SPL1 and SPL2 each independently represent a spacer group, ML represents a mesogen group, and at least one of Q1 or Q2 represents a crosslinkable group. From the viewpoint that the effects of the present invention are more excellent, it is preferable that both Q1 and Q2 represent a crosslinkable group.

The log P(SPL1) representing the log P value of SPL1 and the log P(ML) representing the log P value of ML satisfy the relationship of Expression (13) and preferably the relationship of Expression (13') from the viewpoint that the effects of the present invention are more excellent.

$$|\log P(ML) - \log P(SPL1)| \geq 4.0 \qquad (13)$$

$$|\log P(ML) - \log P(SPL1)| \geq 4.5 \qquad (13')$$

Here, D(SPL1) representing the molecular length of SPL1 and D(SPL2) representing the molecular length of SPL2 satisfy the relationship of Formula (20).

$$D(SPL1) \geq D(SPL2) \qquad (20)$$

SPL1 represents the same structure as that for SP1 in Formula (1), and thus the description thereof will not be repeated. Further, it is preferable that SPL1 has the same structure as SP1.

ML represents the same structure as that for MG1 in Formula (1), and thus the description thereof will not be repeated. Further, it is preferable that ML has the same structure as MG1.

Q1 and Q2 each independently represent the same structure as that for Q in Formula (W1), and thus the description thereof will not be repeated.

Preferred examples of the crosslinkable group include a radically polymerizable group and a cationically polymerizable group. In addition, a vinyl group represented by Formula (P-1), a butadiene group represented by (P-2), a (meth)acryloyloxy group represented by Formula (P-4), a (meth)acrylamide group represented by Formula (P-5), a vinyl acetate group represented by Formula (P-6), a fumaric acid ester group represented by Formula (P-7), a styryl group represented by Formula (P-8), a vinylpyrrolidone group represented by Formula (P-9), a maleic acid anhydride represented by Formula (P-11), and a maleimide group represented by Formula (P-12) are preferable as the radically polymerizable group, and a vinyl ether group represented by Formula (P-18), an epoxy group represented by Formula (P-19), and an oxetanyl group represented by Formula (P-20) are preferable as the cationically polymerizable group. Among these, a (meth)acryloyloxy group which is a radically polymerizable group is particularly preferable.

SPL2 represents the same structure as that for SP1 in Formula (1), and thus the description thereof will not be repeated.

The log P(SPL2) representing the log P value of SPL2 satisfies preferably Expression (31) and more preferably Expression (31').

$$\log P(SPL2) \leq 1.5 \qquad (31)$$

$$\log P(SPL2) \leq 1.0 \qquad (31')$$

Further, D(SPL2) representing the molecular length of SPL2 satisfies preferably Expression (41) and more preferably Expression (41').

$$D(SPL2) \leq 7.0\ \text{Å} \qquad (41)$$

$$D(SPL2) \leq 4.0\ \text{Å} \qquad (41')$$

It is advantageous to achieve both the degree of alignment and the adhesiveness in a case where the log P value of SPL2 and the length of the spacer structure are adjusted as described above.

Specific examples of the low-molecular-weight liquid crystal compound include the following structures, but the low-molecular-weight liquid crystal compound is not limited thereto.

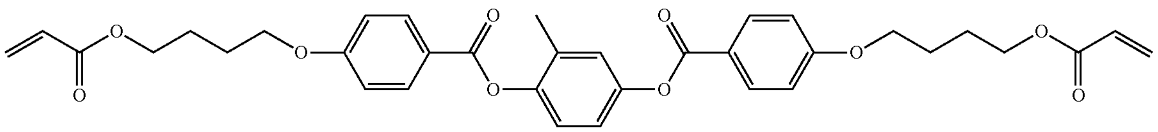
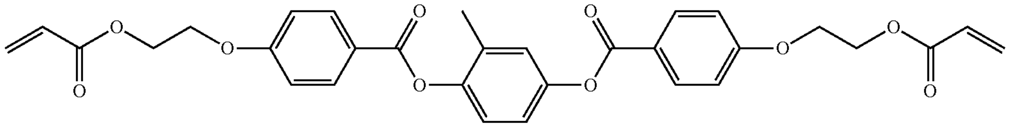
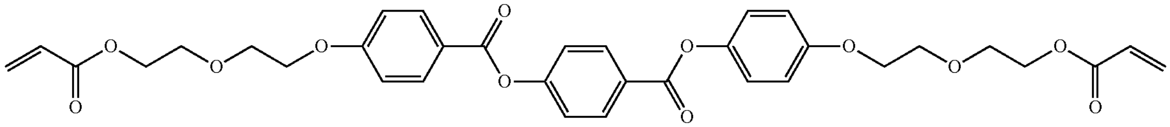
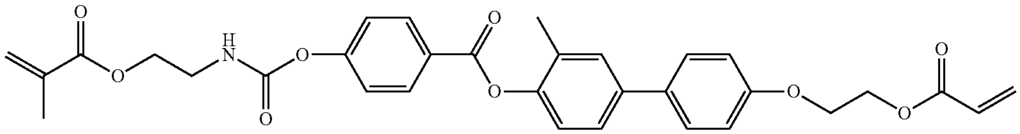
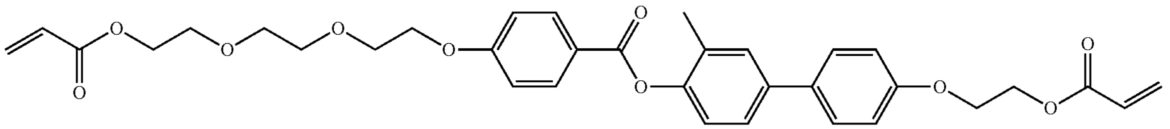
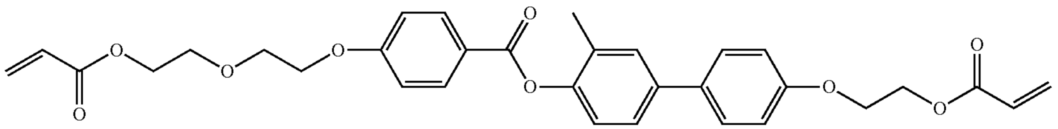
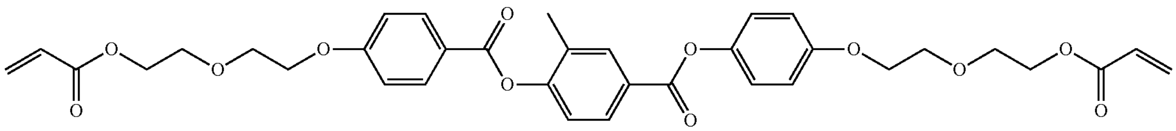
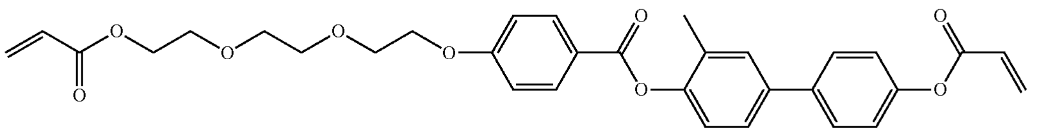
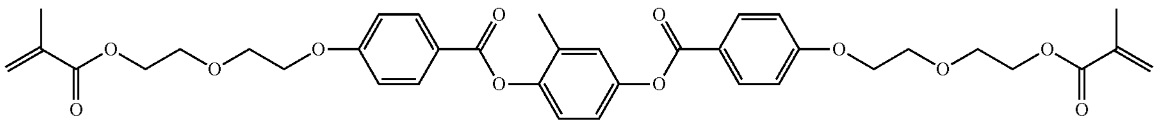
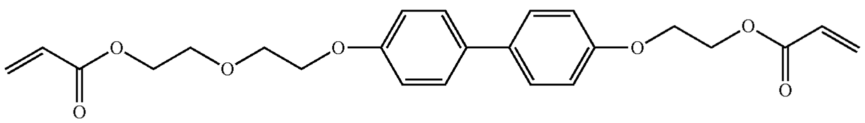
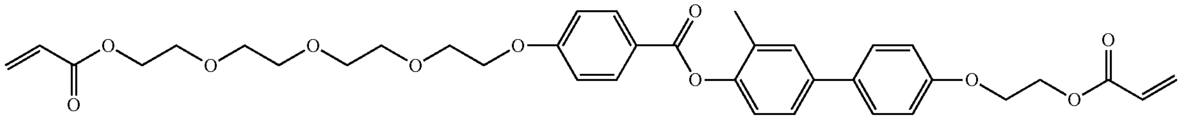
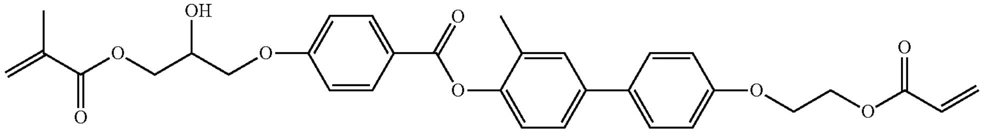
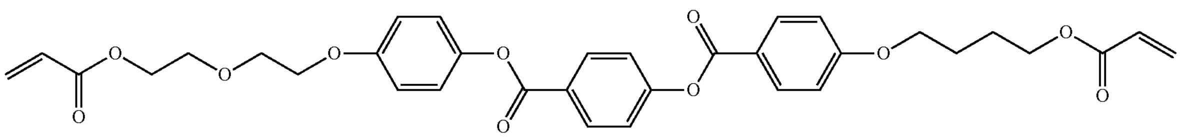

-continued
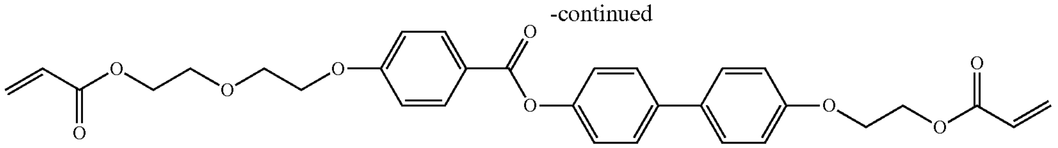
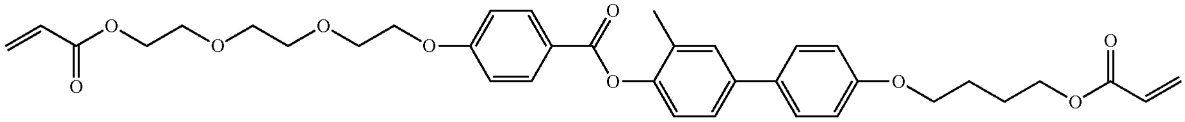
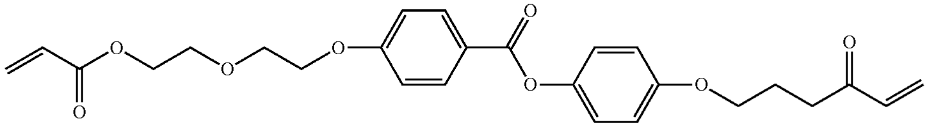
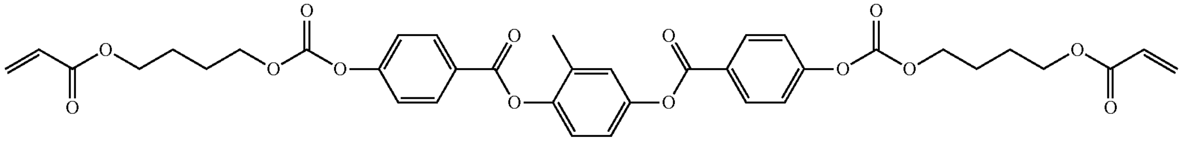
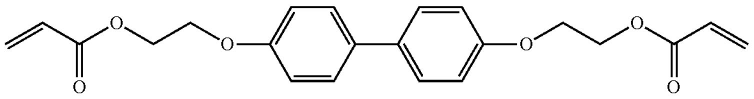
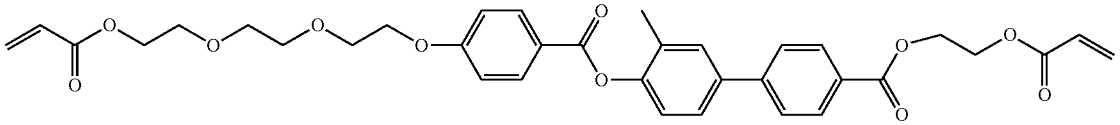
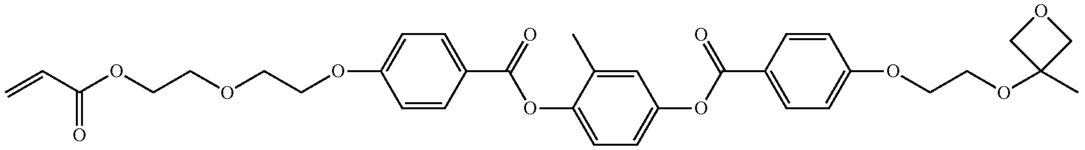
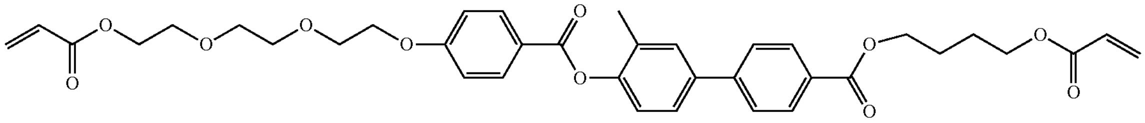
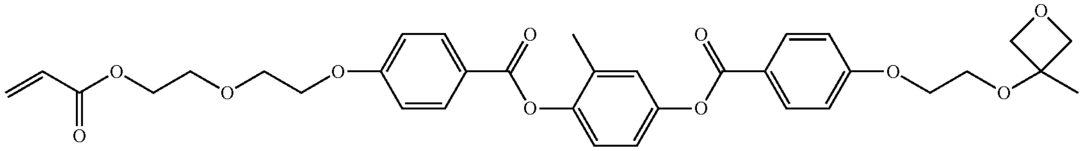
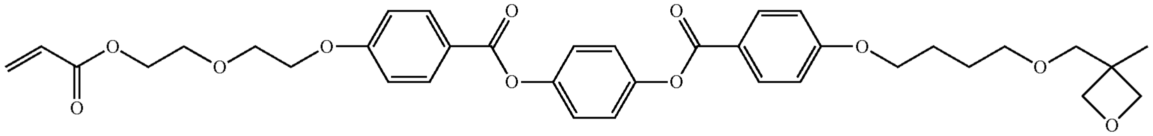
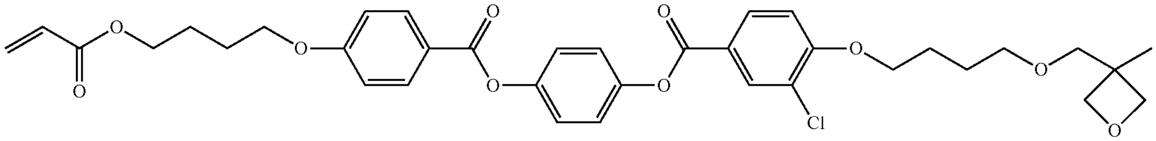
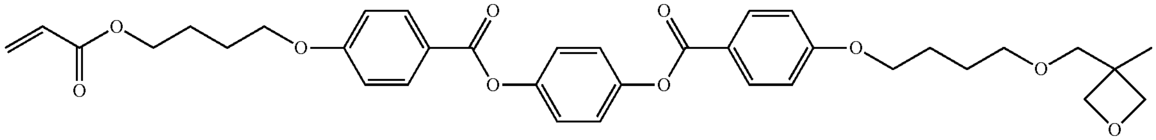
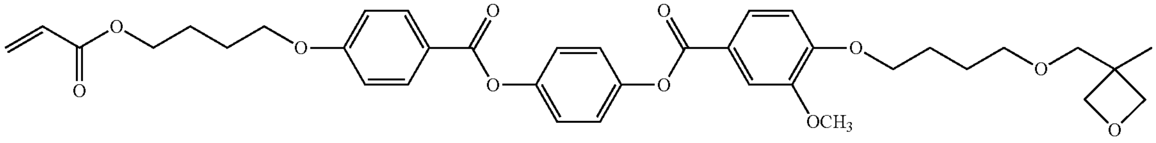

The low-molecular-weight liquid crystal compound may exhibit nematic or smectic liquid crystallinity. The temperature at which the liquid crystallinity is exhibited is preferably in a range of room temperature (23° C.) to 300° C. and from the viewpoints of the handleability and the manufacturing suitability, more preferably in a range of 40° C. to 250° C.

The content of the low-molecular-weight liquid crystal compound is preferably in a range of 1% to 60% by mass, more preferably in a range of 2% to 55% by mass, and particularly preferably in a range of 3% to 50% by mass with respect to 100% by mass of the solid content in the composition. In a case where the content of the low-molecular-weight liquid crystal compound is in the above-described range, the degree of alignment and the adhesiveness of the polarizer layer are further improved.

[Dichroic Material]

The dichroic material contained in the composition according to the embodiment of the present invention is not particularly limited, and examples thereof include a visible light absorbing material (dichroic dye), a light emitting material (such as a fluorescent material or a phosphorescent material), an ultraviolet absorbing material, an infrared absorbing material, a non-linear optical material, a carbon nanotube, and an inorganic material (for example, a quantum rod). Further, known dichroic materials (dichroic dyes) of the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, and paragraphs [0014] to [0034] of WO2018/164252A.

In the present invention, two or more kinds of dichroic materials may be used in combination. For example, from the viewpoint of making the color of the polarizer closer to black, it is preferable that at least one dichroic material having a maximal absorption wavelength in a wavelength range of 370 to 550 nm and at least one dichroic material having a maximal absorption wavelength in a wavelength range of 500 to 700 nm are used in combination.

In the present invention, from the viewpoint of further increasing the degree of alignment of the polarizer to be formed and further improving the heat resistance, the content of the dichroic material is preferably in a range of 1% to 80% by mass, more preferably in a range of 2% to 70% by mass, and still more preferably in a range of 3% to 60% by mass with respect to 100% by mass of the solid content in the composition.

[Solvent]

From the viewpoint of workability and the like, it is preferable that the composition according to the embodiment of the present invention contains a solvent.

Examples of the solvent include organic solvents such as ketones (such as acetone, 2-butanone, methyl isobutyl ketone, cyclopentanone, and cyclohexanone), ethers (such as dioxane, tetrahydrofuran, tetrahydropyran, dioxolane, tetrahydrofurfuryl alcohol, and cyclopentyl methyl ether), aliphatic hydrocarbons (such as hexane), alicyclic hydrocarbons (such as cyclohexane), aromatic hydrocarbons (such as benzene, toluene, xylene, and trimethylbenzene), halogenated carbons (such as dichloromethane, trichloromethane (chloroform), dichloroethane, dichlorobenzene, and chlorotoluene), esters (such as methyl acetate, ethyl acetate, butyl acetate, and diethyl carbonate), alcohols (such as ethanol, isopropanol, butanol, and cyclohexanol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrrolidone, N-ethylpyrrolidone, and 1,3-dimethyl-2-imidazolidinone), and heterocyclic compounds (such as pyridine), and water.

These solvents may be used alone or in combination of two or more kinds thereof.

Among these solvents, from the viewpoint of further improving the degree of alignment of the polarizer to be formed and further improving the heat resistance, it is preferable to use an organic solvent and more preferable to use halogenated carbons or ketones.

In a case where the composition contains a solvent, from the viewpoint of further increasing the degree of alignment of the polarizer layer to be formed and further improving the heat resistance, the content of the solvent is preferably in a range of 70% to 99.5% by mass, more preferably in a range of 75% to 99% by mass, and still more preferably in a range of 80% to 98% by mass with respect to the total mass (100% by mass) of the composition.

[Surfactant]

It is preferable that the composition according to the embodiment of the present invention contains a surfactant (also referred to as an "interface improver"). In a case where the polarizer-forming composition contains a surfactant, the smoothness of the coated surface is improved, the degree of alignment is improved, and cissing and unevenness are suppressed so that the in-plane uniformity is expected to be improved.

As the surfactant, surfactants that allow liquid crystal compounds to be horizontally aligned are preferable, and compounds (horizontal alignment agents) described in paragraphs [0253] to [0293] of JP2011-237513A can be used. Further, fluorine (meth)acrylate-based polymers described in paragraphs [0018] to [0043] of JP2007-272185A can also be used. Further, examples of the surfactant include the compounds described in paragraphs [0079] to [0102] of JP2007-069471A, the polymerizable liquid crystal compounds represented by Formula (4) which are described in JP2013-047204A (particularly the compounds described in paragraphs [0020] to [0032]), the polymerizable liquid crystal compounds represented by Formula (4) which are described in JP2012-211306A (particularly the compounds described in paragraphs [0022] to [0029]), the liquid crystal alignment accelerators represented by Formula (4) which are described in JP2002-129162A (particularly the compounds described in paragraphs [0076] to [0078] and paragraphs [0082] to [0084]), and the compounds represented by Formulae (4), (II) and (III) which are described in JP2005-099248A (particularly the compounds described in paragraphs [0092] to [0096]).

One of the preferred embodiments of the surfactant is a polymer interface improver from the viewpoint that the degree of alignment of the polarizer layer is further improved and/or the haze of the polarizer layer can be reduced. The polymer interface improver is an interface improver having a repeating unit in the chemical structure.

From the viewpoint that the degree of alignment of the polarizer layer is further improved and/or the haze of the polarizer layer can be reduced, a copolymer having a repeating unit containing a fluorinated alkyl group (hereinafter, also referred to as a "repeating unit F") and a repeating unit having a ring structure (hereinafter, also referred to as a "repeating unit M") is preferable as the polymer interface improver.

(Repeating Unit F)

It is preferable that the repeating unit F contained in the copolymer is a repeating unit represented by Formula (a).

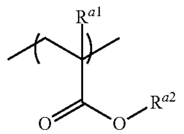

(a)

In Formula (a), $R^{a1}$ represents a hydrogen atom or an alkyl group having 1 to 20 carbon atoms, $R^{a2}$ represents an alkyl group having 1 to 20 carbon atoms or an alkenyl group having 2 to 20 carbon atoms, in which at least one carbon atom has a fluorine atom as a substituent.

In Formula (a), from the viewpoint of further suppressing alignment defects of the polarizer layer to be obtained, $R^{a2}$ represents preferably an alkyl group having 1 to 10 carbon atoms or an alkenylene group having 2 to 10 carbon atoms, in which at least one carbon atom has a fluorine atom as a substituent, more preferably an alkyl group having 1 to 10 carbon atoms, and particularly preferably a group in which more than half of the carbon atoms contained in $R^{a2}$ have a fluorine atom as a substituent.

It is more preferable that the repeating unit F contained in the copolymer is a repeating unit represented by Formula (b).

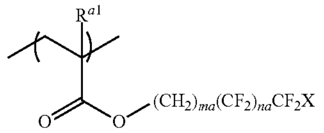

(b)

In Formula (b), $R^{a1}$ represents a hydrogen atom or an alkyl group having 1 to 20 carbon atoms, ma and na each independently represent an integer of 0 or greater, and X represents a hydrogen atom or a fluorine atom.

Here, it is preferable that ma represents preferably an integer of 1 or greater and 10 or less and na represents 4 or greater and 12 or less.

Specific examples of the monomer forming the repeating unit F (hereinafter, also referred to as a "fluoroalkyl group-containing monomer") of the copolymer include 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, 2-(perfluoro-3-methylbutyl)ethyl (meth)acrylate, 2-(perfluoro-5-methylhexyl)ethyl (meth)acrylate, 2-(perfluoro-7-methyloctyl)ethyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H,1H,9H-hexadecafluorononyl (meth)acrylate, 1H-1-(trifluoromethyl) trifluoroethyl (meth)acrylate, 1H,1H,3H-hexafluorobutyl (meth)acrylate, 3-perfluorobutyl-2-hydroxypropyl (meth)acrylate, 3-perfluorohexyl-2-hydroxypropyl (meth)acrylate, 3-perfluorooctyl-2-hydroxypropyl (meth)acrylate, 3-(perfluoro-3-methylbutyl)-2-hydroxypropyl (meth)acrylate, 3-(perfluoro-5-methylhexyl)-2-hydroxypropyl (meth)acrylate, and 3-(perfluoro-7-methyloctyl)-2-hydroxypropyl (meth)acrylate.

From the viewpoints of the reactivity and the surface modification effect, the ratio of copolymerizing the fluoroalkyl group-containing monomer is preferably in a range of 0.01 to 100 mole, more preferably in a range of 0.1 to 50 mole, and particularly preferably in a range of 1 to 30 mole with respect to 1 mole of the monomer used for forming the repeating unit M.

The content of the repeating unit F is preferably in a range of 30% to 80% by mole, more preferably 50% by mole or greater from the viewpoint of the degree of alignment, and preferably 70% by mole or less from the viewpoint of cissing with respect to all the repeating units (100% by mole) contained in the polymer interface improver.

(Repeating Unit M)

The repeating unit M contained in the copolymer may be a unit having a ring structure.

The ring structure is, for example, at least one ring structure selected from the group consisting of an aromatic hydrocarbon group, a heterocyclic group, and an alicyclic group. From the viewpoint of suppressing alignment defects, it is preferable that the repeating unit M has two or more ring structures.

It is more preferable that the repeating unit M contained in the copolymer is a repeating unit represented by Formula (b).

(c)

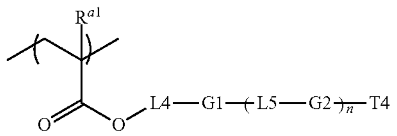

In Formula (c), $R^{a1}$ represents a hydrogen atom or an alkyl group having 1 to 20 carbon atoms, L4 and L5 each independently represent a single bond or an alkylene group having 1 to 8 carbon atoms, G1 and G2 each independently represent a divalent cyclic group, and T4 represents a terminal group. n represents an integer of 0 to 4.

In regard to the alkylene group represented by L4 and L5, one or more $-CH_2$-constituting the alkylene group may be substituted with at least one group selected from the group consisting of a single bond, —O—, —S—, $-NR^{31}-$, —C(═O)—, —C(═S)—, $-CR^{32}=CR^{32}-$, $-SiR^{33}R^{34}-$, —N═N—, $-CR^{35}=N-N=CR^{36}-$, $-CR^{37}=N-$, and $-SO_2-$, and $R^{31}$ to $R^{37}$ each independently represent a hydrogen atom, a halogen atom, a cyano group, a nitro group, or a linear or branched alkyl group having 1 to 10 carbon atoms.

Further, in a case where L represents an alkylene group, the hydrogen atoms contained in one or more $—CH_2—$ constituting the alkylene group may be substituted with at least one group selected from the group consisting of a halogen atom, a cyano group, a nitro group, a hydroxyl group, a linear alkyl group having 1 to 10 carbon atoms, and a branched alkyl group having 1 to 10 carbon atoms.

Among these, it is preferable that L4 represents an alkyleneoxy group having 4 to 6 carbon atoms, in which the terminal is oxygen, and most preferable that L5 represents an ester group.

The divalent cyclic groups represented by G1 and G2 each independently are a divalent alicyclic hydrocarbon group or a divalent aromatic hydrocarbon group having 5 to 8 carbon atoms, and one or more $—CH_2—$ constituting the alicyclic hydrocarbon group may be substituted with —O—, —S—, or —NH—. Further, a plurality of alicyclic hydrocarbon groups or aromatic hydrocarbon groups may be bonded through a single bond. Among these, a benzene ring is preferable.

Examples of the terminal group represented by T4 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—: R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth)acryloyloxy group-containing group. Among these, a hydrogen atom and a cyano group are most preferable.

The content of the repeating unit M is preferably in a range of 5% to 95% by mole and more preferably in a range of 15% to 85% by mole with respect to all the repeating units (100% by mole) of the polymer interface improver.

(Other Repeating Units)

The copolymer may have repeating units other than the repeating unit F and the repeating unit M.

Examples of other repeating units include a repeating unit that does not have a fluorine atom nor a ring structure.

The content of the other repeating units is preferably in a range of 0% to 50% by mole with respect to all the repeating units (100% by mole) contained in the polymer interface improver.

In a case where the composition contains a surfactant, the content of the surfactant is preferably in a range of 0.001% to 5% by mass and more preferably in a range of 0.005% to 3% by mass with respect to 100% by mass of the solid content in the composition from the viewpoint that the degree of alignment of the polarizer layer to be formed is higher and the heat resistance is further improved.

[Polymerization Initiator]

It is preferable that the composition according to the embodiment of the present invention contains a polymerization initiator. The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722,512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), o-acyloxime compounds (paragraph [0065] of JP2016-27384A), and acylphosphine oxide compounds (JP1988-40799B (JP-S63-40799B), JP1993-29234B (JP-H05-29234B), JP1998-95788A (JP-H10-95788A), and JP1998-29997A (JP-H10-29997A)).

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02 (all manufactured by BASF SE).

In a case where the composition contains a polymerization initiator, the content of the polymerization initiator is preferably in a range of 0.01% to 30% by mass and more preferably in a range of 0.1% to 15% by mass with respect to 100% by mass of the solid content in the composition from the viewpoint that the degree of alignment of the polarizer to be formed is higher and the heat resistance is further improved.

PREFERRED EMBODIMENTS

As one of the preferred embodiments of the composition of the present invention, an embodiment satisfying Formulae (11) to (13), (20), and (21) (hereinafter, also referred to as a "first embodiment") is exemplified. In this manner, the effects of the present invention are further exhibited.

The composition according to the first embodiment may further satisfy at least one selected from Formulae (22), (31), and (41). In this manner, the effects of the present invention are further exhibited.

As one of the other preferred embodiments of the composition of the present invention, an embodiment satisfying Formulae (11) to (13), (20), and (41') (hereinafter, also referred to as a "second embodiment") is exemplified. In this manner, the effects of the present invention are further exhibited.

The composition according to the second embodiment may further satisfy at least one selected from Formulae (21), (22), or (31). In this manner, the effects of the present invention are further exhibited.

<Method of Producing Polarizer Layer>

The polarizer layer according to the embodiment of the present invention is formed of the above-described composition according to the embodiment of the present invention.

A method of producing the polarizer layer according to the embodiment of the present invention is not particularly limited, but from the viewpoint of further increasing the degree of alignment of the polarizer to be formed, a method comprising a step of coating an alignment layer with the above-described composition (also referred to as the "polarizer layer-forming composition") according to the embodiment of the present invention to form a coating film (hereinafter, also referred to as a "coating film forming step") and a step of aligning a liquid crystal component contained in the coating film (hereinafter, also referred to as an "aligning step") in this order (hereinafter, also referred to as the "present production method") is preferable.

Further, the following liquid crystal component is a component that also contains a dichroic material having liquid crystallinity in a case where the above-described dichroic material has liquid crystallinity, in addition to the above-described liquid crystal compound (that is, the polymer liquid crystal compound and the low-molecular-weight liquid crystal compound), and also contains the composition (polarizer layer-forming composition) according to the embodiment of the present invention.

Hereinafter, each step will be described.

[Coating Film Forming Step]

The coating film forming step is a step of coating the alignment layer with the above-described composition according to the embodiment of the present invention to form a coating film. The liquid crystal compound in the coating film is horizontally aligned due to an interaction between the alignment layer and an interface improver (in a case where the composition according to the embodiment of the present invention contains an interface improver).

The alignment layer can be easily coated with the composition according to the embodiment of the present invention by using the composition according to the embodiment of the present invention which contains the above-described solvent or using a liquid such as a melt obtained by heating the composition according to the embodiment of the present invention.

Examples of the method of coating the alignment layer with the composition according to the embodiment of the present invention include known methods such as a roll coating method, a gravure printing method, a spin coating method, a wire bar coating method, an extrusion coating method, a direct gravure coating method, a reverse gravure coating method, a die coating method, a spraying method, and an ink jet method.

(Alignment Layer)

The alignment layer may be any film as long as the film allows the liquid crystal compound contained in the composition according to the embodiment of the present invention to be horizontally aligned.

An alignment layer can be provided by means such as a rubbing treatment performed on a film surface of an organic compound (preferably a polymer), oblique vapor deposition of an inorganic compound, formation of a layer having microgrooves, or accumulation of an organic compound (such as w-tricosanoic acid, dioctadecylmethylammonium chloride, or methyl stearylate) according to a Langmuir-Blodgett method (LB film). Further, an alignment layer in which an alignment function is generated by application of an electric field, application of a magnetic field, or irradiation with light is also known. Among these, in the present invention, an alignment layer formed by performing a rubbing treatment is preferable from the viewpoint of easily controlling the pretilt angle of the alignment layer, and a photo-alignment layer formed by irradiation with light is also preferable from the viewpoint of the uniformity of alignment.

(1) Rubbing Treatment Alignment Layer

A polymer material used for the alignment layer formed by performing a rubbing treatment is described in a plurality of documents, and a plurality of commercially available products can be used. In the present invention, polyvinyl alcohol or polyimide and derivatives thereof are preferably used. The alignment layer can refer to the description on page 43, line 24 to page 49, line 8 of WO2001/88574A1.

The thickness of the alignment layer is preferably in a range of 0.01 to 10 μm and more preferably in a range of 0.01 to 2 μm.

(2) Photo-Alignment Layer

A photo-alignment material used for an alignment layer formed by irradiation with light is described in a plurality of documents. In the present invention, preferred examples thereof include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadiimide compounds having a photo-alignment unit described in JP2002-265541A and JP2002-317013A, photocrosslinkable silane derivatives described in JP4205195B and JP4205198B, photocrosslinkable polyimides, polyamides, or esters described in JP2003-520878A, JP2004-529220A, and JP4162850B. Among these, azo compounds, photocrosslinkable polyimides, polyamides, or esters are more preferable.

The photo-alignment layer formed of the above-described material is irradiated with linearly polarized light or non-polarized light to produce a photo-alignment layer.

In the present specification, the "irradiation with linearly polarized light" and the "irradiation with non-polarized light" are operations for causing a photoreaction in the photo-alignment material. The wavelength of the light to be used varies depending on the photo-alignment material to be used and is not particularly limited as long as the wavelength is required for the photoreaction. The peak wavelength of light to be used for irradiation with light is preferably in a range of 200 nm to 700 nm, and ultraviolet light having a peak wavelength of 400 nm or less is more preferable.

Examples of the light source used for irradiation with light include commonly used light sources, for example, lamps such as a tungsten lamp, a halogen lamp, a xenon lamp, a xenon flash lamp, a mercury lamp, a mercury xenon lamp, or a carbon arc lamp, various lasers [such as a semiconductor laser, a helium neon laser, an argon ion laser, a helium cadmium laser, and a yttrium aluminum garnet (YAG) laser], a light emitting diode, and a cathode ray tube.

As means for obtaining linearly polarized light, a method of using a polarizing plate (for example, an iodine polarizing plate, a dichroic material polarizing plate, or a wire grid polarizing plate), a method of using a prism-based element (for example, a Glan-Thompson prism) or a reflective type polarizer for which a Brewster's angle is used, or a method of using light emitted from a laser light source having polarized light can be employed. In addition, only light having a required wavelength may be selectively applied using a filter or a wavelength conversion element.

In a case where light to be applied is linearly polarized light, a method of applying light vertically or obliquely to the upper surface with respect to the alignment layer or the surface of the alignment layer from the rear surface is employed. The incidence angle of light varies depending on the photo-alignment material, but is preferably in a range of 0 to 90° (vertical) and more preferably in a range of 40 to 90°. In a case where light to be applied is non-polarized light, the alignment layer is irradiated with non-polarized light obliquely. The incidence angle is preferably in a range of 10 to 80°, more preferably in a range of 20 to 60°, and still more preferably in a range of 30 to 50°. The irradiation time is preferably in a range of 1 minute to 60 minutes and more preferably in a range of 1 minute to 10 minutes. In a case where patterning is required, a method of performing irradiation with light using a photomask as many times as necessary for pattern preparation or a method of writing a pattern by laser light scanning can be employed.

The photo-alignment layer used in the present invention is not particularly limited, and a known photo-alignment layer can be used. The material for forming the photo-alignment layer is not particularly limited, but a compound containing a photo-aligning group is typically used. The compound may be a polymer having a repeating unit containing a photo-aligning group.

The photo-aligning group is a functional group capable of imparting anisotropy to a film by irradiation with light. More specifically, the photo-aligning group is a group in which a change in molecular structure of the group may occur by irradiation with light (for example, linearly polarized light). Typically, the photo-aligning group is a group in which at least one photoreaction selected from a photoisomerization reaction, a photodimerization reaction, or a photodecomposition reaction may be caused by irradiation with light (for example, linearly polarized light). Among these photo-aligning groups, a group that causes a photoisomerization reaction (a group having a photoisomerization structure) or a group that causes a photodimerization reaction (a group having a photodimerization structure) is preferable, and a group that causes a photoisomerization reaction is more preferable.

The photoisomerization reaction is a reaction that causes stereoisomerization or structural isomerization due to the action of light. Examples of known materials that cause such a photoisomerization reaction include materials having an azobenzene structure (K. Ichimura et al., Mol. Cryst. Liq. Cryst., 298, page 221 (1997)), materials having a hydrazono-β-ketoester structure (S. Yamamura et al., Liquid Crystals, vol. 13, No. 2, page 189 (1993)), materials having a stilbene structure (J. G. Victor and J. M. Torkelson, Macromolecules, 20, page 2241 (1987)), and materials having a spiropirane structure (K. Ichimura et al., Chemistry Letters, page 1063 (1992); K. Ichimura et al., Thin Solid Films, vol. 235, page 101 (1993)).

As the group that causes the photoisomerization reaction, a group that causes the photoisomerization reaction which has a C═C bond or a N═N bond is preferable, and examples of such a group include a group having an azobenzene structure (skeleton), a group having a hydrazono-β-ketoester structure (skeleton), a group having a stilbene structure (skeleton), a group having a cinnamic acid (cinnamoyl) structure (skeleton), and a group having a spiropyran structure (skeleton). Among these groups, a group having a cinnamoyl structure or a group having a coumarin structure is preferable, and a group having a cinnamoyl structure is more preferable.

The photodimerization reaction is a reaction in which a ring structure is typically formed by occurrence of an addition reaction between two groups due to the action of light. Examples of known materials that cause such photodimerization include materials having a cinnamic acid structure (M. Schadt et al., J. Appl. Phys., vol. 31, No. 7, page 2155 (1992)), materials having a coumarin structure (M. Schadt et al., Nature., vol. 381, page 212 (1996)), materials having a chalcone structure (Toshihiro Ogawa et al., Preprints of symposium on liquid crystals, 2AB03 (1997)), and materials having a benzophenone structure (Y. K. Jang et al., SID Int. Symposium Digest, P-53 (1997)).

Examples of the group that causes the photodimerization reaction include a group having a cinnamic acid (cinnamoyl) structure (skeleton), a group having a coumarin structure (skeleton), a group having a chalcone structure (skeleton), a group having a benzophenone structure (skeleton), and a group and a group having an anthracene structure (skeleton). Among these groups, a group having a cinnamoyl structure or a group having a coumarin structure is preferable, and a group having a cinnamoyl structure is more preferable.

Further, it is preferable that the compound having a photo-aligning group further contains a crosslinkable group. As the crosslinkable group, a thermally crosslinkable group that causes a curing reaction due to the action of heat and a photocrosslinkable group that causes a curing reaction due to the action of light are preferable, and the crosslinkable group may be a crosslinkable group that contains both a thermally crosslinkable group and a photocrosslinkable group.

Examples of the crosslinkable group include at least one selected from the group consisting of an epoxy group, an oxetanyl group, a group represented by $—NH—CH_2—O—R$ (R represents a hydrogen atom or an alkyl group having 1 to 20 carbon atoms), a group having an ethylenically unsaturated double bond, and a block isocyanate group. Among these, an epoxy group, an oxetanyl group, or a group having an ethylenically unsaturated double bond is preferable.

Further, a 3-membered cyclic ether group is also referred to as an epoxy group, and a 4-membered cyclic ether group is also referred to as an oxetanyl group.

Specific examples of the group having an ethylenically unsaturated double bond include a vinyl group, an allyl group, a styryl group, and a (meth)acryloyl group. Among these, a (meth)acryloyl group is preferable.

As one of the preferred embodiments of the photo-alignment layer, a photo-alignment layer formed of a photo-alignment layer-forming composition containing a polymer A that has a repeating unit a1 containing a cinnamate group and a low-molecular-weight compound B that has a cinnamate group and has a molecular weight smaller than that of the polymer A is exemplified.

Here, in the present specification, the cinnamate group is a group having a cinnamic acid structure containing cinnamic acid or a derivative thereof as a basic skeleton and is a group represented by Formula (I) or Formula (II).

(I)

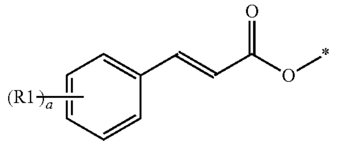

(II)

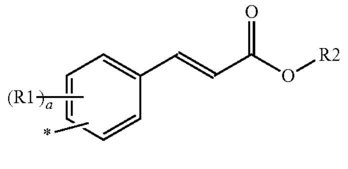

In the formulae, $R^1$ represents a hydrogen atom or a monovalent organic group, and $R^2$ represents a monovalent organic group. Further, a represents an integer of 0 to 5 in Formula (I), and a represents an integer of 0 to 4 in Formula (II). In a case where a represents 2 or greater, a plurality of $R^1$'s may be the same as or different from each other. "*" represents a bonding site.

The polymer A is not particularly limited as long as the polymer has a repeating unit a1 containing a cinnamate group, and a known polymer of the related art can be used.

The weight-average molecular weight of the polymer A is preferably in a range of 1000 to 500000, more preferably in a range of 2000 to 300000, and still more preferably in a range of 3000 to 200000.

Here, the weight-average molecular weight is defined as a value in terms of polystyrene (PS) which is measured by gel permeation chromatography (GPC), and the measurement according to GPC in the present invention can be performed using TSKgel Super HZM-H, HZ4000, and HZ2000 as columns with HLC-8220 GPC (manufactured by Tosoh Corporation).

Examples of the repeating unit a1 containing a cinnamate group contained in the polymer A include repeating units represented by Formulae (A1) to (A4).

(A1)

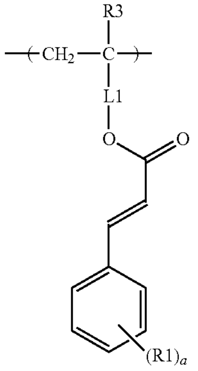

(A2)

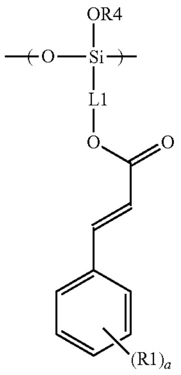

(A3)

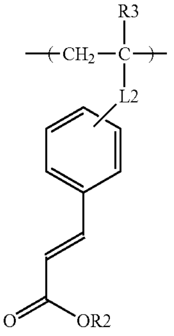

-continued (A4)

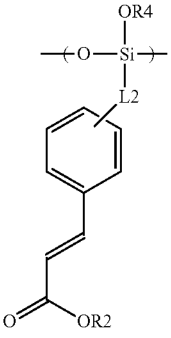

Here, $R^3$ represents a hydrogen atom or a methyl group in Formulae (A1) and (A3), and $R^4$ represents an alkyl group having 1 to 6 carbon atoms in Formulae (A2) and (A4).

In Formulae (A1) and (A2), $L^1$ represents a single bond or a divalent linking group, a represents an integer of 0 to 5, and $R^1$ represents a hydrogen atom or a monovalent organic group.

In Formulae (A3) and (A4), $L^2$ represents a divalent linking group, and $R^2$ represents a monovalent organic group.

Specifically, $L^1$ represents, for example, —CO—O-Ph-, —CO—O-Ph-Ph-, —CO—O—$(CH_2)_n$—, —CO—O—$(CH_2)_n$-Cy-, or —$(CH_2)_n$-Cy-. Here, Ph represents a divalent benzene ring which may have a substituent (for example, a phenylene group), Cy represents a divalent cyclohexane ring which may have a substituent (for example, a cyclohexane-1,4-diyl group), and n represents an integer of 1 to 4.

Specifically, $L^2$ represents, for example, —O—CO— or —O—CO—$(CH_2)_m$—O—. Here, m represents an integer of 1 to 6.

Further, examples of the monovalent organic group as $R^1$ include a chain or cyclic alkyl group having 1 to 20 carbon atoms, an alkoxy group having 1 to 20 carbon atoms, and an aryl group having 6 to 20 carbon atoms which may have a substituent.

Further, examples of the monovalent organic group as $R^2$ include a chain or cyclic alkyl group having 1 to 20 carbon atoms and an aryl group having 6 to 20 carbon atoms which may have a substituent.

Further, it is preferable that a represents 1 and $R^1$ is positioned at the para position.

Further, examples of the substituent that the above-described Ph, Cy, and aryl group may have include an alkyl group, an alkoxy group, a hydroxy group, a carboxy group, and an amino group.

From the viewpoint of further improving the aligning properties of the liquid crystal layer and further improving the adhesiveness of the liquid crystal layer, it is preferable that the polymer A further has a repeating unit a2 containing a crosslinkable group.

The definition and preferred embodiments of the crosslinkable group are as described above.

Among these, as the repeating unit a2 containing a crosslinkable group, a repeating unit that contains an epoxy group, an oxetanyl group, and a group having an ethylenically unsaturated double bond is preferable, and a repeating unit that contains a (meth)acryloyl group is more preferable.

Specific preferred examples of the repeating unit that contains an epoxy group, an oxetanyl group, and a group having an ethylenically unsaturated double bond include the following repeating units. Further, $R^3$ and $R^4$ each have the same definition as that for $R^3$ and $R^4$ in Formula (A1) and (A2).

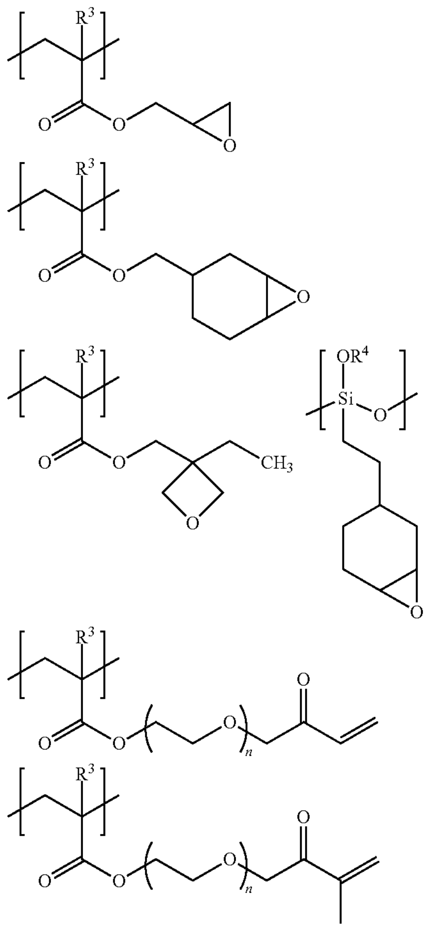

The polymer A may have repeating units other than the repeating unit a1 and the repeating unit a2 described above.

Examples of the monomer forming other repeating units include a (meth)acrylic acid ester compound, a maleimide compound, an acrylamide compound, acrylonitrile, a maleic acid anhydride, a styrene compound, and a vinyl compound.

From the viewpoints of the aligning properties (including the degree of alignment of the polarizer layer) of the liquid crystal component and the adhesiveness, the content of the repeating unit containing a (meth)acryloyl group is preferably in a range of 10 to 50 parts by mass, more preferably in a range of 15 to 45 parts by mass, and particularly preferably in a range of 20 to 40 parts by mass with respect to 100 parts by mass of the polymer A.

In a case where the photo-alignment layer-forming composition contains an organic solvent described below, the content of the polymer A in the photo-alignment layer-forming composition is preferably in a range of 0.1 to 50 parts by mass and more preferably in a range of 0.5 to 30 parts by mass with respect to 100 parts by mass of the solvent.

The low-molecular-weight compound B is a compound containing a cinnamate group and having a molecular weight smaller than that of the polymer A. The aligning properties of the photo-alignment layer to be prepared are further improved by using the low-molecular-weight compound B. From the viewpoint of further improving the aligning properties of the photo-alignment layer, the molecular weight of the low-molecular-weight compound B is preferably in a range of 200 to 500 and more preferably in a range of 200 to 400.

Examples of the low-molecular-weight compound B include a compound represented by Formula (B1).

(B1)

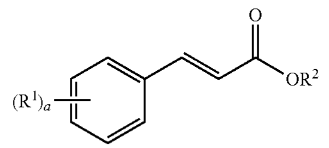

In Formula (B1), a represents an integer of 0 to 5, $R^1$ represents a hydrogen atom or a monovalent organic group, and $R^2$ represents a monovalent organic group. In a case where a represents 2 or greater, a plurality of $R^1$'s may be the same as or different from each other.

Further, examples of the monovalent organic group as $R^1$ include a chain or cyclic alkyl group having 1 to 20 carbon atoms, an alkoxy group having 1 to 20 carbon atoms, and an aryl group having 6 to 20 carbon atoms. Among these, an alkoxy group having 1 to 20 carbon atoms is preferable, an alkoxy group having 1 to 6 carbon atoms is more preferable, and a methoxy group or an ethoxy group is still more preferable.

Further, examples of the monovalent organic group as $R^2$ include a chain or cyclic alkyl group having 1 to 20 carbon atoms and an aryl group having 6 to 20 carbon atoms which may have a substituent. Among these, a chain alkyl group having 1 to 20 carbon atoms is preferable, and a branched alkyl group having 1 to 10 carbon atoms is more preferable.

Further, it is preferable that a represents 1 and $R^1$ is positioned at the para position.

Further, examples of the substituent that the above-described aryl group may have include an alkyl group, an alkoxy group, a hydroxy group, a carboxy group, and an amino group.

The content of the low-molecular-weight compound B in the photo-alignment layer-forming composition is preferably in a range of 10 to 500 parts by mass and more preferably in a range of 30 to 300 parts by mass with respect to the mass of the constitutional unit a1 of the polymer A.

From the viewpoint of further improving the aligning properties, it is preferable that the photo-alignment layer-forming composition contains a crosslinking agent C containing a crosslinkable group, in addition to the polymer A having a constitutional unit a2 containing a crosslinkable group.

The molecular weight of the crosslinking agent C is preferably 1000 or less and more preferably in a range of 100 to 500.

Examples of the crosslinking agent C include a compound containing two or more epoxy groups or oxetanyl groups in a molecule, a block isocyanate compound (a compound containing a protected isocyanate group), and an alkoxymethyl group-containing compound.

Among these, a compound containing two or more epoxy groups or oxetanyl groups in a molecule or a block isocyanate compound is preferable.

In a case where the photo-alignment layer-forming composition contains the above-described crosslinking agent C, the content of the crosslinking agent C is preferably in a range of 1 to 1000 parts by mass and more preferably in a range of 10 to 500 parts by mass with respect to 100 parts by mass of the constitutional unit a1 of the polymer A.

From the viewpoint of the workability for preparing a photo-alignment layer, it is preferable that the photo-alignment layer-forming composition contains a solvent. Examples of the solvent include water and an organic solvent.

The photo-alignment layer-forming composition may contain components other than the above-described components, and examples thereof include a crosslinking catalyst, an adhesion improver, a leveling agent, a surfactant, and a plasticizer.

As one of the preferred embodiments of the alignment layer in the present invention, an alignment layer containing a polymer having a repeating unit that contains a crosslinkable group (hereinafter, referred to as a polymer X).

The crosslinkable group is a polymerizable group represented by any of Formulae (PG-1) to (PG-9).

(PG-1)

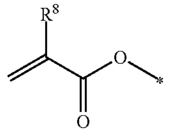

(PG-2)

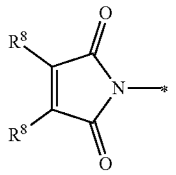

(PG-3)

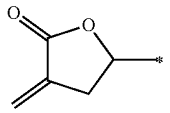

(PG-4)

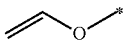

(PG-5)

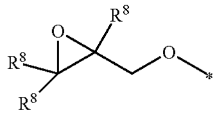

(PG-6)

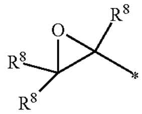

(PG-7)

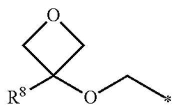

(PG-8)

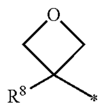

-continued (PG-9)

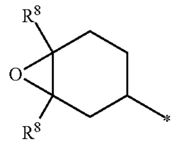

From the viewpoint that the degree of alignment of the polarizer layer is more excellent and/or alignment defects of the polarizer layer can be suppressed, it is preferable that the polymer X further has a repeating unit having a partial structure represented by Formula (PA). Here, the partial structure represented by Formula (PA) is a photo-aligning group.

(PA)

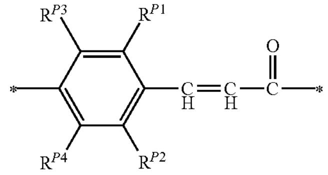

In Formula (PA), two symbols "*" represent a bonding position, $R^{P1}$ to $R^{P4}$ each independently represent a hydrogen atom or a substituent, and two adjacent groups may be bonded to each other to form a ring.

It is preferable that the photo-aligning group represented by Formula (PA) is a photo-aligning group represented by Formula (PA2).

(PA2)

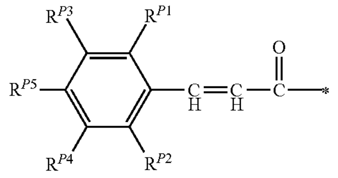

In Formula (PA2), "*" represents a bonding position with respect to $L^1$, $R^{P1}$ to $R^{P5}$ each independently represent a hydrogen atom or a substituent, and two adjacent groups may be bonded to each other to form a ring.

Here, from the viewpoint that the photo-aligning group easily interacts with the liquid crystal compound and the liquid crystal aligning properties of adjacent liquid crystal layers are more satisfactory, the substituents represented by $R^{P1}$ to $R^{P5}$ are each independently a halogen atom, a linear, branched, or cyclic alkyl group having 1 to 20 carbon atoms, a linear halogenated alkyl group having 1 to 20 carbon atoms, an alkoxy group having 1 to 20 carbon atoms, an aryl group having 6 to 20 carbon atoms, an aryloxy group having 6 to 20 carbon atoms, a cyano group, an amino group, and a group represented by Formula (a3).

(a3)

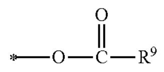

Here, in Formula (a3), * represents a bonding position with respect to the benzene ring in Formula (a2), and $R^9$ represents a monovalent organic group.

Examples of the monovalent organic group represented by $R^9$ in Formula (a3) include a linear or cyclic alkyl group having 1 to 20 carbon atoms.

As the linear alkyl group, an alkyl group having 1 to 6 carbon atoms is preferable, and specific examples thereof include a methyl group, an ethyl group, and an n-propyl group. Among these, a methyl group or an ethyl group is preferable.

As the cyclic alkyl group, an alkyl group having 3 to 6 carbon atoms is preferable, and specific examples thereof include a cyclopropyl group, a cyclopentyl group, and a cyclohexyl group. Among these, a cyclohexyl group is preferable.

As the monovalent organic group represented by $R^9$ in Formula (a3), a combination of a plurality of the linear alkyl groups and a plurality of the cyclic alkyl groups described above directly or via a single bond may be used.

In the present invention, it is preferable that at least one (particularly $R^{P5}$) of $R^{P1}$ to $R^{P4}$ in Formula (PA) or $R^{P1}$ to $R^{P5}$ in Formula (PA2) is the above-described substituent from the viewpoint that the photo-aligning group easily interacts with the liquid crystal compound and the liquid crystal aligning properties of adjacent polarizer layers are more satisfactory and more preferable that at least one thereof is an electron-donating substituent from the viewpoint that the linearity of the polymer X to be obtained is improved and the reaction efficiency in a case of irradiation with polarized light is improved.

Here, the electron-donating substituent (electron-donating group) is a substituent having a Hammett's value (Hammett's substituent constant σp value) of 0 or less, and among the above-described substituents, an alkyl group, a halogenated alkyl group, and an alkoxy group are exemplified.

Among these, an alkoxy group is preferable, and from the viewpoint that the liquid crystal aligning properties of adjacent polarizer layers are more satisfactory, an alkoxy group having 6 to 16 carbon atoms is more preferable, and an alkoxy group having 7 to 10 carbon atoms is still more preferable.

In the polymer X, it is preferable that the repeating unit having a partial structure represented by Formula (PA) is a repeating unit represented by Formula (A).

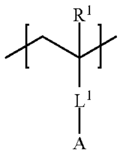

(A)

In Formula (A), $R^1$ represents a hydrogen atom or a substituent, $L^1$ represents a divalent linking group, and A represents a photo-aligning group represented by Formula (PA).

Next, the hydrogen atom or the substituent represented by $R^1$ in Formula (A) will be described.

In Formula (A), as the substituent represented by $R^1$, a halogen atom, a linear, branched, or cyclic alkyl group having 1 to 20 carbon atoms, a linear halogenated alkyl group having 1 to 20 carbon atoms, an alkoxy group having 1 to 20 carbon atoms, an aryl group having 6 to 20 carbon atoms, an aryloxy group having 6 to 20 carbon atoms, a cyano group, or an amino group is preferable.

Examples of the halogen atom include a fluorine atom, a chlorine atom, a bromine atom, and an iodine atom. Among these, a fluorine atom and a chlorine atom are preferable.

In regard to the linear, branched, or cyclic alkyl group having 1 to 20 carbon atoms, an alkyl group having 1 to 6 carbon atoms is preferable as the linear alkyl group, and specific examples thereof include a methyl group, an ethyl group, and an n-propyl group.

An alkyl group having 3 to 6 carbon atoms is preferable as the branched alkyl group, and specific examples thereof include an isopropyl group and a tert-butyl group.

An alkyl group having 3 to 6 carbon atoms is preferable as the cyclic alkyl group, and specific examples thereof include a cyclopropyl group, a cyclopentyl group, and a cyclohexyl group.

As the linear halogenated alkyl group having 1 to 20 carbon atoms, a fluoroalkyl group having 1 to 4 carbon atoms is preferable, and specific examples thereof include a trifluoromethyl group, a perfluoroethyl group, a perfluoropropyl group, and a perfluorobutyl group. Among these, a trifluoromethyl group is preferable.

As the alkoxy group having 1 to 20 carbon atoms, an alkoxy group having 1 to 18 carbon atoms is preferable, an alkoxy group having 6 to 18 carbon atoms is more preferable, and an alkoxy group having 6 to 14 carbon atoms is still more preferable. Specific suitable examples thereof include a methoxy group, an ethoxy group, an n-butoxy group, a methoxyethoxy group, an n-hexyloxy group, an n-octyloxy group, an n-decyloxy group, an n-dodecyloxy group, and an n-tetradecyloxy group. Among these, an n-hexyloxy group, an n-octyloxy group, an n-decyloxy group, an n-dodecyloxy group, and an n-tetradecyloxy group are more preferable.

An aryl group having 6 to 20 carbon atoms is preferable as the aryl group having 6 to 12 carbon atoms, and specific examples thereof include a phenyl group, an α-methylphenyl group, and a naphthyl group. Among these, a phenyl group is preferable.

An aryloxy group having 6 to 12 carbon atoms is preferable as the aryloxy group having 6 to 20 carbon atoms, and specific examples thereof include a phenyloxy group and a 2-naphthyloxy group. Among these, a phenyloxy group is preferable.

Examples of the amino group include a primary amino group (—$NH_2$), a secondary amino group such as a methylamino group, and a tertiary amino group such as a dimethylamino group, a diethylamino group, a dibenzylamino group, or a group having a nitrogen atom of a nitrogen-containing heterocyclic compound (for example, pyrrolidine, piperidine, or piperazine) as a bonding site.

Next, the divalent linking group represented by $L^1$ in Formula (A) will be described.

From the viewpoint that the photo-aligning group easily interacts with the liquid crystal compound and the liquid crystal aligning properties of adjacent polarizer layers are more satisfactory, as the divalent linking group, a divalent linking group obtained by combining at least two or more groups selected from the group consisting of a linear, branched, or cyclic alkylene group having 1 to 18 carbon atoms which may have a substituent, an arylene group having 6 to 12 carbon atoms which may have a substituent, an ether group (—O—), a carbonyl group (—C(═O)—), and an imino group (—NH—) is preferable.

Here, examples of the substituent that the alkylene group, the arylene group, and the imino group may have include a halogen atom, an alkyl group, an alkoxy group, an aryl group, an aryloxy group, a cyano group, a carboxy group, an alkoxycarbonyl group, and a hydroxyl group.

Examples of the halogen atom include a fluorine atom, a chlorine atom, a bromine atom, and an iodine atom. Among these, a fluorine atom and a chlorine atom are preferable.

As the alkyl group, for example, a linear, branched, or cyclic alkyl group having 1 to 18 carbon atoms is preferable, an alkyl group having 1 to 8 carbon atoms (such as a methyl group, an ethyl group, a propyl group, an isopropyl group, an n-butyl group, an isobutyl group, a sec-butyl group, a t-butyl group, or a cyclohexyl group) is more preferable, an alkyl group having 1 to 4 carbon atoms is still more preferable, and a methyl group or an ethyl group is particularly preferable.

As the alkoxy group, for example, an alkoxy group having 1 to 18 carbon atoms is preferable, an alkoxy group having 1 to 8 carbon atoms (such as a methoxy group, an ethoxy group, an n-butoxy group, or a methoxyethoxy group) is more preferable, an alkoxy group having 1 to 4 carbon atoms is still more preferable, and a method group or an ethoxy group is particularly preferable.

Examples of the aryl group include an aryl group having 6 to 12 carbon atoms, and specific examples thereof include a phenyl group, an α-methylphenyl group, and a naphthyl group. Among these, a phenyl group is preferable.

Examples of the aryloxy group include phenoxy, naphthoxy, imidazolyloxy, benzimidazolyloxy, pyridin-4-yloxy, pyrimidinyloxy, quinazolinyloxy, prinyloxy, and thiophene-3-yloxy.

Examples of the alkoxycarbonyl group include methoxycarbonyl and ethoxycarbonyl.

In regard to the linear, branched, or cyclic alkylene group having 1 to 18 carbon atoms, specific examples of the linear alkylene group includes a methylene group, an ethylene group, a propylene group, a butylene group, a pentylene group, a hexylene group, a decylene group, an undecylene group, a dodecylene group, a tridecylene group, a tetradecylene group, a pentadecylene group, a hexadecylene group, a heptadecylene group, and an octadecylene group.

Further, specific examples of the branched alkylene group include a dimethylmethylene group, a methylethylene group, a 2,2-dimethylpropylene group, and a 2-ethyl-2-methylpropylene group.

Further, specific examples of the cyclic alkylene group include a cyclopropylene group, a cyclobutylene group, a cyclopentylene group, a cyclohexylene group, a cyclooctylene group, a cyclodecylene group, an adamantane-diyl group, a norbornane-diyl group, and an exo-tetrahydrodicyclopentadiene-diyl group. Among these, a cyclohexylene group is preferable.

Specific examples of the arylene group having 6 to 12 carbon atoms include a phenylene group, a xylylene group, a biphenylene group, a naphthylene group, and a 2,2'-methylenebisphenyl group. Among these, a phenylene group is preferable.

Specific examples of the repeating unit A represented by Formula (A) include the following repeating units A-1 to A-160. In the following formulae, Me represents a methyl group.

A-1

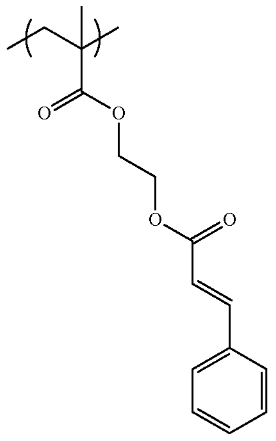

A-2

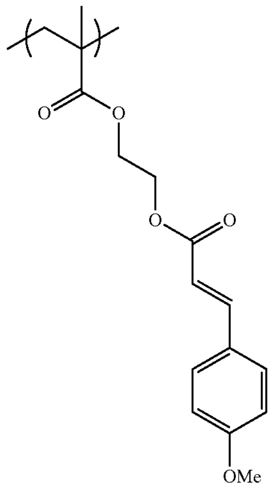

A-3

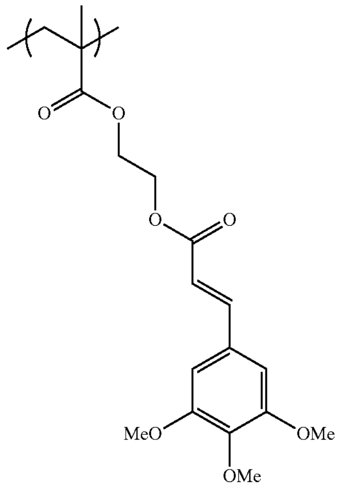

-continued
A-4
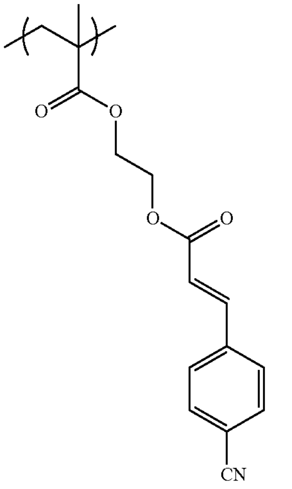
A-5
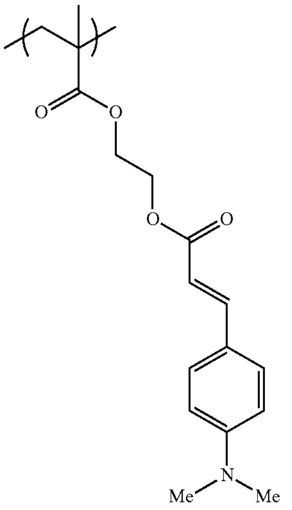
A-6
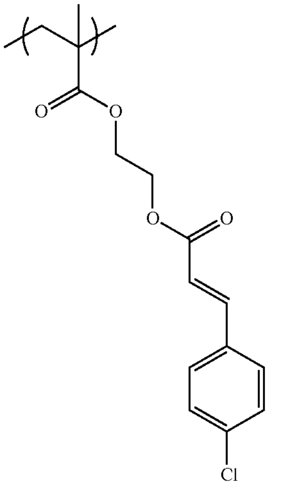
-continued
A-7
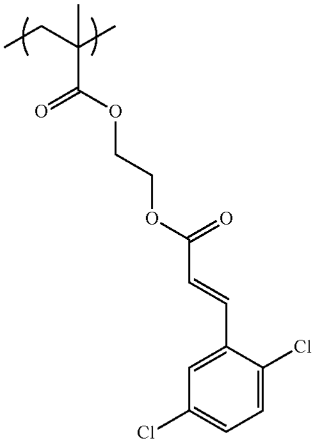
A-8
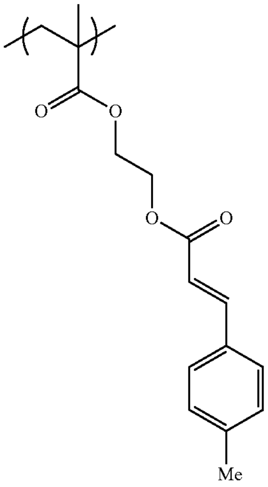
A-9
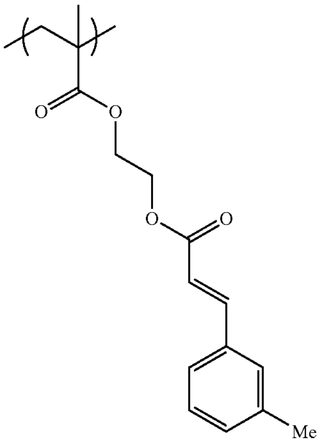

-continued
A-10
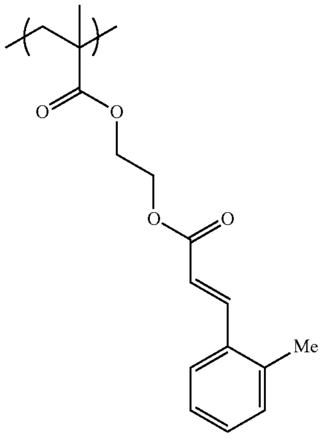
A-11
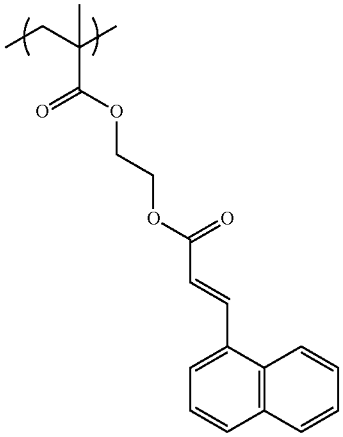
A-12
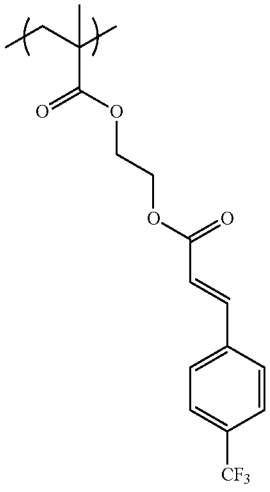
-continued
A-13
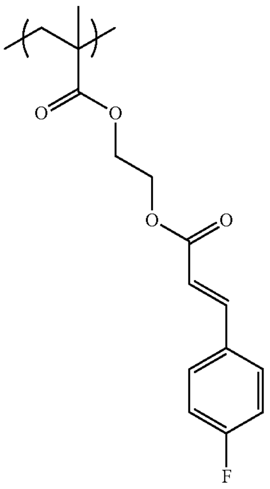
A-14
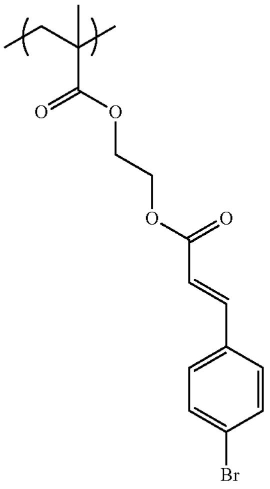
A-15
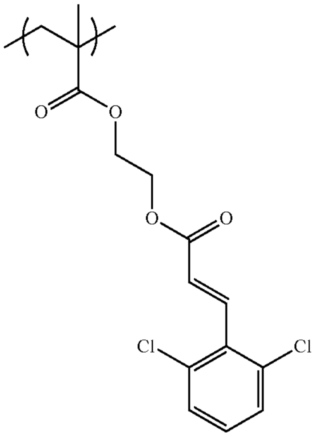

-continued
A-16
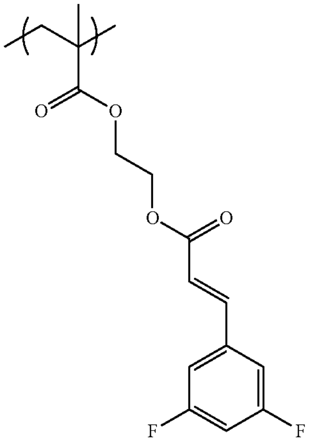
A-17
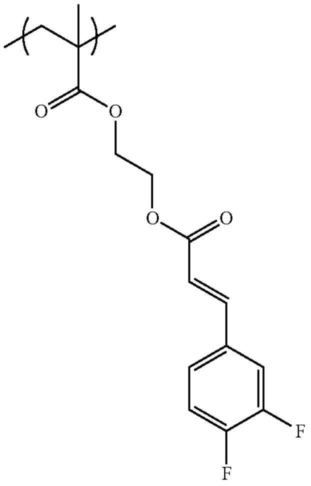
A-18
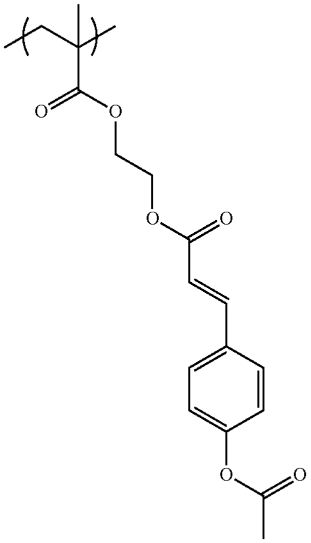
-continued
A-19
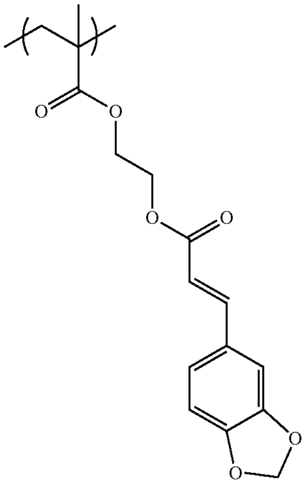
A-20
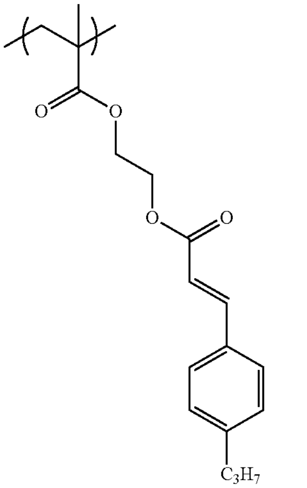
A-21
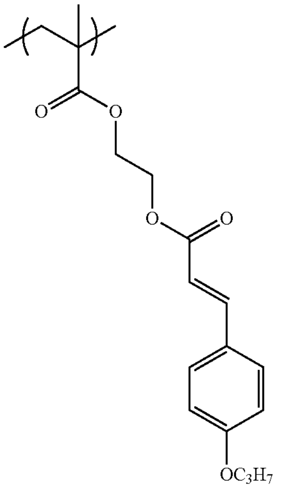

-continued
A-22
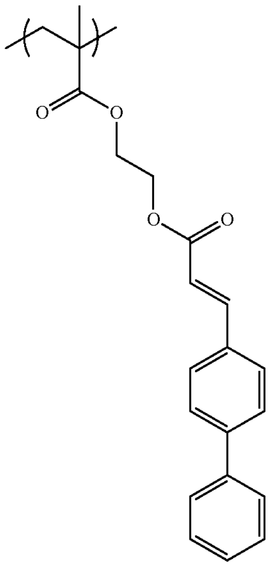
A-23
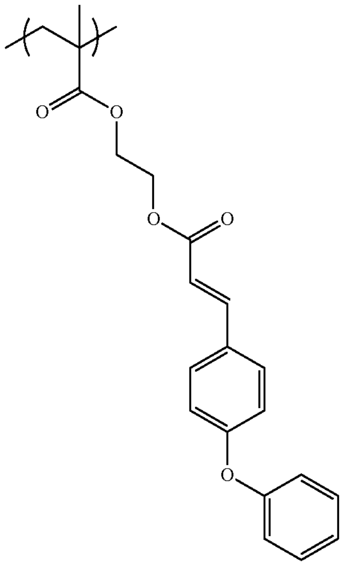
-continued
A-24
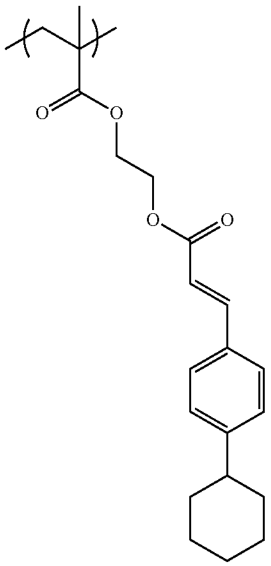
A-25
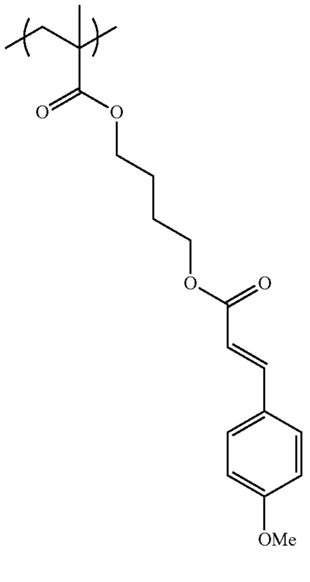

-continued
A-26
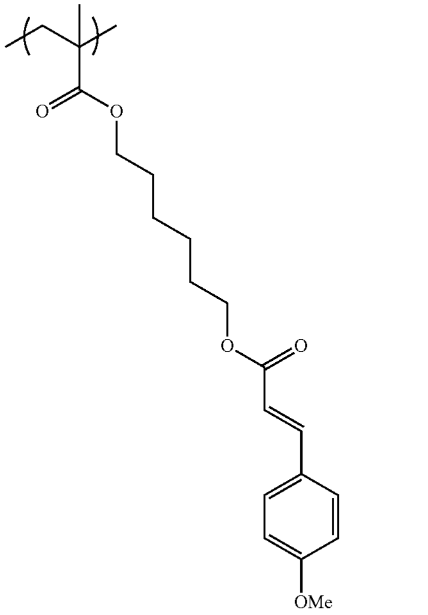
A-27
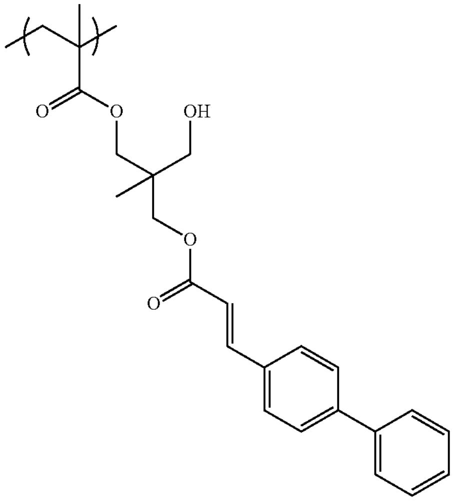
A-28
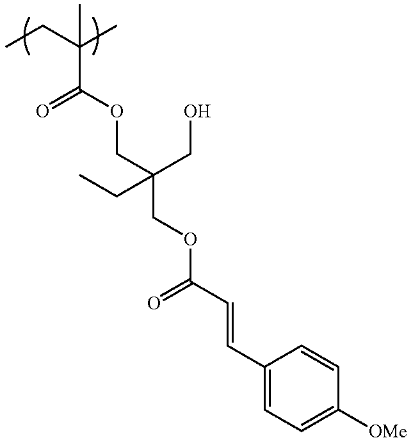
-continued
A-29
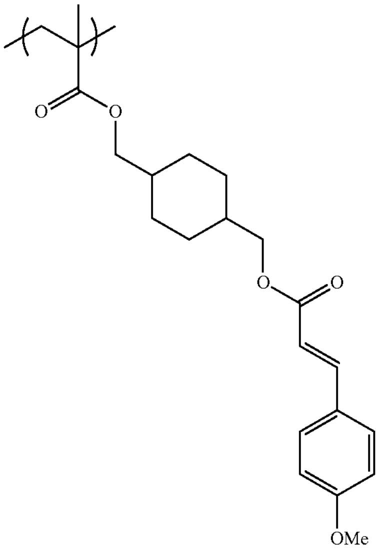
A-30
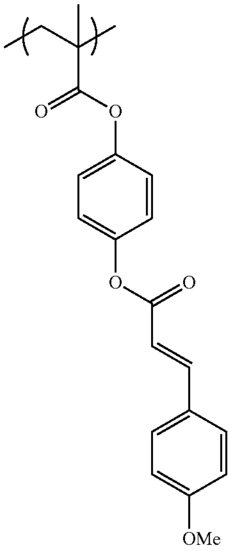
A-31
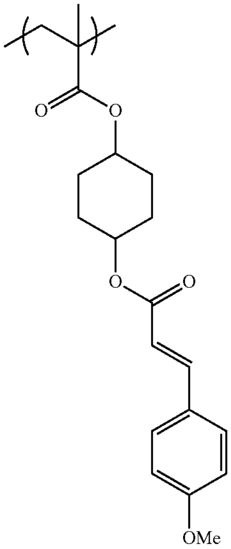

-continued
A-32
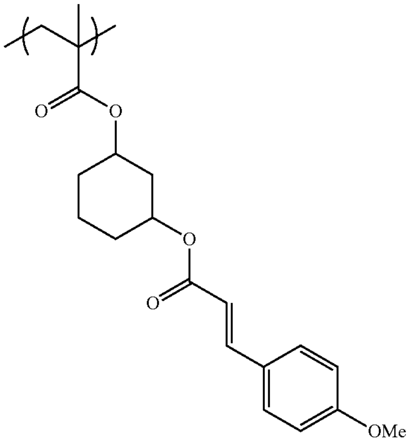
A-33
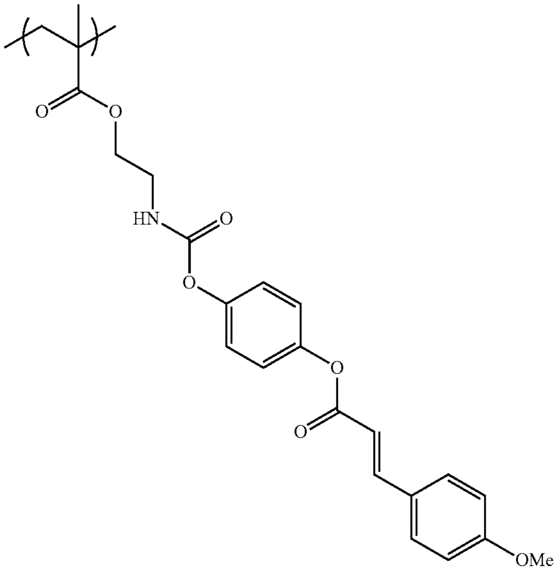
A-34
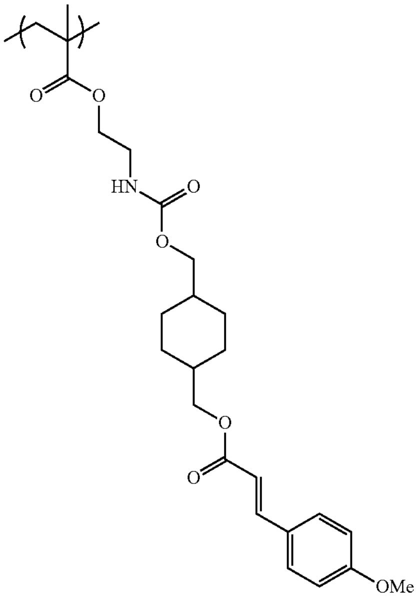
-continued
A-35
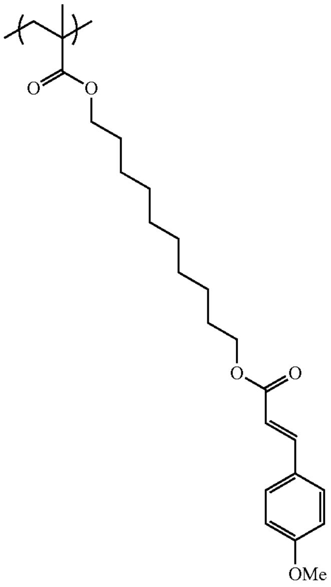
A-36
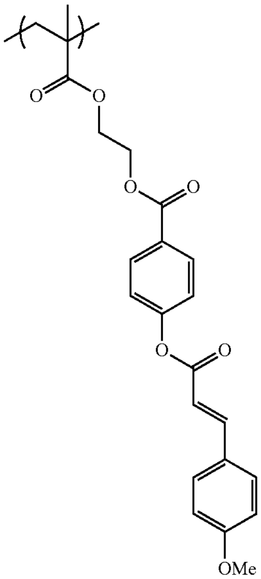

-continued
A-37
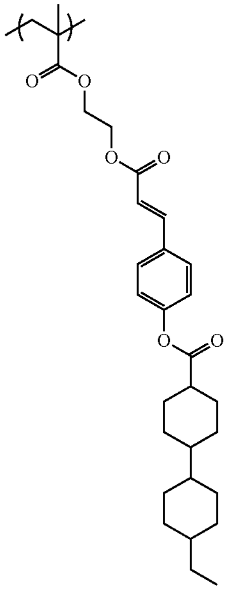
A-39
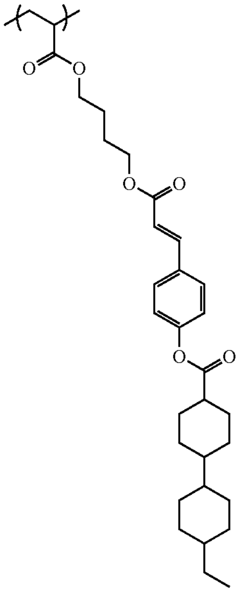
A-38
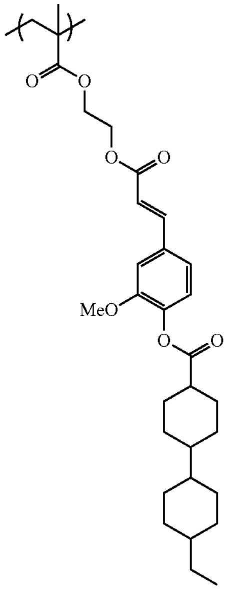
A-40
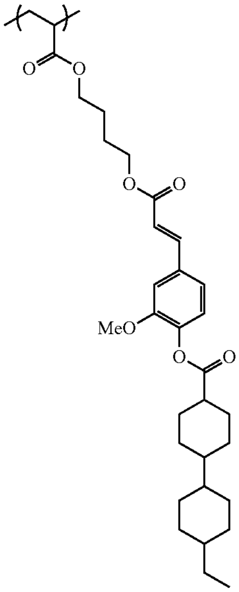

-continued
A-41
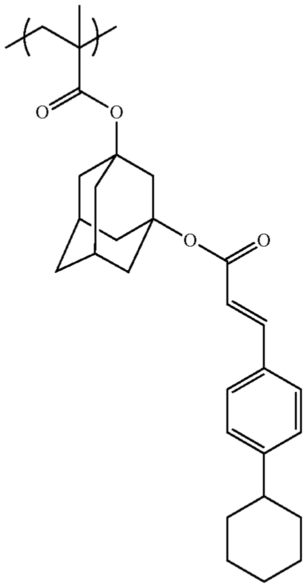
A-42
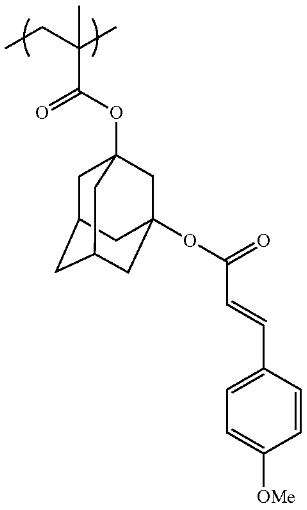
-continued
A-43
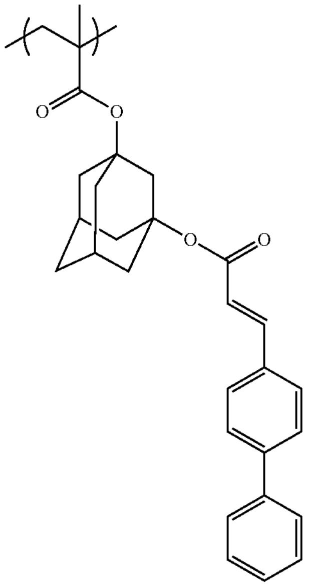
A-44
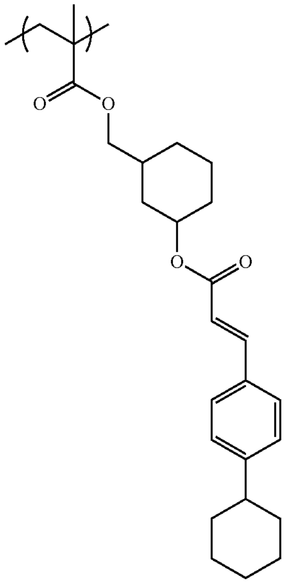

-continued
A-45
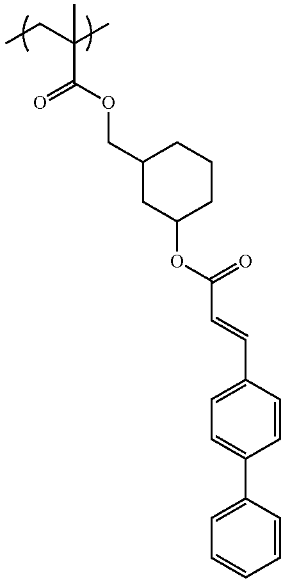
A-46
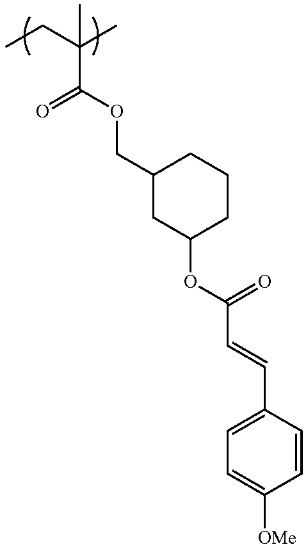
-continued
A-47
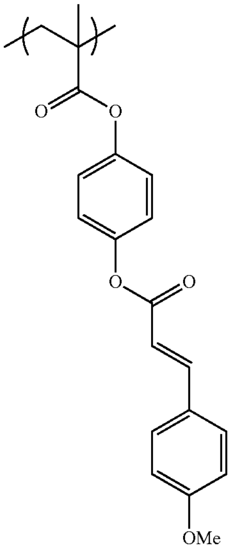
A-48
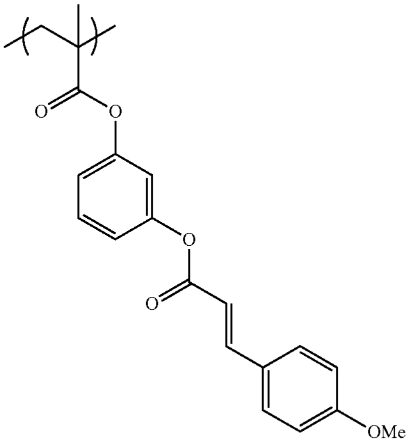
A-49
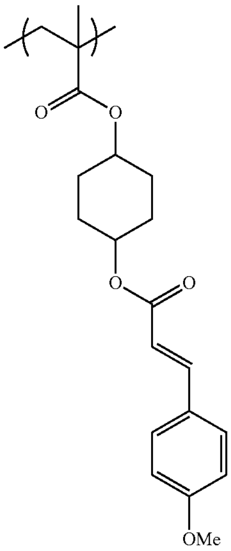

-continued
A-50
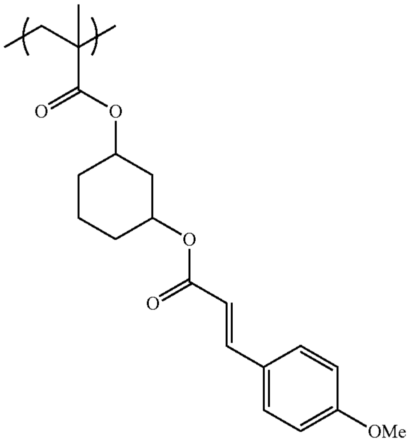
A-51
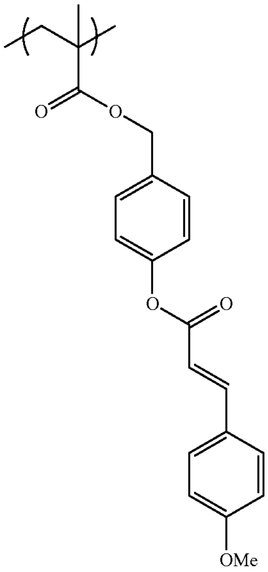
A-52
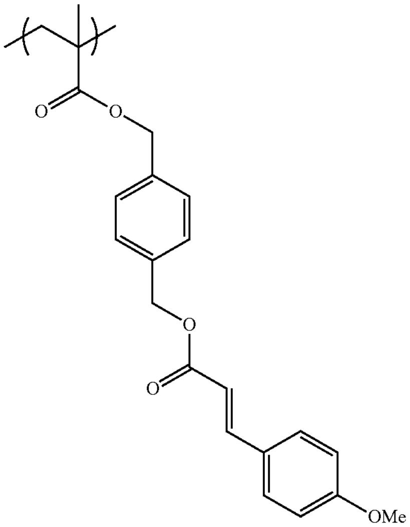
-continued
A-53
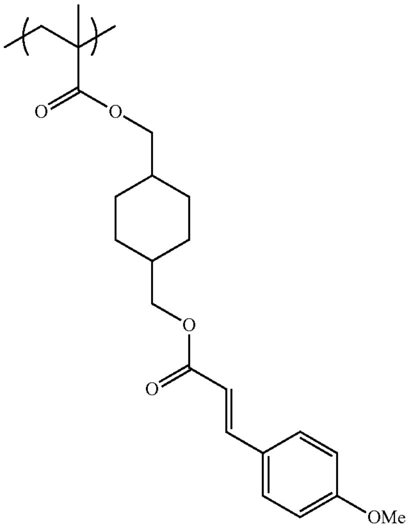
A-54
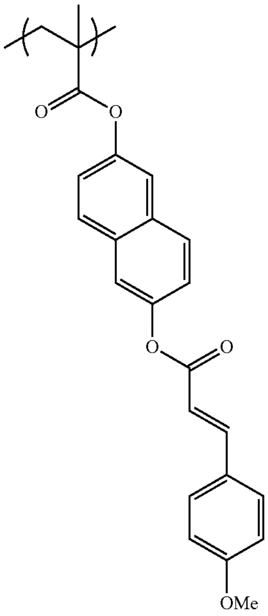
A-55
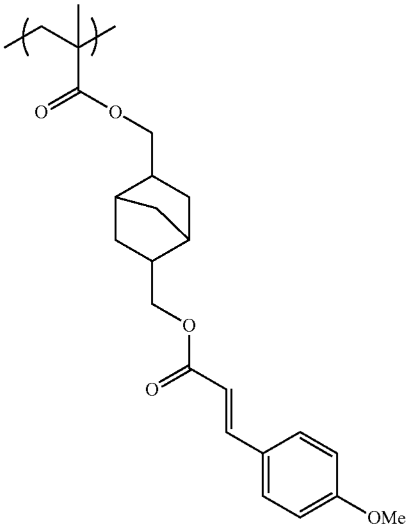

-continued
A-56
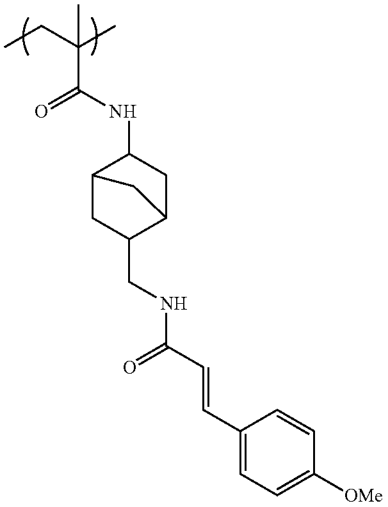
A-57
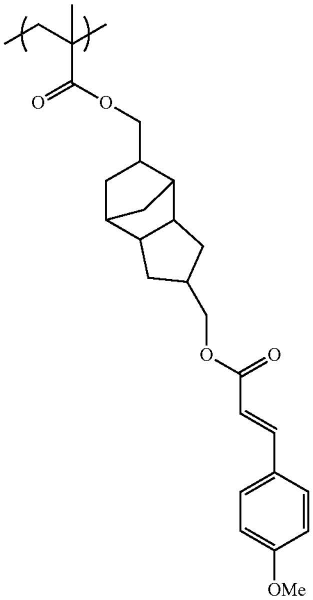
-continued
A-58
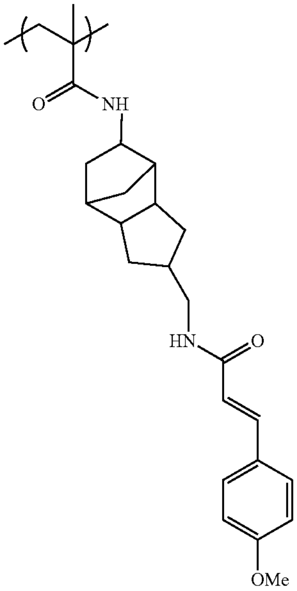
A-59
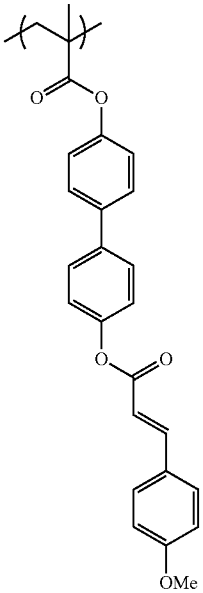

-continued
A-60
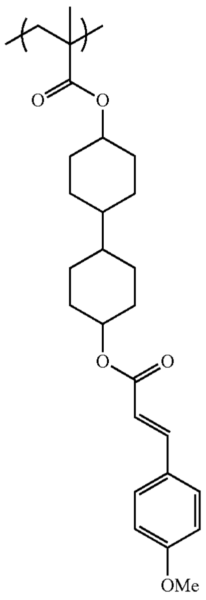
A-61
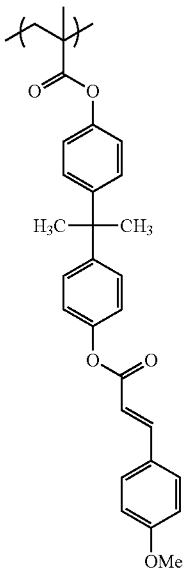
-continued
A-62
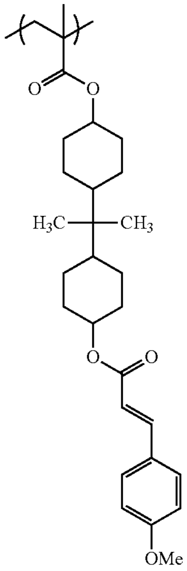
A-63
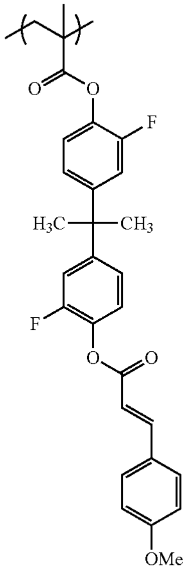

-continued
A-64
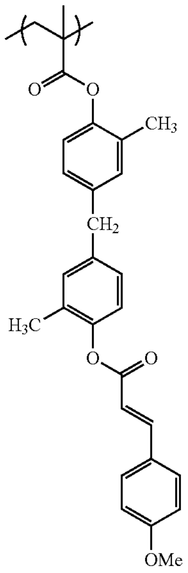
A-65
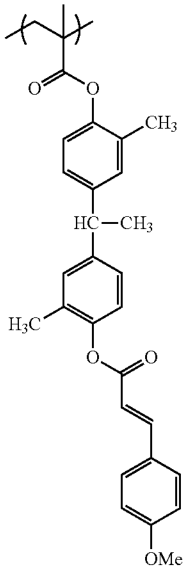
-continued
A-66
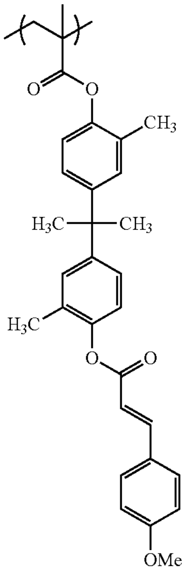
A-67
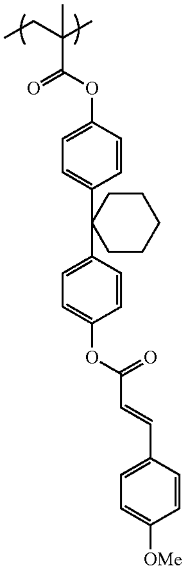

-continued
A-68
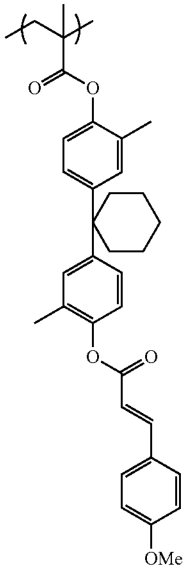
A-69
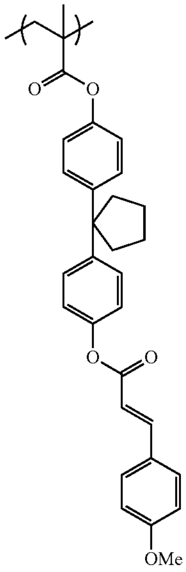
A-70
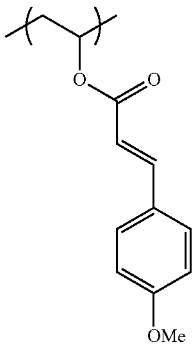
-continued
A-71
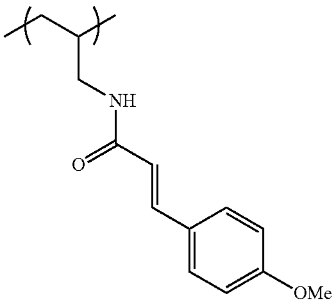
A-72
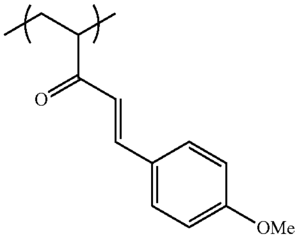
A-73
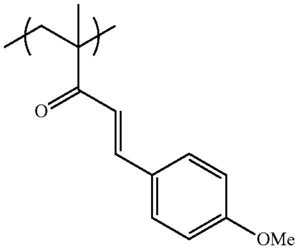
A-74
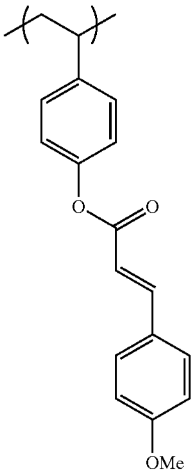

A-75
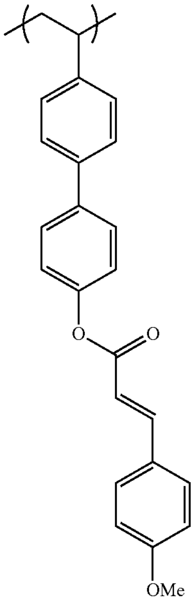
A-76
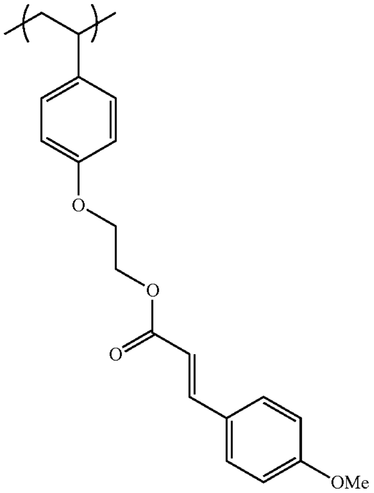
A-77
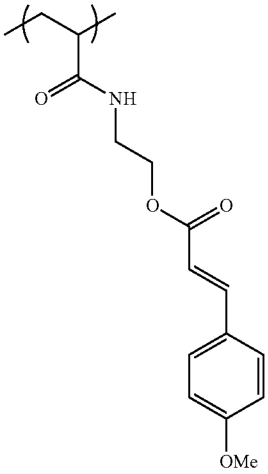
A-78
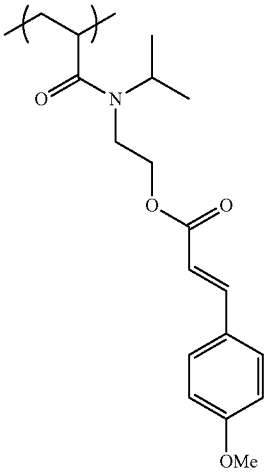
A-79
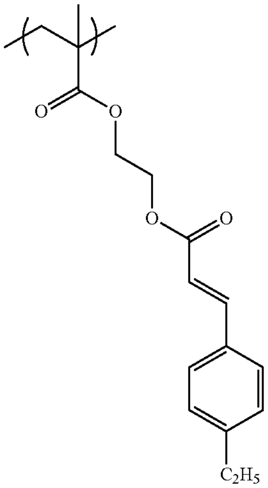
A-80
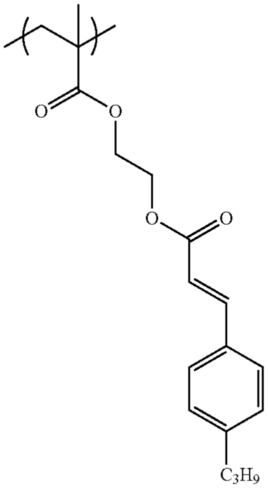

-continued
A-81
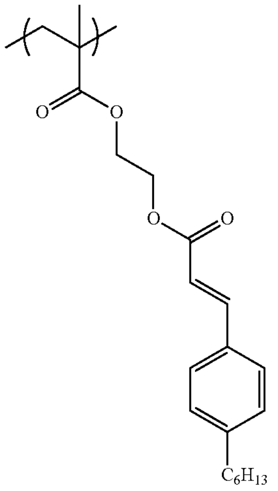
A-82
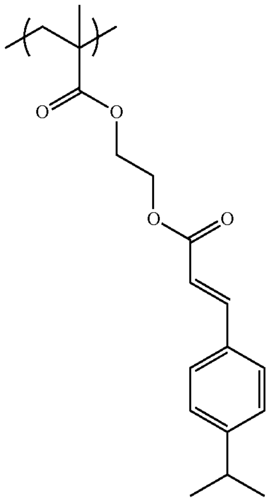
A-83
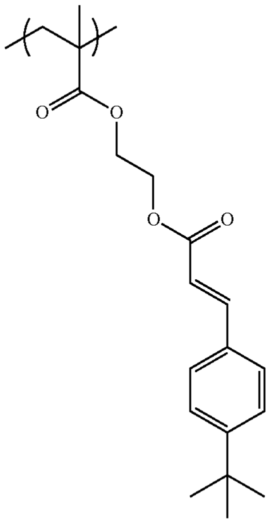
-continued
A-84
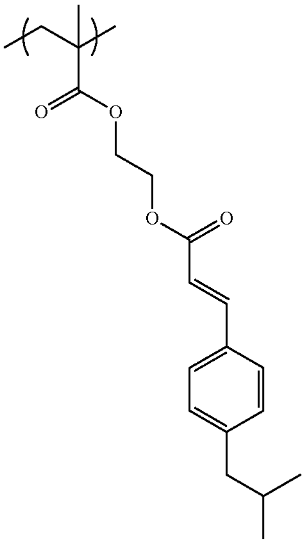
A-85
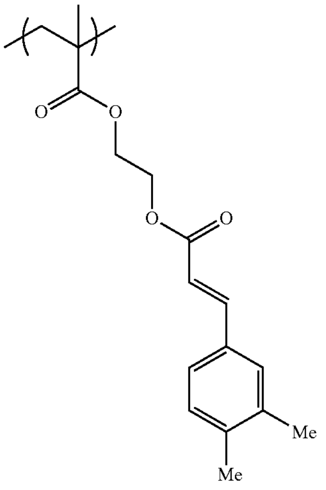
A-86
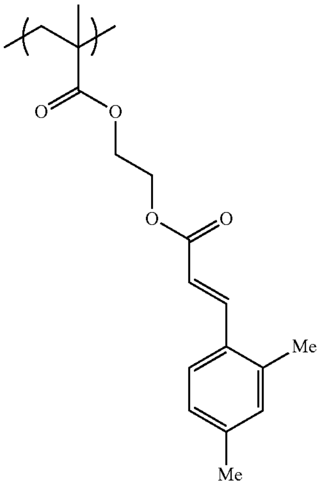

-continued
A-87
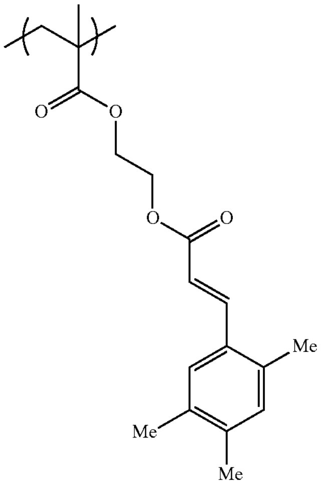
A-88
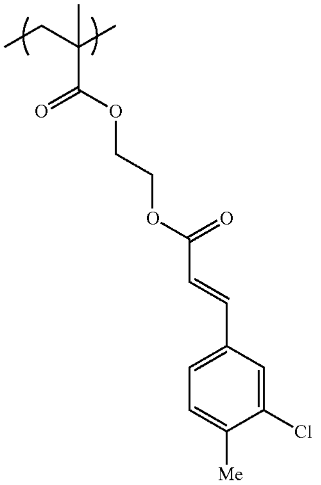
A-89
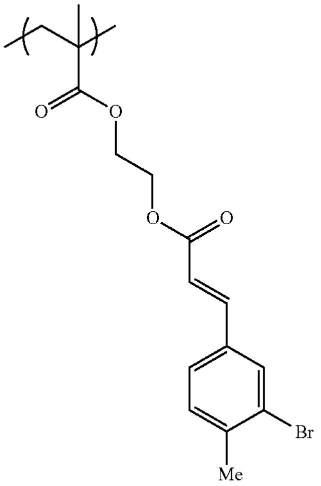
-continued
A-90
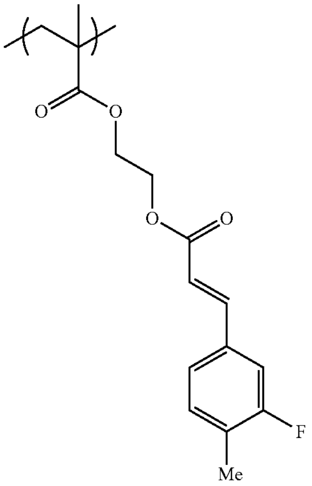
A-91
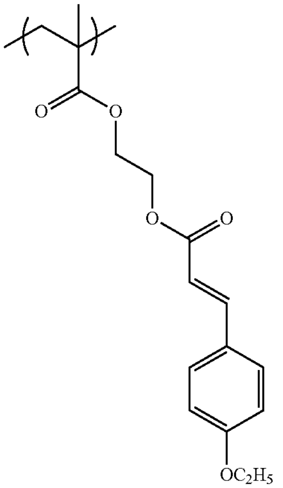
A-92
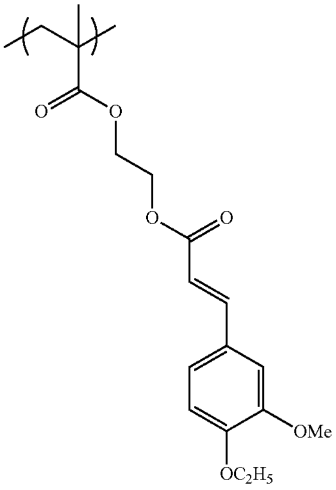

-continued
A-93
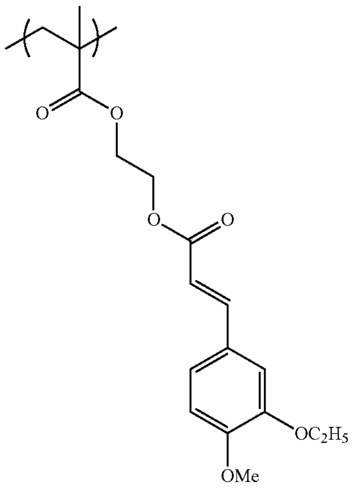
A-94
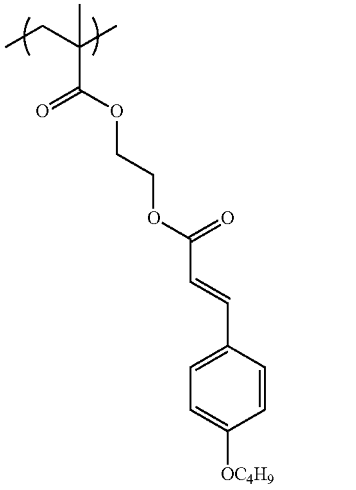
A-95
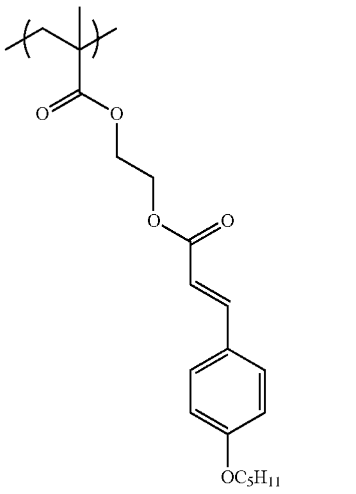
-continued
A-96
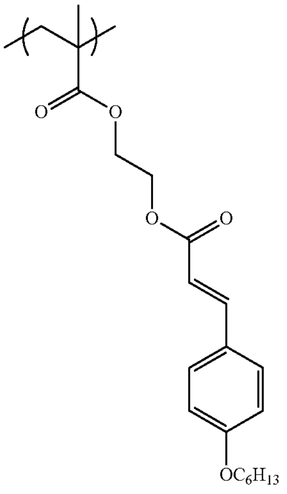
A-97
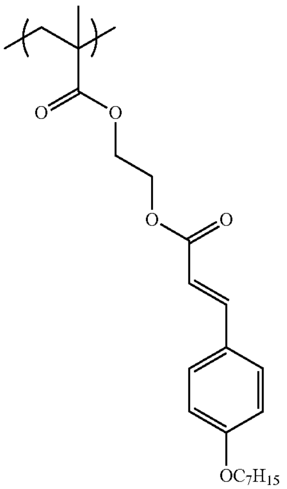
A-98
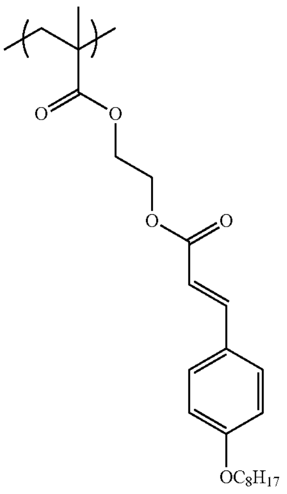

A-99
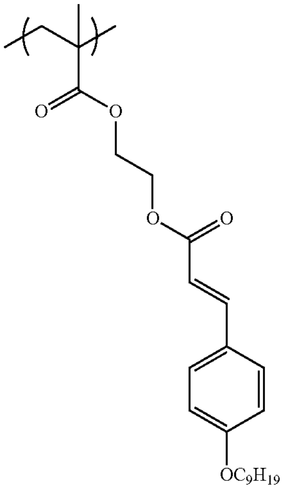
OC9H19
A-100
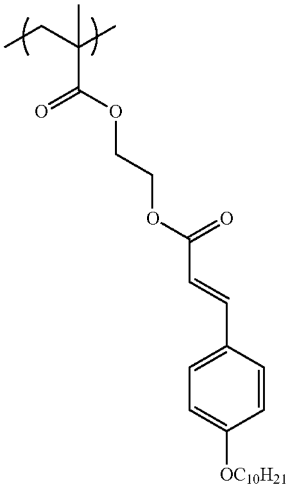
OC10H21
A-101
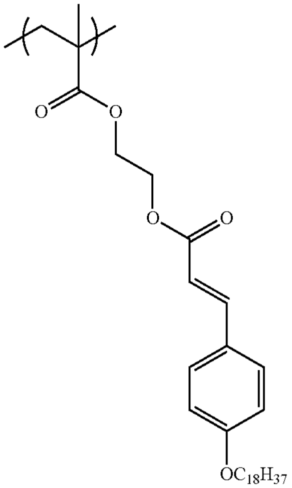
OC18H37
A-102
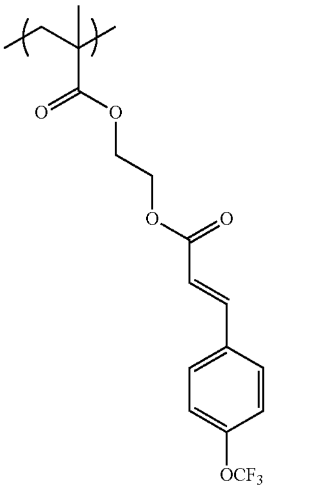
OCF3
A-103
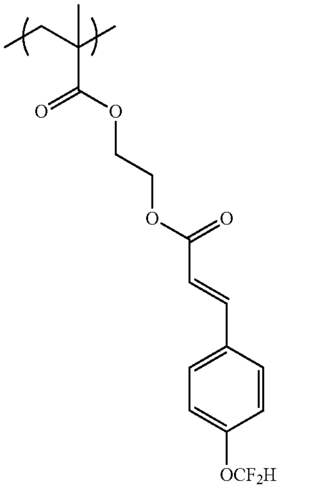
OCF2H
A-104
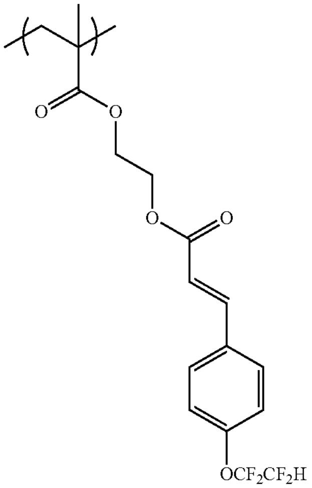
OCF2CF2H A-105
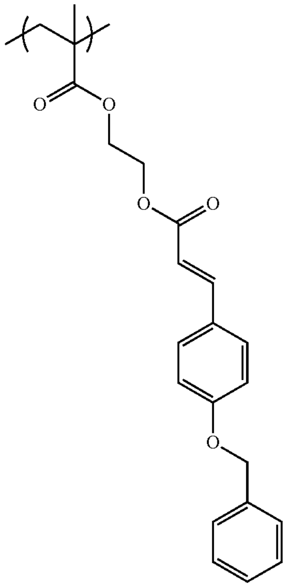
A-106
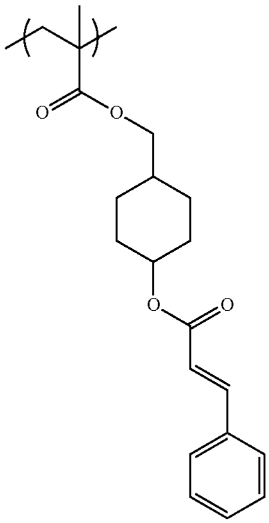
A-107
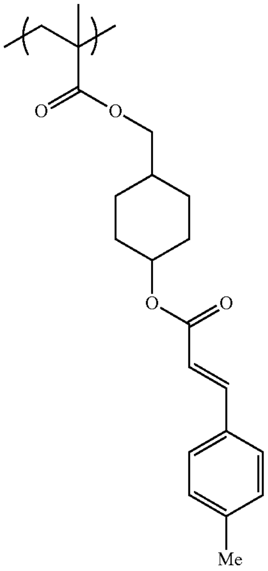
A-108
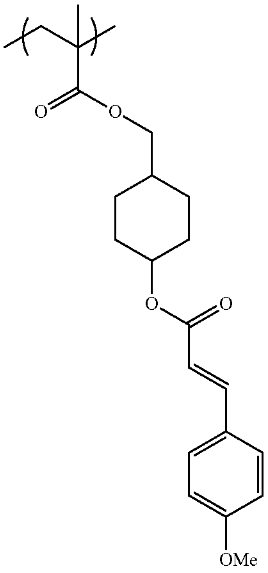

A-109
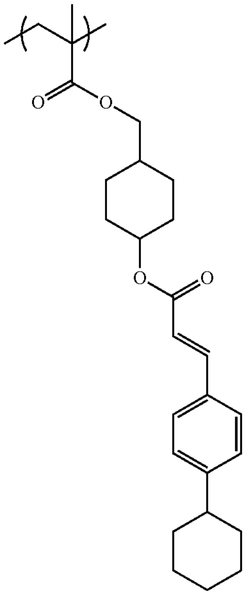
A-110
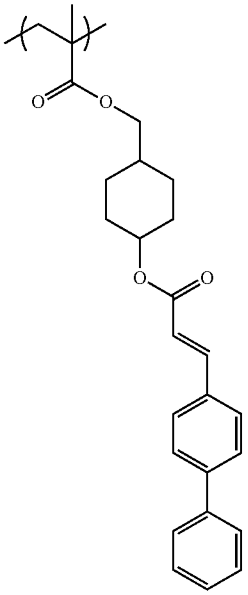
A-111
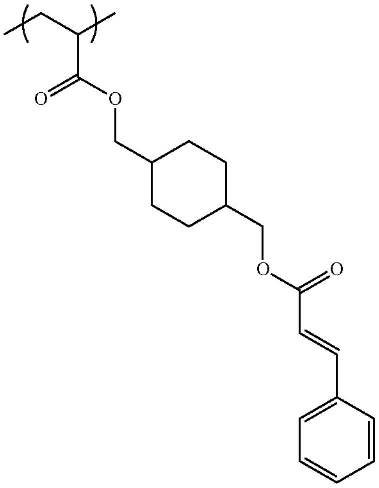
A-112
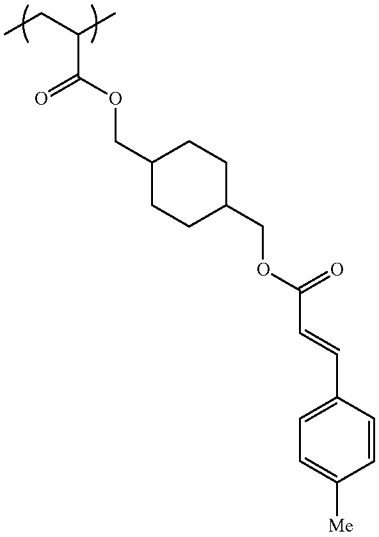
A-113
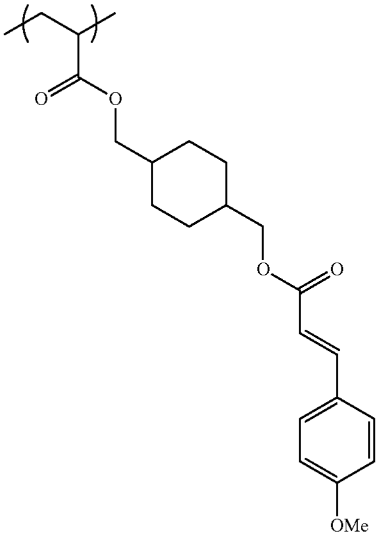

-continued
A-114
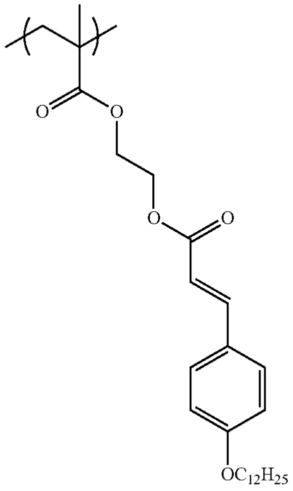
A-115
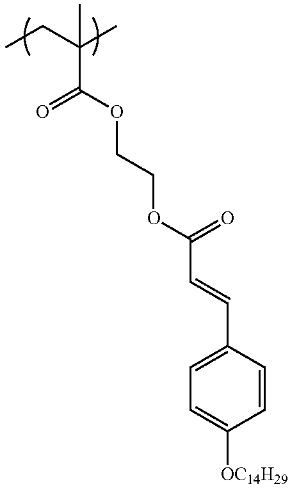
A-116
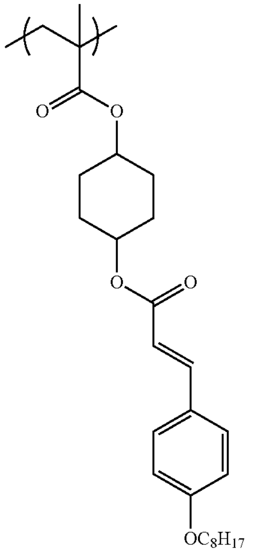
-continued
A-117
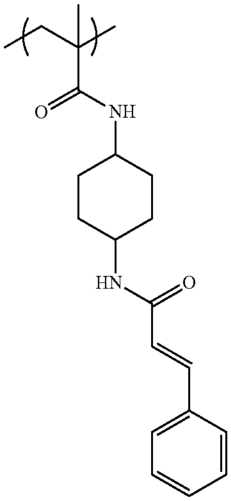
A-118
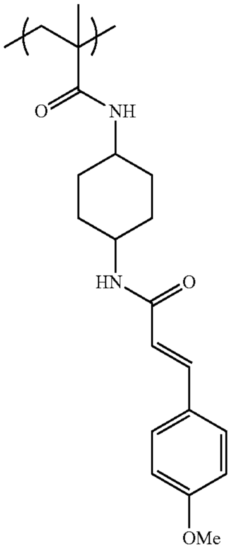
A-119
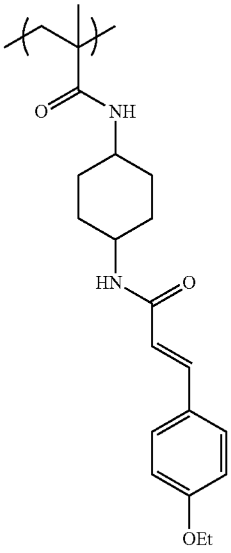

-continued
A-120
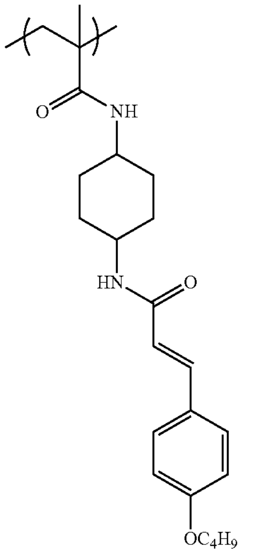
A-121
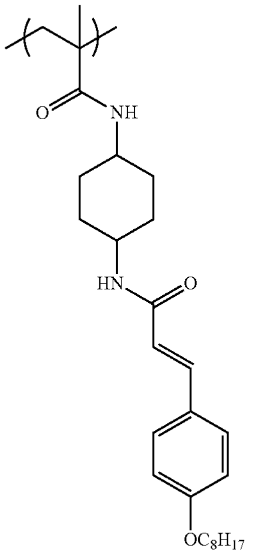
A-122
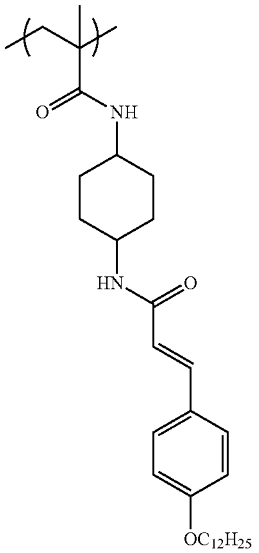
-continued
A-123
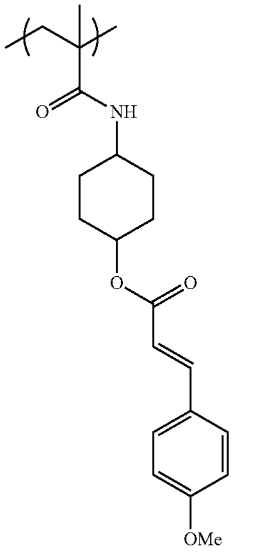
A-124
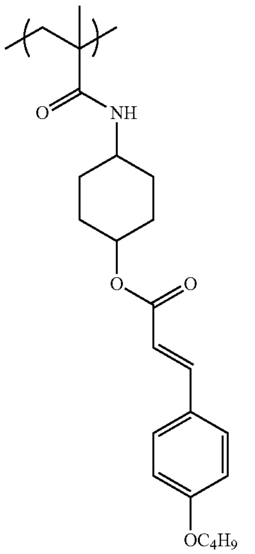
A-125
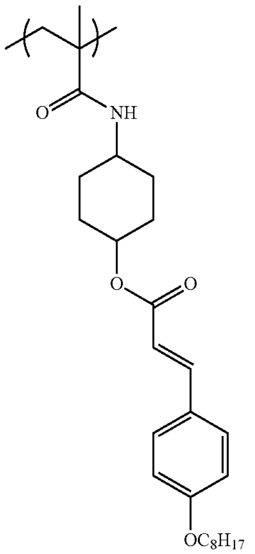

-continued
A-126
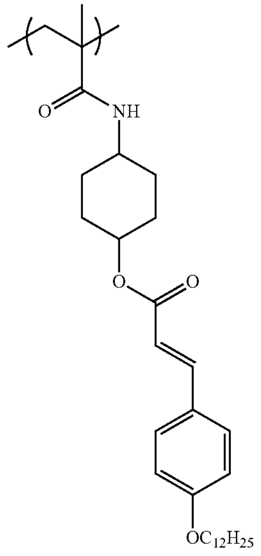
A-127
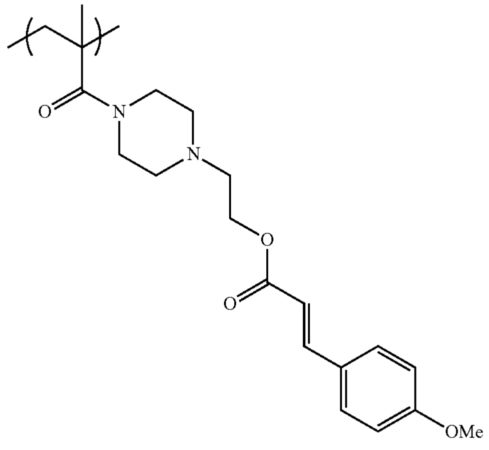
A-128
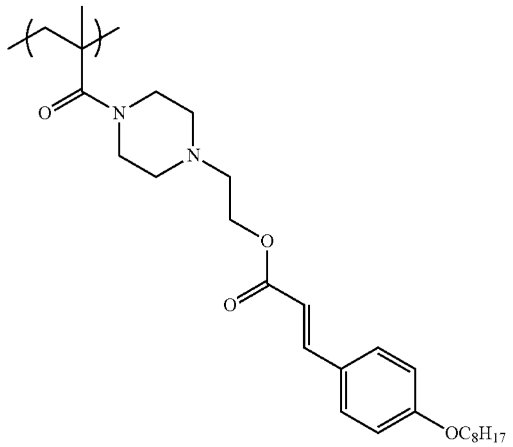
-continued
A-129
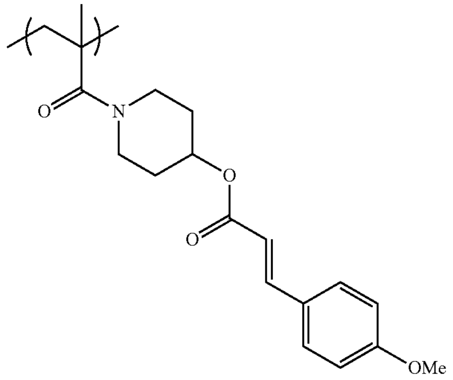
A-130
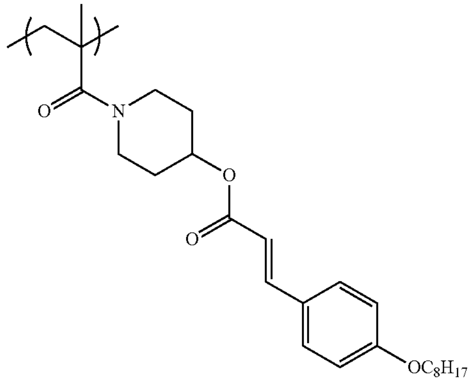
A-131
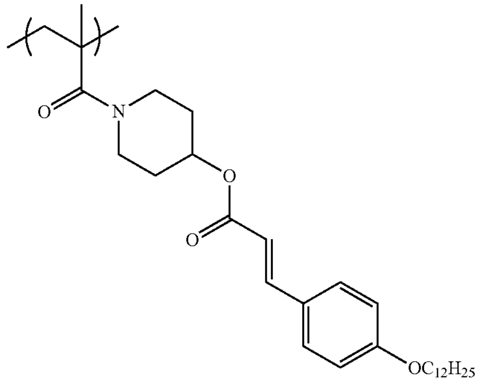
A-132
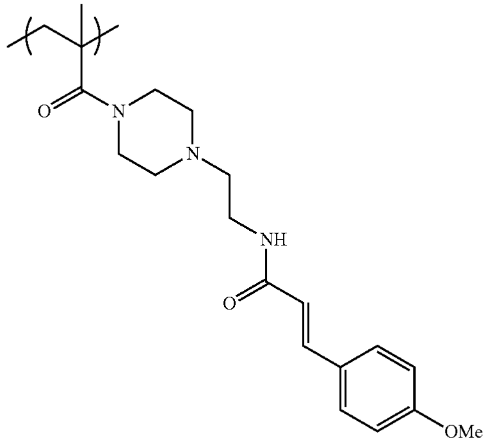

-continued
A-133
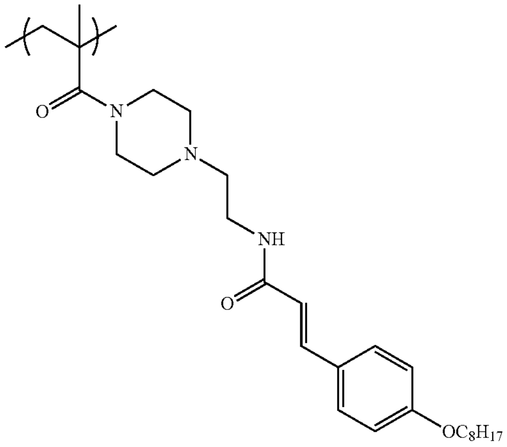
A-134
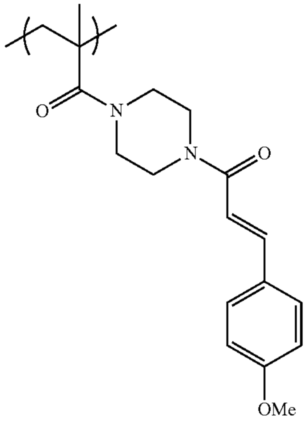
A-135
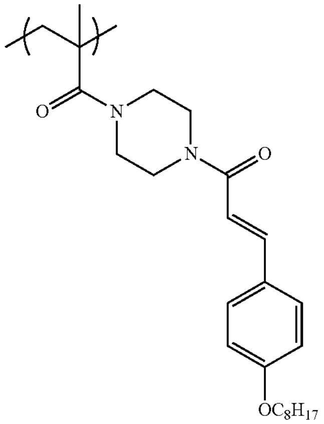
-continued
A-136
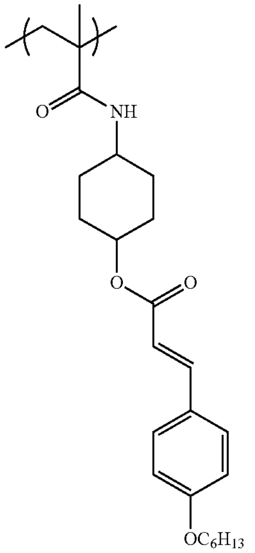
A-137
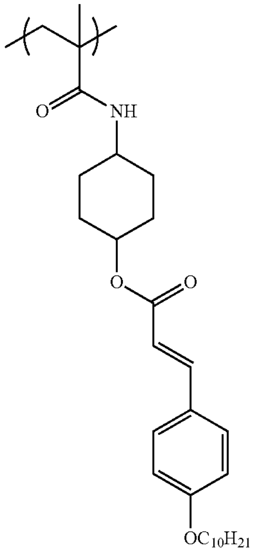
A-138
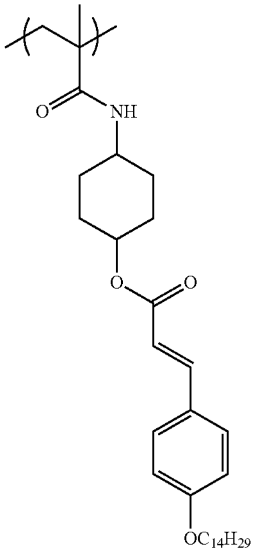

-continued
A-139
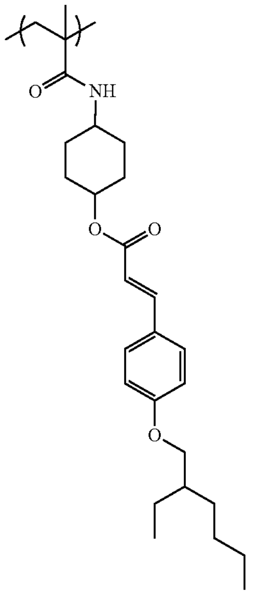
A-140
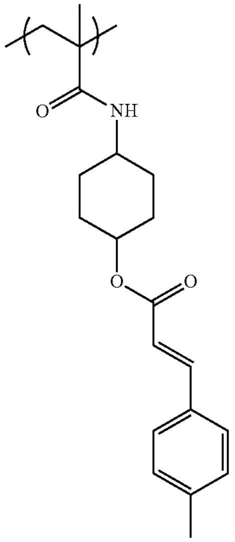
-continued
A-141
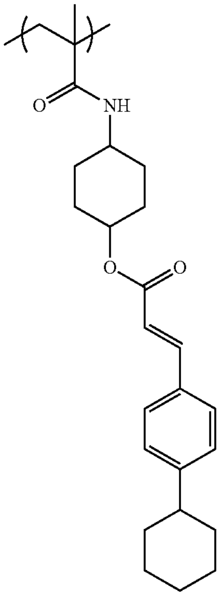
A-142
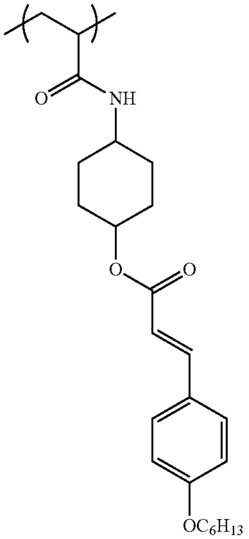

-continued
A-143
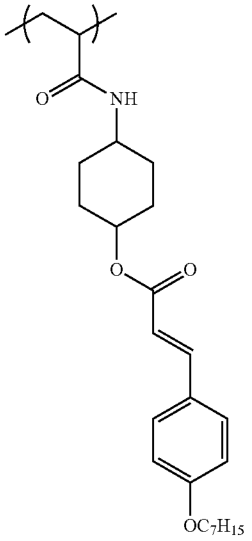
A-144
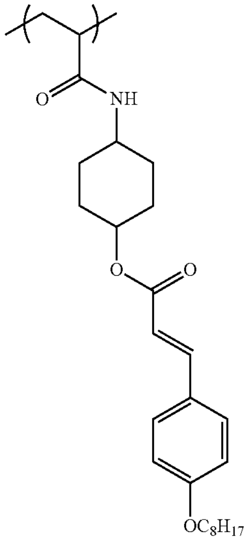
A-145
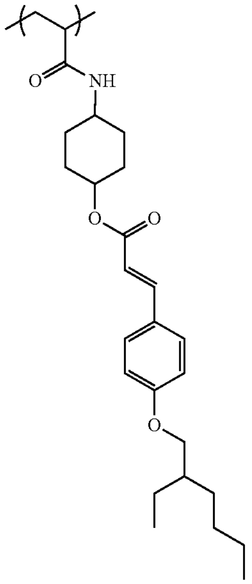
-continued
A-146
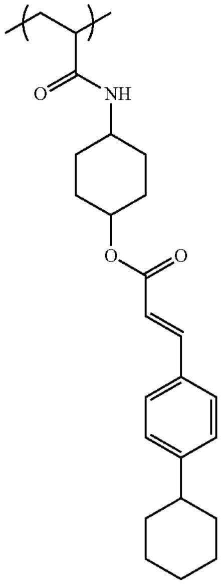
A-147
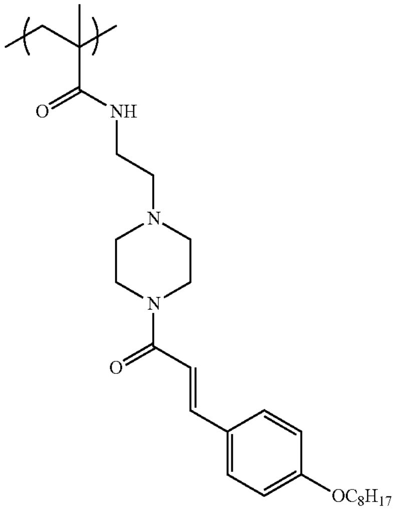
A-148
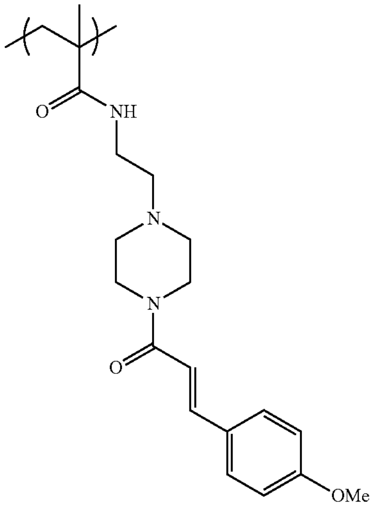

-continued
A-149
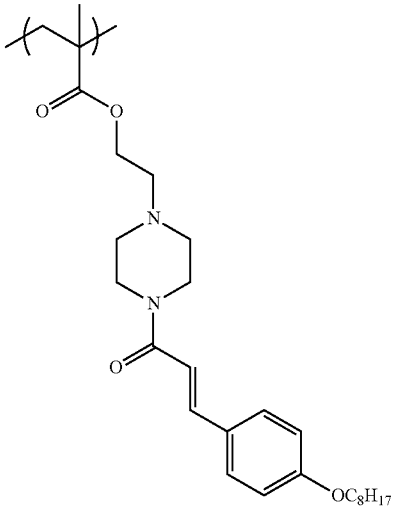
A-150
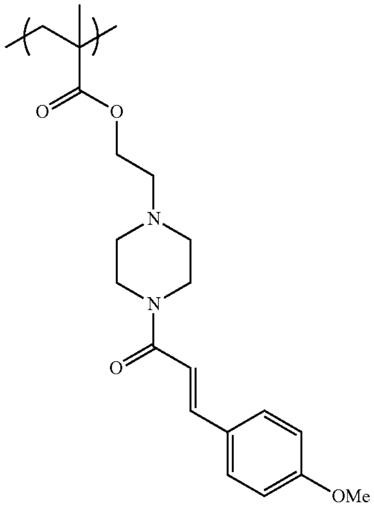
A-151
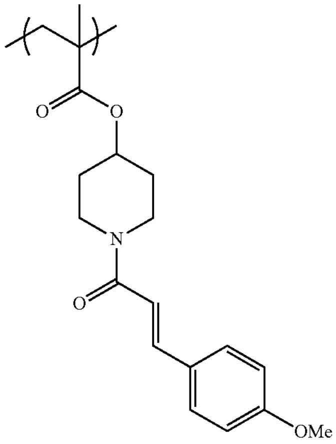
-continued
A-152
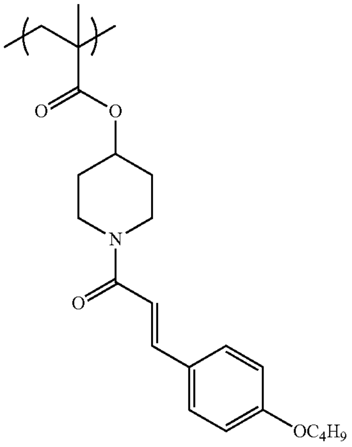
A-153
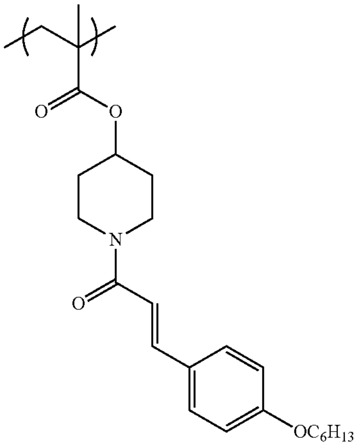
A-154
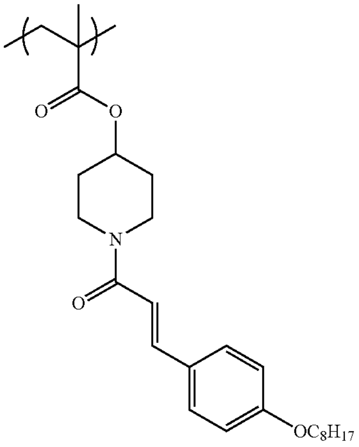

-continued
A-155
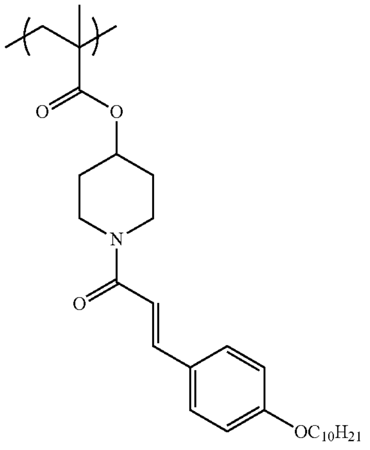
A-156
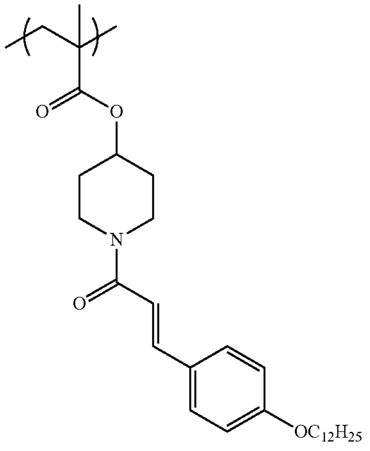
A-157
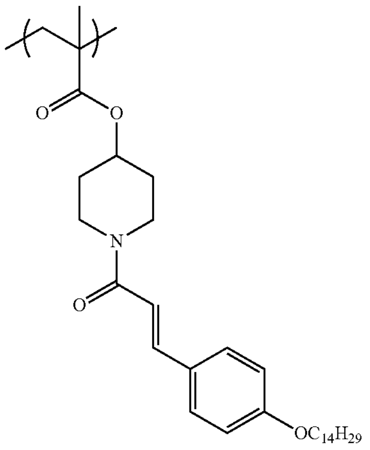
-continued
A-158
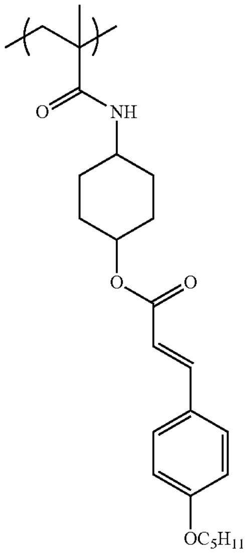
A-159
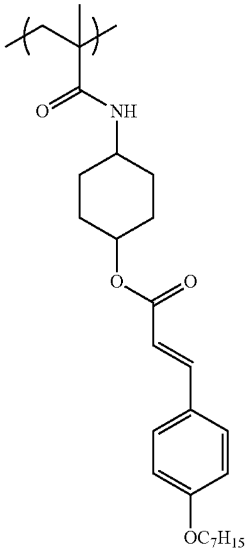

-continued

A-160

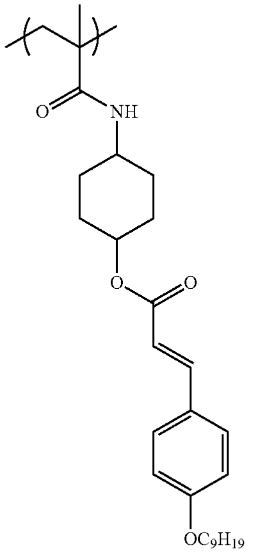

In the polymer X, it is preferable that the repeating unit containing a crosslinkable group is a repeating unit represented by Formula (B).

(B)

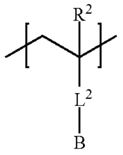

In Formula (B), $R^2$ represents a hydrogen atom or a substituent. Further, examples of the substituent as $R^2$ are the same as those described in the section of the substituent represented by $R^1$ in Formula (A).

Further, $L^2$ represents a divalent linking group. Examples of the divalent linking group represented by $L^2$ are the same as those described in the section of the divalent linking group represented by $L^1$ in Formula (A).

Further, B represents a crosslinkable group represented by any of Formulae (PG-1) to (PG-9).

In the present invention, from the viewpoint of further improving the degree of alignment, it is preferable that the repeating unit B represented by Formula (B) consists of two repeating units of a repeating unit B1 and a repeating unit B2, that the repeating unit B1 is a repeating unit in which B in Formula (B) represents a polymerizable group represented by Formula (PG-1), and that the repeating unit B2 is a repeating unit in which B in Formula (B) represents a polymerizable group represented by any of Formulae (PG-4) to (PG-9).

Specific examples of the repeating unit B1 include repeating units B-1 to B-29 shown below.

B-1

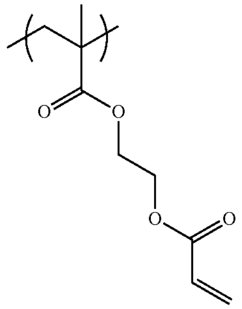

B-2

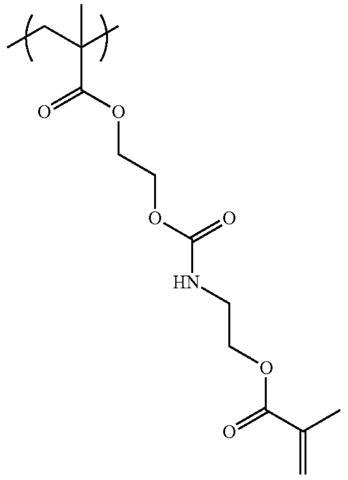

B-3

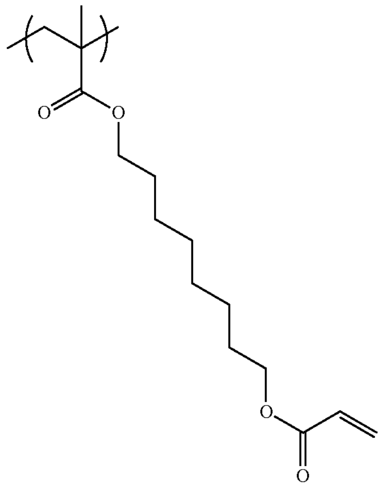

-continued
B-4
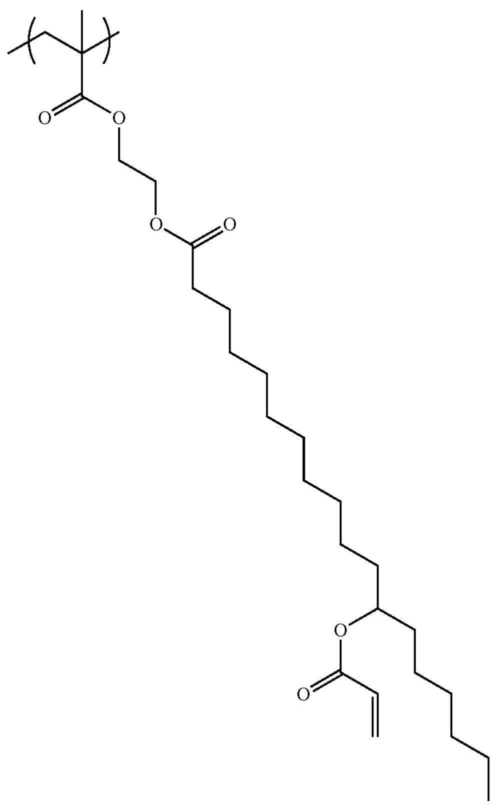
B-5
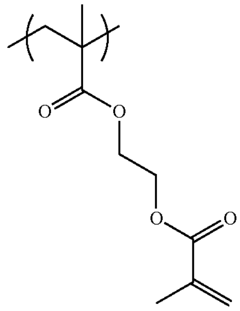
B-6
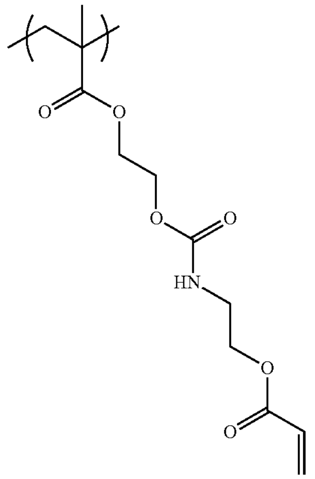
-continued
B-7
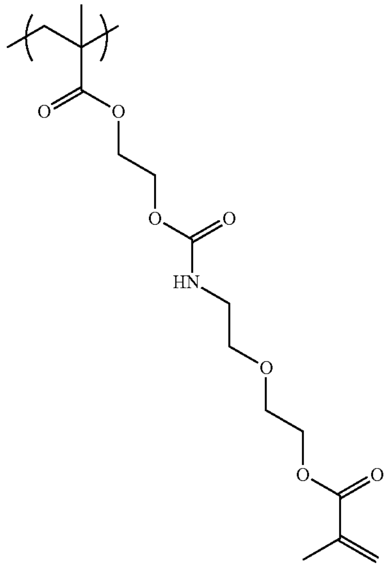
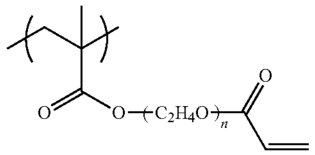
B-8:n = 2
B-9:n = 4.5
B-10:n = 8
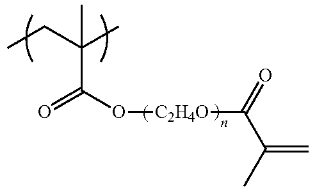
B-11:n = 2
B-12:n = 4.5
B-13:n = 8
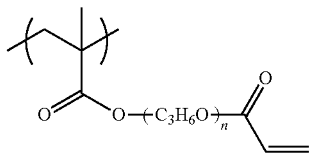
B-14:n = 4~6
B-15:n = 4.5
B-16:n = 8
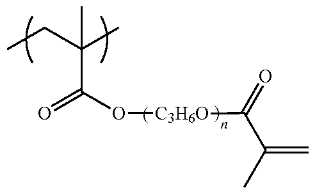
B-17:n = 4~6
B-18:n = 4.5
B-19:n = 8

-continued
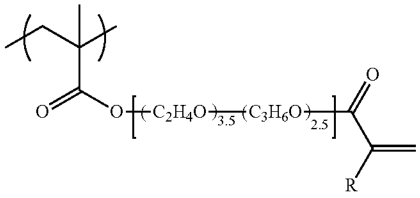
B-20:R = H
B-21:R = $CH_3$
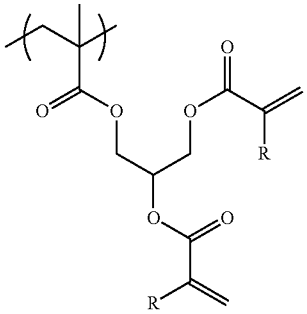
B-22:R = H
B-23:R = $CH_3$
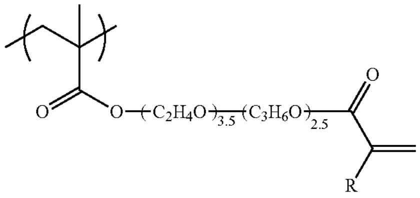
B-24:R = H
B-25:R = $CH_3$
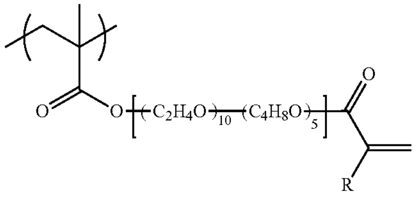
B-26:R = H
B-27:R = $CH_3$
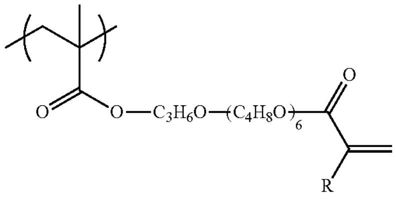
B-28 R = H
B-29:R = $CH_3$
Specific examples of the repeating unit B2 include repeating units B-30 to B-52 shown below.
B-30
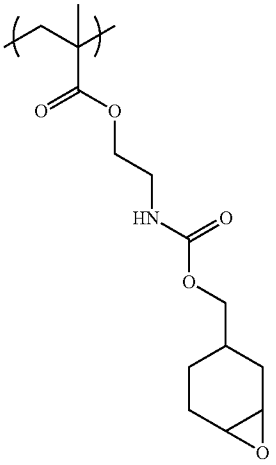
B-31
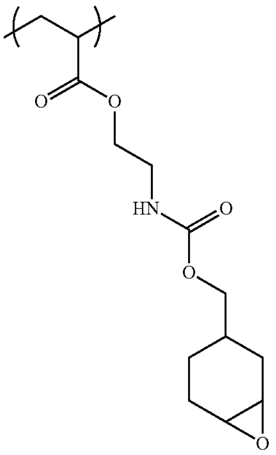
B-32
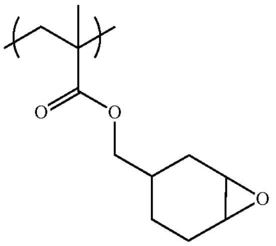
B-33
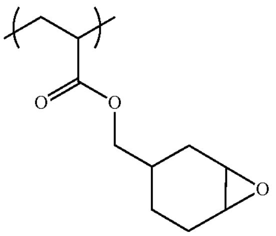

-continued
B-34
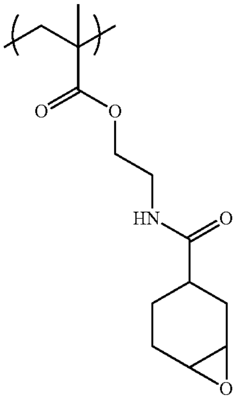
B-35
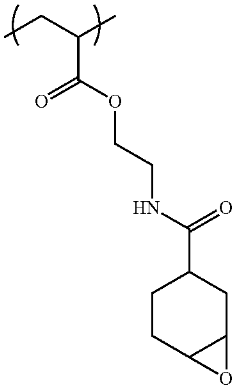
B-36
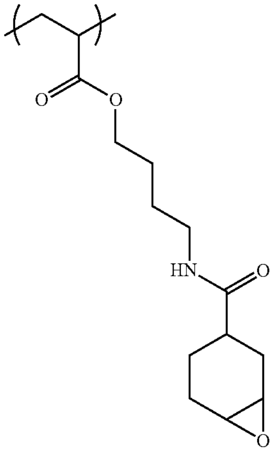
B-37
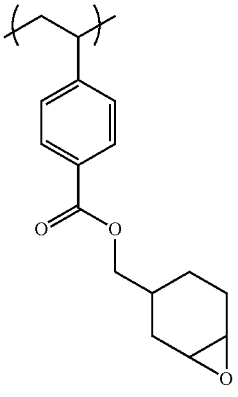
-continued
B-38
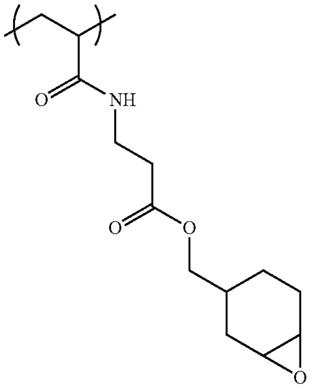
B-39
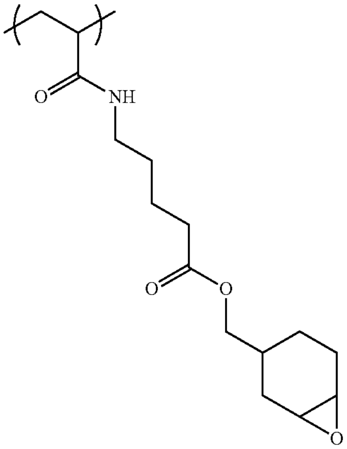
B-40
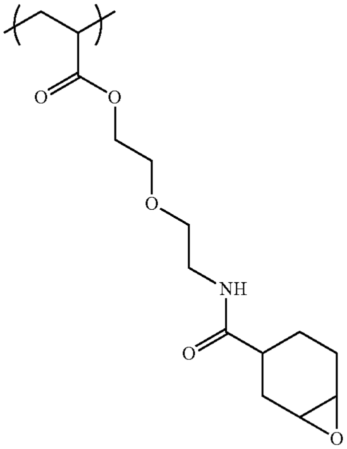
B-41
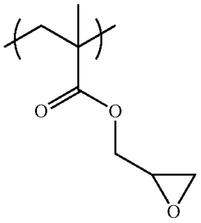

B-42
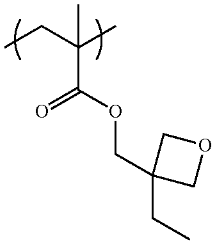
B-43
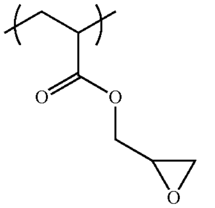
B-44
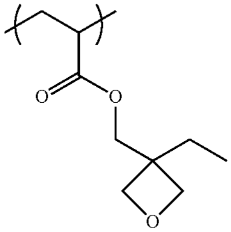
B-45
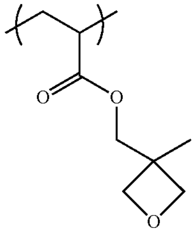
B-46
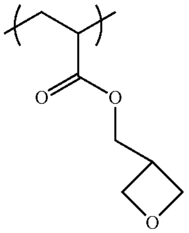
B-47
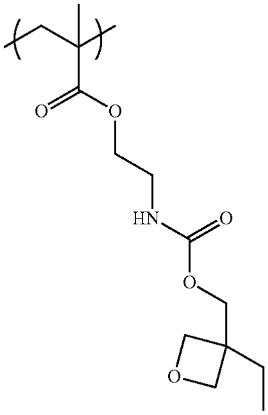
B-48
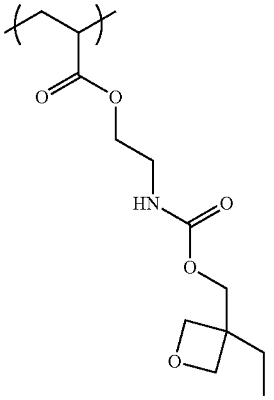
B-49
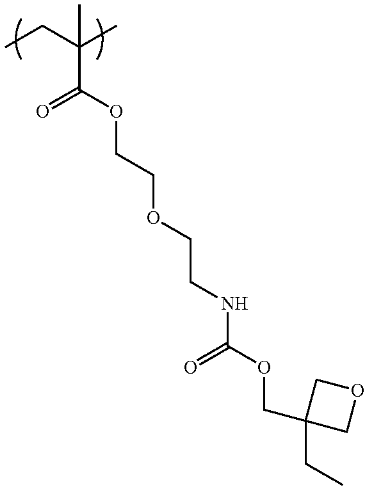
B-50
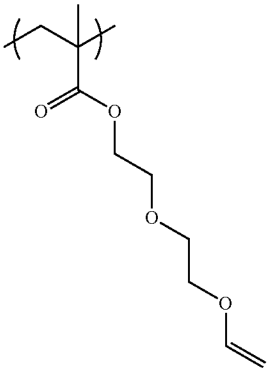
B-51
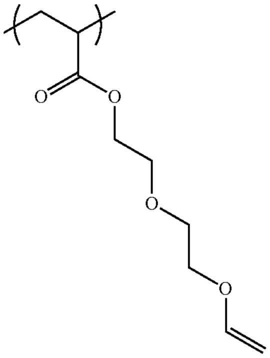

-continued

B-52

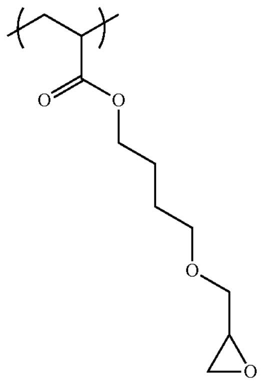

The content of the repeating unit containing a crosslinkable group in the polymer X is preferably 10% by mass or greater and more preferably 15% by mass or greater and is preferably 90% by mass or less, more preferably 60% by mass or less, and particularly preferably 45% by mass or less with respect to all the repeating units (100% by mass) of the polymer X.

The content of the repeating unit having a partial structure represented by Formula (PA) in the polymer X is preferably in a range of 3% to 40% by mass and more preferably in a range of 5% to 35% by mass with respect to all the repeating units (100% by mass) of the polymer X.

The polymer X may have other repeating units in addition to the repeating unit containing a crosslinkable group and the repeating unit having a partial structure represented by Formula (PA) described above as long as the effects of the present invention are not impaired.

Examples of the monomer (radical polymerizable monomer) forming the other repeating units include an acrylic acid ester compound, a methacrylic acid ester compound, a maleimide compound, an acrylamide compound, an acrylonitrile, a maleic acid anhydride, a styrene compound, and a vinyl compound.

[Aligning Step]

The aligning step is a step of aligning the liquid crystal component contained in the coating film. In this manner, a liquid crystal layer can be obtained.

The aligning step may include a drying treatment. Components such as a solvent can be removed from the coating film by performing the drying treatment. The drying treatment may be performed according to a method of allowing the coating film to stand at room temperature for a predetermined time (for example, natural drying) or a method of heating the coating film and/or blowing air to the coating film.

Here, the liquid crystal component contained in the above-described composition according to the embodiment of the present invention may be aligned by the coating film forming step or the drying treatment described above. For example, in an embodiment in which the composition of the present invention is prepared as a coating solution containing a solvent, a coating film having light absorption anisotropy (for example, a polarizer layer) is obtained by drying the coating film and removing the solvent from the coating film. In a case where the drying treatment is performed at a temperature higher than or equal to the transition temperature of the liquid crystal component contained in the coating film to the liquid crystal phase, the heat treatment described below may not be performed.

The transition temperature of the liquid crystal component contained in the coating film to the liquid crystal phase is preferably in a range of 10° C. to 250° C. and more preferably in a range of 25° C. to 190° C. from the viewpoint of the manufacturing suitability or the like. It is preferable that the transition temperature is 10° C. or higher from the viewpoint that a cooling treatment or the like for lowering the temperature to a temperature range in which a liquid crystal phase is exhibited is not necessary. Further, it is preferable that the transition temperature is 250° C. or lower from the viewpoint that a high temperature is not required even in a case of setting an isotropic liquid state at a temperature higher than the temperature range in which a liquid crystal phase is temporarily exhibited, and waste of thermal energy and deformation and deterioration of a substrate can be reduced.

It is preferable that the aligning step includes a heat treatment. In this manner, since the liquid crystal component contained in the coating film can be aligned, the coating film after being subjected to the heat treatment can be suitably used as the polarizer. From the viewpoint of the manufacturing suitability, the heat treatment is performed at a temperature of preferably 10° C. to 250° C. and more preferably 25° C. to 190° C. Further, the heating time is preferably in a range of 1 to 300 seconds and more preferably in a range of 1 to 60 seconds.

The aligning step may include a cooling treatment performed after the heat treatment. The cooling treatment is a treatment of cooling the coating film after being heated to room temperature (20° C. to 25° C.). In this manner, the alignment of the liquid crystal component contained in the coating film can be fixed. The cooling means is not particularly limited and can be performed by a known method.

The polarizer can be obtained by performing the above-described steps.

In the present embodiment, examples of the method of aligning the liquid crystal component contained in the coating film include a drying treatment and a heat treatment, but the method is not limited thereto, and the liquid crystal component can be aligned by a known alignment treatment.

[Other Steps]

It is preferable that the production method includes a step of curing the polarizer layer after the aligning step (hereinafter, also referred to as a "curing step").

The curing step is performed by, for example, heating the film and/or irradiating (exposing) the film with light. Between these, it is preferable that the curing step is performed by irradiating the film with light.

Various light sources such as infrared rays, visible light, and ultraviolet rays can be used as the light source for curing, but ultraviolet rays are preferable. In addition, ultraviolet rays may be applied while the film is heated during curing, or ultraviolet rays may be applied through a filter that transmits only a specific wavelength.

Further, the exposure may be performed under a nitrogen atmosphere. In a case where the curing of the polarizer proceeds by radical polymerization, from the viewpoint of reducing inhibition of polymerization by oxygen, it is preferable that exposure is performed in a nitrogen atmosphere.

<Laminate>

A laminate according to the embodiment of the present invention includes a base material and the above-described polarizer layer (also simply referred to as the "polarizer") on the above-described base material. It is preferable that the laminate according to the embodiment of the present invention further includes an alignment layer provided on the base material.

As one of the preferred embodiments of the laminate of the present invention, an embodiment in which the laminate includes a base material, an alignment layer provided on the base material, and a polarizer layer provided on the alignment layer is exemplified.

Further, the laminate according to the embodiment of the present invention may include a refractive index adjusting layer, a barrier layer, an optically anisotropic layer, a surface protective layer, a functional layer, a pressure-sensitive adhesive layer, and an adhesive layer.

Hereinafter, each layer constituting the laminate of the present invention will be described.

[Base Material]

The base material (hereinafter, also referred to as a "transparent support") can be appropriately selected, and examples thereof include glass and a polymer film. The light transmittance of the base material is preferably 80% or greater.

In a case where a polymer film is used as the base material, it is preferable to use an optically isotropic polymer film. As specific examples and preferred embodiments of the polymer, the description in paragraph [0013] of JP2002-22942A can be applied. Further, even in a case of a polymer easily exhibiting the birefringence such as polycarbonate and polysulfone which has been known in the related art, a polymer with the exhibiting property which has been decreased by modifying the molecules described in WO2000/26705A can be used.

Specific examples of the transparent support include a glass substrate and a plastic substrate.

Examples of the plastic constituting the plastic substrate include a polyolefin such as polyethylene, polypropylene, or a norbornene-based polymer, a cyclic olefin-based resin, polyvinyl alcohol, polyethylene terephthalate, polymethacrylic acid ester, polyacrylic acid ester, cellulose ester such as triacetyl cellulose (TAC), diacetyl cellulose, or cellulose acetate propionate, polyethylene naphthalate, polycarbonate, polysulfone, polyether sulfone, polyether ketone, polyphenylene sulfide, polyphenylene oxide, and polyimide. Among these, from the viewpoints of availability from the market and excellent transparency, cellulose ester, a cyclic olefin-based resin, polyethylene terephthalate, or polymethacrylic acid ester is particularly preferable. From the viewpoint of flexibility, polyimide is excellent. Polyimide has a high refractive index and thus may have a large refractive index gap, but it is also preferable that the refractive index is adjusted by a method of mixing silica particles or the like. The details of the polyimide are described in WO2018/062296A and WO2018/062190A.

It is preferable that the thickness of the transparent support is set to be small to the extent that the strength and the workability can be maintained from the viewpoint that the mass thereof enables the support to be practically handled and sufficient transparency can be ensured.

The thickness of the glass substrate is preferably in a range of 100 to 3000 μm and more preferably in a range of 100 to 1000 μm.

The thickness of the plastic substrate is preferably in a range of 5 to 300 μm and more preferably in a range of 5 to 200 μm.

Further, in a case where the laminate according to the embodiment of the present invention is used as a circularly polarizing plate (particularly in a case where the laminate is used as a circularly polarizing plate for mobile devices), the thickness of the transparent support is preferably in a range of 5 to 100 μm.

In a case where the base material is a glass substrate, the glass substrate may be provided on a side of the polarizer layer opposite to the surface where a λ/4 plate described below is provided (that is, the polarizer layer is disposed between the glass substrate and the λ/4 plate).

[Alignment Layer]

The laminate according to the embodiment of the present invention may include an alignment layer. The alignment layer may be provided between the base material and the polarizer layer, may be provided between the polarizer layer and an optically anisotropic layer described below, or may be provided in both positions thereof.

The details of the alignment layer are as described above, and thus the description thereof will not be repeated.

[Polarizer Layer]

The polarizer layer is as described above, and thus the description thereof will not be repeated.

[Refractive Index Adjusting Layer]

The laminate according to the embodiment of the present invention may have a refractive index adjusting layer. It is preferable that the refractive index adjusting layer is formed on the polarizer layer and more preferable that the refractive index adjusting layer is disposed to be in contact with the polarizer layer from the viewpoint of improving the adhesiveness of the polarizer layer in addition to the antireflection function at the interface of the polarizer layer.

The refractive index adjusting layer is formed of a composition containing a compound that contains a crosslinkable group, and the in-plane average refractive index thereof at a wavelength of 550 nm is 1.55 or greater and 1.70 or less.

The in-plane average refractive index of the refractive index adjusting layer may be in the above-described range, but is preferably in a range of 1.58 to 1.70 and more preferably in a range of 1.60 to 1.70.

The thickness of the refractive index adjusting layer is not particularly limited, but is preferably in a range of 0.01 to 2.00 μm, more preferably in a range of 0.01 to 0.80 μm, and still more preferably in a range of 0.01 to 0.15 μm from the viewpoint of reducing the thickness.

The kind of the component constituting the refractive index adjusting layer is not particularly limited as long as the refractive index adjusting layer contains a compound containing a crosslinkable group. The hardness in the layer can be ensured in the presence of the crosslinkable group. A compound that is cured by light or heat, for example, a polymerizable compound containing a (meth)acryloyl group or an epoxy group is preferable. From the viewpoint of obtaining a high in-plane average refractive index, a polymerizable liquid crystal compound is also preferable. Further, from the viewpoint that the refractive index can be controlled in the plane, the polymerizable liquid crystal compound has a high potential for optimizing the refractive index with the polarizer layer having refractive index anisotropy in the plane.

The refractive index adjusting layer may contain particles together with a compound containing a crosslinkable group. Examples of the particles include organic particles, inorganic particles, and organic-inorganic composite particles containing organic components and inorganic components.

Examples of the organic particles include styrene resin particles, styrene-divinylbenzene copolymer particles, acrylic resin particles, methacrylic resin particles, styrene-acrylic copolymer particles, styrene-methacrylic copolymer particles, melamine resin particles, and resin particles containing two or more kinds of these particles.

Examples of the components constituting the inorganic particles include a metal oxide, a metal nitride, a metal oxynitride, and a simple metal. Examples of metal atoms contained in the metal oxide, the metal nitride, the metal oxynitride, and the simple metal include a titanium atom, a silicon atom, an aluminum atom, a cobalt atom, and a zirconium atom. Specific examples of the inorganic particles include alumina particles, alumina hydrate particles, silica particles, zirconia particles, and inorganic oxide particles such as clay minerals (for example, smectite). From the viewpoint of obtaining a high refractive index, zirconia particles are preferable.

The average particle diameter of the particles is preferably in a range of 1 to 300 nm and more preferably in a range of 10 to 200 nm. In a case where the average particle diameter thereof is in the above-described range, a cured product (transparent resin layer) having excellent particle dispersibility and excellent high temperature durability, wet heat durability, and transparency can be obtained.

Here, the average particle diameter of the particles can be acquired from a photograph obtained by observation with a TEM (transmission electron microscope) or a SEM (scanning electron microscope). Specifically, the projected area of the particles is acquired, and the corresponding equivalent circle diameter (the diameter of the circle) is defined as the average particle diameter of the particles. Further, the average particle diameter in the present invention is the arithmetic average value of the equivalent circle diameters acquired for 100 particles.

The shape of the particles may be any of a spherical shape, a needle shape, a fiber (fiber-like) shape, a column shape, or a plate shape.

The content of particles in the refractive index adjusting layer is not particularly limited, but is preferably in a range of 1% to 50% by mass and more preferably in a range of 1% to 30% by mass with respect to the total mass of the refractive index adjusting layer from the viewpoint of easily adjusting the in-plane average refractive index of the refractive index adjusting layer.

A method for forming the refractive index adjusting layer is not particularly limited, and examples thereof include a method of coating a polarizer layer with a refractive index adjusting layer-forming composition and performing a curing treatment on the coating film as necessary.

The refractive index adjusting layer-forming composition contains components that can form the refractive index adjusting layer, and examples thereof include resins, monomers, and particles. Examples of the resins and the particles are as described above.

Examples of the monomers include a photocurable compound and a thermosetting compound (for example, a thermosetting resin). As the monomer, a monofunctional polymerizable compound containing one polymerizable group in one molecule and a polyfunctional polymerizable compound containing two or more polymerizable groups that are the same as or different from each other in one molecule are preferable. The polymerizable compound may be a monomer or a multimer such as an oligomer or a prepolymer.

Examples of the polymerizable group include a radically polymerizable group and a cationically polymerizable group. Among these, a radically polymerizable group is preferable. Examples of the radically polymerizable group include an ethylenically unsaturated bond group. Examples of the cationically polymerizable group include an epoxy group and an oxetane group.

The refractive index adjusting layer-forming composition may contain at least one of an interface improver, a polymerization initiator, or a solvent. Examples of such components include compounds exemplified as the components that may be contained in the above-described composition according to the embodiment of the present invention (the composition for forming a polarizer layer).

The method of applying the refractive index adjusting layer-forming composition is not particularly limited, and examples thereof include the above-described method of applying the composition according to the embodiment of the present invention.

After application of the refractive index adjusting layer-forming composition, the coating film may be subjected to a drying treatment as necessary.

Further, in a case where the refractive index adjusting layer-forming composition contains a curable compound such as a monomer, the coating film may be subjected to a curing treatment after being coated with the refractive index adjusting layer-forming composition.

Examples of the curing treatment include a photocuring treatment and a thermosetting treatment, and the optimum conditions are selected according to the material to be used.

In a case of using a polymerizable liquid crystal compound, the compound is not particularly limited. Typically, the liquid crystal compound can be classified into a rod type compound and a disk type compound depending on the shape thereof. In addition, the above-described types of compounds respectively include a low-molecular-weight type compound and a polymer type compound. The polymer indicates a compound having a degree of polymerization of 100 or greater (Polymer Physics and Phase Transition Dynamics, written by Masao Doi, p. 2, Iwanami Shoten, Publishers, 1992).

In the present invention, any liquid crystal compound can be used, but it is preferable to use a rod-like liquid crystal compound (hereinafter, also abbreviated as "CLC") or a discotic liquid crystal compound (hereinafter, also abbreviated as "DLC") and more preferable to use a rod-like liquid crystal compound. Further, two or more kinds of rod-like liquid crystal compounds, two or more kinds of disk-like liquid crystal compounds, or a mixture of a rod-like liquid crystal compound and a disk-like liquid crystal compound may be used.

In the present invention, from the viewpoint of fixing the above-described liquid crystal compound, it is necessary to use a liquid crystal compound containing a polymerizable group, and thus it is more preferable that the liquid crystal compound contains two or more polymerizable groups in one molecule. Further, in a case where a mixture of two or more kinds of liquid crystal compounds is used, it is preferable that at least one liquid crystal compound contains two or more polymerizable groups in one molecule. Further, the liquid crystal compound is not required to exhibit liquid crystallinity after the compound is fixed by polymerization.

Further, the kind of the polymerizable group is not particularly limited, but a functional group capable of carrying out the addition polymerization reaction is preferable, and a polymerizable ethylenically unsaturated group or a ring polymerizable group is preferable. More specifically, preferred examples thereof include a (meth)acryloyl group, a vinyl group, a styryl group, and an allyl group. Among these, a (meth)acryloyl group is more preferable.

For example, those described in claim 1 of JP1999-513019A (JP-H11-513019A) and paragraphs [0026] to [0098] of JP2005-289980A can be preferably used as the rod-like liquid crystal compound, and those described in paragraphs [0020] to [0067] of JP2007-108732A and paragraphs [0013] to [0108] of JP2010-244038A can be preferably used as the discotic liquid crystal compound, but the present invention is not limited thereto.

Specific examples of the other components contained in the refractive index adjusting layer-forming composition include the polymerization initiators, the surfactants, and the solvents described in the section of the composition (the polarizer layer-forming composition).

The method for forming the refractive index adjusting layer using the refractive index adjusting layer-forming composition containing a polymerizable liquid crystal compound is not particularly limited, and examples thereof include a method including a step of coating the above-described alignment layer or polarizer layer with the refractive index adjusting layer-forming composition according to the layer configuration to form a coating film (hereinafter, also referred to as a "coating film forming step") and a step of aligning the liquid crystal components contained in the coating film (hereinafter, also referred to as an "aligning step") in this order. Here, examples of the coating film forming step and the aligning step include the same steps as described above in the method of forming the polarizer layer.

[Barrier Layer]

For the purpose of improving the light fastness of the dichroic material of the polarizer layer, it is preferable that the laminate according to the embodiment of the present invention includes a barrier layer.

The "barrier layer" is an oxygen blocking film with an oxygen blocking function and can refer to, for example, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A. Further, specific examples thereof include layers containing organic compounds such as polyvinyl alcohol, polyethylene vinyl alcohol, polyvinyl ether, polyvinylpyrrolidone, polyacrylamide, polyacrylic acid, cellulose ether, polyamide, polyimide, a styrene/maleic acid copolymer, gelatin, vinylidene chloride, and cellulose nanofibers. From the viewpoint that the oxygen blocking function is excellent, polyvinyl alcohol or polyethylene vinyl alcohol is preferable, and polyvinyl alcohol is particularly preferable.

In the present specification, the oxygen blocking function is not limited to a function for making a state where oxygen is not allowed to pass at all, and also includes a function for making a state where a small amount of oxygen is allowed to pass depending on the desired performance.

The oxygen permeability is preferably 40 cc/m$^2$/day/atm or less, more preferably 4 cc/m$^2$/day/atm or less, and still more preferably 1 cc/m$^2$/day/atm or less.

Here, the oxygen permeability is an index showing the amount of oxygen passing through a film per unit time and unit area and is a value measured using a MODEL3600 type oxygen concentration device (manufactured by Hack Ultra Analytics, Inc.) in an environment of a temperature of 25° C. and a humidity of 50%.

Among materials that can be used for forming the barrier layer, examples of the polymerizable compound having a high oxygen blocking function include a polymerizable compound having a high hydrogen bond property and a compound having a large amount of polymerizable groups per molecular weight. Examples of the compound having a large amount of polymerizable groups per molecular weight include pentaerythritol tetra(meth)acrylate and dipentaerythritol hexa(meth)acrylate.

Among the materials that can be used for forming the barrier layer, specific examples of the polymerizable compound having a high hydrogen bond property include compounds represented by the following formulae. Among these, 3',4'-epoxycyclohexylmethyl-3,4-epoxycyclohexanecarboxylate represented by CEL2021P (trade name, "CELLOXIDE CEL2021P", manufactured by Daicel Corporation) is preferable. Further, in the following formulae, CYCLOMER M100 is a product name of Daicel Corporation, and BLEMMER GMR is a product name of NOF Corporation.

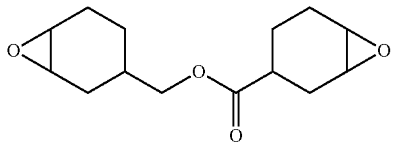

CEL2021P

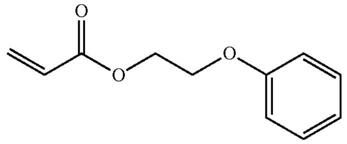

2-Phenoxyethyl acrylate

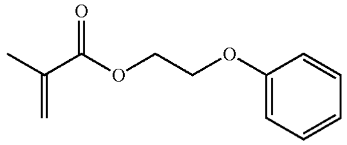

2-Phenoxyethyl methacrylate

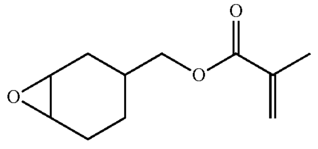

CYCLOMER M100

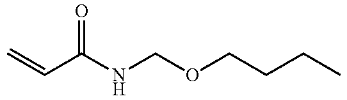

N-(butoxymethyl)acrylamide

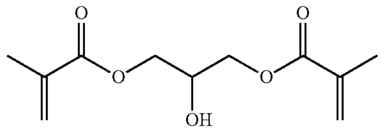

BLEMMER GMR

Further, examples of the barrier layer include a thin layer consisting of a metal compound (metal compound thin layer). As a method of forming the metal compound thin layer, any method can be used as long as a desired thin layer can be formed. Suitable examples thereof include a sputtering method, a vacuum deposition method, an ion plating method, and a plasma CVD (chemical vapor deposition) method. Specifically, the forming methods described in JP3400324B, JP2002-322561A, and JP2002-361774A can be employed.

The component contained in the metal compound thin layer is not particularly limited as long as the component can exhibit an oxygen blocking function, and an oxide, a nitride, an oxynitride, or the like containing one or more metals selected from Si, Al, In, Sn, Zn, Ti, Cu, Ce, Ta and the like can be used. Among these, an oxide, a nitride, or an oxynitride of a metal selected from Si, Al, In, Sn, Zn, and Ti is preferable, and a metal oxide, a nitride, or an oxynitride selected from Si, Al, Sn, and Ti is particularly preferable. These may contain other elements as secondary components. The layers consisting of reaction products of an aluminum compound and a phosphorus compound, as described in JP2016-40120A and JP2016-155255A are also preferable.

Further, the barrier layer may be in the form of lamination of the layer containing an organic material and the metal compound thin layer as described in, for example, U.S. Pat. No. 6,413,645B, JP2015-226995A, JP2013-202971A, JP2003-335880A, JP1978-12953A (JP-S53-12953A), and JP1983-217344A (JP-S58-217344A) and may be a layer obtained by hybridizing an organic compound and an inorganic compound as described in WO2011/11836A, JP2013-248832A, and JP3855004B.

In a case where the barrier layer is a layer containing an organic compound, the film thickness of thereof is preferably in a range of 0.1 to 10 μm and more preferably in a range of 0.5 to 5.5 μm. In a case where the barrier layer is a metal compound thin layer, the film thickness thereof is preferably in a range of 5 nm to 500 nm and more preferably in a range of 10 nm to 200 nm.

For example, it is also preferable that the oxygen blocking function is imparted to the above-described refractive index adjusting layer and other functional layers such as an adhesive layer and a surface protective layer described below to integrate the functions. It is particularly preferable that the adhesive layer between the refractive index adjusting layer and the film of the surface protective layer has the oxygen blocking function. In this case, it is also preferable to use an adhesive containing a polyvinyl alcohol resin.

Further, it is also preferable to use cover glass or a low-reflection film having a multilayer sputtered metal oxide film for the purpose of surface protection because these also function as a barrier layer.

Since the cover glass protects the surface of a display from being scratched or damaged due to contact or falling, the cover glass is required to maintain the high strength by chemical strengthening. The materials for chemically strengthened glass are mainly aluminosilicate glass and soda-lime glass. The chemically strengthened glass is typically prepared by an ion exchange method of immersing glass in an alkali molten salt ($KNO_3$) at a high temperature and replacing $Na^+$ ions on the surface of the glass with $K^+$ ions with a larger ionic radius to generate a compressive stress. In particular, aluminosilicate glass having a composition containing a large amount of $Al_2O_3$ can produce chemically strengthened glass having a large compressive stress value and a deep compressive stress layer. Examples of commercially available chemically strengthened glass include chemically strengthened glass (manufactured by Matsunami Glass Industry Ltd.), "Gorilla Glass" (registered trademark), "Gorilla Glass 2" (registered trademark), and "Gorilla Glass 3" (registered trademark) (all manufactured by Corning Inc.), "Dragon Trail" (registered trademark) (manufactured by AGC Inc.), "CX-01", "CX-01P", and "CX-01T" (all manufactured by Nippon Electric Glass Co., Ltd.), ARMOREX (manufactured by Central Glass Co., Ltd.), chemically strengthened glass (manufactured by Nippon Sheet Glass Co., Ltd.), and "Xensation Cover" and "Xensation Cover 3D" (manufactured by SCHOTT Japan Corporation).

The thickness of the cover glass is in a range of 200 μm to 1000 μm in many cases. Glass is excellent in oxygen blocking ability and moisture blocking ability and can sufficiently realize the oxygen blocking function.

The barrier layer may be provided on a side of the polarizer layer opposite to the surface where a λ/4 plate described below or a surface protective layer described below is provided. Further, in a case where another layer (for example, a pressure-sensitive adhesive layer, an adhesive layer, or an alignment layer) is provided between the polarizer layer according to the embodiment of the present invention and the barrier layer, the barrier layer can be provided, for example, between the polarizer according to the embodiment of the present invention and another layer.

[Optically Anisotropic Layer]

The laminate according to the embodiment of the present invention may include an optically anisotropic layer. In a case of the laminate for imparting an antireflection function, the optically anisotropic layer has a λ/4 function. The λ/4 plate is a plate having a function of converting linearly polarized light having a specific wavelength into circularly polarized light (or converting circularly polarized light into linearly polarized light) and is also a plate (phase difference film) in which an in-plane retardation Re (λ) at a specific wavelength of λ nm satisfies "Re (λ)=λ/4", and it is preferable that the plate is prepared by adjusting Re of a positive A-plate to λ/4. In order to improve a change in tint in a case of visual recognition in an oblique direction and light leakage in a case of black display, it is preferable to further combine a positive C-plate. Here, it is preferable that the total Rth of an antireflection plate is adjusted to be close to zero.

The antireflection plate is suitably used for antireflection applications of image display devices such as a liquid crystal display (LCD), a plasma display panel (PDP), an electroluminescence display (ELD), and a cathode ray tube (CRT) display, and can improve the contrast ratio of display light. For example, an antireflection plate can be provided on a side of the light extraction surface of an organic EL display device. In this case, external light is converted into linearly polarized light by a polarizer and converted into circularly polarized light after passing through a phase difference plate. The circularly polarized light state is reversed in a case where the circularly polarized light is reflected by a metal electrode or the like of an organic EL panel, the circularly polarized light is converted into linearly polarized light tilted at 90° from the time of incidence in a case of passing through the phase difference plate again, and the light reaches the polarizer and is absorbed. As a result, the influence of external light can be suppressed.

The laminate according to the embodiment of the present invention can also be produced by, for example, attaching a polarizer layer and a λ/4 positive A-plate and a λ/4 positive C-plate, which are optically anisotropic layers, with a pressure-sensitive adhesive layer or the like described below. In a case where the optically anisotropic layer is formed of a λ/4 positive A-plate and a λ/4 positive C-plate, the optically anisotropic layer may be adhered to a polarizer layer on the surface on the positive C-plate side and may be adhered to a polarizer layer on the opposite surface.

Alternatively, the laminate can be produced by directly forming a λ/4 positive A-plate and a λ/4 positive C-plate on the polarizer layer. As described in Example 19 of JP6243869B, it is also preferable to add an alignment layer between the polarizer layer and the positive A-plate. Further, it is also possible to add a protective layer between the polarizer layer and the positive A-plate as in Example 1 of JP6123563B. Alternatively, a polarizer layer can also be formed after formation of the λ/4 positive A-plate and the λ/4 positive C-plate.

The angle formed by a slow axis direction of the positive A-plate of the antireflection plate and an absorption axis direction of the polarizer layer is preferably in a range of 45°±10°. As for the optical characteristics of the positive A-plate and the positive C-plate, it is preferable that the wavelength dispersion of Re and Rth exhibits reverse dispersibility, particularly from the viewpoint of suppressing a change in tint.

It is preferable that the process of producing an antireflection plate includes a step of continuously laminating the polarizer layer, the positive A-plate, and the positive C-plate with a long size, respectively. The long antireflection plate is cut according to the size of the screen of an image display device to be used.

From the viewpoint of the flexibility, it is preferable that an optically anisotropic layer is formed from a liquid crystal compound because the thickness thereof can be reduced. Further, from the viewpoint of light durability, it is preferable that the optically anisotropic layer includes a layer formed of a composition containing a polymerizable liquid crystal compound represented by Formula (4) described below.

Hereinafter, first, the components in the composition used for forming the optically anisotropic layer (hereinafter, also referred to as an "optically anisotropic layer-forming composition") will be described in detail, and a method of producing the optically anisotropic layer and characteristics thereof will be described in detail.

(Polymerizable Liquid Crystal Compound Represented by Formula (4))

The optically anisotropic layer-forming composition contains a polymerizable liquid crystal compound represented by Formula (4). The polymerizable liquid crystal compound represented by Formula (4) is a compound exhibiting liquid crystallinity.

(I)

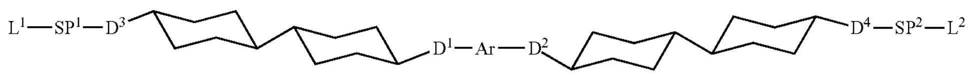

In Formula (I), $D^1$, $D^2$, $D^3$, and $D^4$ each independently represent a single bond, —CO—O—, —C(═S)O—, —$CR^1R^2$—, —$CR^1R^2$—$CR^3R^4$—, —O—$CR^1R^2$—, —$CR^1R^2$—O—$CR^3R^4$—, —CO—O—$CR^1R^2$—, —O—CO—$CR^1R^2$—, —$CR^1R^2$—O—CO—$CR^3R^4$—, —$CR^1R^2$—CO—O—$CR^3R^4$—, —$NR^1$—$CR^2R^3$—, or —CO—$NR^1$—. R', $R^2$, $R^3$, and $R^4$ each independently represent a hydrogen atom, a fluorine atom, or an alkyl group having 1 to 4 carbon atoms.

Further, in Formula (I), $SP^1$ and $SP^2$ each independently represent a single bond, a linear or branched alkylene group having 1 to 12 carbon atoms, or a divalent linking group in which one or more —$CH_2$— constituting a linear or branched alkylene group having 1 to 12 carbon atoms have been substituted with —O—, —S—, —NH—, —N(Q)-, or —CO—, and Q represents a substituent.

Further, in Formula (I), $L^1$ and $L^2$ each independently represent a monovalent organic group, and at least one of $L^1$ or $L^2$ represents a polymerizable group. Here, in a case where Ar represents an aromatic ring represented by Formula (Ar-3), at least one of $L^1$ or $L^2$ and at least one of $L^3$ and $L^4$ in Formula (Ar-3) represent a polymerizable group.

In Formula (I), preferred examples of the linear or branched alkylene group having 1 to 12 carbon atoms represented by $SP^1$ and $SP^2$ include a methylene group, an ethylene group, a propylene group, a butylene group, a pentylene group, a hexylene group, a methylhexylene group, and a heptylene group. As described above, $SP^1$ and $SP^2$ may represent a divalent linking group in which one or more —$CH_2$— constituting a linear or branched alkylene group having 1 to 12 carbon atoms have been substituted with —O—, —S—, —NH—, —N(Q)-, or —CO—, and examples of the substituent represented by Q are the same as the substituents that $Y^1$ in Formula (Ar-1) may have.

In Formula (I), examples of the monovalent organic group represented by $L^1$ and $L^2$ include an alkyl group, an aryl group, and a heteroaryl group.

The alkyl group may be linear, branched, or cyclic, and it is preferable that the alkyl group is linear. The number of carbon atoms of the alkyl group is preferably in a range of 1 to 30, more preferably in a range of 1 to 20, and still more preferably in a range of 1 to 10.

The aryl group may be monocyclic or polycyclic, and it is preferable that the aryl group is monocyclic. The number of carbon atoms of the aryl group is preferably in a range of 6 to 25 and more preferably in a range of 6 to 10.

Further, the heteroaryl group may be monocyclic or polycyclic. The number of heteroatoms constituting the heteroaryl group is preferably in a range of 1 to 3. It is preferable that the heteroatom constituting the heteroaryl group is a nitrogen atom, a sulfur atom, or an oxygen atom. The number of carbon atoms of the aryl group is preferably in a range of 6 to 18 and more preferably in a range of 6 to 12.

Further, the alkyl group, the aryl group, and the heteroaryl group may be unsubstituted or may have a substituent. Examples of the substituent are the same as the substituents that $Y^1$ in Formula (Ar-1) described below may have.

In Formula (I), the polymerizable group represented by at least one of $L^1$ or $L^2$ is not particularly limited, but a polymerizable group capable of radical polymerization or cationic polymerization is preferable.

As the radically polymerizable group, a generally known radically polymerizable group can be used, and an acryloyl group or a methacryloyl group is preferable. In this case, since the acryloyl group is generally known to have a higher polymerization rate, the acryloyl group is preferable from the viewpoint of improving the productivity, but the methacryloyl group can also be used as the polymerizable group.

As the cationically polymerizable group, a generally known cationically polymerizable group can be used, and specific examples thereof include an alicyclic ether group, a cyclic acetal group, a cyclic lactone group, a cyclic thioether group, a spiroorthoester group, and a vinyloxy group. Among these, an alicyclic ether group or a vinyloxy group is preferable, and an epoxy group, an oxetanyl group, or a vinyloxy group is more preferable.

Examples of particularly preferable polymerizable groups include the following groups.

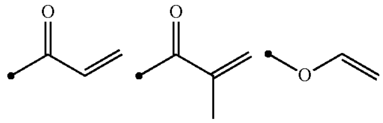

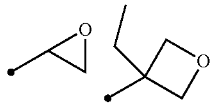

In Formula (I), from the viewpoint that the heat durability of the laminate is more excellent (hereinafter, also referred to as "the effects of the present invention are more excellent"), both $L^1$ and $L^2$ in Formula (4) represent preferably a polymerizable group and more preferably an acryloyl group or a methacryloyl group.

In Formula (I), Ar represents an aromatic ring selected from the group consisting of groups represented by Formulae (Ar-1) to (Ar-5). Further, in Formulae (Ar-1) to (Ar-5), * represents a bonding position with respect to $D^1$ or $D^2$ in Formula (I).

(Ar-1)

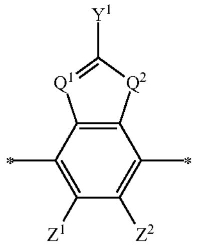

(Ar-2)

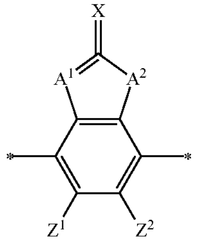

(Ar-3)

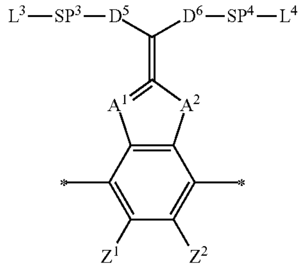

(Ar-4)

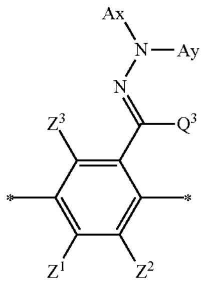

-continued (Ar-5)

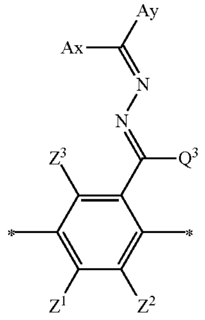

Here, in Formula (Ar-1), $Q^1$ represents N or CH, $Q^2$ represents —S—, —O—, or —N($R^5$)—, $R^5$ represents a hydrogen atom or an alkyl group having 1 to 6 carbon atoms, and $Y^1$ represents an aromatic hydrocarbon group having 6 to 12 carbon atoms which may have a substituent or an aromatic heterocyclic group having 3 to 12 carbon atoms which may have a substituent.

Examples of the alkyl group having 1 to 6 carbon atoms as $R^5$ include a methyl group, an ethyl group, a propyl group, an isopropyl group, an n-butyl group, an isobutyl group, a sec-butyl group, a tert-butyl group, an n-pentyl group, and an n-hexyl group.

Examples of the aromatic hydrocarbon group having 6 to 12 carbon atoms as $Y^1$ include an aryl group such as a phenyl group, a 2,6-diethylphenyl group, or a naphthyl group.

Examples of the aromatic heterocyclic group having 3 to 12 carbon atoms as $Y^1$ include a heteroaryl group such as a thienyl group, a thiazolyl group, a furyl group, and a pyridyl group.

Further, examples of the substituent that $Y^1$ may have include an alkyl group, an alkoxy group, and a halogen atom.

As the alkyl group, for example, a linear, branched, or cyclic alkyl group having 1 to 18 carbon atoms is preferable, an alkyl group having 1 to 8 carbon atoms (such as a methyl group, an ethyl group, a propyl group, an isopropyl group, an n-butyl group, an isobutyl group, a sec-butyl group, a t-butyl group, or a cyclohexyl group) is more preferable, an alkyl group having 1 to 4 carbon atoms is still more preferable, and a methyl group or an ethyl group is particularly preferable.

As the alkoxy group, for example, an alkoxy group having 1 to 18 carbon atoms is preferable, an alkoxy group having 1 to 8 carbon atoms (such as a methoxy group, an ethoxy group, an n-butoxy group, or a methoxyethoxy group) is more preferable, an alkoxy group having 1 to 4 carbon atoms is still more preferable, and a methoxy group or an ethoxy group is particularly preferable.

Examples of the halogen atom include a fluorine atom, a chlorine atom, a bromine atom, and an iodine atom. Among these, a fluorine atom or a chlorine atom is preferable.

In Formulae (Ar-1) to (Ar-5), $Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a halogen atoms, a cyano group, a nitro group, —$OR^6$, —$NR^7R^8$, or —$SR^9$, $R^6$ to $R^9$ each independently represent a hydrogen atom or an alkyl group having 1 to 6 carbon atoms, and $Z^1$ and $Z^2$ may be bonded to each other to form an aromatic ring.

As the monovalent aliphatic hydrocarbon group having 1 to 20 carbon atoms, an alkyl group having 1 to 15 carbon atoms is preferable, an alkyl group having 1 to 8 carbon atoms is more preferable, specifically, a methyl group, an ethyl group, an isopropyl group, a tert-pentyl group (1,1-dimethylpropyl group), a tert-butyl group, or a 1,1-dimethyl-3,3-dimethyl-butyl group is still more preferable, and a methyl group, an ethyl group, or a tert-butyl group is particularly preferable.

Examples of the monovalent alicyclic hydrocarbon group having 3 to 20 carbon atoms include a monocyclic saturated hydrocarbon group such as a cyclopropyl group, a cyclobutyl group, a cyclopentyl group, a cyclohexyl group, a cycloheptyl group, a cyclooctyl group, a cyclodecyl group, a methylcyclohexyl group, or an ethylcyclohexyl group, a monocyclic unsaturated hydrocarbon group such as a cyclobutenyl group, a cyclopentenyl group, a cyclohexenyl group, a cycloheptenyl group, a cyclooctenyl group, a cyclodecenyl group, a cyclopentadienyl group, a cyclohexadienyl group, a cyclooctadienyl group, or cyclodecadienyl group, and a polycyclic saturated hydrocarbon group such as a bicyclo[2.2.1]heptyl group, a bicyclo[2.2.2]octyl group, a tricyclo[5.2.1.$0^{2,6}$]decyl group, a tricyclo[3.3.1.$1^{3,7}$]decyl group, a tetracyclo[6.2.1.$1^{3,6}$.$0^{2,7}$]dodecyl group, or an adamantyl group.

Examples of the monovalent aromatic hydrocarbon group having 6 to 20 carbon atoms include a phenyl group, a 2,6-diethylphenyl group, a naphthyl group, and a biphenyl group. Among these, an aryl group having 6 to 12 carbon atoms (particularly a phenyl group) is preferable.

Examples of the halogen atom include a fluorine atom, a chlorine atom, a bromine atom, and an iodine atom. Among these, a fluorine atom, a chlorine atom, or a bromine atom is preferable.

Further, examples of the alkyl group having 1 to 6 carbon atoms as $R^6$ to $R^9$ include a methyl group, an ethyl group, a propyl group, an isopropyl group, an n-butyl group, an isobutyl group, a sec-butyl group, a tert-butyl group, an n-pentyl group, and an n-hexyl group.

In Formulae (Ar-2) and (Ar-3), $A^1$ and $A^2$ each independently represent a group selected from the group consisting of —O—, —N($R^{19}$)—, —S—, and —CO—, and $R^{19}$ represents a hydrogen atom or a substituent.

Examples of the substituent as $R^{19}$ are the same as the substituents that $Y^1$ in Formula (Ar-1) may have.

In Formula (Ar-2), X represents a non-metal atom of Groups 14 to 16 to which a hydrogen atom or a substituent may be bonded.

Further, examples of the non-metal atom of Groups 14 to 16 represented by X include an oxygen atom, a sulfur atom, a nitrogen atom having a substituent, and a carbon atom having a substituent. Examples of the substituent include an alkyl group, an alkoxy group, an alkyl substituted alkoxy group, a cyclic alkyl group, an aryl group (such as a phenyl group or a naphthyl group), a cyano group, an amino group, a nitro group, an alkylcarbonyl group, a sulfo group, and a hydroxyl group.

Further, in Formula (Ar-3), $D^5$ and $D^6$ each independently represent a single bond, —CO—O—, —C(=S)O—, —$CR^1R^2$—, —$CR^1R^2$—$CR^3R^4$—, —O—$CR^1R^2$—, —$CR^1R^2$—O—$CR^3R^4$—, —CO—O—$CR^1R^2$—, —O—CO—$CR^1R^2$—, —$CR^1R^2$—O—CO—$CR^3R^4$—, —$CR^1R^2$—CO—O—$CR^3R^4$—, —$NR^1$—$CR^2R^3$—, or —CO—$NR^1$—. R', $R^2$, $R^3$, and $R^4$ each independently represent a hydrogen atom, a fluorine atom, or an alkyl group having 1 to 4 carbon atoms.

Further, in Formula (Ar-3), $SP^3$ and $SP^4$ each independently represent a single bond, a linear or branched alkylene group having 1 to 12 carbon atoms, or a divalent linking group in which one or more —$CH_2$— constituting a linear or branched alkylene group having 1 to 12 carbon atoms have been substituted with —O—, —S—, —NH—, —N(Q)-, or —CO—, and Q represents a substituent. Examples of the substituent are the same as the substituents that $Y^1$ in Formula (Ar-1) may have.

Further, in Formula (Ar-3), $L^3$ and $L^4$ each independently represent a monovalent organic group, and at least one of $L^3$ or $L^4$ and at least one of $L^1$ or $L^2$ in Formula (I) represent a polymerizable group.

Examples of the monovalent organic group are the same as those described in the section of $L^1$ and $L^2$ in Formula (I).

Further, examples of the polymerizable group are the same as those described in the section of $L^1$ and $L^2$ in Formula (I).

In Formulae (Ar-4) to (Ar-5), Ax represents an organic group having 2 to 30 carbon atoms which has at least one aromatic ring selected from the group consisting of an aromatic hydrocarbon ring and an aromatic heterocyclic ring.

Further, in Formulae (Ar-4) and (Ar-5), Ay represents a hydrogen atom, an alkyl group having 1 to 12 carbon atoms which may have a substituent, or an organic group having 2 to 30 carbon atoms which has at least one aromatic ring selected from the group consisting of an aromatic hydrocarbon ring and an aromatic heterocyclic ring.

Here, the aromatic ring in Ax and Ay may have a substituent, or Ax and Ay may be bonded to each other to form a ring.

Further, $Q^3$ represents a hydrogen atom or an alkyl group having 1 to 6 carbon atoms which may have a substituent.

Examples of Ax and Ay include those described in paragraphs [0039] to [0095] of WO2014/010325A.

Examples of the alkyl group having 1 to 6 carbon atoms as $Q^3$ include a methyl group, an ethyl group, a propyl group, an isopropyl group, an n-butyl group, an isobutyl group, a sec-butyl group, a tert-butyl group, an n-pentyl group, and an n-hexyl group, and examples of the substituent are the same as the substituents that $Y^1$ in Formula (Ar-1) may have.

Suitable examples of such a polymerizable liquid crystal compound (I) include compounds represented by Formulae (1) to (12), and specific examples of K (side chain structure) in Formulae (1) to (12) include compounds having side chain structures represented by the following formulae.

In the following formulae, "*" shown in the side chain structures of K represents a bonding position with respect to an aromatic ring.

In the description below, a compound represented by Formula (1) and containing a group represented by 1-1 in the following formula is referred to as a "compound (1-1-1)" and the same applies to compounds having the other structural formulae and containing the other groups. For example, a compound represented by Formula (2) and containing a group represented by 2-3 in the following formula can be referred to as a "compound (2-2-3)".

Further, in the side chain structures represented by 1-2 and 2-2 in the following formulae, the groups adjacent to the acryloyloxy group and the methacryloyl group each represent a propylene group (a group in which a methyl group has been substituted with an ethylene group) and a mixture of position isomers with different positions of methyl groups.

(1)
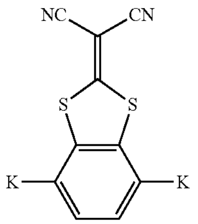
(2)
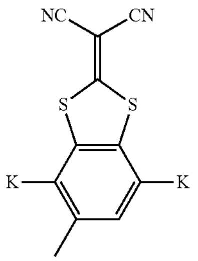
(3)
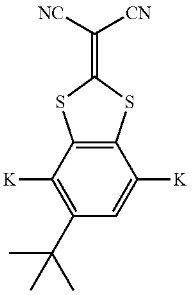
(4)
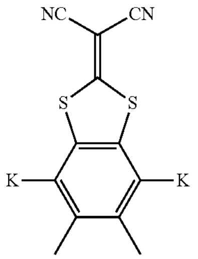
(5)
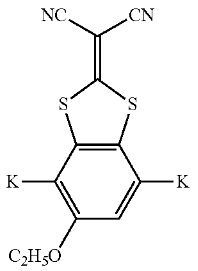
(6)
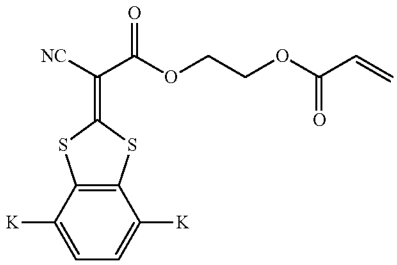
-continued
(7)
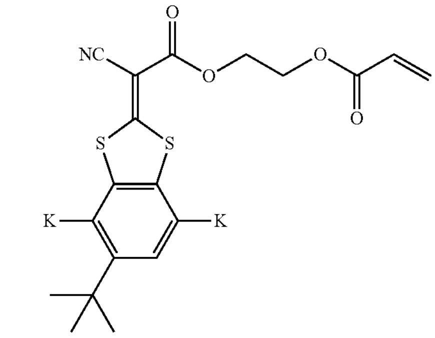
(8)
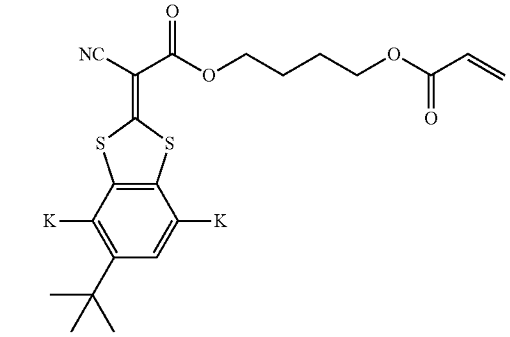
(9)
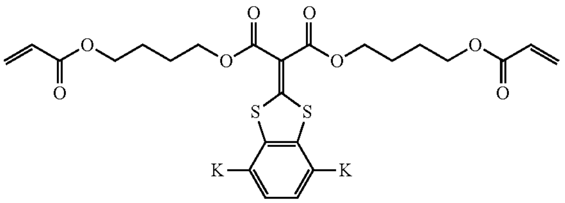
(10)
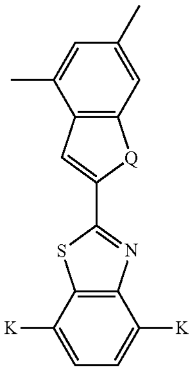
(11)
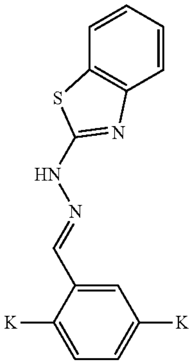

-continued
(12)
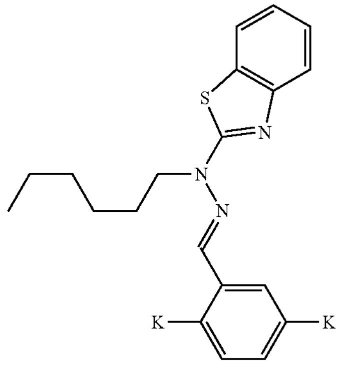
1-1
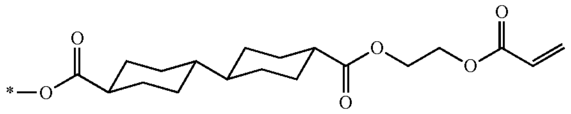
1-2
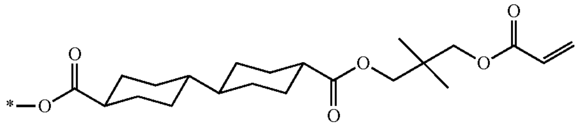
1-3
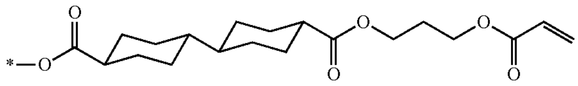
1-4
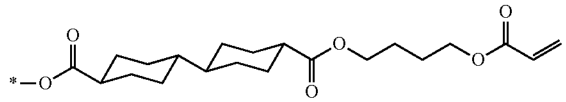
1-5
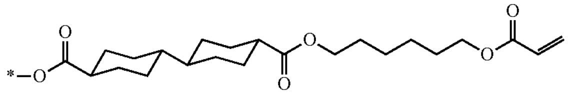
1-6
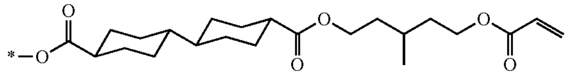
1-7
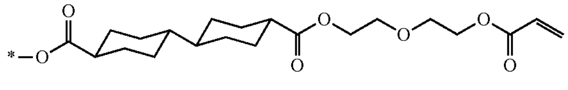
1-8
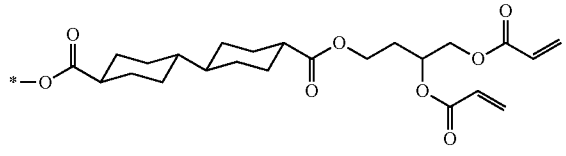
1-9
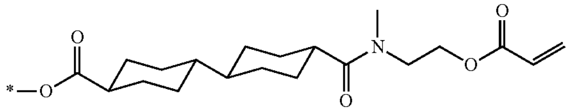
-continued
1-10
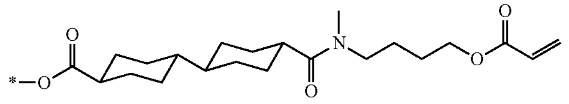
1-11
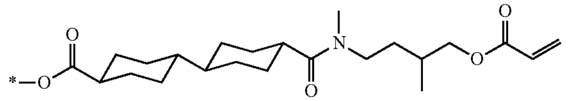
1-12
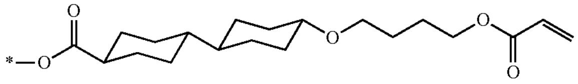
1-13
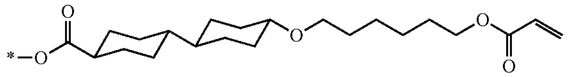
1-14
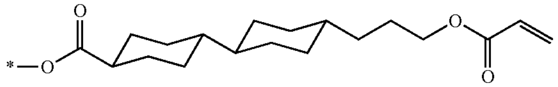
2-1
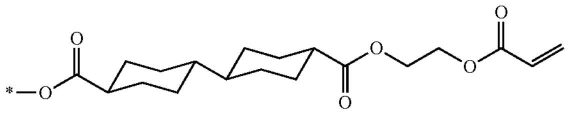
2-2
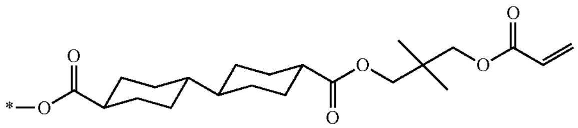
2-3
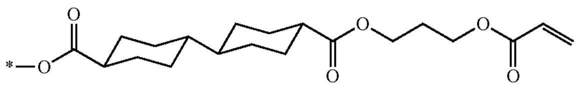
2-4
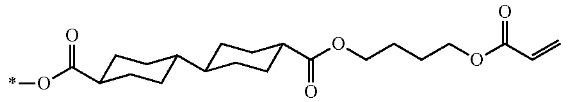
2-5
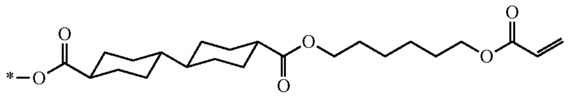
2-6
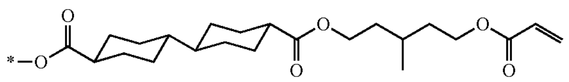
2-7
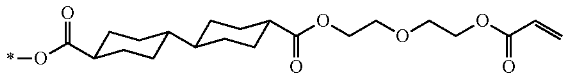

-continued 2-8

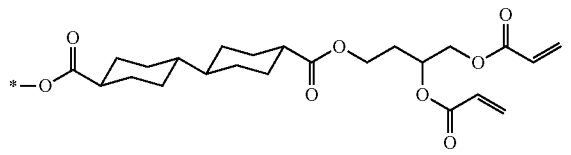

2-9

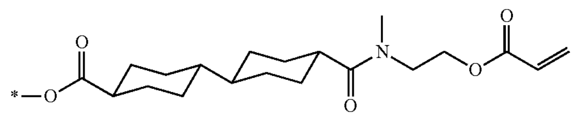

2-10

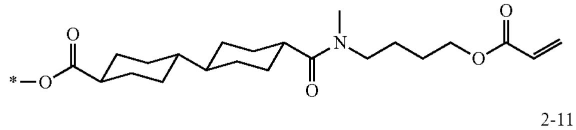

2-11

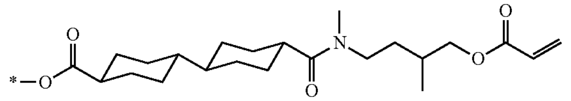

2-12

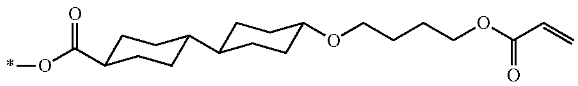

2-13

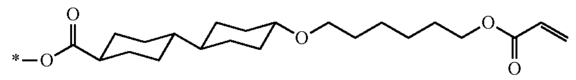

2-14

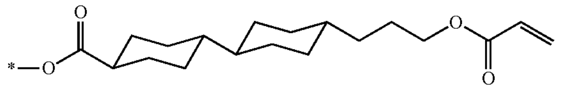

The content of the polymerizable liquid crystal compound represented by Formula (I) in the optically anisotropic layer-forming composition is not particularly limited, but is preferably in a range of 50% to 100% by mass and more preferably in a range of 70% to 99% by mass with respect to the total solid content in the optically anisotropic layer-forming composition.

In the present invention, the solid content indicates other components obtained by removing solvents in the composition, and is calculated as a solid content even in a case where the components are in a liquid state.

The optically anisotropic layer-forming composition may contain components other than the polymerizable liquid crystal compound represented by Formula (I).

(Liquid Crystal Compound)

The optically anisotropic layer-forming composition may contain liquid crystal compounds other than the polymerizable liquid crystal compound represented by Formula (I). Examples of the other liquid crystal compounds include known liquid crystal compounds (rod-like liquid crystal compounds and disk-like liquid crystal compounds). The other liquid crystal compounds may have a polymerizable group.

The optically anisotropic layer-forming composition may contain polymerizable monomers other than the polymerizable liquid crystal compound represented by Formula (I) and the other liquid crystal compounds containing a polymerizable group. Among these, from the viewpoint that the hardness of the optically anisotropic layer is more excellent, a polymerizable compound (polyfunctional polymerizable monomer) containing two or more polymerizable groups is preferable.

As the polyfunctional polymerizable monomer, a polyfunctional radically polymerizable monomer is preferable. Examples of the polyfunctional radically polymerizable monomer include the polymerizable monomers described in paragraphs [0018] to [0020] in JP2002-296423A.

Further, in a case where the optically anisotropic layer-forming composition contains a polyfunctional polymerizable monomer, the content of the polyfunctional polymerizable monomer is preferably in a range of 1 to 50 parts by mass and more preferably in a range of 2 to 30 parts by mass with respect to the total mass of the polymerizable liquid crystal compound represented by Formula (I).

The optically anisotropic layer-forming composition may contain a polymerization initiator, a solvent, and a surfactant. As the polymerization initiator, the solvent, and the surfactant, those used in the polarizer layer-forming composition can be used, and thus the description thereof will not be repeated, but an oxime type polymerization initiator is preferable as the polymerization initiator. Further, the polymerization initiator may also have the function of an alignment control agent described below.

(Alignment Control Agent)

The optically anisotropic layer-forming composition may contain an alignment control agent as necessary. The alignment control agent can form various alignment states such as homeotropic alignment (vertical alignment), inclined alignment, hybrid alignment, and cholesteric alignment in addition to homogenous alignment and can realize a specific alignment state by controlling the state more uniformly and more precisely.

As the alignment control agent that promotes homogenous alignment, for example, a low-molecular-weight alignment control agent and a polymer alignment control agent can be used. In regard to the low-molecular-weight control agent, for example, the description in paragraphs [0009] to [0083] of JP2002-20363A, paragraphs [0111] to [0120] of JP2006-106662A, and paragraphs [0021] to [0029] of JP2012-211306A can be referred to, and the contents thereof are incorporated in the specification of the present application by reference. In regard to the polymer alignment control agent, for example, the description in paragraphs [0021] to [0057] of JP2004-198511A and paragraphs [0121] to [0167] of JP2006-106662A can be referred to, and the contents thereof are incorporated in the specification of the present application by reference.

Examples of the alignment control agent for forming or promoting homeotropic alignment include a boronic acid compound and an onium salt compound. Specifically, the description in paragraphs [0023] to [0032] of JP2008-225281A, paragraphs [0052] to [0058] of JP2012-208397A, paragraphs [0024] to [0055] of JP2008-026730A, and paragraphs [0043] to [0055] of JP2016-193869 can be referred to, and the contents thereof are incorporated in the specification of the present application by reference.

In a case where the optically anisotropic layer-forming composition contains an alignment control agent, the content of the alignment control agent is preferably in a range of 0.01% to 10% by mass and more preferably in a range of 0.05% to 5% by mass with respect to the total solid content in the composition.

The optically anisotropic layer-forming composition may contain components other than the components described above, and examples thereof include a tilt angle control agent, an alignment assistant, a plasticizer, and a crosslinking agent.

(Method of Producing Optically Anisotropic Layer)

A method of producing the optically anisotropic layer is not particularly limited, and known methods can be used.

For example, a predetermined substrate (for example, a support layer described below) is coated with the optically anisotropic layer-forming composition to form a coating film, and the obtained coating film is subjected to a curing treatment (irradiation with active energy rays (light irradiation treatment) and/or a heat treatment), thereby producing a cured coating film (optically anisotropic layer). As necessary, an alignment layer described below may be used.

The optically anisotropic layer-forming composition can be applied by a known method (for example, a wire bar coating method, an extrusion coating method, a direct gravure coating method, a reverse gravure coating method, or a die coating method).

In the method of producing the optically anisotropic layer, it is preferable to perform an alignment treatment of the liquid crystal compound contained in the coating film before performing the curing treatment on the coating film.

The alignment treatment can be performed by drying or heating the film at room temperature (for example, 20° C. to 25° C.). In a case of a thermotropic liquid crystal compound, transition of the liquid crystal phase formed by the alignment treatment can be typically made by a change in temperature or pressure. In a case of a liquid crystal compound having lyotropic properties, the transition can be made by a compositional ratio such as the amount of solvent.

In a case where the alignment treatment is a heat treatment, the heating time (heat aging time) is preferably in a range of 10 seconds to 5 minutes, more preferably in a range of 10 seconds to 3 minutes, and still more preferably in a range of 10 seconds to 2 minutes.

The above-described curing treatment (irradiation with active energy rays (light irradiation treatment) and/or a heat treatment) on the coating film can also be referred to as an immobilization treatment for fixing the alignment of the liquid crystal compound.

It is preferable that the immobilization treatment is performed by irradiation with active energy rays (preferably ultraviolet rays), and the liquid crystals are immobilized by the polymerization of the liquid crystal compound.

(Characteristics of Optically Anisotropic Layer)

The optically anisotropic layer is a film formed by using the above-described optically anisotropic layer-forming composition. The optical characteristics of the optically anisotropic layer are not particularly limited, but it is preferable that the optically anisotropic layer functions as a λ/4 plate. The λ/4 plate is a plate having a function of converting linearly polarized light having a specific wavelength into circularly polarized light (or converting circularly polarized light into linearly polarized light) and is also a plate (optically anisotropic layer) in which an in-plane retardation Re (λ) at a specific wavelength of λ nm satisfies "Re (λ)=λ/4".

This equation may be established at any wavelength in the visible light region (for example, 550 nm), but the in-plane retardation Re (550) at a wavelength of 550 nm satisfies preferably a relationship of "110 nm≤Re (550)≤160 nm" and more preferably a relationship of "110 nm≤Re (550)≤150 nm".

It is preferable that Re (450) which is an in-plane retardation measured at a wavelength of 450 nm of the optically anisotropic layer, Re (550) which is an in-plane retardation measured at a wavelength of 550 nm of the optically anisotropic layer, and Re (650) which is an in-plane retardation measured at a wavelength of 650 nm of the optically anisotropic layer have a relationship of "Re (450)≤Re (550) ≤Re (650)". That is, it can be said that the relationship is a relationship showing the reciprocal wavelength dispersibility.

The optically anisotropic layer may be an A-plate or a C-plate, and a positive A-plate is preferable.

The positive A-plate can be obtained by, for example, horizontally aligning the polymerizable liquid crystal compound represented by Formula (4).

The thickness of the optically anisotropic layer is not particularly limited, but is preferably in a range of 0.5 to 10 μm and more preferably in a range of 1.0 to 5 μm from the viewpoint of reducing the thickness.

[Functional Layer]

It is preferable that a functional layer having a function of reducing short wave light is provided on a viewing side relative to the polarizer layer. By reducing short-wave light, a display device that suppresses photodecomposition of a dye compound and has excellent light fastness can be provided.

As one aspect of the functional layer, it is preferable that the pressure-sensitive adhesive layer, the adhesive layer, the support, the barrier layer, and the like described below have a function of reducing short wave light.

Further, as another aspect of the functional layer, it is also preferable that a layer having the function of reducing short wave light is newly provided on the viewing side relative to the polarizer layer.

A method of reducing short wave light is not particularly limited, and examples thereof include a method of applying light absorption using an absorbing agent or the like and a method of applying wavelength selective reflection using a multilayer film.

The above-described short wave light is light having a wavelength of 430 nm or less. By reducing the light having a wavelength of 430 nm or less, photodecomposition of a liquid crystal compound due to sunlight or light from a light source used in the light fastness test of JIS B 7751 and JIS B 7754 can be suppressed.

Further, it is preferable to be transparent in a wavelength range of 450 nm or greater so as not to affect the performance of the polarizer in visible light.

The transmittance is preferably 0.1% or less in a wavelength range of 350 to 390 nm, 20% to 70% at a wavelength range of 410 nm, and 90% or greater at a wavelength of 450 nm or greater.

The transmittance at a wavelength of 410 nm is more preferably 40% to 50%.

As the compound that absorbs short wave light, the merocyanine compound described in JP2017-119700A or WO2018/123267A is preferably used.

It is also preferable to use known ultraviolet absorbing agents of the related art in combination. Examples thereof include an organic ultraviolet absorbing agent such as an oxybenzophenone-based ultraviolet absorbing agent, a benzotriazole-based ultraviolet absorbing agent, a salicylic acid ester-based ultraviolet absorbing agent, a benzophenone-based ultraviolet absorbing agent, a cyanoacrylate-based ultraviolet absorbing agent, or a triazine-based ultraviolet absorbing agents.

[Surface Protective Layer]

The laminate according to the embodiment of the present invention is used as a part of a display device, and in that case, it is preferable that a surface protective layer is provided on the most viewing side. The surface protective layer is not limited as long as the layer has a function of protecting the surface. The surface protective layer may be formed of one layer and preferably a plurality of layers. It is preferable that the surface protective layer has a high hardness and also preferable that the surface protective layer has an excellent recovery property. A low-reflection layer that suppresses surface reflection that occurs at the air interface is also preferable.

The configuration of the transparent base material and the surface coating layer is assumed as one of the preferred embodiments. Since the transparent base material is the same as the above-described base material, the description thereof will not be repeated, and the surface coating layer will be described below.

Examples of the surface coating layer includes at least one selected from the group consisting of an antireflection layer, an antiglare layer, and a hard coat layer. Known layer materials are used for the antireflection layer, the antiglare layer, and the hard coat layer. In addition, these layers may be formed by laminating a plurality of layers.

The antireflection layer indicates a structure that is different from an antireflection plate of a so-called circularly polarizing plate formed of the optically anisotropic layer and the polarizer layer described above and reduces reflection by a structure using light interference. The antireflection layer may have a configuration consisting of only a low refractive index layer as the simplest configuration. In order to further reduce the reflectivity, it is preferable that an antireflection layer is formed by combining a high refractive index layer having a high refractive index and a low refractive index layer having a low refractive index. Examples of the configuration thereof include a configuration in which two layers of a high refractive index layer and a low refractive index layer are laminated in order from the lower side and a configuration in which three layers with different refractive indices are laminated in order of a medium refractive index layer (layer with a higher refractive index than that of the lower layer), a high refractive index layer, and a low refractive index layer, and a configuration in which a plurality of antireflection layers are laminated has been suggested. Among these, from the viewpoints of the durability, the optical characteristics, the cost, and the productivity, a configuration in which a medium refractive index layer, a high refractive index layer, and a low refractive index layer are sequentially laminated on a hard coat layer is preferable, and examples thereof include the configurations described in JP1996-122504A (JP-H08-122504A), JP1996-110401A (JP-H08-110401A), JP1998-300902A (JP-H10-300902A), JP2002-243906A, JP2000-111706A, and the like. Further, an antireflection film having a three-layer configuration with excellent robustness with respect to fluctuations in film thickness is described in JP2008-262187A. In a case where the antireflection film having the above-described three-layer configuration is provided on the surface of an image display device, the average value of the reflectivity can be set to 0.5% or less, the reflected glare can be significantly reduced, and an image with an excellent stereoscopic effect can be obtained. In addition, other functions may be imparted to each layer, and examples thereof include an antifouling low refractive index layer, an antistatic high refractive index layer, an antistatic hard coat layer, and an antiglare hard coat layer (the layers described in JP1998-206603A (JP-H10-206603A), JP2002-243906A, JP2007-264113A, and the like).

As one aspect of the present invention, as a foldable organic electroluminescence (hereinafter, also referred to as "EL") display device, the description of JP2018-56069A can be referred to except for the polarizer layer. A surface film is required because cover glass cannot be used. For example, paragraphs [0030] to [0040] describe that a polyimide-based resin is preferable as a base material having a curvature radius of 3 mm or less (for example, 3 mm, 2 mm, or 1 mm) and flexibility such that the base material can be bent preferably 200000 times, more preferably 300000 times, and still more preferably 500000 times and that an organic-inorganic hybrid material obtained by mixing silica particles and a cage-like silsesquioxane compound with an ultraviolet-curable acrylic resin is preferable.

As the surface protective layer in the present invention, a hard coat obtained by using a silsesquioxane compound having a structure described in JP2015-212353A, JP2017-008148A, and the like is preferable.

[Pressure-Sensitive Adhesive Layer and Adhesive Layer]

From the viewpoint of bonding the above-described $\lambda/4$ plate and the surface protective layer, the laminate according to the embodiment of the present invention may have a pressure-sensitive adhesive layer or an adhesive layer on the surface to which the $\lambda/4$ plate is bonded.

Examples of the pressure-sensitive adhesive contained in the pressure-sensitive adhesive layer include a rubber-based pressure-sensitive adhesive, an acrylic pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, and a cellulose-based pressure-sensitive adhesive. Among these, an acrylic pressure-sensitive adhesive (pressure-sensitive adhesive) is preferable from the viewpoints of the transparency, the weather resistance, the heat resistance, and the like.

The pressure-sensitive adhesive layer can be formed by a method of coating a release sheet with a solution of a pressure-sensitive adhesive, drying the solution, and transferring the sheet to a surface of a transparent resin layer or a method of directly coating a surface of a transparent resin layer with a solution of a pressure-sensitive adhesive and drying the solution.

A solution of a pressure-sensitive adhesive is prepared as a 10 to 40 mass % solution obtained by dissolving or dispersing the pressure-sensitive adhesive in a solvent such as toluene or ethyl acetate.

As a coating method, a roll coating method such as reverse coating or gravure coating, a spin coating method, a screen coating method, a fountain coating method, a dipping method, or a spray method can be employed.

Examples of the constituent material of the release sheet include appropriate thin paper bodies, for example, synthetic resin films such as polyethylene, polypropylene, and polyethylene terephthalate, rubber sheets, paper, cloth, nonwoven fabrics, nets, foam sheets, and metal foils.

In the present invention, the thickness of an optional pressure-sensitive adhesive layer is not particularly limited, but is preferably in a range of 3 μm to 50 μm, more preferably in a range of 4 μm to 40 μm, and still more preferably in a range of 5 μm to 30 μm.

The adhesive used in the present invention exhibits adhesiveness due to drying or reaction after attachment.

A polyvinyl alcohol-based adhesive (PVA-based adhesive) exhibits adhesiveness due to drying and is capable of bonding materials to each other.

Specific examples of the curable adhesive that exhibits adhesiveness due to reaction include an active energy ray-curable adhesive such as a (meth) acrylate-base d adhesive and a cationic polymerization curable adhesive. Further, the (meth)acrylate indicates acrylate and/or methacrylate. Examples of the curable component in the (meth)acrylate-based adhesive include a compound containing a (meth) acryloyl group and a compound containing a vinyl group.

Further, as the cationic polymerization curable adhesive, a compound containing an epoxy group or an oxetanyl group can also be used. The compound containing an epoxy group is not particularly limited as long as the compound contains at least two epoxy groups in a molecule, and various generally known curable epoxy compounds can be used. Preferred examples of the epoxy compound include a compound (aromatic epoxy compound) containing at least two epoxy groups and at least one aromatic ring in a molecule and a compound (alicyclic epoxy compound) containing at least two epoxy groups in a molecule, in which at least one of the epoxy groups is formed between two adjacent carbon atoms constituting an alicyclic ring.

FIG. 1 is a schematic cross-sectional view showing an example of the laminate according to the embodiment of the present invention. In FIG. 1, a laminate 100 is formed by laminating an optically anisotropic layer 12, a polarizer layer 14, a refractive index adjusting layer 16, a barrier layer 18, and a surface protective layer 20 in this order.

Figure 2:
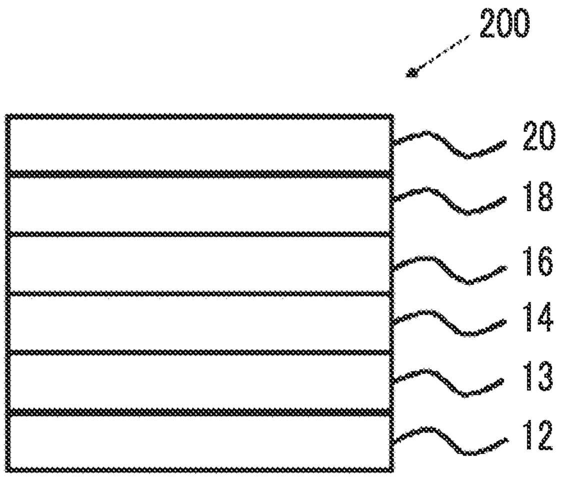
FIG. 2 is a schematic cross-sectional view showing an example of a laminate of the present invention.

FIG. 2 is a schematic cross-sectional view showing an example of the laminate according to the embodiment of the present invention. In FIG. 2, a laminate 200 is formed by laminating the optically anisotropic layer 12, an alignment layer 13, the polarizer layer 14, the refractive index adjusting layer 16, the barrier layer 18, and the surface protection layer 20 in this order. The laminate 200 has the same structure as the laminate 100 except that the alignment layer 13 is formed between the optically anisotropic layer 12 and the polarizer layer 14.

The details of each layer in FIGS. 1 and 2 are as described above, and thus the description thereof will not be repeated.

[Physical Characteristics of Laminate]

The haze of the laminate according to the embodiment of the present invention is preferably in a range of 0.2% to 3.0%, more preferably in a range of 0.2% to 1.5%, and particularly preferably in a range of 0.2% to 1.0%.

A method of measuring the haze of the laminate is as described in the section of examples.

[Applications]

The laminate according to the embodiment of the present invention can be used as a polarizer (polarizing plate) or the like, for example, as a linearly polarizing plate or a circularly polarizing plate.

In a case where the laminate of the present invention does not include an optically anisotropic layer such as the λ/4 plate, the laminate can be used as a linearly polarizing plate.

Meanwhile, in a case where the laminate of the present invention includes the λ/4 plate, the laminate can be used as a circularly polarizing plate.

[Image Display Device]

An image display device according to the embodiment of the present invention includes the above-described polarizer according to the embodiment of the present invention or the above-described laminate of the present invention.

The display element used in the image display device according to the embodiment of the present invention is not particularly limited, and examples thereof include a liquid crystal cell, an organic EL display panel, and a plasma display panel. Among these, a liquid crystal cell or an organic EL display panel is preferable, and a liquid crystal cell is more preferable. That is, in the image display device according to the embodiment of the present invention, a liquid crystal display device obtained by using a liquid crystal cell as a display element or an organic EL display device obtained by using an organic EL display panel as a display element is preferable.

[Liquid Crystal Display Device]

As a liquid crystal display device which is an example of the image display device according to the embodiment of the present invention, a form of a liquid crystal display device including the above-described polarizer according to the embodiment of the present invention and a liquid crystal cell is preferably exemplified. A liquid crystal display device including the above-described laminate of the present invention (here, the laminate does not include a λ/4 plate) and a liquid crystal cell is more suitable.

In the present invention, between the polarizing elements provided on both sides of the liquid crystal cell, it is preferable that the laminate of the present invention is used as a front-side polarizing element and more preferable that the laminate of the present invention is used as a front-side polarizing element and a rear-side polarizing element.

Hereinafter, the liquid crystal cell constituting the liquid crystal display device will be described in detail.

[Liquid Crystal Cell]

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystalline molecules are substantially horizontally aligned at the time of no voltage application and further twisted aligned at 60° to 120°. The liquid crystal cell in a TN mode is most likely used as a color thin film transistor (TFT) liquid crystal display device and is described in multiple documents.

In the liquid crystal cell in a VA mode, rod-like liquid crystalline molecules are substantially vertically aligned at the time of no voltage application. The concept of the liquid crystal cell in a VA mode includes (1) a liquid crystal cell in a VA mode in a narrow sense where rod-like liquid crystalline molecules are aligned substantially vertically at the time of no voltage application and substantially horizontally at the time of voltage application (described in JP1990-176625A (JP-H02-176625A)), (2) a liquid crystal cell (in an MVA mode) (SID97, described in Digest of tech. Papers (proceedings) 28 (1997) 845) in which the VA mode is formed to have multi-domain in order to expand the viewing angle, (3) a liquid crystal cell in a mode (n-ASM mode) in which rod-like liquid crystal molecules are substantially vertically aligned at the time of no voltage application and twistedly multi-domain aligned at the time of voltage application (described in proceedings of Japanese Liquid Crystal Conference, p. 58 to 59 (1998)), and (4) a liquid crystal cell in a SURVIVAL mode (presented at LCD International 98). Further, the liquid crystal cell may be of any of a patterned vertical alignment (PVA) type, a photo-alignment (optical alignment) type, or a polymer-sustained alignment (PSA) type. Details of these modes are described in JP2006-215326A and JP2008-538819A.

In the liquid crystal cell in an IPS mode, rod-like liquid crystal molecules are aligned substantially parallel to the substrate, and the liquid crystal molecules respond planarly through application of an electric field parallel to the substrate surface. In the IPS mode, black display is carried out in a state where no electric field is applied, and absorption axes of a pair of upper and lower polarizing plates are orthogonal to each other. A method of reducing leakage light during black display in an oblique direction and improve the viewing angle using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

[Organic EL Display Device]

As an organic EL display device which is an example of the image display device according to the embodiment of the present invention, a form of a display device including the above-described polarizer according to the embodiment of the present invention, a λ/4 plate, and an organic EL display panel in this order from the viewing side is suitably exemplified.

A form of a display device including the above-described laminate of the present invention which includes a λ/4 plate and an organic EL display panel in this order from the viewing side is more suitably exemplified. Examples thereof include an aspect in which the base material, the barrier layer, the alignment layer, the polarizer layer according to the embodiment of the present invention, and the λ/4 plate are disposed in this order from the viewing side, an aspect in which the barrier layer, the polarizer layer according to the embodiment of the present invention, the alignment layer, the base material, and the λ/4 plate are disposed in this order from the viewing side, and an aspect in which the glass substrate, the polarizer layer according to the embodiment of the present invention, the alignment layer, and the λ/4 plate are disposed in this order from the viewing side.

Further, the organic EL display panel is a display panel formed using an organic EL element having an organic light-emitting layer (organic electroluminescence layer) interposed between electrodes (between a cathode and an anode). The configuration of the organic EL display panel is not particularly limited, and a known configuration is employed.

EXAMPLES

Hereinafter, the present invention will be described in detail based on examples. The materials, the reagents, the amounts of materials, and the proportions of the materials, the operations, and the like shown in the following examples can be appropriately changed within a range not departing from the scope of the present invention. Therefore, the present invention is not limited to the following examples.

Example 1-1

[Preparation of Cellulose Acylate Film 1]

[Preparation of core layer cellulose acylate dope]

The following composition was put into a mixing tank and stirred to dissolve each component, thereby preparing a cellulose acetate solution used as a core layer cellulose acylate dope.

| Core layer cellulose acylate dope |
|---|
| Cellulose acetate having acetyl substitution degree of 2.88: 100 parts by mass |
| Polyester compound B described in example of JP2015-227955B: 12 parts by mass |

-continued

| Core layer cellulose acylate dope |
|---|
| Compound F shown below: 2 parts by mass |
| Methylene chloride (first solvent): 430 parts by mass |
| Methanol (second solvent): 64 parts by mass |

Compound F

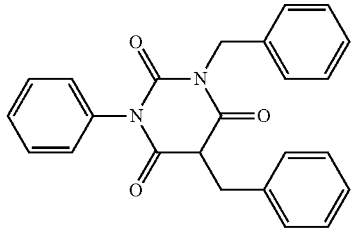

(Preparation of Outer Layer Cellulose Acylate Dope)

10 parts by mass of the following matting agent solution was added to 90 parts by mass of the above-described core layer cellulose acylate dope, thereby preparing a cellulose acetate solution used as an outer layer cellulose acylate dope.

| Matting agent solution |
|---|
| •Silica particles with average particle size of 20 nm (AEROSIL R972, manufactured by Nippon Aerosil Co., Ltd.): 2 parts by mass |
| •Methylene chloride (first solvent): 76 parts by mass |
| •Methanol (second solvent): 11 parts by mass |
| •Core layer cellulose acylate dope described above: 1 parts by mass |

(Preparation of Cellulose Acylate Film)

The core layer cellulose acylate dope and the outer layer cellulose acylate dope were filtered through filter paper having an average pore size of 34 μm and a sintered metal filter having an average pore size of 10 μm, and three layers which were the core layer cellulose acylate dope and the outer layer cellulose acylate dopes provided on both sides of the core layer cellulose acylate dope were simultaneously cast from a casting port onto a drum at 20° C. (band casting machine).

Next, the film was peeled off in a state where the solvent content was approximately 20% by mass, both ends of the film in the width direction were fixed by tenter clips, and the film was dried while being stretched at a stretching ratio of 1.1 times in the lateral direction.

Thereafter, the film was further dried by being transported between the rolls of the heat treatment device to prepare an optical film having a thickness of 40 μm, and the optical film was used as a cellulose acylate film 1 (support 1). The in-plane retardation of the obtained cellulose acylate film 1 was 0 nm.

[Preparation of Alignment Layer PA1]

The cellulose acylate film 1 was continuously coated with an alignment layer-forming coating solution PA1 described below with a wire bar. The support on which a coating film was formed was dried with warm air at 140° C. for 120 seconds, and the coating film was irradiated with polarized ultraviolet rays (10 mJ/$cm^2$, using an ultra-high pressure mercury lamp) to form a photo-alignment layer PA1, thereby obtaining a TAC film provided with a photo-alignment layer. The film thickness thereof was 0.5 μm.

| (Alignment layer-forming coating solution PA1) |
|---|
| Polymer PA1 shown below: 100.00 parts by mass<br>Acid generator PAG-1 shown below: 8.00 parts by mass<br>Acid generator CPI-110TF shown below: 0.005 parts by mass<br>Xylene: 1220.00 parts by mass<br>Methyl isobutyl ketone: 122.00 parts by mass |

PA1

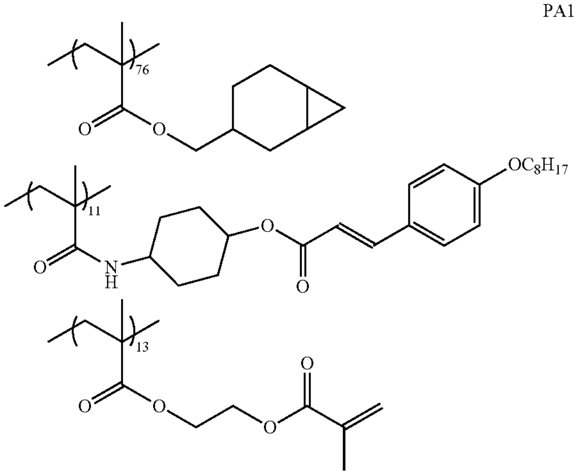

PAG-1

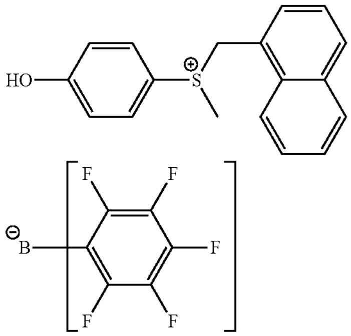

-continued

CPI-100TF

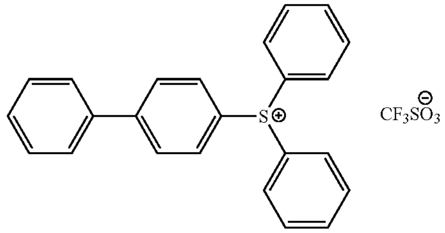

[Preparation of Polarizer Layer 1]

The obtained alignment film 1 was continuously coated with the following polarizer layer-forming composition 1 with a wire bar to form a coating layer.

Next, the coating layer was heated at 140° C. for 30 seconds and cooled to room temperature (23° C.). Next, the coating layer was heated at 90° C. for 60 seconds and cooled to room temperature again.

Thereafter, the coating layer was irradiated with light using a light emitting diode (LED) (center wavelength of 365 nm) under an irradiation condition of an illuminance of 200 mW/$cm^2$ for 2 seconds, thereby preparing a polarizer layer 1 on the photo-alignment layer PA1.

The film thickness of the polarizer layer 1 was 0.4 μm.

| Composition of polarizer layer-forming composition 1 |
|---|
| •Dichroic material Y1 shown below: 0.376 parts by mass<br>•Dichroic material M1 shown below: 0.417 parts by mass<br>•Dichroic material C1 shown below: 0.608 parts by mass<br>•Polymer liquid crystal compound Pl shown below: 3.761 parts by mass<br>•Low-molecular-weight liquid crystal compound L1 shown below: 0.636 parts by mass<br>•Polymerization initiator 11 (IRGACURE OXE-02, : manufactured by BASF SE) 0.174 parts by mass<br>•Surfactant F1 shown below: 0.029 parts by mass<br>•Cyclopentanone: 47.000 parts by mass<br>•Tetrahydrofuran: 47.000 parts by mass |

Y1

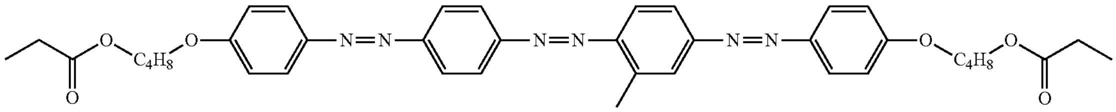

M1

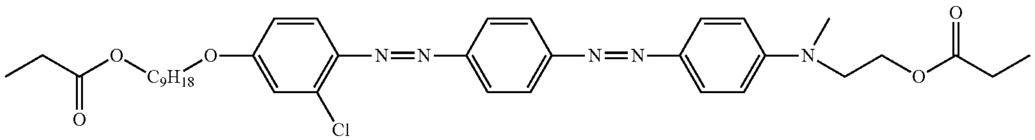

C1

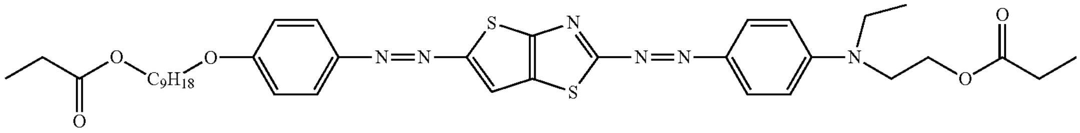

-continued

P1

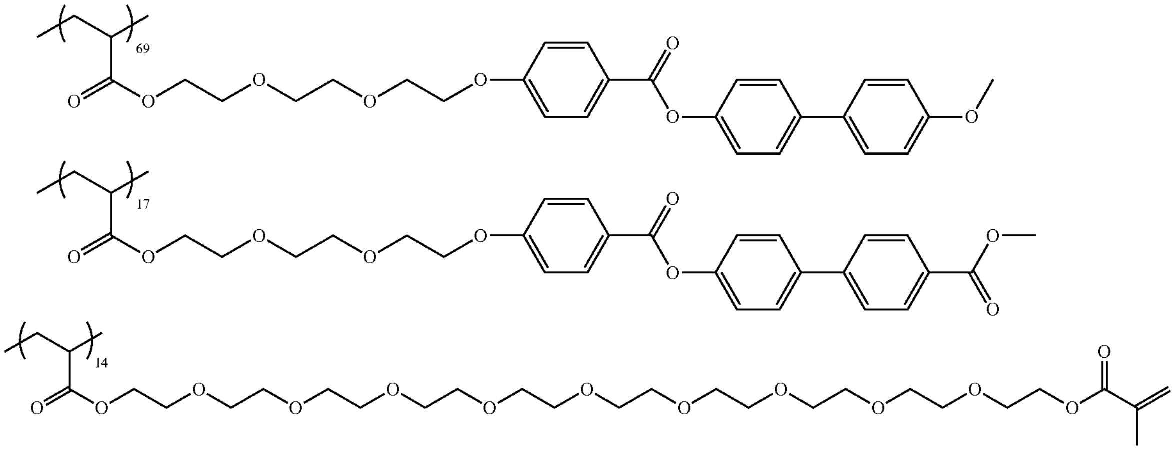

L1

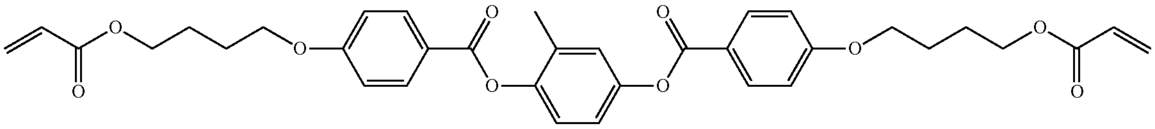

F1

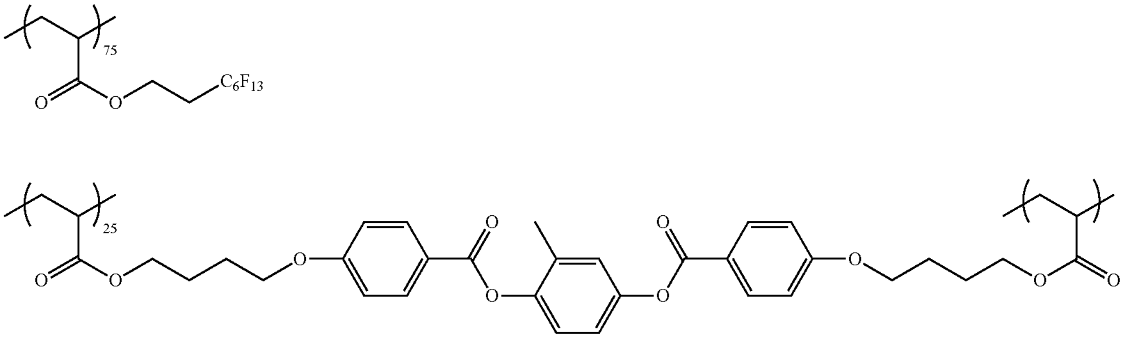

[Preparation of Refractive Index Adjusting Layer N1]

The obtained polarizer layer 1 was continuously coated with the following refractive index adjusting layer-forming composition N1 with a wire bar to form a cured layer.

Thereafter, the cured layer was dried at room temperature and irradiated using a high-pressure mercury lamp under an irradiation condition of an illuminance of 28 $mW/cm^2$ for 15 seconds, thereby preparing a refractive index adjusting layer N1 on the polarizer layer 1. The film thickness of the refractive index adjusting layer N1 was 0.05 μm (50 nm).

| Composition of refractive index adjusting layer-forming composition N1 |
| --- |
| •Mixture L1 of rod-like liquid crystal compounds shown below: 2.61 parts by mass |

-continued

| Composition of refractive index adjusting layer-forming composition N1 |
| --- |
| •Modified trimethylolpropane triacrylate shown below: 0.11 parts by mass |
| •Photopolymerization initiator BI1 shown below: 0.05 parts by mass |
| •Interface improver BF1 shown below: 0.21 parts by mass |
| •Methyl isobutyl ketone: 297 parts by mass |

Mixture L1 of rod-like liquid crystal compounds (numerical values in the following formulae are denoted in units of % by mass)

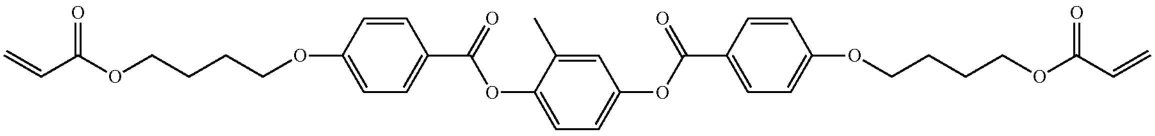

84%

-continued

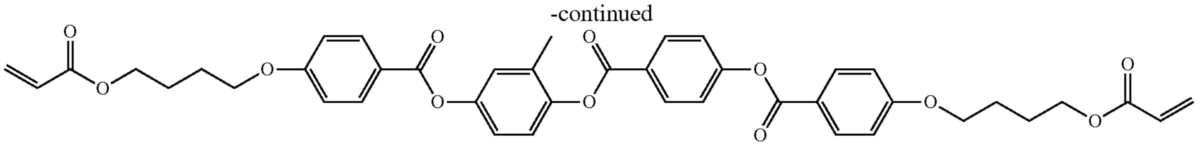

14%

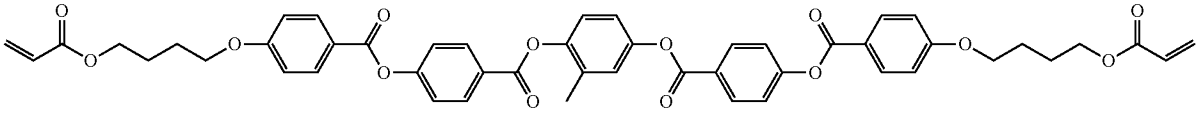

2%

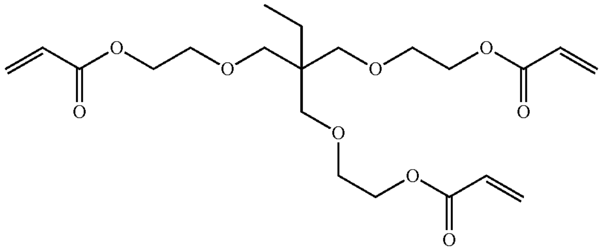

Modified trimethylolpropane triacrylate

BI1

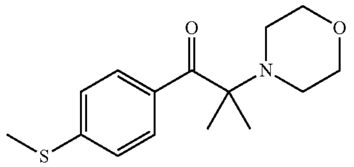

BF1

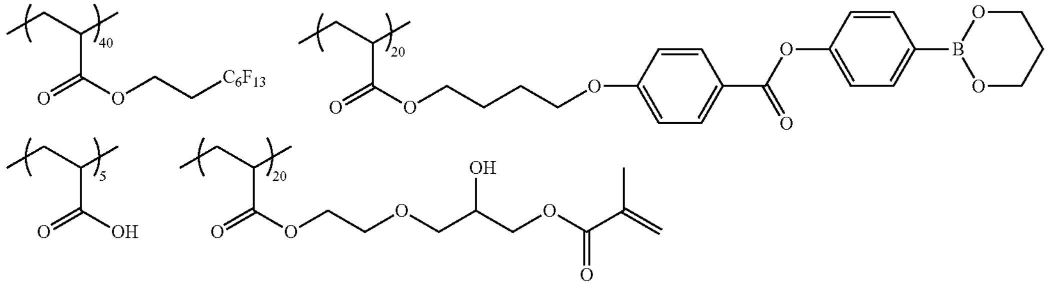

[Preparation of Barrier Layer B1]

The refractive index adjusting layer N1 was continuously coated with a coating solution having the following composition using a ware bar. Thereafter, the layer was dried with warm air at 100° C. for 2 minutes to prepare a laminate 1-1 of Example 1-1, in which a polyvinyl alcohol (PVA) barrier layer B1 having a thickness of 1.0 μm was formed on the refractive index adjusting layer N1.

| Composition of barrier layer-forming composition B1 |
|---|
| •Modified polyvinyl alcohol shown below: 3.80 parts by mass |
| •Initiator (IRGACURE 2959): 0.20 parts by mass |
| •Water: 70 parts by mass |
| •Methanol: 30 parts by mass |

Modified Polyvinyl Alcohol

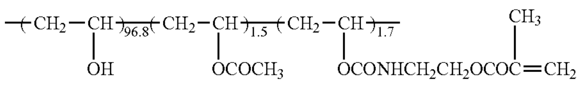

Examples 1-2 to 1-13 and 15 to 17 and Comparative Examples 1-1 and 1-2

Laminates 1-2 to 1-13 and 15 to 17 of Examples 1-2 to 1-13 and 15 to 17 and laminates 1H-1 and 1H-2 of Comparative Examples 1-1 and 1-2 were prepared in the same manner as in Example 1-1 except that the polarizer layer-forming composition 1 was changed to the composition listed in the first table shown below.

The outline of the components indicated by the symbols in the first table is shown below.

P2
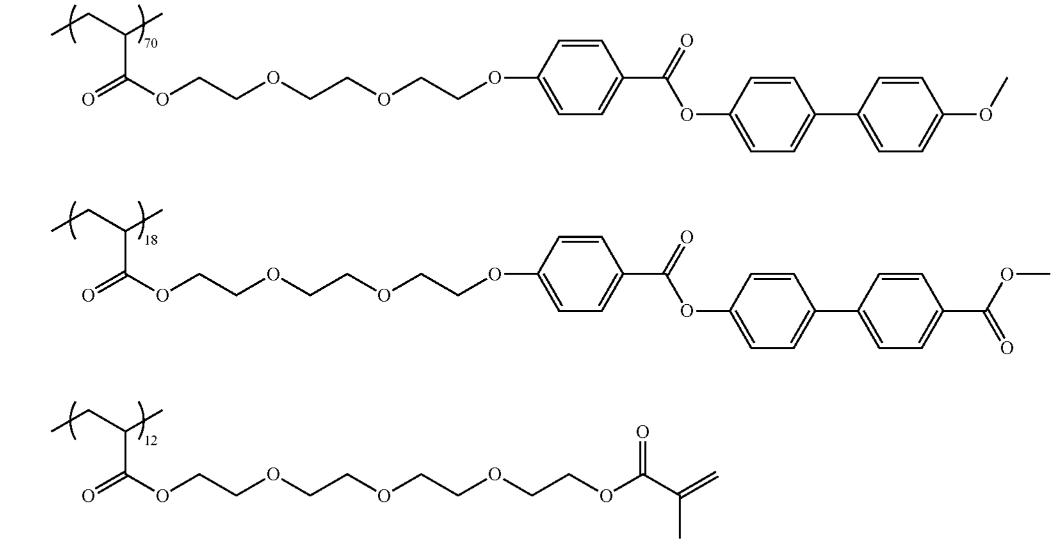
P3
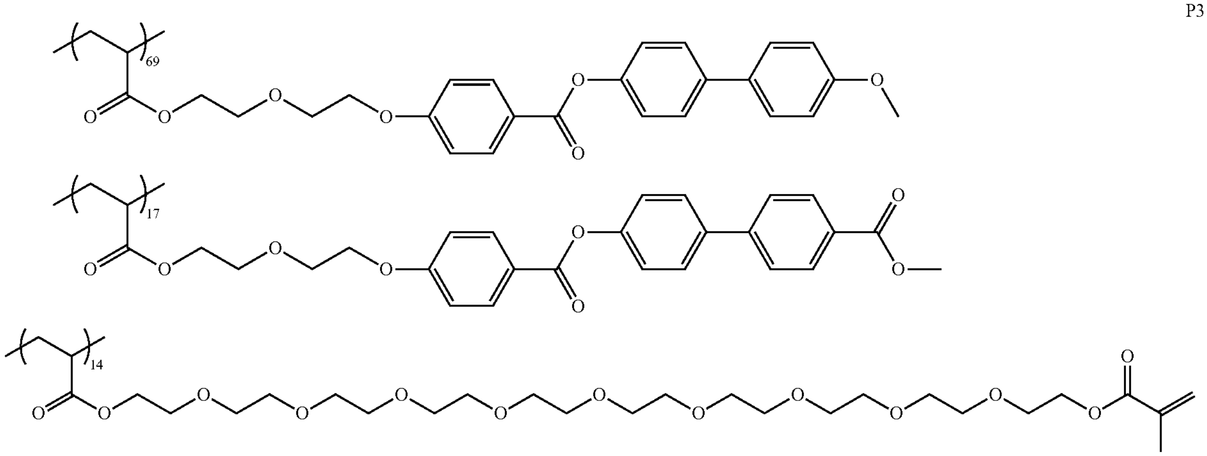
P4
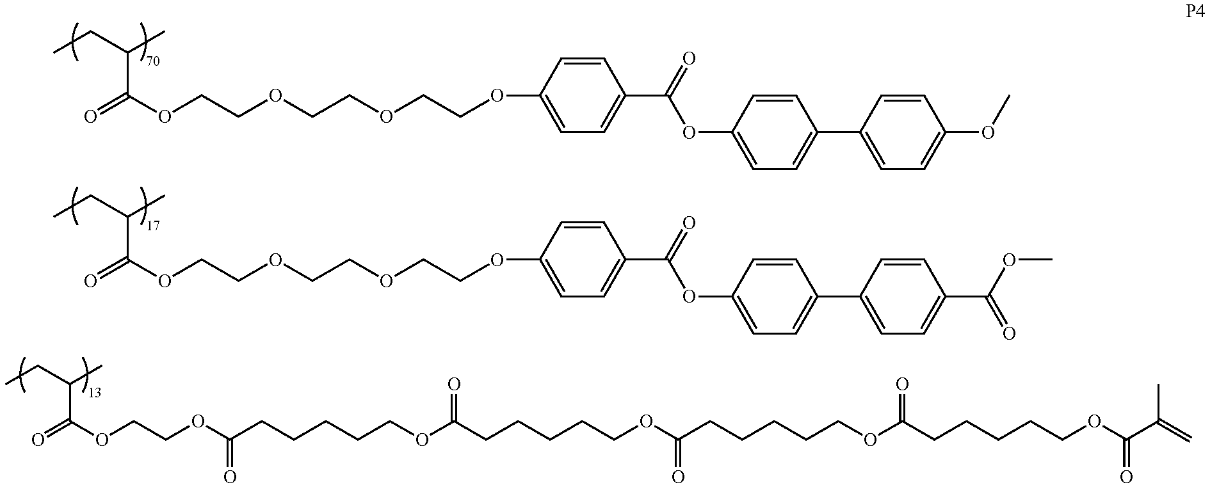
P5
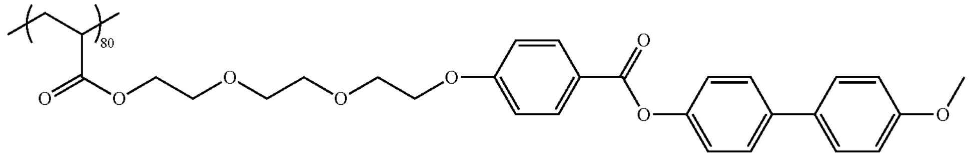

-continued
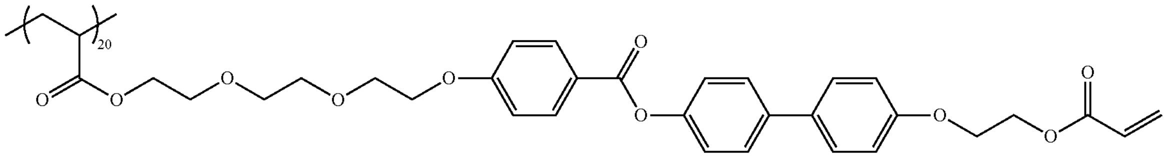
P6
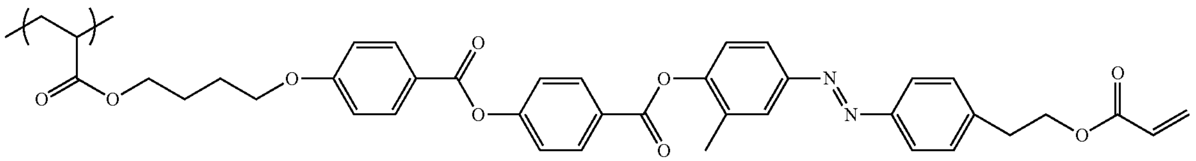
L2
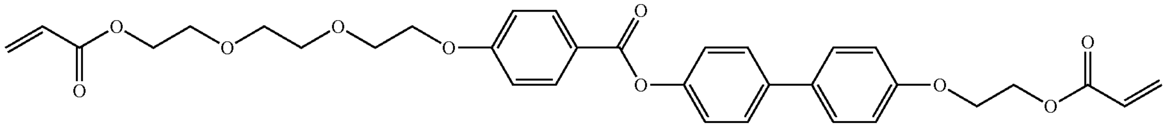
L3
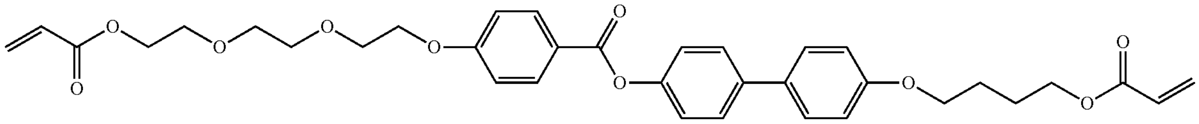
L4
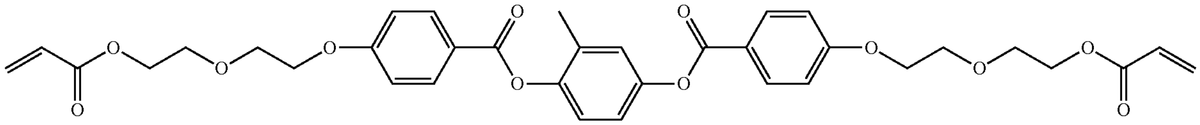
L5
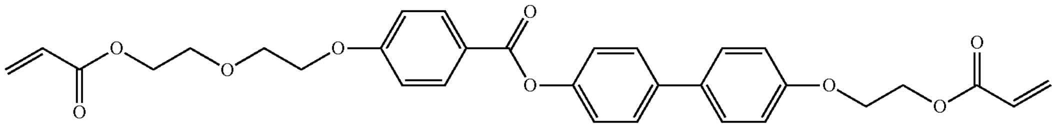
L6
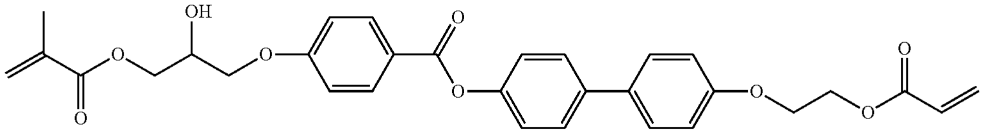
L7
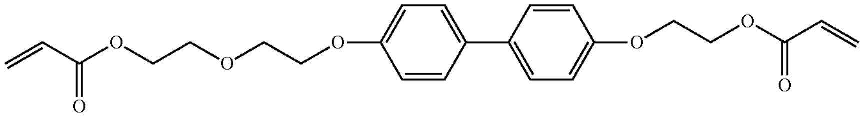
L8
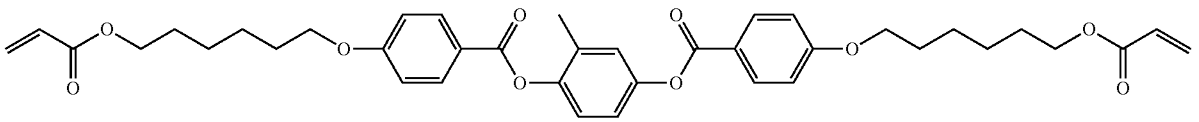
L9
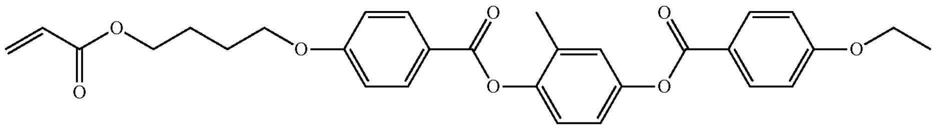

-continued
Y2
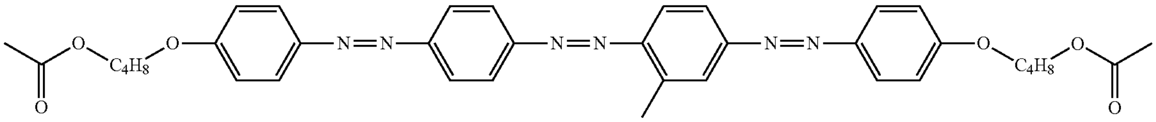
Y3
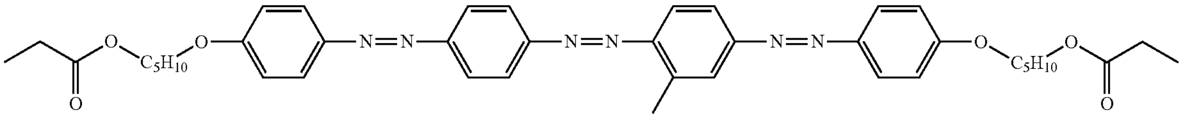
Y4
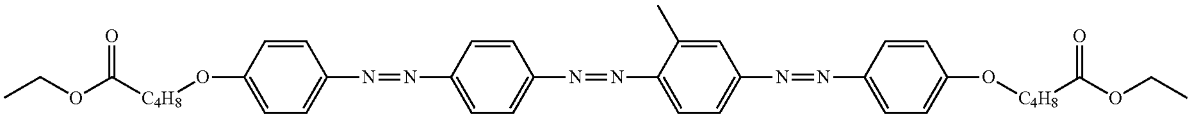
M2
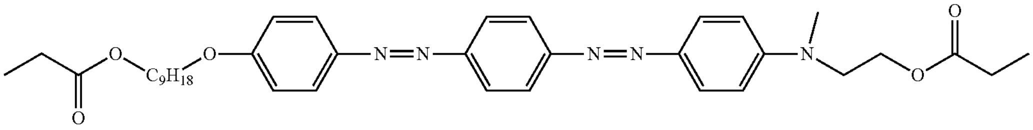
M3
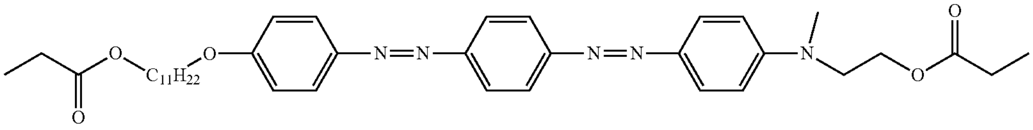
C2
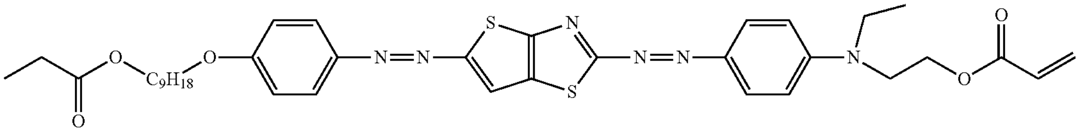
F2
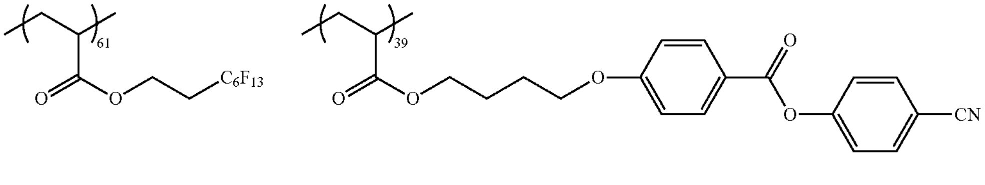
F3
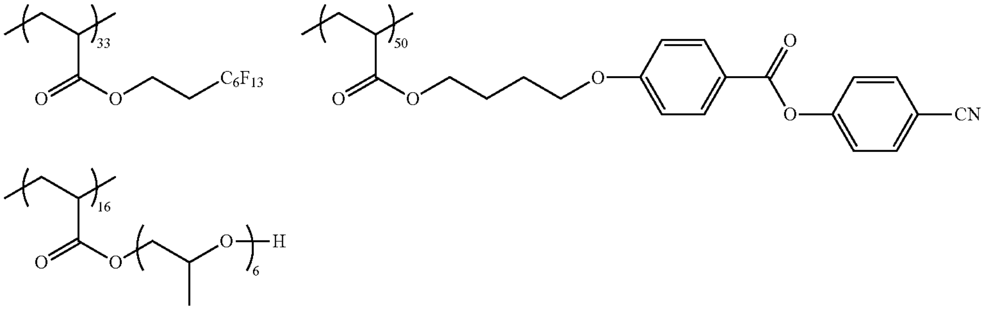
F4
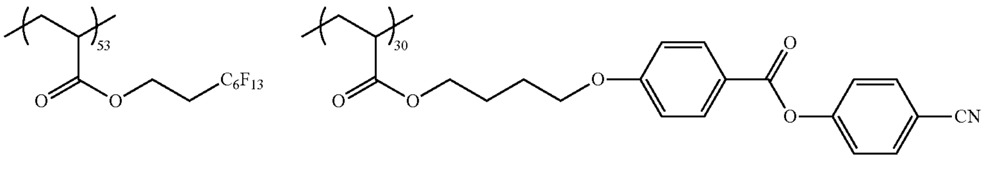

-continued

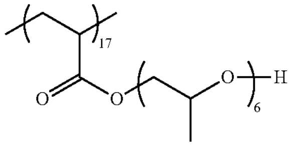

Example 1-14

A laminate 1-14 of Example 1-14 was prepared in the same manner as in Example 1-2 except that an alignment layer PA2 obtained by using an alignment film-forming coating solution containing a polymer PA2 was used in place of the polymer PA1 in the alignment layer-forming coating solution.

PA2

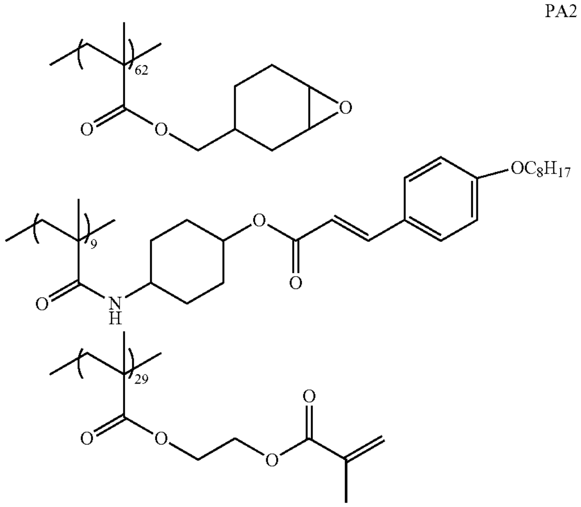

<Evaluation of Degree of Alignment>

Each laminate was set on a sample table in a state in which a linear polarizer was inserted on a light source side of an optical microscope (product name, "ECLIPSE E600 POL", manufactured by Nikon Corporation), the absorbance of the polarizer layer in a wavelength range of 400 nm to 700 nm was measured using a multi-channel spectrometer (product name, "QE65000", manufactured by Ocean Optics, Inc.), and the degrees of alignment was calculated according to the following equation and evaluated based on the following evaluation standards. The results are listed in the first table shown below.

Degree of alignment: $S=((Az0/Ay0)-1)/((Az0/Ay0)+2)$

Az0: Absorbance of polarizer layer with respect to polarized light in absorption axis direction Ay0: Absorbance of polarizer layer with respect to polarized light in polarization axis direction A: 0.96 or greater B: 0.94 or greater and less than 0.96

C: 0.90 or greater and less than 0.94

D: less than 0.90

<Evaluation of Adhesive Force>

The cellulose acylate film 1 of the prepared laminate was removed, and the cellulose acylate film 1 was reattached to using an adhesive N2 described below. Next, a total of 100 squares were cut on the surface on a side where the barrier layer B1 was provided by making 11 vertical cuts and 11 horizontal cuts in a grid pattern with a cutter knife, and polyester pressure-sensitive adhesive tape (No. 31B) (manufactured by Nitto Denko Corporation) was attached onto the surface thereof. The tape was quickly peeled off in the vertical direction after 30 minutes, the number of peeled squares was counted, and the evaluation was made according to the following standards. The results are listed in the first table shown below.

A: Peeling was not observed in 100 squares.

B: Peeling of 1 to 10 squares was observed in 100 squares.

C: Peeling of 11 to 30 squares was observed in 100 squares.

D: Peeling of 31 or more squares was observed in 100 squares.

TABLE 1

| First table (1) | Alignment layer | Polymer liquid crystal | | Low-molecular-weight liquid crystal compound | | Dichroic material | | Dichroic material | |
|---|---|---|---|---|---|---|---|---|---|
| | | Type | Parts by mass | Type | Parts by mass | Type | Parts by mass | Type | Parts by mass |
| Example 1-1 | PA1 | P1 | 3.761 | L1 | 0.636 | Y1 | 0.376 | M1 | 0.417 |
| Example 1-2 | PA1 | P1 | 4.102 | L2 | 0.624 | Y2 | 0.257 | M2 | 0.306 |
| Example 1-3 | PA1 | P1 | 2.909 | L2 | 1.818 | Y2 | 0.267 | M2 | 0.316 |
| Example 1-4 | PA1 | P1 | 4.082 | L3 | 0.619 | Y1 | 0.247 | M2 | 0.353 |
| Example 1-5 | PA1 | P1 | 3.909 | L4 | 0.711 | Y3 | 0.314 | M3 | 0.349 |
| Example 1-6 | PA1 | P1 | 4.119 | L5 | 0.584 | Y1 | 0.307 | M1 | 0.314 |
| Example 1-7 | PA1 | P1 | 4.125 | L6 | 0.563 | Y3 | 0.256 | M1 | 0.319 |
| Example 1-8 | PA1 | P1 | 4.050 | L7 | 0.648 | Y3 | 0.268 | M1 | 0.324 |
| Example 1-9 | PA1 | P2 | 4.310 | L1 | 0.560 | Y2 | 0.224 | M2 | 0.269 |
| Example 1-10 | PA1 | P3 | 4.077 | L5 | 0.647 | Y1 | 0.256 | M2 | 0.305 |
| Example 1-11 | PA1 | P4 | 4.127 | L2 | 0.610 | Y2 | 0.254 | M2 | 0.302 |
| Example 1-12 | PA1 | P5 | 3.330 | L2 | 1.388 | Y4 | 0.250 | M2 | 0.266 |
| Example 1-13 | PA1 | P1 | 2.909 | L2 | 1.818 | Y4 | 0.167 | M2 | 0.315 |
| Example 1-14 | PA2 | P1 | 4.102 | L2 | 0.624 | Y2 | 0.257 | M2 | 0.306 |
| Example 1-15 | PA1 | P1 | 2.929 | L2 | 1.775 | Y4 | 0.225 | M2 | 0.314 |

TABLE 1-continued

| | | | | | | | | | |
|---|---|---|---|---|---|---|---|---|---|
| Example 1-16 | PA1 | P1 | 3.038 | L2 | 1.674 | Y4 | 0.217 | M2 | 0.310 |
| Example 1-17 | PA1 | P1 | 4.138 | L9 | 0.591 | Y1 | 0.236 | M1 | 0.349 |
| Comparative Example 1-1 | PA1 | P1 | 4.091 | L8 | 0.642 | Y1 | 0.255 | M1 | 0.303 |
| Comparative Example 1-2 | PA1 | P6 | 3.761 | L1 | 0.636 | Y1 | 0.376 | M1 | 0.417 |

| | Dichroic material | | Surfactant | | Polymerization initiator | | Tetra-hydro- | Cyclo-pentanone |
|---|---|---|---|---|---|---|---|---|
| First table (1) | Type | Parts by mass | Type | Parts by mass | Type | Parts by mass | furan Type | Parts by mass |
| Example 1-1 | C1 | 0.608 | F1 | 0.029 | I1 | 0.174 | 47.000 | 47.000 |
| Example 1-2 | C2 | 0.478 | F2 | 0.055 | I1 | 0.178 | 47.000 | 47.000 |
| Example 1-3 | C2 | 0.461 | F2 | 0.048 | I1 | 0.182 | 47.000 | 47.000 |
| Example 1-4 | C1 | 0.458 | F2 | 0.043 | I1 | 0.198 | 47.000 | 47.000 |
| Example 1-5 | C1 | 0.474 | F1 | 0.065 | I1 | 0.178 | 47.000 | 47.000 |
| Example 1-6 | C1 | 0.443 | F2 | 0.053 | I1 | 0.178 | 47.000 | 47.000 |
| Example 1-7 | C1 | 0.500 | F1 | 0.050 | I1 | 0.188 | 47.000 | 47.000 |
| Example 1-8 | C1 | 0.486 | F1 | 0.056 | I1 | 0.168 | 47.000 | 47.000 |
| Example 1-9 | C2 | 0.420 | F2 | 0.050 | I1 | 0.168 | 47.000 | 47.000 |
| Example 1-10 | C2 | 0.476 | F2 | 0.055 | I1 | 0.183 | 47.000 | 47.000 |
| Example 1-11 | C2 | 0.471 | F2 | 0.054 | I1 | 0.181 | 47.000 | 47.000 |
| Example 1-12 | C1 | 0.555 | F2 | 0.050 | I1 | 0.161 | 47.000 | 47.000 |
| Example 1-13 | C2 | 0.461 | F2 | 0.048 | I1 | 0.182 | 47.000 | 47.000 |
| Example 1-14 | C2 | 0.478 | F2 | 0.055 | I1 | 0.173 | 47.000 | 47.000 |
| Example 1-15 | C2 | 0.527 | F3 | 0.053 | I1 | 0.178 | 47.000 | 47.000 |
| Example 1-16 | C2 | 0.527 | F4 | 0.048 | I1 | 0.186 | 47.000 | 47.000 |
| Example 1-17 | C1 | 0.435 | F2 | 0.053 | I1 | 0.177 | 47.000 | 47.000 |
| Comparative Example 1-1 | C1 | 0.473 | F1 | 0.055 | I1 | 0.182 | 47.000 | 47.000 |
| Comparative Example 1-2 | C1 | 0.608 | F1 | 0.029 | I1 | 0.174 | 47.000 | 47.000 |

TABLE 2

| | Polymer liquid crystal | | | | Low-molecular-weight liquid crystal | | | | | | | |
|---|---|---|---|---|---|---|---|---|---|---|---|---|
| | SPI | | MG1 | | SPL1 | | ML | | SPL2 | | Degree of | Adhesive |
| First table (2) | log P | D(Å) | log P | D(Å) | log P | D(Å) | log P | D(Å) | log P | D(Å) | alignment | force |
| Example 1-1 | −0.63 | 9.3 | 4.09 | 13.5 | 1.02 | 4.9 | 5.22 | 15.7 | 1.02 | 4.9 | C | C |
| Example 1-2 | −0.63 | 9.3 | 4.09 | 13.5 | −0.63 | 9.3 | 4.09 | 13.5 | −0.05 | 2.4 | A | B |
| Example 1-3 | −0.63 | 9.3 | 4.09 | 13.5 | −0.63 | 9.3 | 4.09 | 13.5 | −0.05 | 2.4 | A | A |
| Example 1-4 | −0.63 | 9.3 | 4.09 | 13.5 | −0.63 | 9.3 | 4.09 | 13.5 | 1.02 | 4.9 | B | B |
| Example 1-5 | −0.63 | 9.3 | 4.09 | 13.5 | −0.38 | 6.0 | 5.22 | 15.7 | −0.38 | 6.0 | B | C |
| Example 1-6 | −0.63 | 9.3 | 4.09 | 13.5 | −0.38 | 6.0 | 4.09 | 13.5 | −0.05 | 2.4 | A | B |
| Example 1-7 | −0.63 | 9.3 | 4.09 | 13.5 | 0.10 | 3.8 | 4.09 | 13.5 | −0.05 | 2.4 | C | B |
| Example 1-8 | −0.63 | 9.3 | 4.09 | 13.5 | −0.38 | 6.0 | 3.70 | 7.1 | −0.05 | 2.4 | B | B |
| Example 1-9 | −0.63 | 9.3 | 4.09 | 13.5 | 1.02 | 4.9 | 5.22 | 15.7 | 1.02 | 4.9 | C | C |
| Example 1-10 | −0.38 | 6.0 | 4.09 | 13.5 | −0.38 | 6.0 | 4.09 | 13.5 | −0.05 | 2.4 | A | B |
| Example 1-11 | −0.63 | 9.3 | 4.09 | 13.5 | −0.63 | 9.3 | 4.09 | 13.5 | −0.05 | 2.4 | A | B |
| Example 1-12 | −0.63 | 9.3 | 4.09 | 13.5 | −0.63 | 9.3 | 4.09 | 13.5 | −0.05 | 2.4 | A | B |
| Example 1-13 | −0.63 | 9.3 | 4.09 | 13.5 | −0.63 | 9.3 | 4.09 | 13.5 | −0.05 | 2.4 | A | A |
| Example 1-14 | −0.63 | 9.3 | 4.09 | 13.5 | −0.63 | 9.3 | 4.09 | 13.5 | −0.05 | 2.4 | A | A |
| Example 1-15 | −0.63 | 9.3 | 4.09 | 13.5 | −0.63 | 9.3 | 4.09 | 13.5 | −0.05 | 2.4 | A | A |
| Example 1-16 | −0.63 | 9.3 | 4.09 | 13.5 | −0.63 | 9.3 | 4.09 | 13.5 | −0.05 | 2.4 | A | A |
| Example 1-17 | −0.63 | 9.3 | 4.09 | 13.5 | 1.02 | 4.9 | 5.22 | 15.7 | −0.43 | 0.8 | B | C |
| Comparative Example 1-1 | −0.63 | 9.3 | 4.09 | 13.5 | 1.88 | 7.4 | 5.22 | 15.7 | 1.88 | 7.4 | D | C |
| Comparative Example 1-2 | 1.02 | 4.9 | 5.11 | 21.9 | 1.02 | 4.9 | 5.22 | 15.7 | 1.02 | 4.9 | C | D |

Example 1-18

A laminate 1-18 was prepared in the same manner as the laminate 1-1 of Example 1-1 except that the refractive index adjusting layer N1 was not formed. The degree of alignment and the adhesiveness were evaluated by the same method as in Example 1-1, and the following results were obtained.

Degree of alignment: A

Adhesive force: C

Examples 2-1 to 2-3 and Comparative Example 2-1

Laminates 2-1 to 2-3 of Examples 2-1 to 2-3 Examples 2-1 listed in Table 2 and a laminate 2H-1 of Comparative Example were prepared in the same manner as described above except that the refractive index adjusting layer N1 and the barrier layer B1 in Examples 1-1 to 1-3 and Comparative Example 1-1 were not provided.

<Evaluation of Haze>

A sample in which the photo-alignment layer PA1 was laminated on the support 1 was prepared on Haze Meter ND4000 (manufactured by Nippon Denshoku Industries Co., Ltd.), and the photo-alignment layer side was set as the incident side, and reference measurement was performed. Subsequently, the polarizer layer side of the prepared laminate was set as the incident side, and the direction parallel to polarization irradiation light of the photo-alignment layer was set horizontally, haze measurement was performed three times, and the average value (Hz1) thereof was calculated. Next, the barrier layer side of the identical laminate was set as the incident side, the direction perpendicular to polarization irradiation light of the photo-alignment layer was set horizontally, haze measurement was performed three times, the average value (Hz2) thereof was calculated, and the average value of Hz1 and Hz2 was defined as the haze value. The results are listed in Table 2.

TABLE 3

| Second table | Laminate | | | | |
|---|---|---|---|---|---|
| | | Support | Alignment layer | Polarizer layer | Haze |
| Example 2-1 | 2-1 | Cellulose acylate film 1 | PA1 | Polarizer layer of Example 1-1 | 1.5 |
| Example 2-2 | 2-2 | Cellulose acylate film 1 | PA1 | Polarizer layer of Example 1-2 | 0.4 |
| Example 2-3 | 2-3 | Cellulose acylate film 1 | PA1 | Polarizer layer of Example 1-3 | 0.4 |
| Comparative Example 1-1 | 2H-1 | Cellulose acylate film 1 | PA1 | Polarizer layer of Comparative Example 1-1 | 3.2 |

According to the composition of the present invention, a polarizer having a low haze in addition to a high degree of alignment and excellent adhesiveness can be formed.

<Preparation of Optically Anisotropic Layer>

(Preparation of Positive A-Plate A1)

A photo-alignment layer-forming composition E1 was prepared with the following composition, dissolved for 1 hour while being stirred, and filtered through a 0.45 μm filter.

| Photo-alignment layer-forming composition E1 |
|---|
| •Photoactive compound E-1 shown below: 5.0 parts by mass |
| •Cyclopentanone: 95.0 parts by mass |

Photoactive Compound E-1

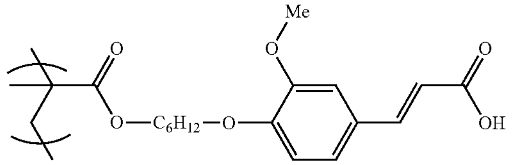

(Preparation of Positive A-Plate-Forming Composition A1)

A positive A-plate-forming composition A1 having the following composition was prepared.

| Composition of positive A-plate-forming composition A1 |
|---|
| •Liquid crystal compound L-1 shown below: 70.00 parts by mass |
| •Liquid crystal compound L-2 shown below: 30.00 parts by mass |
| •Polymerization initiator OXE-03 (manufactured by BASF Japan Ltd.): 7.50 parts by mass |
| •Polymerization initiator Irg369 (manufactured by BASF SE): 3.00 parts by mass |
| •Leveling agent BYK-361N: 0.10 parts by mass |
| •Methyl ethyl ketone (solvent): 60.00 parts by mass |
| •Cyclopentanone (solvent): 240.00 parts by mass |

L-1

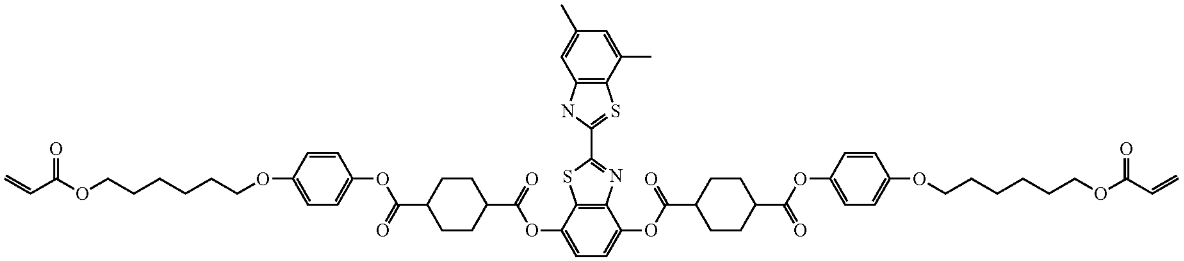

L-2

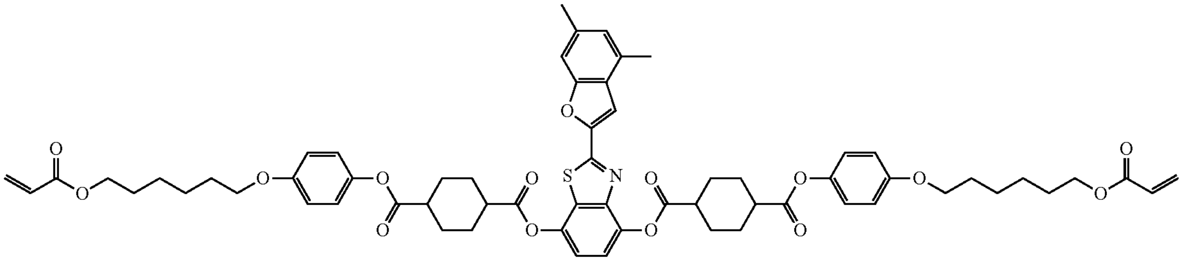

A cellulose triacetate film TJ40 (manufactured by Fujifilm Corporation: thickness of 40 μm) coated with the photo-alignment layer-forming composition E1 and dried at 80° C. for 1 minute. Thereafter, the obtained coating film was irradiated with linearly polarized ultraviolet rays (100 mJ/cm$^2$) using a polarized ultraviolet exposure device to prepare a photo-alignment layer E1 having a thickness of 100 nm.

The obtained photo-alignment layer E1 was coated with the positive A-plate-forming composition A1 with a wire bar. Next, the obtained coating film was heated at 120° C. for 90 seconds and cooled to room temperature.

Thereafter, the positive A-plate A1 was formed by irradiating the coating film with ultraviolet rays with an exposure dose of 1200 mJ/cm$^2$ using a high-pressure mercury lamp.

The thickness of the positive A-plate A1 was 2 μm, and Re (550) was 145 nm. Further, the positive A-plate A1 satisfied the relationship of "Re (450)≤Re (550)≤Re (650)". Re (450)/Re (550) was 0.85.

(Preparation of Positive C-Plate C1)

The above-described cellulose acylate film 1 was used as a temporary support.

The cellulose acylate film 1 was allowed to pass through a dielectric heating roll at a temperature of 60° C., the film surface temperature was increased to 40° C., one surface of the film was coated with an alkaline solution having the following composition such that the coating amount reached 14 ml/m$^2$ using a bar coater and heated to 110° C., and the film was transported for 10 seconds under a steam-type far-infrared heater (manufactured by Noritake Co., Ltd.).

Next, the film was coated with pure water such that the coating amount reached 3 ml/m$^2$ using the same bar coater.

Next, the process of washing the film with water using a fountain coater and draining the film using an air knife was repeated three times, and the film was transported to a drying zone at 70° C. for 10 seconds and dried, thereby preparing a cellulose acylate film 1 which had been subjected to an alkali saponification treatment.

| (Alkaline solution) |
|---|
| Potassium hydroxide: 4.7 parts by mass |
| Water: 15.8 parts by mass |
| Isopropanol: 63.7 parts by mass |
| Surfactant SF-1 ($C_{14}H_{29}O(CH_2CH_2O)_{20}H$): 1.0 parts by mass |
| Propylene glycol: 14.8 parts by mass |

The cellulose acylate film 1 that had been subjected to the alkali saponification treatment was continuously coated with an alignment layer-forming coating solution 3 having the following composition using a #8 ware bar. The obtained film was dried with warm air at 60° C. for 60 seconds and further dried with warm air at 100° C. for 120 seconds, thereby forming an alignment layer.

| (Alignment layer-forming coating solution 3) |
|---|
| Polyvinyl alcohol (PVA103, manufactured by Kuraray Co., Ltd.): 2.4 parts by mass |
| Isopropyl alcohol: 1.6 parts by mass |
| Methanol: 36 parts by mass |
| Water: 60 parts by mass |

The alignment layer was coated with a positive C-plate-forming coating solution C1 described below, the obtained coating film was aged at 60° C. for 60 seconds and irradiated with ultraviolet rays with a light dose of 1000 mJ/cm$^2$ using an air-cooled metal halide lamp at an illuminance of 70 mW/cm$^2$ (manufactured by Eye Graphics Co., Ltd.), and the alignment state thereof was immobilized to vertically align the liquid crystal compound, thereby preparing a positive C-plate C1 having a thickness of 0.5 μm.

The Rth (550) of the obtained positive C-plate was −60 nm.

| (Positive C-plate-forming coating solution C1) |
|---|
| Liquid crystal compound L-11 shown below: 80 parts by mass<br>Liquid crystal compound L-12 shown below: 20 parts by mass<br>Vertical alignment agent S01 (alignment control agent) shown below: 1 part by mass<br>Ethylene oxide-modified trimethylolpropane triacrylate (V # 360, manufactured by Osaka Organic Chemical Industry Ltd.): 8 parts by mass<br>IRGACURE 907 (manufactured by BASF SE): 3 parts by mass<br>KAYACURE DETX (manufactured by Nippon Kayaku Co., Ltd.): 1 part by mass<br>Compound B03 (surfactant) shown below: 0.4 parts by mass<br>Methyl ethyl ketone: 170 parts by mass<br>Cyclohexanone: 30 parts by mass |

95 parts by mass of butyl acrylate and 5 parts by mass of acrylic acid were polymerized by a solution polymerization method in a reaction container equipped with a cooling pipe, a nitrogen introduction pipe, a thermometer, and a stirrer, thereby obtaining an acrylate-based polymer (A1) with an average molecular weight of 2000000 and a molecular weight distribution (Mw/Mn) of 3.0.

Next, each pressure-sensitive adhesive was prepared with each of the following compositions in the third table shown below using the obtained acrylate-based polymer (A1). Each separate film that had been subjected to a surface treatment with a silicone-based release agent was coated with the composition using a die coater, dried in an environment of 90° C. for 1 minute, and irradiated with ultraviolet rays (UV) under the following conditions, thereby obtaining pressure-sensitive adhesive sheets N1 to N3. The compositions of the pressure-sensitive adhesives and the film thicknesses of the pressure-sensitive adhesive sheets are listed in the third table shown below.

L-11

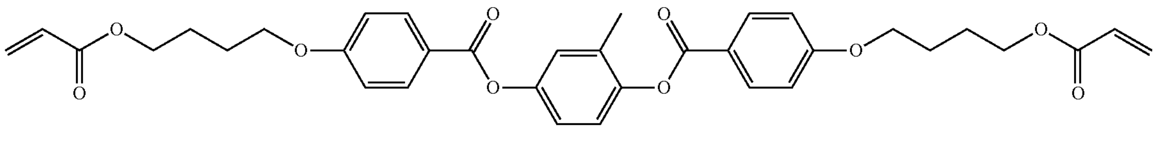

L-12

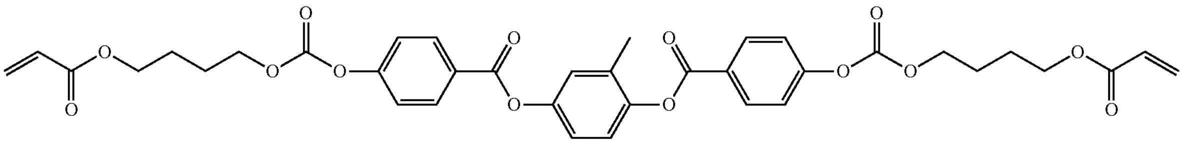

S01

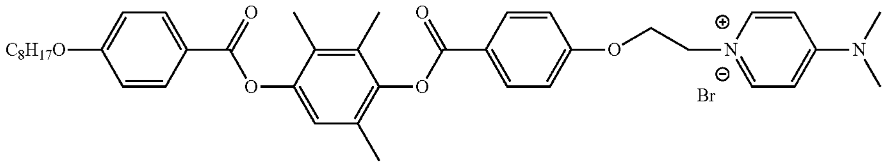

Compound B03

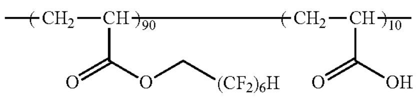

Mw:15k
Each numerical value in the structure is denoted in units of % by mass

<Preparation of Pressure-Sensitive Adhesive Sheets N1 to N3>

Next, an acrylate-based polymer was prepared according to the following procedures.

<UV Irradiation Conditions>

Electrodeless lamp H bulb (Fusion Co., Ltd.)

Illuminance of 600 $mW/cm^2$, light dose of 150 $mJ/cm^2$

The UV illuminance and the light dose were measured using "UVPF-36" (manufactured by Eye Graphics Co., Ltd.).

TABLE 4

| Third table | Acrylate-based polymer (A1) | Composition of pressure-sensitive adhesive (parts by mass) (A) Polyfunctional acrylate-based monomer | (B) Photo-polymerization initiator | (C) Isocyanate-based crosslinking agent | (D) Silane coupling agent | (E) UV absorbing agent | Film thickness (μm) |
|---|---|---|---|---|---|---|---|
| N1 | 100 | 11.1 | 1.1 | 1 | 0.2 | — | 5 |
| N2 | 100 | — | — | 1 | 0.2 | — | 25 |
| N3 | 100 | — | — | 1 | 0.2 | 1.2 | 25 |

(A) Polyfunctional acrylate-based monomer: tris(acryloyloxyethyl) isocyanurate, molecular weight=423, trifunctional type (trade name, "ARONIX M-315", manufactured by Toagosei Co., Ltd.), (B) Photopolymerization initiator: mixture of benzophenone and 1-hydroxycyclohexylphenyl ketone at mass ratio of 1:1, "IRGACURE 500" (manufactured by Ciba Specialty Chemicals, Inc.)

(C) Isocyanate-based crosslinking agent: trimethylolpropane-modified tolylene diisocyanate ("CORONATE L", manufactured by Nippon Polyurethane Industry Co., Ltd.)

(D) Silane coupling agent: 3-glycidoxypropyltrimethoxysilane ("KBM-403", manufactured by Shin-Etsu Chemical Co., Ltd.)

(E) UV absorbing agent (structure shown below): λmax=389 nm (in 2-butanone)

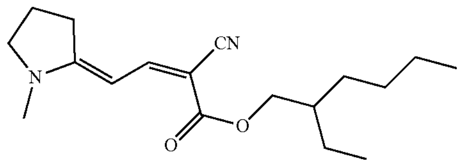 [SMILES: CCCCC(CC)COC(=O)/C(C#N)=C\C=C1/CCCN1C]

<Preparation of UV Adhesive>

The following UV adhesives were prepared.

| UV adhesive |
|---|
| •CEL2021P (manufactured by Daicel Corporation) shown below: 70 parts by mass |
| •1,4-Butanediol diglycidyl ether: 20 parts by mass |
| •2-Ethylhexyl glycidyl ether: 10 parts by mass |
| •CPI-100P (compound shown below): 2.25 parts by mass |

CPI-100P

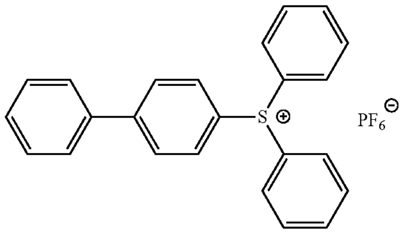

<Preparation of Laminates 1-1' to 1-17'>

The phase difference side of the positive A-plate A1 and the phase difference side of the positive C-plate C1 were attached to each other by irradiation with UV rays having a light dose of 600 mJ/cm$^2$ using the UV adhesive. Hereinafter, the UV adhesive was used under the same conditions as described above. The thickness of the UV adhesive layer was 1.5 μm. Further, the surfaces to be attached with the UV adhesive were respectively subjected to a corona treatment (the same applies hereinafter). Next, the photo-alignment layer on the positive A-plate A1 side and the cellulose triacetate film TJ40 were removed to obtain a phase difference plate 1.

A low-reflection surface protective film 1 was prepared with reference to Sample No. 1 of Example 1 of JP2008-262187A. The barrier layer side of the laminate 1-1 was attached to the support side of the low-reflection surface protective film 1 using the pressure-sensitive adhesive sheet NE Next, only the cellulose acylate film 1 was removed, and the removed surface and the phase difference side of the positive A-plate A1 of the phase difference plate 1 were attached to each other using the pressure-sensitive adhesive N1, thereby preparing a laminate 1-1'. Here, the attachment was made such that the angle between the absorption axis of the polarizer layer and the slow axis of the positive A-plate A1 reached 45°.

Laminates 1-2' to 1-17' were prepared in the same manner as described above except that the laminate 1-1 of Example 1-1 was changed to the laminates 1-2 to 1-17 of Examples 1-2 to 1-17.

<Preparation of Organic EL Display Device>

GALAXY S4 (manufactured by Samsung Electronics Co., Ltd.) equipped with an organic EL panel (organic EL display element) was disassembled, the touch panel provided with a circularly polarizing plate was peeled off from the organic EL display device, and the circularly polarizing plate was further peeled off from the touch panel so that the organic EL display element, the touch panel, and the circularly polarizing plate were isolated from each other. Next, the isolated touch panel was reattached to the organic EL display element, each of the above-described laminates 1-1' to 1-17' was further attached to the touch panel using the pressure-sensitive adhesive sheet N2 to prepare an organic EL display device, and the effects of the antireflection were confirmed to be seen.

[Preparation of Laminate of Example 3-1]

A laminate 3-1 was prepared in the same manner as described above except that a pressure-sensitive adhesive sheet N3 was used for the laminate 1-2' in place of the pressure-sensitive adhesive sheet NE As listed in the fourth table shown below, the laminate 3-1 exhibited more satisfactory light fastness than that of a laminate 3-4 for which the pressure-sensitive adhesive sheet N1 was used.

[Preparation of Laminate of Example 3-2]

A laminate 3-2 was prepared in the same manner as described above except that a barrier layer was not formed on the laminate 1-2' and a glass base material (aluminosilicate strengthened glass) having a thickness of 500 μm was used in place of the antireflection surface protective film 1. As listed in the fourth table shown below, the laminate 3-2 exhibited more satisfactory light fastness than that of a laminate 3-5 for which the antireflection surface protective film 1 was used.

[Preparation of Laminate of Example 3-3]

A laminate 3-3 was prepared in the same manner as described above except that a barrier layer was not formed on the laminate 1-2 and an AR film (AR100, manufactured by Dexerials Corporation, 91 μm) having a multilayer sputtered metal oxide film was used in place of the low-reflection surface protective film 1. As listed in the fourth table shown below, the laminate 3-3 exhibited more satisfactory light fastness than that of the laminate 3-5 for which the low-reflection surface protective film 1 was used.

[Preparation of Laminate of Example 3-4]

The laminate 1-2' was used as a laminate 3-4.

[Preparation of Laminate of Example 3-5]

A laminate 3-5 was prepared in the same manner as described above except that a barrier layer was not formed on the laminate 1-2'. As listed in the fourth table shown below, the laminate 3-5 exhibited inferior light fastness compared to that of the laminate 3-4 including a barrier layer.

<Evaluation of Light Fastness>

A sample obtained by removing the cellulose acylate film 1 and attaching each of the laminates of Examples 3-1 to 3-5 to a 1.1 cm glass substrate using the adhesive N2 was prepared. The sample was set on a sample table of an optical microscope (product name, "ECLIPSE E600 POL", manufactured by Nikon Corporation), the absorbance in a wavelength range of 400 nm to 700 nm was measured at a pitch of 1 nm using a multi-channel spectrometer (product name, "QE65000", manufactured by Ocean Optics, Inc.). Subsequently, the sample was set in an Xe light fastness tester (light source XB-50101AA-A: manufactured by Ushio Inc.) and irradiated for 40 hours from a side opposite to the glass substrate. The absorbance of the sample was measured in the same manner as before the irradiation, the rate of change in absorbance before and after the irradiation at each wavelength was calculated, and the average value at 400 to 700 nm defined as the rate of change in absorbance.

A: The rate of change in absorbance was less than 50%

B: The rate of change in absorbance was 50% or greater and less than 75%

C: The rate of change in absorbance was 75% or greater

Example 4-1

A laminate 4-1 of Example 4-1 was obtained in the same manner as described above except that the refractive index adjusting layer N1 and the barrier layer B1 were not formed on the laminate 1-2 of Example 1-2.

Example 4-2

[Preparation of Alignment Layer Rb1]

The cellulose acylate film 1 that had been subjected to a saponification treatment was coated with an alignment film coating liquid Rb1 having the following composition using a #17 wire bar.

Thereafter, a modified polyvinyl alcohol (PVA) alignment film Rb1 was formed on the cellulose acylate film by drying the solution with warm air at 110° C. for 2 minutes.

Further, the modified polyvinyl alcohol was added to the alignment film coating solution such that the concentration thereof reached 4% by mass.

| Composition of alignment film coating solution Rb1 |
|---|
| •Modified vinyl alcohol (PVA-1 shown below): 4.00 parts by mass |
| •Water: 74.08 parts by mass |
| •Methanol: 21.86 parts by mass |
| •Photopolymerization initiator (IRGACURE 2959, manufactured by BASF SE): 0.06 parts by mass |

Modified Polyvinyl Alcohol

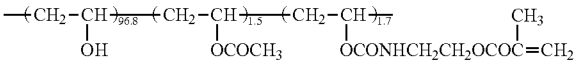

The obtained alignment layer Rb1 was subjected to a rubbing treatment (1000 rotations, stage speed of 1.8 m/min) once to prepare an alignment layer Rb1.

TABLE 5

| Fourth table | Laminate | | | | | | | | Light fastness |
|---|---|---|---|---|---|---|---|---|---|
| | | Support | Alignment layer | Polarizer layer | Refractive index adjusting layer | Barrier layer | Pressure-sensitive adhesive layer | Surface protective layer | |
| Example 3-1 | 3-1 | Cellulose acylate film 1 | PA1 | Polarizer layer of Example 1-2 | Refractive index adjusting layer N1 | Barrier layer B1 | Pressure-sensitive adhesive N3 | Low-reflection surface protective film 1 | A |
| Example 3-2 | 3-2 | Cellulose acylate film 1 | PA1 | Polarizer layer of Example 1-2 | Refractive index adjusting layer N1 | — | Pressure-sensitive adhesive N1 | Glass base material | B |
| Example 3-3 | 3-3 | Cellulose acylate film 1 | PA1 | Polarizer layer of Example 1-2 | Refractive index adjusting layer N1 | — | Pressure-sensitive adhesive N1 | AR100 | B |
| Example 3-4 | 3-4 | Cellulose acylate film 1 | PA1 | Polarizer layer of Example 1-2 | Refractive index adjusting layer N1 | Barrier layer B1 | Pressure-sensitive adhesive N1 | Low-reflection surface protective film 1 | B |
| Example 3-5 | 3-5 | Cellulose acylate film 1 | PA1 | Polarizer layer of Example 1-2 | Refractive index adjusting layer N1 | — | Pressure-sensitive adhesive N1 | Low-reflection surface protective film 1 | C |

[Preparation of Polarizer Layer]

A laminate 4-2 of Example 4-2 was obtained in the same manner as in Example 4-1 except that the obtained alignment layer Rb1 was used.

Example 4-3

A laminate 4-3 of Example 4-3 was obtained in the same manner as in Example 4-1 except that the following polarizer layer-forming composition X was used in formation of the polarizer layer.

| Composition of polarizer layer-forming composition X |
|---|
| •Dichroic material Y4 shown above: 0.274 parts by mass |
| •Dichroic material M1 shown above: 0.317 parts by mass |
| •Dichroic material C1 shown above: 0.488 parts by mass |
| •Polymer liquid crystal compound P1 shown above: 3.354 parts by mass |
| •Low-molecular-weight liquid crystal compound L2: 0.915 parts by mass |
| •Polymerization initiator I1: 0.110 parts by mass |
| •Surfactant F2 shown above: 0.055 parts by mass |
| •Cyclopentanone: 47.000 parts by mass |
| •Tetrahydrofuran: 47.000 parts by mass |

Example 4-4

[Preparation of Alignment Layer PA3]

41.6 parts by mass of butoxyethanol, 41.6 parts by mass of dipropylene glycol monomethyl, and 15.8 parts by mass of pure water were added to 1 part by mass of a photo-alignment material PA3 having the following structure, and the obtained solution was filtered through a 0.45 μm membrane filter under pressure. The alignment layer Rb1 that had not been subjected to a rubbing treatment was coated with the obtained coating solution for a photo-alignment film and dried at 60° C. for 1 minute. Next, the obtained coating film was irradiated with linearly polarized ultraviolet rays (illuminance of 4.5 mW, irradiation dose of 300 mJ/cm$^2$) using a polarized ultraviolet ray exposure device, thereby preparing an alignment film PA3.

PA3

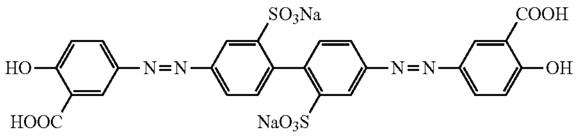

[Preparation of Polarizer Layer]

A laminate 4-4 of Example 4-4 was obtained in the same manner as in Example 4-3 except that the obtained alignment layer PA3 was used.

<Evaluation of Defects>

The laminate was cut into a size of 10 cm×10 cm, placed on a backlight equipped with a polarizing plate (HCL2-5618HCS, manufactured by Sanritz Co., Ltd.), and the polarizer layer was observed using a loupe. The number of alignment defects due to rubbish was counted and evaluated according to the following evaluation standards. The results are shown in the fifth table.

A: The number of defects was less than 20

B: The number of defects was 20 or greater

<Degree of Alignment>

The degrees of alignment of the above-described laminates 4-1 to 4-4 were evaluated by the above-described evaluation method and evaluation standards for the degree of alignment. The results are shown in the fifth table.

<Adhesive Force>

The adhesive forces of the above-described laminates 4-1 to 4-4 were evaluated by the above-described evaluation method and evaluation standards for the adhesive force. The results are shown in the fifth table.

TABLE 6

| Fifth table | Laminate | | | Degree of alignment | Adhesive force | Alignment defect |
|---|---|---|---|---|---|---|
| | | Alignment layer | Polarizer layer | | | |
| Example 4-1 | Laminate 4-1 | PA1 | Polarizer layer of Example 1-2 | A | A | A |
| Example 4-2 | Laminate 4-2 | Rb1 | Polarizer layer of Example 1-2 | A | A | B |
| Example 4-3 | Laminate 4-3 | PA1 | Preparation using polarizer-forming composition X | A | A | A |
| Example 4-4 | Laminate 4-4 | PA3 | Preparation using polarizer-forming composition X | A | B | A |

Example 5-1

A laminate 5-1 of Example 5-1 was prepared in the same manner as in Example 1-2 except that the following surfactant F3 was used in place of the surfactant F1. The degree of alignment, the adhesiveness, and the haze were evaluated by the same methods as in Example 1-2, and the results are as follows.

Degree of alignment: B

Adhesive force: B

Haze: C

F3

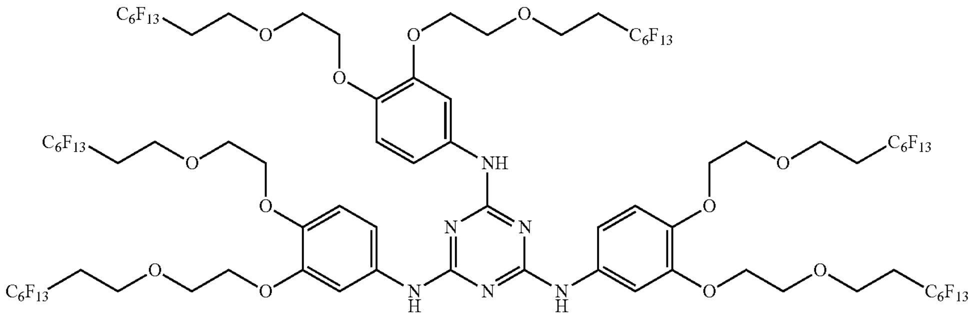

Example 6-1

[Preparation of Vertical Polarizer Layer]

The alignment layer Rb1 provided on the cellulose acylate film 1 was continuously coated with the following vertical polarizer layer-forming composition Z with a #20 wire bar, heated at 120° C. for 45 seconds, and cooled to room temperature (23° C.). Next, the coating layer was heated at 75° C. for 30 seconds and cooled to room temperature again. Thereafter, the coating layer was irradiated with an LED lamp (center wavelength of 365 nm) for 2 seconds under an irradiation condition of an illuminance of 200 mW/cm$^2$, thereby preparing a vertical polarizer layer 6-1 on the alignment film Rb1. The film thickness of the vertical polarizer layer 6-1 was 1.8 μm. In the vertical polarizer layer, the liquid crystal compound and the dichroic material were aligned in the film thickness direction of the vertical polarizer layer.

| Composition of vertical polarizer layer-forming composition Z |
| --- |
| •Dichroic material Y1 shown above: 0.322 parts by mass<br>•Dichroic material M1 shown above: 0.087 parts by mass<br>•Dichroic material C2 shown above: 0.579 parts by mass<br>•Polymer liquid crystal compound P1 shown above: 2.526 parts by mass<br>•Low-molecular-weight liquid crystal compound L1 shown above: 1.669 parts by mass<br>•Polymerization initiator I1: 0.081 parts by mass<br>•Compound B03 (surfactant) shown above: 0.005 parts by mass<br>•Vertical alignment agent S01 (alignment control agent) shown above: 0.065 parts by mass<br>•Vertical alignment agent S02 (alignment control agent) shown below: 0.065 parts by mass<br>•Cyclopentanone: 87.505 parts by mass<br>•Benzyl alcohol: 7.095 parts by mass |

S02

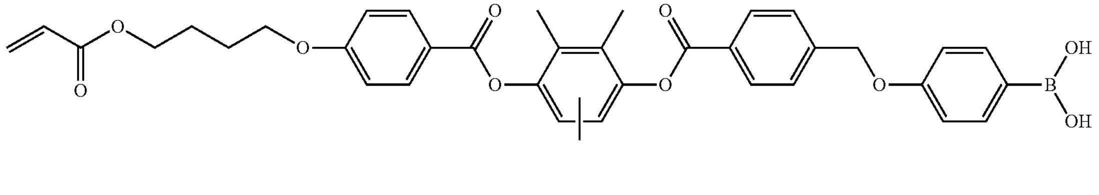

Example 6-2 to Example 6-4 and Comparative Example 6-1

Each vertical polarizer layer of Examples 6-2 to 6-4 and Comparative Example 6-1 was formed in the same manner as in Example 6-1 except that the vertical polarizer layer-forming composition Z was changed to the composition listed in the sixth table shown below.

<Evaluation of Degree of Alignment>

The polar angle for a Mueller matrix of the vertical polarizer layer was measured every 5° in a range of −70° to 70° at the wavelength λ in AxoScan OPMF-1 (manufactured by Opto Science, Inc.) using the obtained vertical polarizing element layer. Based on the measurement results, the angle at which the transmittance was maximized was defined as 0. After removing the influence of surface reflection, ko [λ] and ke [λ] were calculated by fitting to the following theoretical equation considering Snell's formula and Fresnel's formula. The measurement wavelength λ was 550 nm.

$$k=-\log(T)\times\lambda/(4\pi d)$$

The absorbance in the in-plane direction and the thickness direction and the dichroic ratio were calculated from ko [λ] and ke [λ] obtained in the above-described manner, and the degree of alignment was calculated, and the degree of alignment was evaluated according to the following evaluation standards. The results are listed in the sixth table shown below.

A: 0.96 or greater
B: 0.92 or greater and less than 0.96
C: 0.85 or greater and less than 0.92
D: less than 0.85

<Evaluation of Adhesive Force>

A barrier layer B1 was formed on the prepared laminate in the same manner as in Example 1-1. Next, the cellulose acylate film 1 was removed, and the cellulose acylate film 1 was reattached using the above-described pressure-sensitive adhesive N2. Next, a total of 100 squares were cut on the surface on a side where the barrier layer B1 was provided by making 11 vertical cuts and 11 horizontal cuts in a grid pattern with a cutter knife, and polyester pressure-sensitive adhesive tape (No. 31B) (manufactured by Nitto Denko Corporation) was attached onto the surface thereof. The tape was quickly peeled off in the vertical direction after 30 minutes, the number of peeled squares was counted, and the evaluation was made according to the following standards. The results are listed in the sixth table shown below.

A: Peeling was not observed in 100 squares.
B: Peeling of 1 to 10 squares was observed in 100 squares.
C: Peeling of 11 to 30 squares was observed in 100 squares.
D: Peeling of 31 or more squares was observed in 100 squares.

TABLE 7

| | Polymer liquid crystal | | Low-molecular-weight liquid crystal compound | | Dichroic material | | Dichroic material | | Dichroic material | | Surfactant | |
|---|---|---|---|---|---|---|---|---|---|---|---|---|
| Sixth table | Type | Parts by mass | Type | Parts by mass | Type | Parts by mass | Type | Parts by mass | Type | Parts by mass | Type | Parts by mass |
| Example 6-1 | P1 | 2.526 | L1 | 1.669 | Y1 | 0.322 | M1 | 0.087 | C2 | 0.579 | B03 | 0.005 |
| Example 6-2 | P1 | 2.526 | L3 | 1.669 | Y2 | 0.322 | M2 | 0.087 | C2 | 0.579 | B03 | 0.005 |
| Example 6-3 | P1 | 2.526 | L2 | 1.669 | Y4 | 0.322 | M2 | 0.087 | C2 | 0.579 | B03 | 0.005 |
| Example 6-4 | P1 | 2.526 | L2 | 1.669 | Y4 | 0.322 | M2 | 0.087 | C1 | 0.579 | B03 | 0.005 |
| Comparative Example 6-1 | P1 | 2.526 | L8 | 1.669 | Y1 | 0.322 | M1 | 0.087 | C1 | 0.579 | B03 | 0.005 |

| | Polymerization initiator | | Vertical alignment agent | | Vertical alignment agent | | Cyclo- | Benzyl alcohol Parts | Degree | |
|---|---|---|---|---|---|---|---|---|---|---|
| Sixth table | Type | Parts by mass | Type | Parts by mass | Type | Parts by mass | pentanone Type | by mass | of alignment | Adhesive force |
| Example 6-1 | I1 | 0.081 | S01 | 0.065 | S02 | 0.065 | 87.505 | 7.095 | C | C |
| Example 6-2 | I1 | 0.081 | S01 | 0.065 | S02 | 0.065 | 87.505 | 7.095 | B | B |
| Example 6-3 | I1 | 0.081 | S01 | 0.065 | S02 | 0.065 | 87.505 | 7.095 | A | A |
| Example 6-4 | I1 | 0.081 | S01 | 0.065 | S02 | 0.065 | 87.505 | 7.095 | A | A |
| Comparative Example 6-1 | I1 | 0.081 | I1 | 0.065 | S02 | 0.065 | 87.505 | 7.095 | D | D |

EXPLANATION OF REFERENCES

100, 200: laminate
12: optically anisotropic layer
13: alignment layer
14: polarizer layer
16: refractive index adjusting layer
18: barrier layer
20: surface protective layer

What is claimed is:

1. A composition comprising:
at least a polymer liquid crystal compound;
a dichroic material;
a low-molecular-weight liquid crystal compound; and
a polymer interface improver,
wherein the polymer liquid crystal compound is a copolymer having a repeating unit (1) represented by Formula (1) and a repeating unit (4) represented by Formula (4),
the low-molecular-weight liquid crystal compound is a compound represented by Formula (LC), and
relationships represented by Expressions (11) to (13) and (20) to (21) are satisfied, (1)

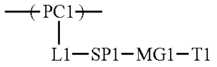

(LC)

Q1—SPL1—ML—SPL2—Q2

(4)

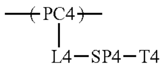

in Formula (1), PC1 represents a main chain of the repeating unit represented by the Formula (P1-A), L1 represents a single bond or a divalent linking group, SP1 represents a spacer group, MG1 represents a mesogen group, and T1 represents a terminal group, (P1-A)

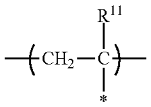

in Formula (P1-A), "*" represents a bonding position with respect to L1 in Formula (1), and $R^{11}$ represent a hydrogen atom, a halogen atom, a cyano group, an alkyl group having 1 to 10 carbon atoms, or an alkoxy group having 1 to 10 carbon atoms, in Formula (LC), SPL1 and SPL2 each independently represent a spacer group, ML represents a mesogen group, Q1 and Q2 each independently represent a crosslinkable group or a terminal group, and at least one of Q1 or Q2 represents a crosslinkable group, in Formula (4), PC4 represents a main chain of the repeating unit, L4 represents a single bond or a divalent linking group, SP4 represents a spacer group, T4 represents a crosslinkable group, and the number of atoms in a main chain of SP4 in Formula (4) is 31 or more and 70 or less, $$|\log P(SP1)-\log P(SPL1)|\leq 2.0 \quad (11)$$

$$|\log P(MG1)-\log P(SP1)|\geq 4.5 \quad (12)$$

$$|\log P(ML)-\log P(SPL1)|\geq 4.0 \quad (13)$$

in Formulae (11) to (13), log P(SP1) represents a log P value of SP1 in Formula (1), log P(MG1) represents a log P value of MG1 in Formula (1), log P(SPL1) represents a log P value of SPL1 in Formula (LC), and log P(ML) represents a log P value of ML in Formula (LC), $$D(SPL1)\geq D(SPL2) \quad (20)$$

$$|D(SP1)-D(SPL1)|\leq 4.0\text{Å} \quad (21)$$

in Expressions (20) and (21), D(SPL1) represents a molecular length of SPL1 in Formula (LC), D(SPL2) represents a molecular length of SPL2 in Formula (LC), and D(SP1) represents a molecular length of SP1 in Formula (1).

2. A composition comprising:

at least a polymer liquid crystal compound;

a dichroic material;

a low-molecular-weight liquid crystal compound; and a polymer interface improver, wherein the polymer liquid crystal compound is a copolymer having a repeating unit (1) represented by Formula (1) and a repeating unit (4) represented by Formula (4), the low-molecular-weight liquid crystal compound is a compound represented by Formula (LC), and relationships represented by Expressions (11) to (13) and (20) to (41') are satisfied, (1)

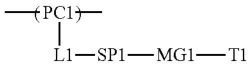

(LC)

Q1—SPL1—ML—SPL2—Q2

(4)

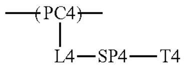

in Formula (1), PC1 represents a main chain of the repeating unit represented by the Formula (P1-A), L1 represents a single bond or a divalent linking group, SP1 represents a spacer group, MG1 represents a mesogen group, and T1 represents a terminal group, (P1-A)

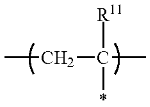

in Formula (P1-A), "*" represents a bonding position with respect to L1 in Formula (1), and $R^{11}$ represent a hydrogen atom, a halogen atom, a cyano group, an alkyl group having 1 to 10 carbon atoms, or an alkoxy group having 1 to 10 carbon atoms, in Formula (LC), SPL1 and SPL2 each independently represent a spacer group, ML represents a mesogen group, Q1 and Q2 each independently represent a crosslinkable group or a terminal group, and at least one of Q1 or Q2 represents a crosslinkable group, in Formula (4), PC4 represents a main chain of the repeating unit, L4 represents a single bond or a divalent linking group, SP4 represents a spacer group, T4 represents a crosslinkable group, and the number of atoms in a main chain of SP4 in Formula (4) is 31 or more and 70 or less, $$|\log P(SP1)-\log P(SPL1)|\leq 2.0 \quad (11)$$

$$|\log P(MG1)-\log P(SP1)|\geq 4.5 \quad (12)$$

$$|\log P(ML)-\log P(SPL1)|\geq 4.0 \quad (13)$$

in Formulae (11) to (13), log P(SP1) represents a log P value of SP1 in Formula (1), log P(MG1) represents a log P value of MG1 in Formula (1), log P(SPL1) represents a log P value of SPL1 in Formula (LC), and log P(ML) represents a log P value of ML in Formula (LC), $$D(SPL1)\geq D(SPL2) \quad (20)$$

$$D(SPL2)\leq 4.0\text{Å} \quad (41')$$

in Expressions (20) and (41'), D(SPL1) represents a molecular length of SPL1 in Formula (LC), and D(SPL2) represents a molecular length of SPL2 in Formula (LC).

3. The composition according to claim 1, wherein a relationship represented by Expression (31) is satisfied, $$\log P(SPL2) \leq 1.5 \quad (31)$$

where in Formula (31), log P(SPL2) represents a log P value of SPL2 in Formula (LC).

4. The composition according to claim 1, wherein a content of the repeating unit (4) is 10% by mass or greater with respect to all repeating units of the polymer liquid crystal compound.

5. The composition according to claim 1, wherein SP1 in Formula (1) has an oxyethylene structure.

6. A polarizer layer which is formed of the composition according to claim 1.

7. A laminate comprising:

a base material; and the polarizer layer according to claim 6 provided on the base material.

8. The laminate according to claim 7, further comprising:

an alignment layer which contains a polymer having a repeating unit that contains a crosslinkable group, on the base material, wherein a content of the repeating unit that contains the crosslinkable group is 20% by mass or greater with respect to all repeating units of the polymer.

9. The laminate according to claim 8, wherein the polymer further has a repeating unit having a partial structure represented by Formula (PA), (PA)

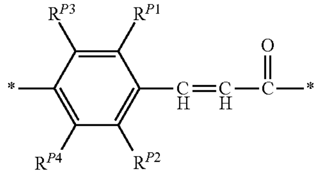

in Formula (PA), two symbols "*" represent a bonding position, and $R^{P1}$ to $R^{P4}$ each independently represent a hydrogen atom or a substituent.

10. The laminate according to claim 7, further comprising:

a refractive index adjusting layer on the polarizer layer.

11. The laminate according to claim 7, wherein the laminate has a haze of 0.2% to 1.5%.

12. A laminate comprising:

the polarizer layer according to claim 6; and a layer containing an ultraviolet absorbing agent.

13. The laminate according to claim 7, further comprising:

a λ/4 plate.

14. The laminate according to claim 13, further comprising:

a glass substrate on a side of the polarizer layer opposite to a surface where the λ/4 plate is provided, wherein in a case where the laminate includes the base material, the base material is the glass substrate.

15. The laminate according to claim 13, further comprising:

a barrier layer on a side of the polarizer layer opposite to the surface where the λ/4 plate is provided.

16. An image display device comprising:

the polarizer layer according to claim 6.

17. An image display device comprising:

the laminate according to claim 7.

* * * * *